US012523899B2

(12) United States Patent
Harrold et al.

(10) Patent No.: US 12,523,899 B2
(45) Date of Patent: *Jan. 13, 2026

(54) SWITCHABLE PRIVACY DISPLAY

(71) Applicant: RealD Spark, LLC, Boulder, CO (US)

(72) Inventors: Jonathan Harrold, Leamington Spa (GB); Michael G Robinson, Boulder, CO (US); Graham J. Woodgate, Henley-on-Thames (GB); Robert Ramsey, Boulder, CO (US); Ben Ihas, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,255

(22) Filed: Apr. 23, 2024

(65) Prior Publication Data

US 2024/0369869 A1    Nov. 7, 2024

Related U.S. Application Data

(60) Provisional application No. 63/461,885, filed on Apr. 25, 2023.

(51) Int. Cl.
*G02F 1/13*  (2006.01)
*G02F 1/133*  (2006.01)
*G02F 1/1335*  (2006.01)
*G02F 1/1343*  (2006.01)

(52) U.S. Cl.
CPC ........ *G02F 1/1323* (2013.01); *G02F 1/13306* (2013.01); *G02F 1/133528* (2013.01); *G02F 1/13439* (2013.01)

(58) Field of Classification Search
CPC .............. G02F 1/1323; G02F 1/13306; G02F 1/13528; G02F 1/13439
See application file for complete search history.

(56) References Cited

U.S. PATENT DOCUMENTS

| 3,914,022 A | 10/1975 | Kashnow |
| 4,059,916 A | 11/1977 | Tachihara et al. |
| 4,586,790 A | 5/1986 | Umeda et al. |
| 4,621,898 A | 11/1986 | Cohen |
| 4,974,941 A | 12/1990 | Gibbons et al. |

(Continued)

FOREIGN PATENT DOCUMENTS

| CA | 2222313 A1 | 6/1998 |
| CN | 1125943 C | 10/2003 |
| CN | 1601331 A | 3/2005 |
| CN | 1690800 A | 11/2005 |

(Continued)

OTHER PUBLICATIONS

KR10-2020-7024293 Notice of Preliminary Rejection mailed Dec. 7, 2023.

(Continued)

*Primary Examiner* — Mariceli Santiago
(74) *Attorney, Agent, or Firm* — Foley & Lardner LLP

(57) ABSTRACT

A switchable privacy display device comprises a spatial light modulator and a switchable diffractive view angle control retarder arrangement arranged between a display polariser of the spatial light modulator and an additional polariser. The display achieves high image visibility to an off-axis user in a share mode of operation and high image security to an off-axis snooper in privacy mode of operation.

23 Claims, 87 Drawing Sheets

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,126,882 A | 6/1992 | Oe et al. |
| 5,579,139 A | 11/1996 | Abileah et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,726,729 A | 3/1998 | Takei |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,466,486 B2 | 12/2008 | Mitsuya |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 9,939,675 B2 | 4/2018 | Peng et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,092,852 B2 | 8/2021 | Robinson et al. |
| 11,099,433 B2 | 8/2021 | Robinson et al. |
| 11,099,447 B2 | 8/2021 | Woodgate et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,340,482 B2 | 5/2022 | Robinson et al. |
| 11,366,358 B2 | 6/2022 | Wu et al. |
| 11,442,316 B2 | 9/2022 | Woodgate et al. |
| 11,573,437 B2 | 2/2023 | Woodgate et al. |
| 11,892,717 B2 | 2/2024 | Harrold et al. |
| 11,977,286 B2 | 5/2024 | Woodgate et al. |
| 12,253,748 B2 * | 3/2025 | Harrold ............. G02F 1/133638 |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0140342 A1 | 10/2002 | Sundahl |
| 2002/0163790 A1 | 11/2002 | Yamashita et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0246418 A1 | 12/2004 | Kumagai et al. |
| 2004/0264910 A1 | 12/2004 | Suzuki et al. |
| 2005/0002174 A1 | 1/2005 | Min et al. |
| 2005/0014913 A1 | 1/2005 | Kim et al. |
| 2005/0041311 A1 | 2/2005 | Mi et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0206814 A1 | 9/2005 | Histake |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259193 A1 | 11/2005 | Sumiyoshi et al. |
| 2005/0259205 A1 | 11/2005 | Sharp et al. |
| 2005/0270798 A1 | 12/2005 | Lee et al. |
| 2006/0050209 A1 | 3/2006 | Higa |
| 2006/0066785 A1 | 3/2006 | Moriya |
| 2006/0082702 A1 | 4/2006 | Jacobs et al. |
| 2006/0092512 A1 | 5/2006 | Shioya |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |

(56) References Cited

U.S. PATENT DOCUMENTS

| | | |
|---|---|---|
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262376 A1 | 11/2006 | Mather et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0040780 A1 | 2/2007 | Gass et al. |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0147088 A1 | 6/2007 | Chien et al. |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0106689 A1 | 5/2008 | Inoue et al. |
| 2008/0117364 A1 | 5/2008 | Matsushima |
| 2008/0129899 A1 | 6/2008 | Sharp |
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2008/0316366 A1 | 12/2008 | Takatani et al. |
| 2009/0009894 A1 | 1/2009 | Chuang |
| 2009/0021657 A1 | 1/2009 | Yang et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0309204 A1 | 12/2010 | Smith et al. |
| 2010/0328438 A1 | 12/2010 | Ohyama et al. |
| 2011/0018860 A1 | 1/2011 | Parry-Jones et al. |
| 2011/0032437 A1 | 2/2011 | Yoshimi et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0086893 A1 | 4/2012 | Ou et al. |
| 2012/0113158 A1 | 5/2012 | Goto et al. |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0050610 A1 | 2/2013 | Parry-Jones et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308185 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0313464 A1 | 10/2014 | Li et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0029449 A1 | 1/2015 | Woo et al. |
| 2015/0035872 A1 | 2/2015 | Shima et al. |
| 2015/0055366 A1 | 2/2015 | Chang et al. |
| 2015/0088284 A1 | 3/2015 | Hendricks et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0293409 A1 | 10/2015 | Usukura et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |

(56) References Cited

U.S. PATENT DOCUMENTS

| | | |
|---|---|---|
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0154458 A1 | 6/2016 | Liu et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0023725 A1 | 1/2017 | Oki et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |
| 2017/0363913 A1 | 12/2017 | Yi |
| 2018/0011173 A1 | 1/2018 | Newman |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0210253 A1 | 7/2018 | Kashima |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0284341 A1 | 10/2018 | Woodgate et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0056628 A1 | 2/2019 | Inokuchi |
| 2019/0086706 A1 | 3/2019 | Robinson et al. |
| 2019/0121173 A1 | 4/2019 | Robinson et al. |
| 2019/0146134 A1 | 5/2019 | Miura et al. |
| 2019/0154896 A1 | 5/2019 | Yanai |
| 2019/0196235 A1 | 6/2019 | Robinson et al. |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0278010 A1 | 9/2019 | Sakai et al. |
| 2019/0293858 A1 | 9/2019 | Woodgate et al. |
| 2019/0293983 A1 | 9/2019 | Robinson et al. |
| 2019/0331944 A1 | 10/2019 | Fang et al. |
| 2019/0339433 A1 | 11/2019 | Benoit et al. |
| 2019/0353944 A1 | 11/2019 | Acreman et al. |
| 2019/0361165 A1 | 11/2019 | Chang et al. |
| 2020/0019006 A1 | 1/2020 | Robinson et al. |
| 2020/0026114 A1 | 1/2020 | Harrold et al. |
| 2020/0026125 A1 | 1/2020 | Robinson et al. |
| 2020/0041839 A1 | 2/2020 | Robinson et al. |
| 2020/0110301 A1 | 4/2020 | Harrold et al. |
| 2020/0132904 A1 | 4/2020 | Smith et al. |
| 2020/0159055 A1 | 5/2020 | Robinson et al. |
| 2020/0185590 A1 | 6/2020 | Malhotra et al. |
| 2020/0218101 A1 | 7/2020 | Ihas et al. |
| 2020/0225402 A1 | 7/2020 | Ihas et al. |
| 2020/0233142 A1 | 7/2020 | Liao et al. |
| 2020/0409156 A1 | 12/2020 | Sissom et al. |
| 2021/0018773 A1 | 1/2021 | Woodgate et al. |
| 2021/0033898 A1 | 2/2021 | Woodgate et al. |
| 2021/0072448 A1 | 3/2021 | Peng et al. |
| 2021/0116627 A1 | 4/2021 | Tsuji |
| 2021/0149233 A1 | 5/2021 | Robinson et al. |
| 2021/0149234 A1 | 5/2021 | Woodgate et al. |
| 2021/0271121 A1 | 9/2021 | Woodgate et al. |
| 2021/0333577 A1 | 10/2021 | Robinson et al. |
| 2021/0333580 A1 | 10/2021 | Matsushima |
| 2021/0341769 A1 | 11/2021 | Woodgate et al. |
| 2021/0373382 A1 | 12/2021 | Sakai et al. |
| 2021/0382340 A1 | 12/2021 | Harrold et al. |
| 2022/0113552 A1 | 4/2022 | Schowengerdt |
| 2022/0269128 A1 | 8/2022 | Matsushima |
| 2022/0404540 A1 | 12/2022 | Robinson et al. |
| 2022/0413338 A1 | 12/2022 | Matsushima et al. |
| 2023/0099000 A1 | 3/2023 | Harrold et al. |
| 2023/0254457 A1 | 8/2023 | Robinson et al. |
| 2023/0375863 A1 | 11/2023 | Woodgate et al. |

FOREIGN PATENT DOCUMENTS

| | | |
|---|---|---|
| CN | 1776484 A | 5/2006 |
| CN | 101042449 A | 9/2007 |
| CN | 101256251 A | 9/2008 |
| CN | 101405631 A | 4/2009 |
| CN | 101435952 A | 5/2009 |
| CN | 101454712 A | 6/2009 |
| CN | 101518095 A | 8/2009 |
| CN | 101681061 A | 3/2010 |
| CN | 102540544 A | 7/2012 |
| CN | 102582438 A | 7/2012 |
| CN | 103109226 A | 5/2013 |
| CN | 103473494 A | 12/2013 |
| CN | 103688211 A | 3/2014 |
| CN | 103988121 A | 8/2014 |
| CN | 104133292 A | 11/2014 |
| CN | 104303085 A | 1/2015 |
| CN | 104321686 A | 1/2015 |
| CN | 104380177 A | 2/2015 |
| CN | 104597661 A | 5/2015 |
| CN | 204740413 U | 11/2015 |
| CN | 105842909 A | 8/2016 |
| CN | 105960609 A | 9/2016 |
| CN | 106104372 A | 11/2016 |
| CN | 106415342 A | 2/2017 |
| CN | 106557711 A | 4/2017 |
| CN | 107102460 A | 8/2017 |
| CN | 209171779 U | 7/2019 |
| EP | 1326102 A1 | 7/2003 |
| EP | 1060344 B1 | 5/2004 |
| EP | 1956423 A1 | 8/2008 |
| EP | 2037318 A1 | 3/2009 |
| GB | 2405542 A | 3/2005 |
| GB | 2415850 A | 1/2006 |
| GB | 2418518 A | 3/2006 |
| GB | 2428100 A | 1/2007 |
| GB | 2428345 A | 1/2007 |
| GB | 2482065 A | 1/2012 |
| GB | 2486935 B | 9/2013 |
| JP | S58143305 A | 8/1983 |
| JP | H01130783 U | 9/1989 |

(56) References Cited

FOREIGN PATENT DOCUMENTS

| | | | |
|---|---|---|---|
| JP | H09197405 | A | 7/1997 |
| JP | H10268251 | A | 10/1998 |
| JP | H11174489 | A | 7/1999 |
| JP | 2005316470 | A | 11/2005 |
| JP | 2005345799 | A | 12/2005 |
| JP | 2006139160 | A | 6/2006 |
| JP | 2006201326 | A | 8/2006 |
| JP | 2006330164 | A | 12/2006 |
| JP | 2007501966 | A | 2/2007 |
| JP | 2007148279 | A | 6/2007 |
| JP | 2007273288 | A | 10/2007 |
| JP | 2008310271 | A | 12/2008 |
| JP | 2009020293 | A | 1/2009 |
| JP | 2011095719 | A | 5/2011 |
| JP | 2011103241 | A | 5/2011 |
| JP | 2013160818 | A | 8/2013 |
| JP | 2014032953 | A | 2/2014 |
| JP | 2014099363 | A | 5/2014 |
| JP | 2015125240 | A | 7/2015 |
| KR | 20090106062 | A | 10/2009 |
| KR | 20090108231 | A | 10/2009 |
| KR | 20100085732 | A | 7/2010 |
| KR | 20120011228 | A | 2/2012 |
| KR | 20120089950 | A | 8/2012 |
| KR | 101227145 | B1 | 2/2013 |
| KR | 20130046116 | A | 5/2013 |
| KR | 1020150021937 | A | 3/2015 |
| KR | 20150142753 | A | 12/2015 |
| KR | 20160053264 | A | 5/2016 |
| KR | 1020170013915 | A | 2/2017 |
| KR | 1020170019006 | A | 2/2017 |
| KR | 1020170040565 | A | 4/2017 |
| KR | 101990286 | B1 | 6/2019 |
| TW | M537663 | U | 3/2017 |
| TW | I612360 | B | 1/2018 |
| WO | 2005071449 | A2 | 8/2005 |
| WO | 2005071474 | A2 | 8/2005 |
| WO | 2006030702 | A1 | 3/2006 |
| WO | 2008001896 | A1 | 1/2008 |
| WO | 2008078764 | A1 | 7/2008 |
| WO | 2008093445 | A1 | 8/2008 |
| WO | 2009008406 | A1 | 1/2009 |
| WO | 2009011199 | A1 | 1/2009 |
| WO | 2010021926 | A2 | 2/2010 |
| WO | 2010101141 | A1 | 9/2010 |
| WO | 2010143705 | A1 | 12/2010 |
| WO | 2014011328 | A1 | 1/2014 |
| WO | 2014130860 | A1 | 8/2014 |
| WO | 2015040776 | A1 | 3/2015 |
| WO | 2015057625 | A1 | 4/2015 |
| WO | 2015143227 | A1 | 9/2015 |
| WO | 2015157184 | A1 | 10/2015 |
| WO | 2015190311 | A1 | 12/2015 |
| WO | 2015200814 | A1 | 12/2015 |
| WO | 2016195786 | A1 | 12/2016 |
| WO | 2017050631 | A1 | 3/2017 |
| WO | 2017065745 | A1 | 4/2017 |
| WO | 2017117570 | A1 | 7/2017 |
| WO | 2018003380 | A1 | 1/2018 |
| WO | 2018035492 | A1 | 2/2018 |
| WO | 2018178790 | A1 | 10/2018 |
| WO | 2018208618 | A1 | 11/2018 |
| WO | 2018221413 | A1 | 12/2018 |
| WO | 2019055755 | A1 | 3/2019 |
| WO | 2019067846 | A1 | 4/2019 |
| WO | 2019090252 | A1 | 5/2019 |
| WO | 2019147762 | A1 | 8/2019 |
| WO | 2021003383 | A1 | 1/2021 |

OTHER PUBLICATIONS

Nelkon et al., "Advanced Level Physics", Third edition with SI units, Heinemann Educational Books LTD, London, 1970.

PCT/US2016/058695 International search report and written opinion of the international searching authority mailed Feb. 28, 2017.
PCT/US2017/032734 International search report and written opinion of the international searching authority mailed Jul. 27, 2017.
PCT/US2018/031206 International search report and written opinion of the international searching authority mailed Jul. 20, 2018.
PCT/US2018/031218 International search report and written opinion of the international searching authority mailed Jul. 19, 2018.
PCT/US2018/051021 International search report and written opinion of the international searching authority mailed Nov. 21, 2018.
PCT/US2018/051027 International search report and written opinion of the international searching authority mailed Nov. 30, 2018.
PCT/US2018/053328 International search report and written opinion of the international searching authority mailed Nov. 30, 2018.
PCT/US2018/059249 International search report and written opinion of the international searching authority mailed Jan. 3, 2019.
PCT/US2018/059256 International search report and written opinion of the international searching authority mailed Jan. 3, 2019.
PCT/US2019/014889 International search report and written opinion of the international searching authority mailed May 24, 2019.
PCT/US2019/014902 International search report and written opinion of the international searching authority mailed Jun. 25, 2019.
PCT/US2019/023659 International search report and written opinion of the international searching authority mailed Jun. 10, 2019.
PCT/US2019/038409 International search report and written opinion of the international searching authority mailed Sep. 19, 2019.
PCT/US2019/038466 International search report and written opinion of the international searching authority mailed Nov. 5, 2019.
PCT/US2019/042027 International search report and written opinion of the international searching authority mailed Oct. 15, 2019.
PCT/US2019/054291 International search report and written opinion of the international searching authority mailed Jan. 6, 2020.
PCT/US2019/059990 International search report and written opinion of the international searching authority mailed Feb. 28, 2020.
PCT/US2019/066208 International search report and written opinion of the international searching authority mailed Feb. 27, 2020.
PCT/US2020/017537 International search report and written opinion of the international searching authority mailed Apr. 29, 2020.
PCT/US2020/040686 International search report and written opinion of the international searching authority mailed Nov. 20, 2020.
PCT/US2020/044574 International search report and written opinion of the international searching authority mailed Oct. 21, 2020.
PCT/US2020/053863 International search report and written opinion of the international searching authority mailed Mar. 12, 2021.
PCT/US2020/060155 International search report and written opinion of the international searching authority mailed Feb. 5, 2021.
PCT/US2020/060191 International search report and written opinion of the international searching authority mailed Feb. 8, 2021.
PCT/US2020/063638 International search report and written opinion of the international searching authority mailed Mar. 2, 2021.
PCT/US2020/064633 International search report and written opinion of the international searching authority mailed Mar. 15, 2021.
PCT/US2021/029937 International search report and written opinion of the international searching authority mailed Aug. 6, 2021.
PCT/US2021/029944 International search report and written opinion of the international searching authority mailed Aug. 3, 2021.
PCT/US2021/029947 International search report and written opinion of the international searching authority mailed Aug. 10, 2021.
PCT/US2021/029954 International search report and written opinion of the international searching authority mailed Aug. 10, 2021.
PCT/US2021/029958 International search report and written opinion of the international searching authority mailed Aug. 10, 2021.
PCT/US2021/043435 International search report and written opinion of the international searching authority mailed Nov. 1, 2021.
PCT/US2021/043444 International search report and written opinion of the international searching authority mailed Nov. 1, 2021.
PCT/US2022/045030 International search report and written opinion of the international searching authority mailed Jan. 3, 2023.
PCT/US2023/012240 International search report and written opinion of the international searching authority mailed Apr. 27, 2023.
PCT/US2023/012243 International search report and written opinion of the international searching authority mailed May 10, 2023.
PCT/US2023/017639 International search report and written opinion of the international searching authority mailed Jul. 6, 2023.

(56) References Cited

OTHER PUBLICATIONS

Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks For Large-Scale Image Recognition", ICLR 2015.
TW107132221 First Office Action dated Apr. 28, 2022.
TW108140291 First Office Action dated Nov. 9, 2023.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
CN202080079843.9 Notification of the First Office Action dated Jul. 18, 2024.
EP21849510.9 Extended European Search Report of European Patent Office dated Jun. 19, 2024.
EP21849888.9 Extended European Search Report of European Patent Office dated Jul. 1, 2024.
Heber, "Switchable View Control using a Vertically Aligned Polarizer and Polarization Control", 31-2, siOPTICA GmbH, SID 2024 Digest, Jena, Germany, ISSN 0097-996X/24/5501, pp. 398-401.
KR10-2020-7024291 Notice of Preliminary Rejection mailed Jun. 13, 2024.
PCT/US2024/020519 International search report and written opinion of the international searching authority mailed Jun. 17, 2024.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
Cheng, et al., "Fast-Response Liquid Crystal Variable Optical Retarder and Multilevel Attenuator," Optical Engineering 52 (10), 107105 (Oct. 16, 2013). (Year: 2013).
Chiu, et al., "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
CN201680061632.6 Notification of the First Office Action dated Sep. 14, 2021.
CN201780030715.3 Notification of the First Office Action dated Jan. 21, 2020.
CN201880042320.X Notification of the First Office Action dated May 25, 2021.
CN-201880042320.X Notification of the Third Office Action from the Chinese Patent Office dated Dec. 30, 2022.
CN201880073578.6 Notification of the First Office Action dated Aug. 27, 2021.
CN-201980020303.0—Notification of the First Office Action dated Dec. 16, 2021.
CN201980030279.9 Notification of the First Office Action dated Mar. 29, 2022.
CN201980056000.4 Notification of the First Office Action dated Nov. 1, 2023.
CN201980056022.0 Notification of the First Office Action dated Oct. 23, 2023.
CN-201980082757.0 Notification of the 1st Office Action of the Chinese Patent Office mailed Dec. 5, 2022.
CN202080020818.3 Notification of the First Office Action dated Oct. 23, 2023.
CN202080059812.7 Notification of the First Office Action dated Oct. 19, 2023.
CN202080089170.5 Notification of the First Office Action dated Apr. 7, 2024.
EP-16860628.3 Extended European Search Report of European Patent Office dated Apr. 26, 2019.
EP-17799963.8 Extended European Search Report of European Patent Office dated Oct. 9, 2019.
EP-18855604.7 Extended European Search Report of European Patent Office dated Jun. 1, 2021.
EP-18857077.4 Extended European Search Report of European Patent Office dated Jun. 16, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
EP19771688.9 Notification of the First Office Action dated Mar. 6, 2023.
EP-19825448.4 Extended European Search Report of European Patent Office dated Mar. 10, 2022.
EP-19881483.2 Extended European Search Report of European Patent Office dated Aug. 5, 2022.
EP-20754927.0 Extended European Search Report of European Patent Office dated Sep. 19, 2022.
EP-20835231.0 Extended European Search Report of European Patent Office dated May 15, 2023.
EP-20851155.0 Extended European Search Report of European Patent Office dated Aug. 2, 2023.
EP-20872625.7 Extended European Search Report of European Patent Office dated Sep. 20, 2023.
EP-20887527.8 Extended European Search Report of European Patent Office dated Nov. 20, 2023.
EP-20887756.3 Extended European Search Report of European Patent Office dated Jan. 2, 2024.
EP-20898295.9 Extended European Search Report of European Patent Office dated Jan. 22, 2024.
EP21795524.4 Extended European Search Report of European Patent Office dated Apr. 26, 2024.
EP21796016.0 Extended European Search Report of European Patent Office dated Apr. 29, 2024.
EP23218625.4 Extended European Search Report of European Patent Office dated Feb. 23, 2024.
Gass, et al. "Privacy LCD Technology for Cellular Phones", Sharp Laboratories of Europe Ltd, Mobile LCD Group, Feb. 2007, pp. 45-49.
IN202017035853 Hearing Notice dated Jan. 3, 2024.
Ishikawa, T., "New Design for a Highly Collimating Turning Film", SID 06 Digest, pp. 514-517.
JP2019-561773 Non-Final Notice of Reasons for Rejection dated Mar. 22, 2022.
JP2020-509511 Non-Final Notice of Reasons for Rejection dated Jul. 19, 2022.
JP2020-540724 Non-Final Notice of Reasons for Rejection dated Jan. 4, 2023.
JP-2020-540797 Non-Final Notice of Reasons for Rejection from the Japan Patent Office mailed Dec. 6, 2022.
JP2020-550747 Non-Final Notice of Reasons for Rejection dated Mar. 29, 2023.
JP2021-518864 Non-Final Notice of Reasons for Rejection dated Oct. 24, 2023.
JP2022-506340 Non-Final Notice of Reasons for Rejection dated Mar. 19, 2024.
JP2022-526302 Non-Final Notice of Reasons for Rejection dated Apr. 30, 2024.
Kalantar, et al. "Backlight Unit With Double Surface Light Emission," J. Soc. Inf. Display, vol. 12, Issue 4, pp. 379-387 (Dec. 2004).
KR10-2020-7010753 Notice of Preliminary Rejection mailed Feb. 17, 2023.
EP20835231.0 Notification of the First Office Action dated Nov. 27, 2024.
KR10-2022-7019753 Notice of Preliminary Rejection mailed Oct. 30, 2024.
CN202080085343.6 Notification of the First Office Action dated Feb. 8, 2025.
KR10-2022-7002482 Notice of Preliminary Rejection mailed Jan. 2, 2025.
PCT/US2024/055852 International search report and written opinion of the international searching authority mailed Jan. 16, 2025.

(56) References Cited

OTHER PUBLICATIONS

PCT/US2024/059840 International search report and written opinion of the international searching authority mailed Feb. 24, 2025.
CN201980056022.0 Notification of the Second Office Action dated Jul. 26, 2024.
PCT/US2024/025836 International search report and written opinion of the international searching authority mailed Jul. 23, 2024.

* cited by examiner

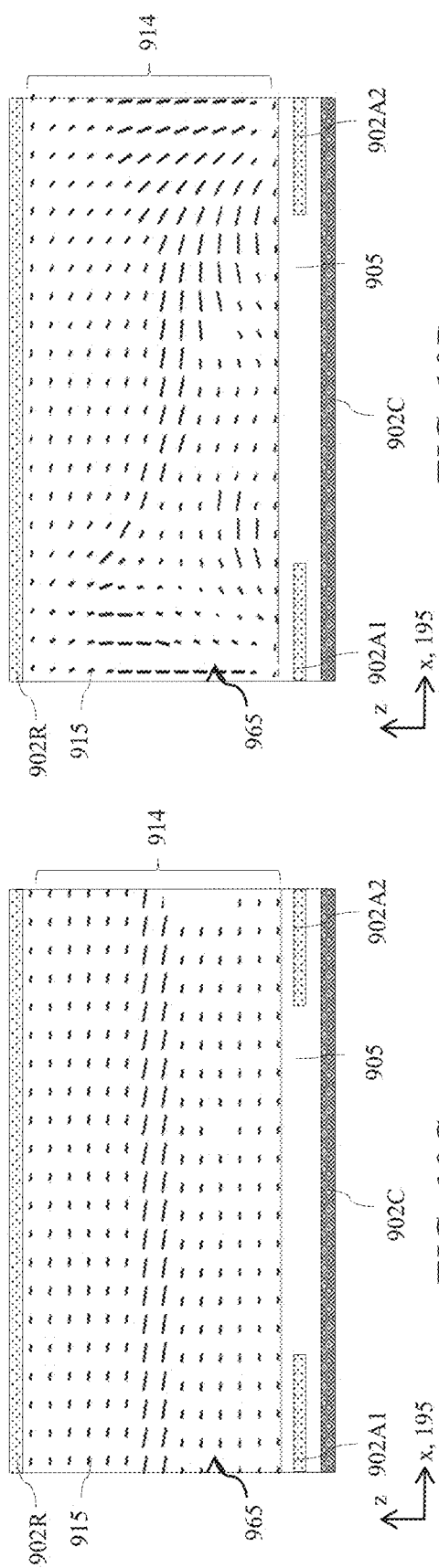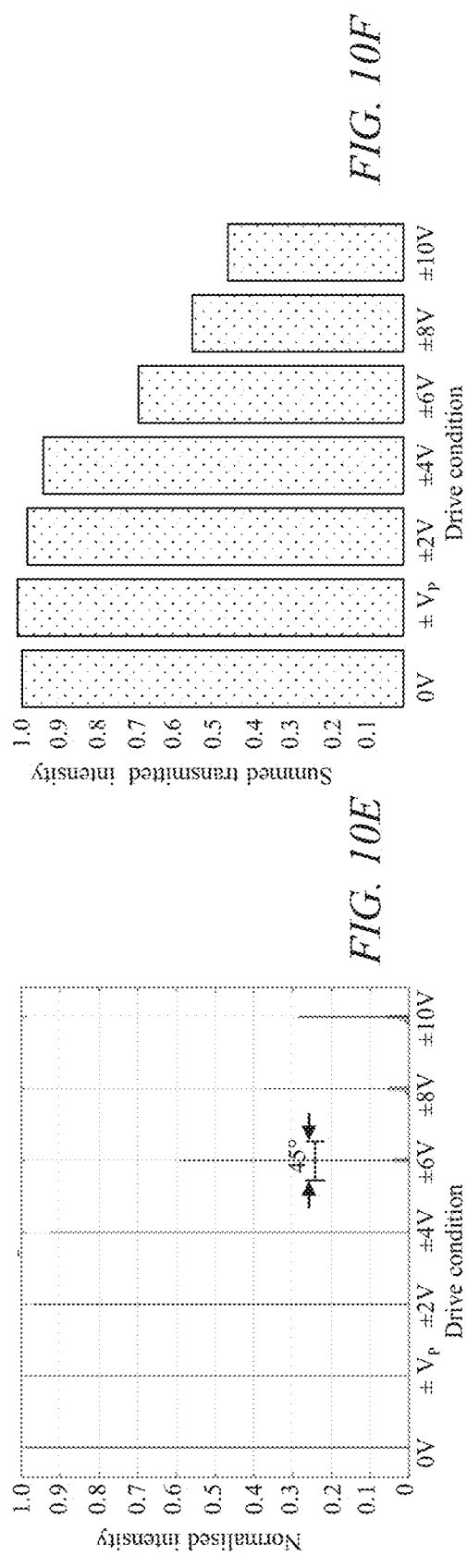

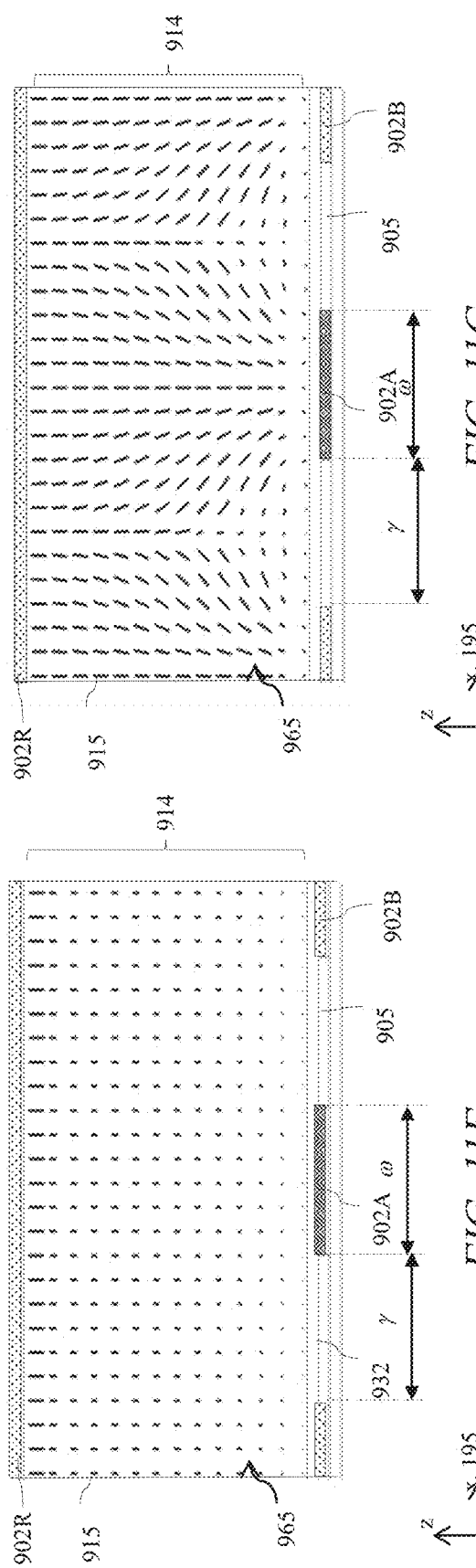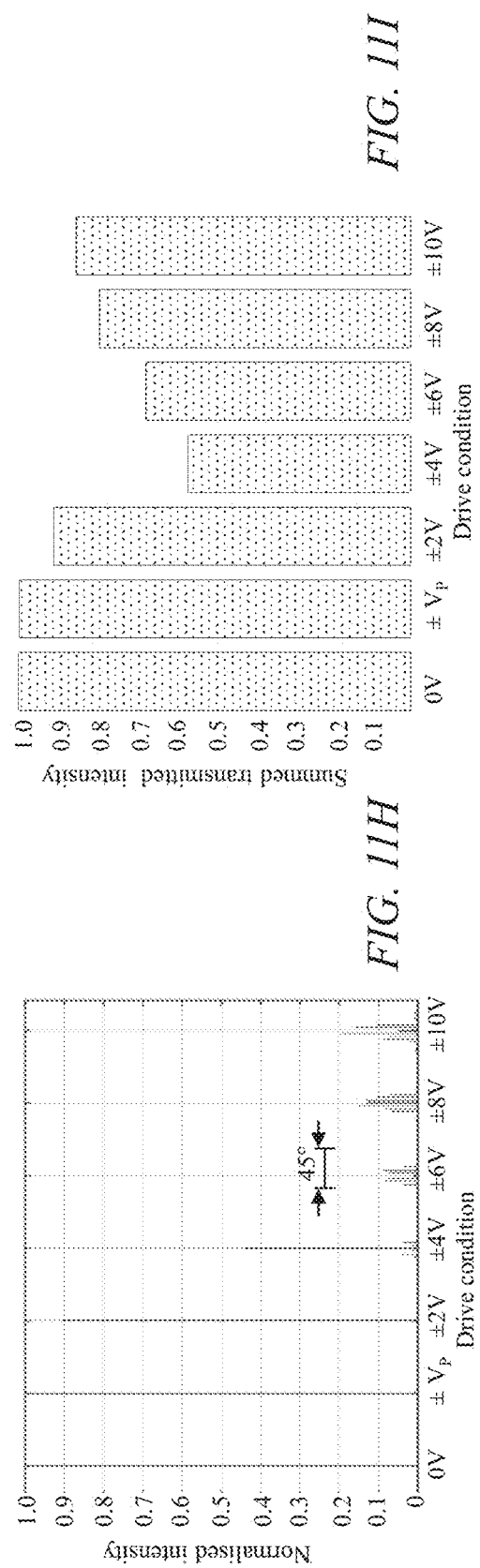

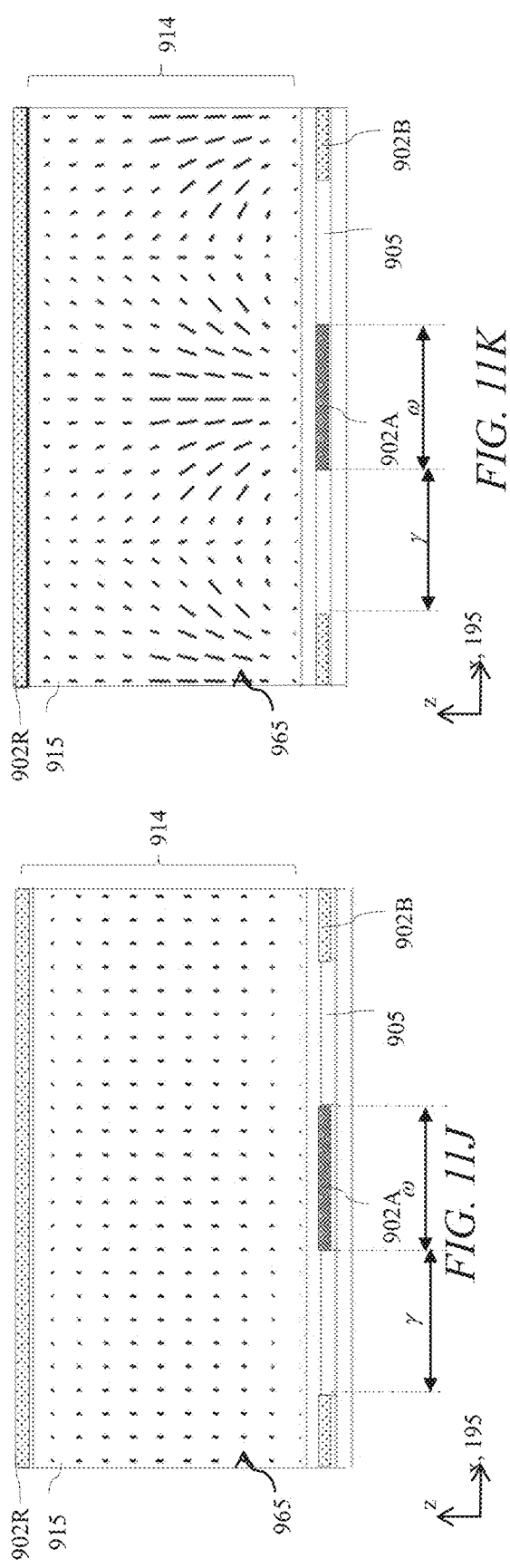
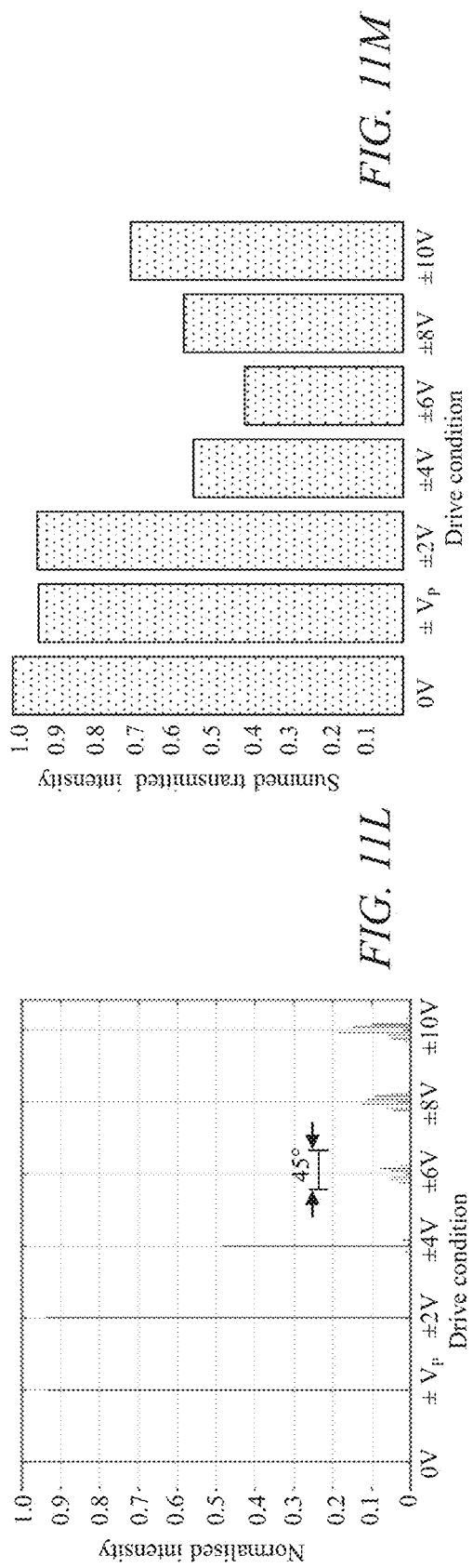
FIG. 11J
FIG. 11K
FIG. 11L
FIG. 11M

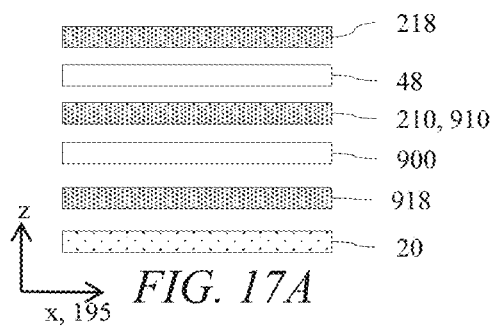
FIG. 17A
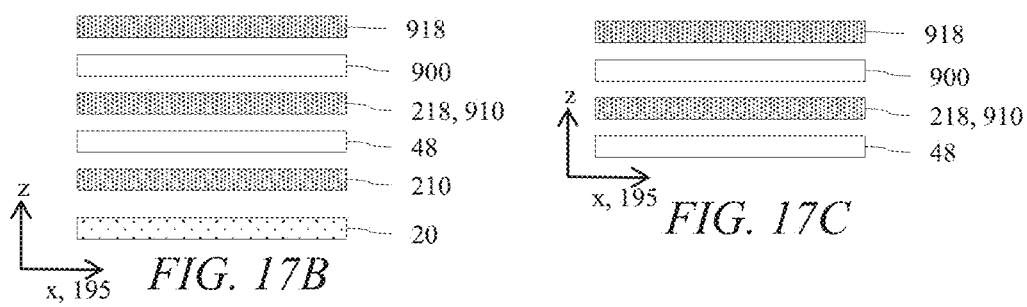
FIG. 17B
FIG. 17C
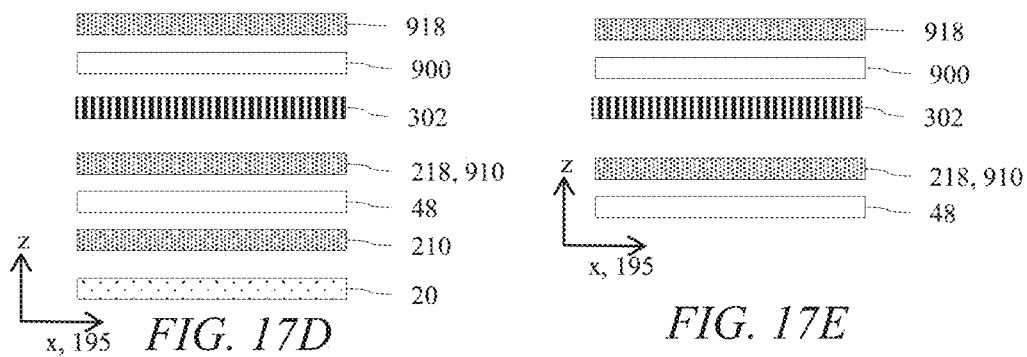
FIG. 17D
FIG. 17E

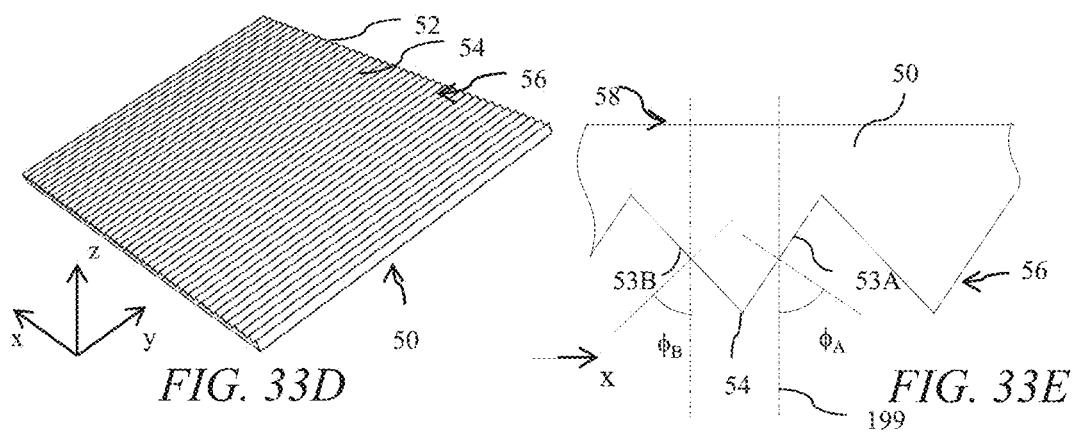
FIG. 33D
FIG. 33E
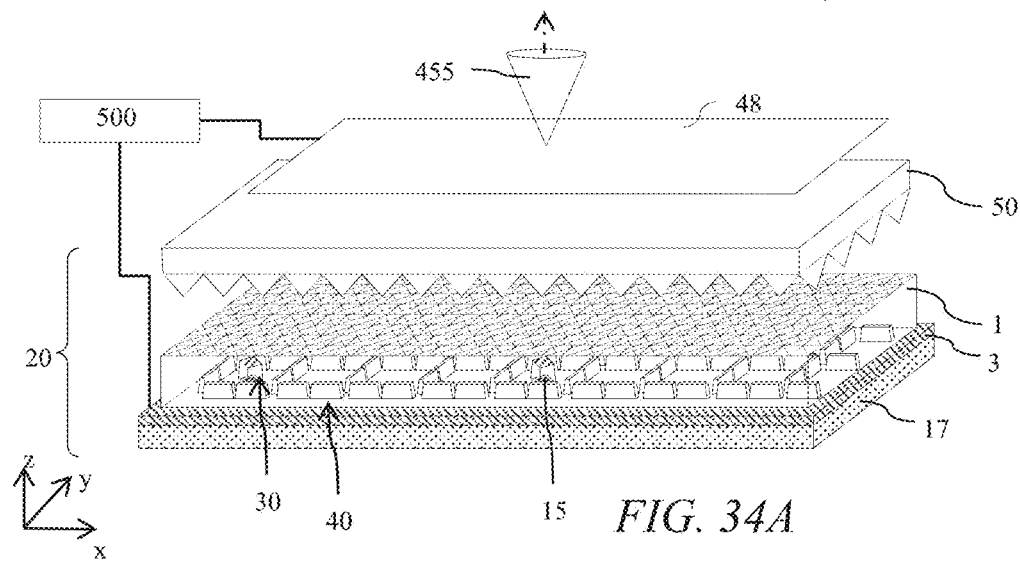
FIG. 34A
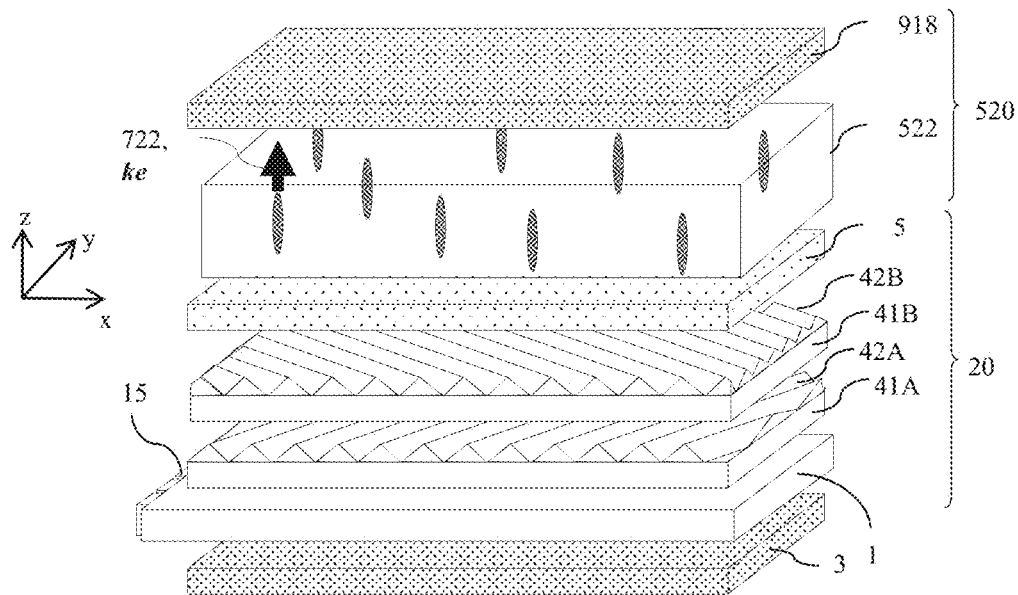
FIG. 34B

SWITCHABLE PRIVACY DISPLAY

TECHNICAL FIELD

This disclosure generally relates to optical stacks for use in privacy display and low stray light displays.

BACKGROUND

Privacy displays provide image visibility to a primary user that is typically in an on-axis position and reduced visibility of image content to a snooper, that is typically in an off-axis position.

Switchable privacy displays may be provided by control of the off-axis optical output.

Control of off-axis privacy may be provided by means of contrast reduction, for example by adjusting the liquid crystal bias tilt in an In-Plane-Switching LCD.

Control may be further provided by means of off-axis luminance reduction. Luminance reduction may be achieved by means of switchable backlights for a liquid crystal display (LCD) spatial light modulator. Off-axis luminance reduction may also be provided by switchable liquid crystal retarders and compensation retarders arranged to modulate the input and/or output directional luminance profile of a spatial light modulator.

Control may be further provided by means of off-axis reflectivity increase. Reflectivity increase may be achieved by means of switchable liquid crystal retarders, compensation retarders that are arranged to control the polarisation of ambient light that falls onto a reflective polariser.

BRIEF SUMMARY

According to a first aspect of the present disclosure there is provided a display device comprising: a spatial light modulator (SLM) arranged to output spatially modulated light; a display polariser arranged on a side of the SLM, the display polariser being a linear polariser; an additional polariser arranged on the same side of the SLM as the display polariser outside the display polariser, the additional polariser being a linear polariser; a switchable diffractive view angle control retarder arrangement (SDVACRA) arranged between the additional polariser and the display polariser, the SDVACRA comprising a switchable diffractive liquid crystal retarder (SDLCR) comprising a layer of liquid crystal material and a transmissive electrode arrangement arranged to drive the layer of liquid crystal material, wherein the transmissive electrode arrangement is patterned to be capable of driving the layer of liquid crystal material selectively into a narrow-angle state in which the layer of liquid crystal material has a structure of orientations which causes the layer of liquid crystal material to introduce net phase shifts to light having a predetermined polarisation state that are uniform across an area of the layer of liquid crystal material and thereby cause the layer of liquid crystal material to provide no diffractive effect to the light having the predetermined polarisation state; and causes the SDVACRA to introduce net relative phase shifts to orthogonal polarisation components of the light having the predetermined polarisation state that differ along a viewing axis and an inclined axis that is inclined to the viewing axis; and a wide-angle state in which the layer of liquid crystal material has a structure of orientations which causes the layer of liquid crystal material to introduce net phase shifts to the light having the predetermined polarisation state that vary spatially across the area of the layer of liquid crystal material and thereby cause the layer of liquid crystal material to provide a diffractive effect to the light having the predetermined polarisation state.

In one mode of operation of a display device, a narrow-angle state may be provided. A displayed image that is visible with high image visibility may be provided for a viewer along the viewing axis or at angles near to the viewing axis. A viewer viewing from directions inclined to the viewing axis may see an image with high image security and not perceive image data. A privacy mode of operation may be provided to prevent snoopers seeing the displayed image. A passenger infotainment display for a vehicle may be provided to reduce driver distraction by the image displayed to a passenger. A low stray light mode of operation may be provided, to reduce illumination of ambient environment by the light from the display device. In another mode of operation of a display device, a wide-angle state may be provided. A displayed image that is visible with high image visibility from a wide range of viewing positions may be provided. A share mode of operation may be provided and multiple viewers may see the displayed information simultaneously and comfortably. Switching between the narrow-angle state and wide-angle state may be provided. The display device may be segmented so that in some areas, the operating state is different to other operating states. In one mode of operation, some regions of the display device may provide narrow-angle state while other regions provide wide-angle state. In another mode of operation the whole of the display device may provide narrow-angle state or wide-angle state operation. Advantageously increased functionality of the display device may be achieved.

The number of layers provided to achieve desirable security factor in narrow-angle state and desirable image visibility in wide-angle state may be reduced. A thin, lightweight and low-cost display device may be provided. Gaps between segmented areas of the display device may be reduced.

The transmissive electrode arrangement may be patterned to be capable of driving the layer of liquid crystal material selectively into an intermediate state in which the layer of liquid crystal material has a structure of orientations which may cause the layer of liquid crystal material to introduce net phase shifts to the light having the predetermined polarisation state that are uniform across the area of the layer of liquid crystal material and thereby cause the layer of liquid crystal material to provide no diffractive effect to the light having the predetermined polarisation state; and may cause the SDVACRA to introduce net relative phase shifts to the orthogonal polarisation components of the light having the predetermined polarisation state that are the same along the viewing axis and the inclined axis.

By comparison with the narrow-angle state the display may be visible from an increased range of viewing angles. By comparison with the wide-angle state, the display luminance may be increased to the viewer along the viewing axis and/or power consumption may be reduced. In one mode of operation, some regions of the display device may provide one of the narrow-angle state, wide-angle state or intermediate state. In another mode of operation the whole of the display device may provide the same state operation. Advantageously increased functionality of the display device may be achieved.

In the wide-angle state, the structure of orientations of the layer of liquid crystal material may cause the layer of liquid crystal material to introduce net phase shifts to the light having the predetermined polarisation state that vary spatially in one direction across the area of the layer of liquid crystal material and thereby may cause the layer of liquid crystal material to provide the diffractive effect in the one direction.

Brightness in the wide-angle state to the viewer along the viewing axis may be increased. Efficiency in the wide-angle state may be increased and stray light in the direction orthogonal to the one direction may be reduced. The one direction may be in the lateral direction that may be a horizontal axis to provide desirable performance for horizontally spaced locations of viewers.

The transmissive electrode arrangement may comprise at least one array of separated electrodes. The separated electrodes may be manufactured by known manufacturing processes at low cost and complexity.

The at least one array of separated electrodes may be arrayed in the one direction and the separated electrodes may extend across the area of the layer of liquid crystal material in the direction orthogonal to the one direction. The separated electrodes may have a common connection. The common connection may be formed by a bar located outside an area of the SLM. Electrical connections to the separated electrodes may be conveniently provided at low cost and complexity.

The at least one array of separated electrodes may comprise two interdigitated sets of separated electrodes. The at least one array of separated electrodes may comprise two arrays of separated electrodes on opposite sides of the SDLCR, each comprising two interdigitated sets of separated electrodes. Each set of separated electrodes may have a common connection. The common connection for each set of separated electrodes may be formed by a respective bar, the bars being located outside an area of the SLM on opposite sides of the layer of liquid crystal material. Further control of the structure of orientations of the layer of liquid crystal material may be provided to achieve alternative profiles of diffracted light. Asymmetric diffraction patterns may be provided to achieve improved control of light output to the non-viewing direction that is primarily to one side of the optical axis of the display device. Increased display functionality may be provided.

The separated electrodes may be sufficiently closely spaced to produce an electric field capable of driving the layer of liquid crystal material uniformly into the narrow-angle state by application of a common voltage thereto. The cost and complexity of the electrode arrangement may be reduced and power consumption reduced.

The transmissive electrode arrangement may further comprise a control electrode extending across the entirety of the SLM, the control electrode being arranged on the same side of the layer of liquid crystal material as the array of separated electrodes, outside the array of separated electrodes. The profile of electric field within the layer of liquid crystal material may be modified and diffraction angles may be increased for a desirable pitch of separated electrodes.

The transmissive electrode arrangement may further comprise a reference electrode extending across the entirety of the SLM, the reference electrode being arranged on the opposite side of the layer of liquid crystal material from the array of separated electrodes. The layer of liquid crystal material may be switched between different structures of orientations to achieve desirable wide-angle and narrow-angle states of operation.

The display device may further comprise a control system arranged to supply voltages to the transmissive electrode arrangement for driving the layer of liquid crystal material. The control system may be arranged in a narrow-angle state, to supply voltages to the transmissive electrode arrangement that are selected to drive the layer of liquid crystal material into the-narrow-angle state; and in a wide-angle state, to supply voltages to the transmissive electrode arrangement that are selected to drive the layer of liquid crystal material into the wide-angle state. The liquid crystal layer may be controlled to provide output light cones for wide-angle; narrow-angle or intermediate states of operation. The size of the display device output light cones in each mode may be adjusted to achieve desirable viewing properties.

The switchable liquid crystal retarder may comprise two surface alignment layers disposed adjacent to the layer of liquid crystal material and on opposite sides thereof, the surface alignment layers each being arranged to provide alignment of the adjacent liquid crystal material. The surface alignment layer on the side of the layer of liquid crystal material adjacent the array of separated electrodes may have a component of alignment in the plane of the layer of liquid crystal material in the direction that may be orthogonal to the one direction. The direction of luminance reduction in the narrow-angle privacy mode may be provided in the one direction. For display devices wherein the one direction is the horizontal direction, viewing freedom in the vertical direction may be increased. The surface alignment layers may be selected to provide desirably low transmission in inclined directions in the narrow-angle state and desirable high transmission in the wide-angle state.

At least one of the surface alignment layers may be arranged to provide homogeneous alignment of the adjacent liquid crystal material. Visibility of artefacts arising from liquid crystal material flow during applied compression may be reduced.

Each of the surface alignment layers may be arranged to provide homogeneous alignment of the adjacent liquid crystal material; the layer of liquid crystal material of the SDLCR may have a retardance for light of a wavelength of 550 nm in a range from 500 nm to 900 nm; and the SDLCR may further comprise either: a passive uniaxial retarder having an optical axis perpendicular to the plane of the retarder and having a retardance for light of a wavelength of 550 nm in a range from −300 nm to −700 nm; or a pair of passive uniaxial retarders having optical axes in the plane of the retarders that are crossed and each having a retardance for light of a wavelength of 550 nm in a range from 300 nm to 800 nm. The angle of the inclined direction may be reduced for which the transmission minimum and desirable security factor may be achieved.

One of the surface alignment layers may be arranged to provide homogeneous alignment of the adjacent liquid crystal material and the other of the surface alignment layers may be arranged to provide homeotropic alignment of the adjacent liquid crystal material; the layer of liquid crystal material of the SDLCR may have a retardance for light of a wavelength of 550 nm in a range from 700 nm to 2000 nm; and the SDLCR may further comprise either: a passive uniaxial retarder having an optical axis perpendicular to the plane of the retarder and having a retardance for light of a wavelength of 550 nm in a range from −300 nm to −1800 nm; or a pair of passive uniaxial retarders having optical axes in the plane of the retarders that are crossed and each having a retardance for light of a wavelength of 550 nm in a range from 300 nm to 1800 nm. The size of the polar region for which desirable security factor is achieved may be increased. Increased light dispersion may be achieved and advantageously image visibility increased in wide-angle state.

Each of the surface alignment layers may be arranged to provide homeotropic alignment of the adjacent liquid crystal material; the layer of liquid crystal material of the SDLCR may have a retardance for light of a wavelength of 550 nm in a range from 500 nm to 1000 nm; and the SDLCR may further comprise either: a passive uniaxial retarder having an optical axis perpendicular to the plane of the retarder and having a retardance for light of a wavelength of 550 nm in a range from −300 nm to −900 nm; or a pair of passive uniaxial retarders having optical axes in the plane of the retarders that are crossed and each having a retardance for light of a wavelength of 550 nm in a range from 300 nm to 800 nm. The angle of the inclined direction may be reduced for which the transmission minimum and desirable security factor may be achieved.

The SDVACRA may further comprise at least one passive compensation retarder. In the wide-angle state the size of the polar region for which desirable image visibility is provided may be increased.

The area of the liquid crystal material extends across the entirety of the SLM. The cost and complexity of the electrode arrangement and control system may be reduced.

The viewing axis may be normal to a plane of the SLM. A symmetric operation display device may be provided. The nominal viewing direction for the primary viewer may be head-on to the display device.

The display device may further comprise a backlight arranged to output light, and the SLM may be a transmissive SLM arranged to receive the output light from the backlight. The backlight may provide a luminance at polar angles to the normal to the SLM greater than 45 degrees that may be at most 30% of the luminance along the normal to the SLM, preferably at most 20% of the luminance along the normal to the SLM, and most preferably at most 10% of the luminance along the normal to the SLM. A high efficiency display device may be provided. Low power consumption may be achieved for desirable image luminance. Desirable image luminance at angles greater than 45 degrees may be achieved in wide-angle state.

The display polariser may be an input display polariser arranged on the input side of the SLM, and the additional polariser and the SDVACRA may be arranged between the backlight and the SLM. The visibility of frontal reflections may be reduced and image contrast increased. The visibility of direct sunlight reflections may be reduced, to achieve improved display safety to a driver in a vehicle.

The display polariser may be an output display polariser arranged on the output side of the SLM. The additional polariser and switchable liquid crystal retarder may be conveniently added to the SLM during or after manufacture. Increased security factor may be achieved for a given ambient illuminance.

The display device may further comprise a reflective polariser arranged between the output display polariser and SDVACRA, the reflective polariser being a linear polariser. In privacy mode of operation, low reflectivity along the on-axis direction may be achieved, and high reflectivity along the non-viewing direction inclined to the on-axis direction. The size of the polar region for which desirable security factor is achieved may be increased.

The SDVACRA may further comprise a further switchable liquid crystal retarder comprising a layer of liquid crystal material and a further transmissive electrode arrangement arranged to drive the layer of liquid crystal material of the further switchable liquid crystal retarder, wherein the further transmissive electrode arrangement may be capable of driving the layer of liquid crystal material of the further switchable liquid crystal retarder selectively into: a narrow-angle state in which the layer of liquid crystal material may have a structure of orientations which causes the further switchable liquid crystal retarder to introduce net relative phase shifts to the orthogonal polarisation components of the light having the predetermined polarisation state that vary along the viewing axis and the inclined axis; and a wide-angle state in which the layer of liquid crystal material may have a structure of orientations which causes the further switchable liquid crystal retarder to introduce net relative phase shifts to the orthogonal polarisation components of the light having the predetermined polarisation state that are the same along the viewing axis and the inclined axis. Light dispersion in the wide-angle state may be increased. Image visibility to inclined viewers may be increased.

The display device may further comprise a further additional polariser on the same side of the SLM as the first-mentioned additional polariser and arranged either a) between the display polariser and the first-mentioned SDVACRA or b) outside the first-mentioned additional polariser, the further additional polariser being a linear polariser; and a further switchable liquid crystal retarder arrangement that may be arranged either a) between the further additional polariser and the display polariser in the case that the further additional polariser may be arranged between the display polariser and the first-mentioned SDVACRA or b) between the first additional polariser and the further additional polariser in the case that the further additional polariser may be arranged outside the first-mentioned additional polariser, wherein the further switchable liquid crystal retarder arrangement may comprise a further switchable liquid crystal retarder comprising a layer of liquid crystal material and a further transmissive electrode arrangement arranged to drive the layer of liquid crystal material of the further switchable liquid crystal retarder arrangement, and the further transmissive electrode arrangement may be capable of driving the layer of liquid crystal material of the further switchable liquid crystal retarder selectively into: a narrow-angle state in which the layer of liquid crystal material may have a structure of orientations which causes the further switchable liquid crystal retarder arrangement to introduce net relative phase shifts to the orthogonal polarisation components of the light having the predetermined polarisation state that vary along the viewing axis and the inclined axis; and a wide-angle state in which the layer of liquid crystal material may have a structure of orientations which causes the further switchable liquid crystal retarder to introduce net relative phase shifts to the orthogonal polarisation components of the light having the predetermined polarisation state that are the same along the viewing axis and the inclined axis. In the narrow-angle state, transmission may be reduced along the inclined axis. Increased image security may be achieved.

The display device may further comprise a backlight arranged to output light; the SLM may be a transmissive SLM arranged to receive the output light from the backlight; the first-mentioned display polariser may be either a) an input polariser or b) an output polariser; the display device may further comprise a further display polariser that may be either a) an output polariser in the case that the first display polariser may be an input polariser, or b) an input polariser in the case that the first display polariser may be an output polariser; the display device may further comprise a further additional polariser arranged either a) on the output side of the output polariser in the case that the first display polariser is an input polariser, or b) between the input polariser and the backlight in the case that the first display polariser is an output polariser; and the display device may further comprise a further switchable liquid crystal retarder arrangement that may be arranged between the further additional polariser and the further display polariser, wherein the further switchable liquid crystal retarder arrangement may comprise a further switchable liquid crystal retarder comprising a layer of liquid crystal material and a further transmissive electrode arrangement arranged to drive the layer of liquid crystal material of the further switchable liquid crystal retarder, and the further transmissive electrode arrangement may be capable of driving the layer of liquid crystal material of the further switchable liquid crystal retarder selectively into: a narrow-angle state in which the layer of liquid crystal material may have a structure of orientations which causes the further switchable liquid crystal retarder arrangement to introduce net relative phase shifts to the orthogonal polarisation components of the light having the predetermined polarisation state that vary along the viewing axis and the inclined axis; and a wide-angle state in which the layer of liquid crystal material may have a structure of orientations which causes the further switchable liquid crystal retarder arrangement to introduce net relative phase shifts to the orthogonal polarisation components of the light having the predetermined polarisation state that are the same along the viewing axis and the inclined axis. In the narrow-angle state transmission may be reduced along the inclined axis. Increased image security may be achieved. Display efficiency may be increased.

The further switchable liquid crystal retarder may be a SDLCR, wherein: in the narrow-angle state, the layer of liquid crystal material may have a structure of orientations which causes the layer of liquid crystal material to introduce net phase shifts to the light having the predetermined polarisation state that are uniform across an area of the layer of liquid crystal material and thereby cause the layer of liquid crystal material to provide no diffractive effect to the light having the predetermined polarisation state; and in the wide-angle state, the layer of liquid crystal material may have a structure of orientations which causes the layer of liquid crystal material to introduce net phase shifts to the light having the predetermined polarisation state that vary spatially across the area of the layer of liquid crystal material and thereby cause the layer of liquid crystal material to provide a diffractive effect to the light having the predetermined polarisation state. Increased image visibility to inclined viewers in the wide-angle state and improved security factor in the narrow-angle state may be achieved.

The further switchable liquid crystal retarder may be a switchable non-diffractive liquid crystal retarder (SNDLCR), wherein, in each of the narrow-angle state and the wide-angle state, the layer of liquid crystal material may have a structure of orientations which may cause the layer of liquid crystal material to introduce net phase shifts to the light having the predetermined polarisation state and thereby cause the layer of liquid crystal material to provide no diffractive effect to the light having the predetermined polarisation state. Cost and complexity may be reduced and improved security factor in the narrow-angle state may be achieved.

The SDVACRA may further comprise a switchable diffractive liquid crystal element (SDLCE) comprising a layer of liquid crystal material and a further transmissive electrode arrangement arranged to drive the layer of liquid crystal material of the SDLCE, wherein the further transmissive electrode arrangement may be patterned to be capable of driving the layer of liquid crystal material of the further SDLCR selectively into: a non-diffractive state in which the layer of liquid crystal material may have a structure of orientations which cause the layer of liquid crystal material to introduce net phase shifts to the light having the predetermined polarisation state that are uniform across an area of the layer of liquid crystal material and thereby cause the layer of liquid crystal material to provide no diffractive effect to the light having the predetermined polarisation state; and a wide-angle state in which the layer of liquid crystal material may have a structure of orientations which cause the layer of liquid crystal material to introduce net phase shifts to the light having the predetermined polarisation state that vary spatially across the area of the layer of liquid crystal material and thereby cause the layer of liquid crystal material to provide a diffractive effect to the light having the predetermined polarisation state. In the wide-angle state light dispersion may be increased and image visibility may be improved for viewers along the inclined axis.

According to a second aspect of the present disclosure there is provided a display device comprising: a SLM arranged to output spatially modulated light; a display polariser arranged on a side of the SLM, the display polariser being a linear polariser; an additional polariser arranged on the same side of the SLM as the display polariser outside the display polariser, the additional polariser being a linear polariser; a SNDLCR arrangement (SNDLCRA) arranged between the additional polariser and the display polariser, the SNDLCRA comprising a SNDLCR comprising a layer of liquid crystal material and a transmissive electrode arrangement arranged to drive the layer of liquid crystal material selectively into: a narrow-angle state in which the layer of liquid crystal material causes the SNDLCRA to introduce net relative phase shifts to orthogonal polarisation components of light having a predetermined polarisation state that vary along a viewing axis and an inclined axis that is inclined to the viewing axis; and a wide-angle state in which the layer of liquid crystal material causes the SNDLCRA to introduce net relative phase shifts to the orthogonal polarisation components of the light having the predetermined polarisation state that are the same along the viewing axis and the inclined axis; and a switchable light dispersion arrangement (SLDA) arranged in series with the SLM, the display polariser, the additional polariser and the SNDLCRA, wherein the SLDA is switchable between a non-dispersive state not providing dispersion of light and a dispersive state providing dispersion of light.

In one mode of operation of a display device, a narrow-angle state may be provided. A displayed image that is visible with high image visibility may be provided for a viewer along the viewing axis or at angles near to the viewing axis. A viewer viewing from directions inclined to the viewing axis may see an image with high image security and not perceive image data. A privacy mode of operation may be provided to prevent snoopers seeing the displayed image. A passenger infotainment display for a vehicle may be provided to reduce driver distraction by the image displayed to a passenger. A low stray light mode of operation may be provided, to reduce illumination of ambient environment by the light from the display device. In another mode of operation of a display device, a wide-angle state may be provided. A displayed image that is visible with high image visibility from a wide range of viewing positions may be provided. A share mode of operation may be provided, and multiple viewers may see the displayed information simultaneously and comfortably. Switching between the narrow-angle state and wide-angle state may be provided. The display device may be segmented so that in some areas, the operating state is different to other operating states. In one mode of operation, some regions of the display device may provide narrow-angle state while other regions provide wide-angle state. In another mode of operation, the whole of the display device may provide narrow-angle state or wide-angle state operation. Advantageously increased functionality of the display device may be achieved. A thin, lightweight and low-cost display device may be provided.

The SLDA may provide dispersion of light in the dispersive state in one direction across the area of the layer of liquid crystal material. Brightness in the wide-angle state to the viewer along the viewing axis may be increased. Efficiency in the wide-angle state may be increased and stray light in the direction orthogonal to the one direction may be reduced. The one direction may be in the lateral direction that may be a horizontal axis to provide desirable performance for horizontally spaced locations of viewers.

The display device may further comprise a control system arranged to supply voltages to the transmissive electrode arrangement for driving the layer of liquid crystal material and arranged to control the SLDA. The control system may be arranged in a narrow-angle state of the display device: to supply voltages to the transmissive electrode arrangement that may be selected to drive the layer of liquid crystal material of the SNDLCR into the narrow-angle state thereof, and to switch the SLDA into the non-dispersive state; and in a wide-angle state of the display device: to supply voltages to the transmissive electrode arrangement that are selected to drive the layer of liquid crystal material of the SNDLCR into the wide-angle state thereof, and to switch the SLDA into the dispersive state. The SLDA and SNDLCRA may each be controlled to provide output light cones for wide-angle; narrow-angle or intermediate states of operation. The size of the display device output light cones in each mode may be adjusted to achieve desirable viewing properties.

The SLDA may be a diffractive element that provides dispersion of light by diffraction in the dispersion state. The SLDA may comprise a SDLCE that may comprise: a layer of liquid crystal material; and a transmissive electrode arrangement arranged to drive the layer of liquid crystal material, wherein the transmissive electrode arrangement may be patterned to be capable of driving the layer of liquid crystal material selectively into: a non-diffractive state corresponding to the non-dispersive state of the SLDA in which the layer of liquid crystal material has a structure of orientations which causes the layer of liquid crystal material to introduce net phase shifts to the light having the predetermined polarisation state that are uniform across the area of the layer of liquid crystal material and thereby cause the layer of liquid crystal material to provide no dispersion of the light having the predetermined polarisation state; and a diffractive state corresponding to the dispersive state of the SLDA in which the layer of liquid crystal material has a structure of orientations which causes the layer of liquid crystal material to introduce net phase shifts to the light having the predetermined polarisation state that vary spatially across the area of the layer of liquid crystal material and thereby cause the layer of liquid crystal material to provide the dispersion of light by a diffractive effect to the light having the predetermined polarisation state. A thin and low-cost SLDA may be provided. The cost and complexity of the electrode arrangement and the power consumption may be reduced.

The SLDA may be a refractive element that provides dispersion of light by refraction in the dispersion state. The SLDA may comprise a birefringent layer of birefringent material having an ordinary refractive index and an extraordinary refractive index; an isotropic layer of isotropic material having an interface with the birefringent layer, wherein the isotropic material may have a refractive index that may be equal to the ordinary refractive index or the extraordinary refractive index of the birefringent material, and the interface surface may have a surface relief that may be dispersive; and a polarisation control element arranged to selectively control the polarisation of light passing through the SLDA between a first polarisation state that experiences the ordinary refractive index in the birefringent layer and a second polarisation state that experiences the extraordinary refractive index in the birefringent layer.

The surface relief may be dispersive by refraction. The surface relief may be a lens profile, a prism profile, a random profile, or an engineered profile. A thin, low-cost passive optical element may be provided with desirable interface surface relief structure. The birefringent material and isotropic material may be cured materials to achieve a stable structure that does not change its optical structure under applied pressure, to achieve improved ruggedness. Visibility of diffractive colour artefacts may be reduced. Desirable profiles of light dispersion with low chromatic variations may be achieved. The surface relief may be dispersive by diffraction. Increased dispersion may be provided and improved visibility to inclined viewers achieved.

The SLDA may be arranged between the display polariser and the additional polariser. The SLDA may have dispersion properties that are independent of the layer of liquid crystal material of the SNDLCR, achieving improved performance of image visibility in the wide-angle state and increased size of polar region for desirable security factor in privacy mode of the narrow-angle state.

The display device may further comprise a backlight arranged to output light, the SLM may be a transmissive SLM arranged to receive the output light from the backlight, the display polariser may be an input display polariser arranged on the input side of the SLM. A high efficiency display device may be provided. Low power consumption may be achieved for desirable image luminance.

The SLDA may be arranged on the same side of the SLM as the display polariser, outside the additional polariser. The display device may further comprise a backlight arranged to output light, the SLM may be a transmissive SLM arranged to receive the output light from the backlight, the display polariser may be an input display polariser arranged on the input side of the SLM, and the SLDA, the additional polariser and the SNDLCRA are arranged between the backlight and the SLM. Stray light may be reduced so that transmission in the narrow-angle state in the inclined direction may be reduced, achieving increased security factor.

The display polariser may be an output display polariser arranged on the output side of the SLM, the SLDA may be arranged between the backlight and the SLM. Image fidelity of the perceived information on the SLM may be maintained.

The display device may further comprise a reflective polariser arranged between the output display polariser and the SNDLCRA, the reflective polariser being a linear polariser. In the narrow-angle state for privacy mode, low reflectivity along the on-axis direction may be achieved, and high reflectivity along the non-viewing direction inclined to the on-axis direction. The size of the polar region for which desirable security factor is achieved may be increased.

The SNDLCRA may further include at least one passive compensation retarder. In the wide-angle state the size of the polar region for which desirable image visibility is provided may be increased.

Embodiments of the present disclosure may be used in a variety of optical systems. The embodiment may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

Directional backlights offer control over the illumination emanating from substantially the entire output surface controlled typically through modulation of independent LED light sources arranged at the input aperture side of an optical waveguide. Controlling the emitted light directional distribution can achieve single person viewing for a security function, where the display can only be seen by a single viewer from a limited range of angles; high electrical efficiency, where illumination is primarily provided over a small angular directional distribution; alternating left-eye and right-eye viewing for time sequential stereoscopic and autostereoscopic display; and low cost.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIG. 10C is a schematic diagram illustrating in top view the alternative homogeneous liquid crystal alignment structure of a SDLCR comprising the arrangement of FIG. 10A and arranged in narrow-angle state;

FIG. 10D is a schematic diagram illustrating in top view the alternative homogeneous liquid crystal alignment structure of a SDLCR comprising the arrangement of FIG. 10A in wide-angle state;

FIG. 10E is a schematic graph illustrating the variation of normalised intensity against angle for each of seven different drive voltages for the arrangement of FIG. 10D;

FIG. 10F is a schematic graph illustrating the variation of summed transmitted intensity for each of the seven different drive voltages for the arrangement of FIG. 10D;

FIG. 11F is a schematic diagram illustrating in top view the alternative liquid crystal alignment structure of a SDLCR comprising the arrangement of FIG. 11B in narrow-angle state;

FIG. 11G is a schematic diagram illustrating in top view the alternative homogeneous liquid crystal alignment structure of a SDLCR comprising the arrangement of FIGS. 11B-C and arranged in wide-angle state;

FIG. 11H is a schematic graph illustrating the variation of normalised intensity against angle for each of seven different drive voltages for the arrangement of FIG. 11G;

FIG. 11I is a schematic graph illustrating the variation of summed transmitted intensity for each of the seven different drive voltages for the arrangement of FIG. 11G;

FIG. 11J is a schematic diagram illustrating in top view the alternative homogeneous liquid crystal alignment structure of a SDLCR comprising the arrangement of FIG. 11E and arranged in narrow-angle state;

FIG. 11K is a schematic diagram illustrating in top view the alternative homogeneous liquid crystal alignment structure of a SDLCR comprising the arrangement of FIG. 11E in wide-angle state;

FIG. 11L is a schematic graph illustrating the variation of normalised intensity against angle for each of seven different drive voltages for the arrangement of FIG. 11K;

FIG. 11M is a schematic graph illustrating the variation of summed transmitted intensity for each of the seven different drive voltages for the arrangement of FIG. 11K;

FIG. 17A, FIG. 17B, FIG. 17C, FIG. 17D, and FIG. 17E are schematic diagrams illustrating side views of alternative optical stack arrangements for a switchable display device comprising the SDVACRA of FIG. 1A;

FIG. 26A is a schematic diagram illustrating in perspective side view a switchable display device 120 comprising a backlight; a switchable light dispersion arrangement comprising SDLCE; a transmissive SLM with input and output display polarisers; a reflective polariser; a switchable non-diffractive view angle control arrangement and an additional polariser;

FIG. 26B is a schematic diagram illustrating in perspective front view alignment orientations for an optical stack for use in the embodiment of FIG. 26A;

FIG. 27A is a schematic diagram illustrating in top view the structure and operation of the optical stack of FIGS. 26A-B and the electrode arrangement FIG. 21C (but omitting the electrode arrangement) for wide-angle state;

FIG. 27B is a schematic diagram illustrating in top view the structure and operation of the optical stack of FIGS. 26A-B for narrow-angle state;

FIG. 27C is a schematic diagram illustrating in top view the structure and operation of the optical stack of FIGS. 26A-B for an intermediate state;

Figure 8A:
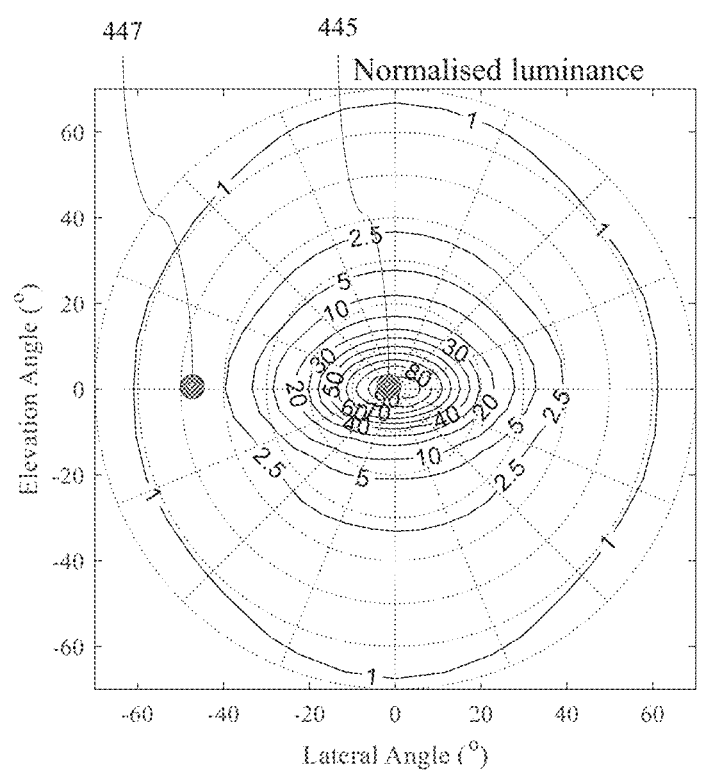
FIG. 8A is a schematic graph illustrating the polar variation of luminance output for an illustrative backlight of FIG. 1A.
Figure 29A:
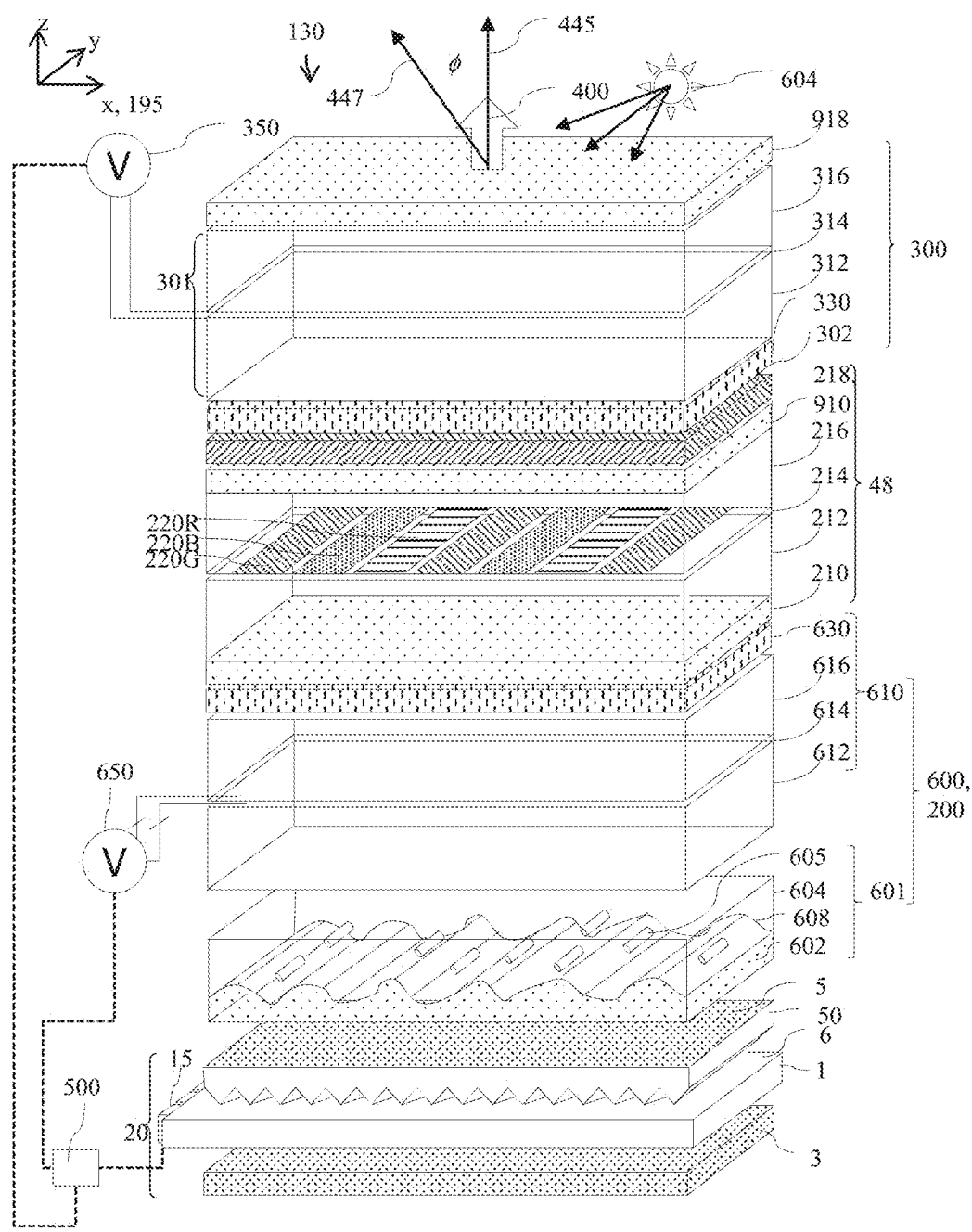
Figure 29B:
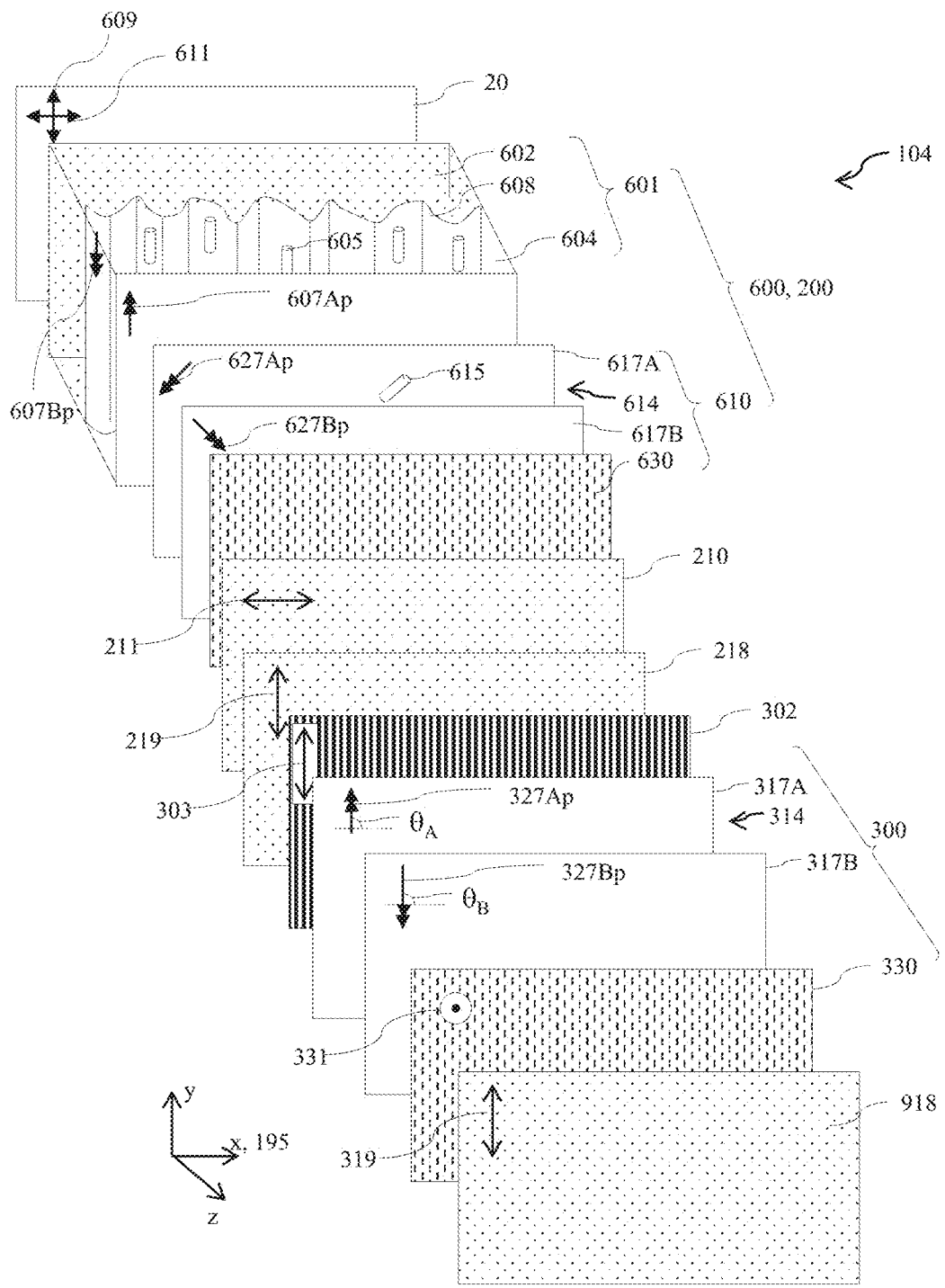
Figure 29C:
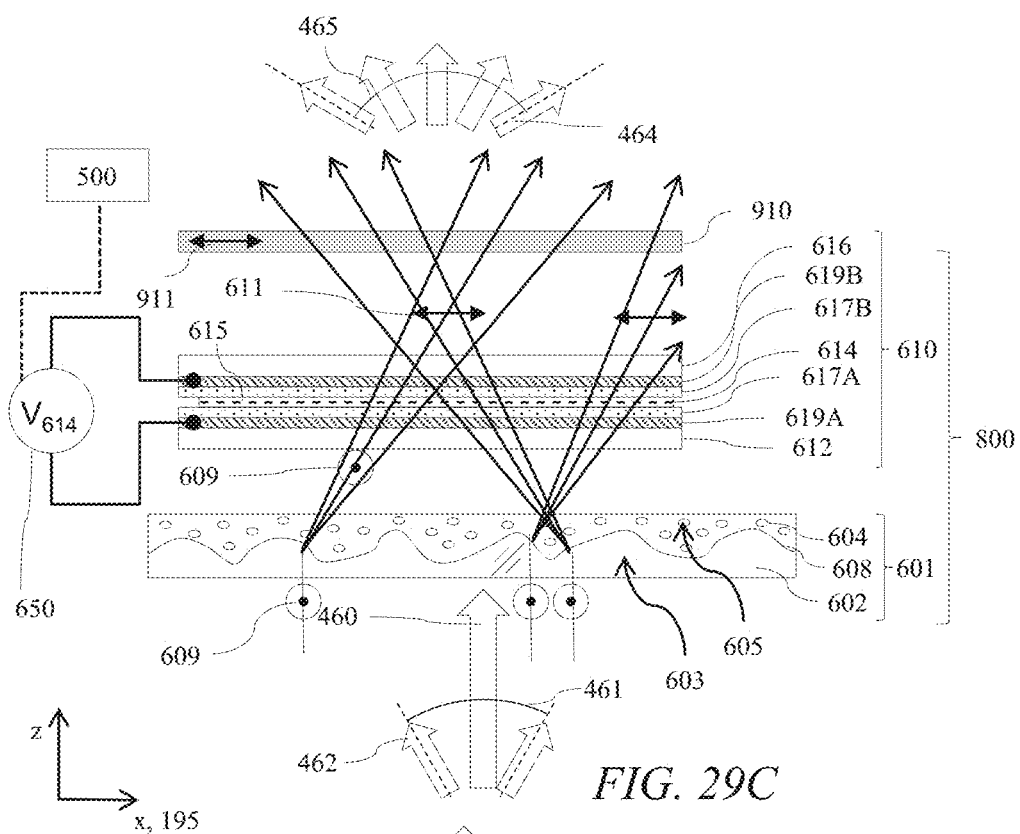
Figure 29D:
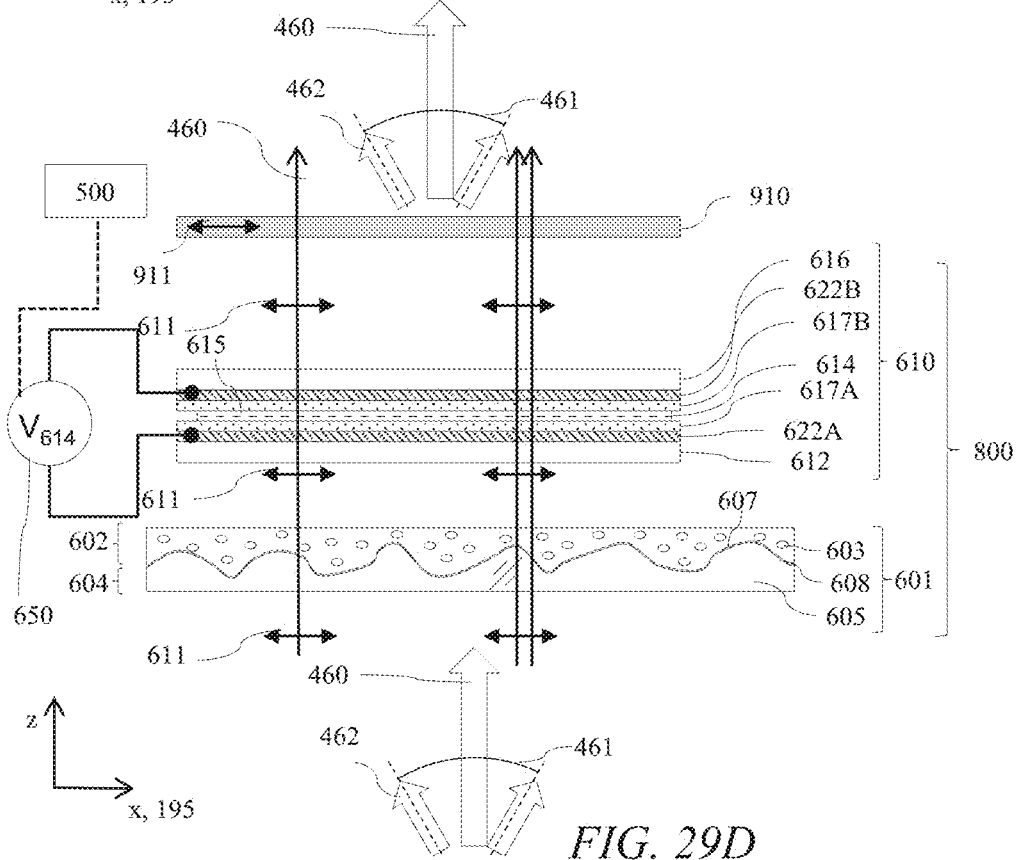
Figure 29E:
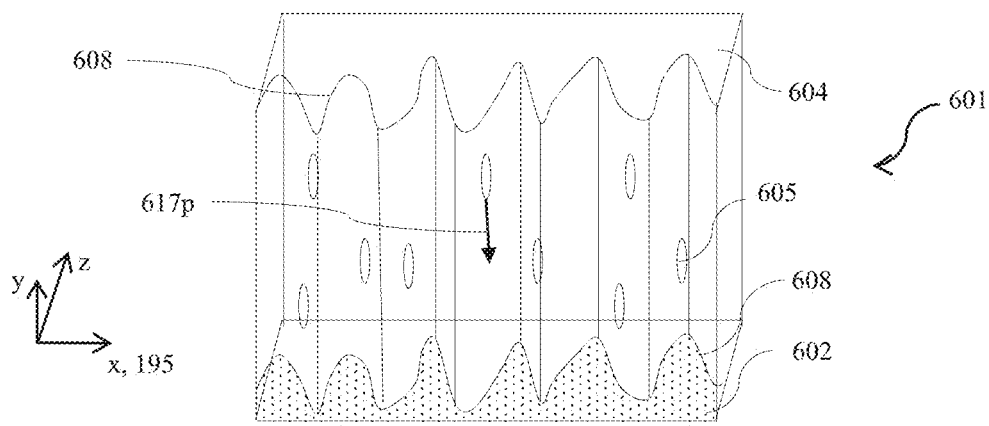
Figure 30A:
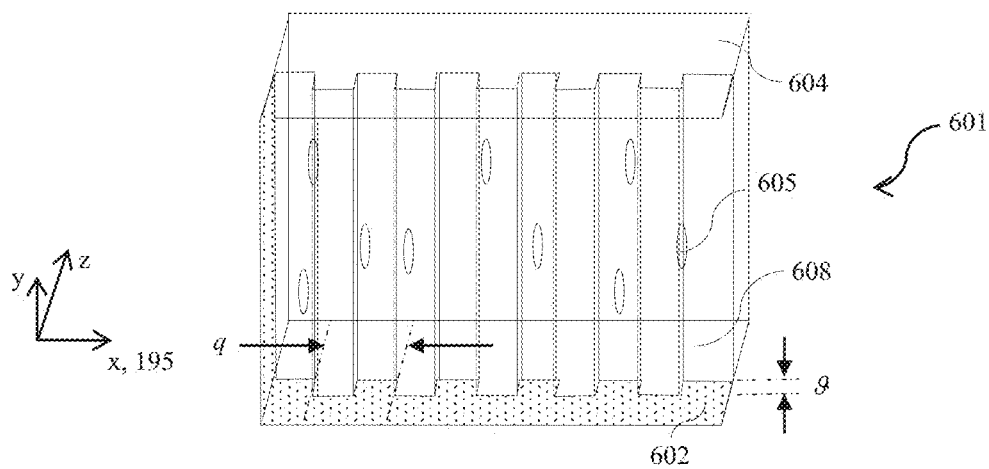
Figure 30B:
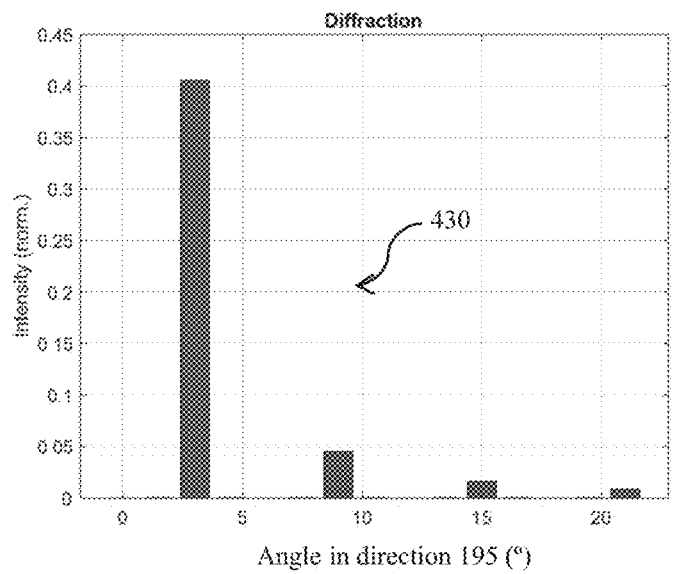
Figure 31A:
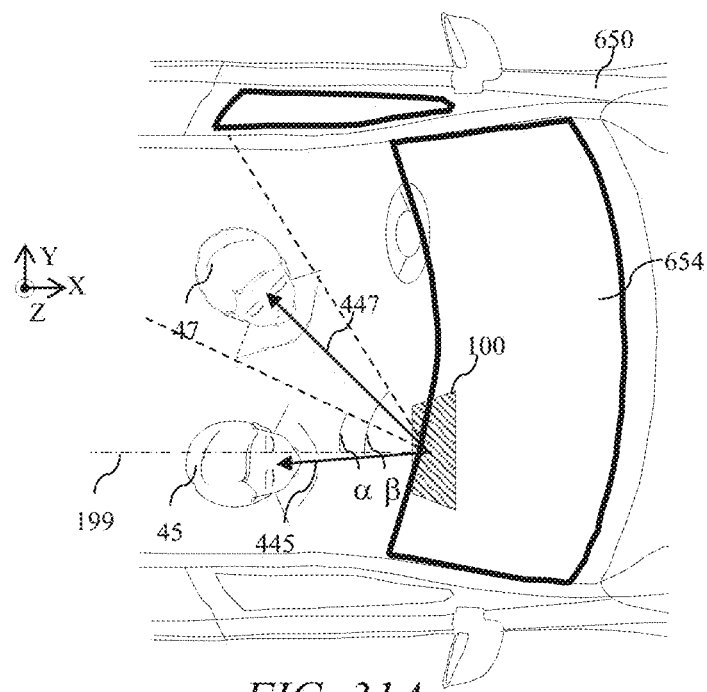
Figure 31B:
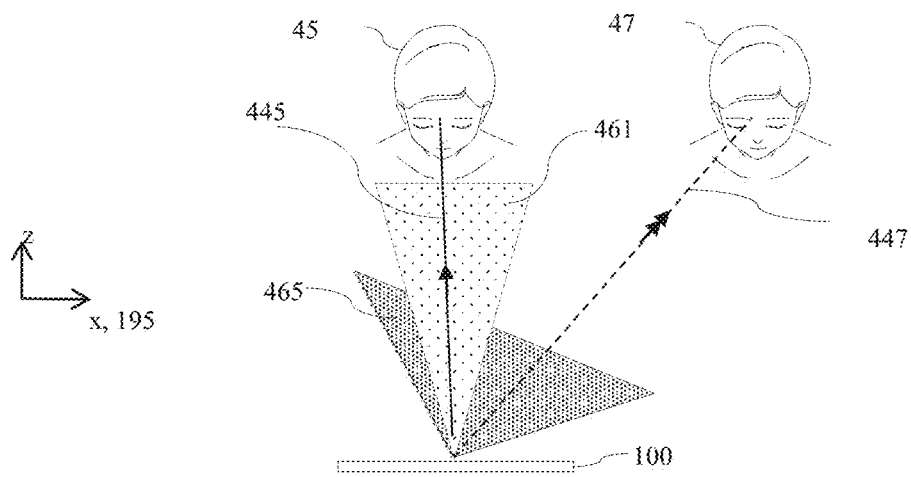
Figure 32A:
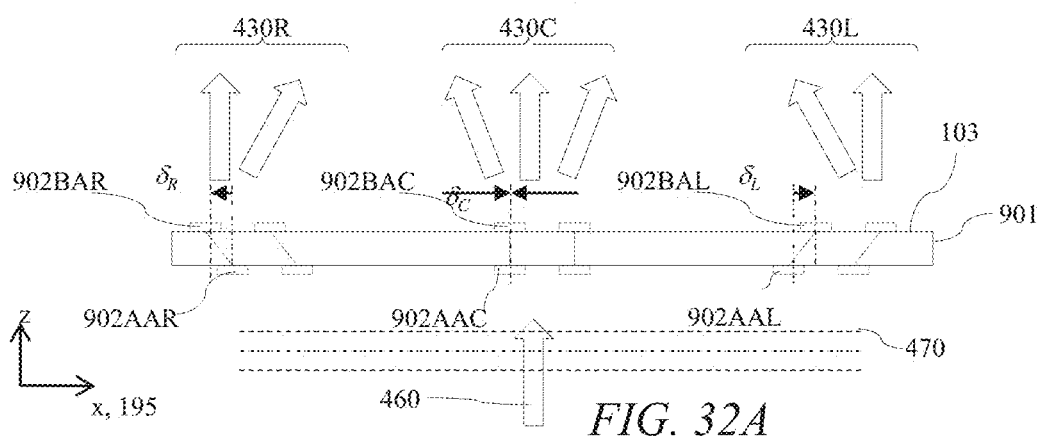
Figure 32B:
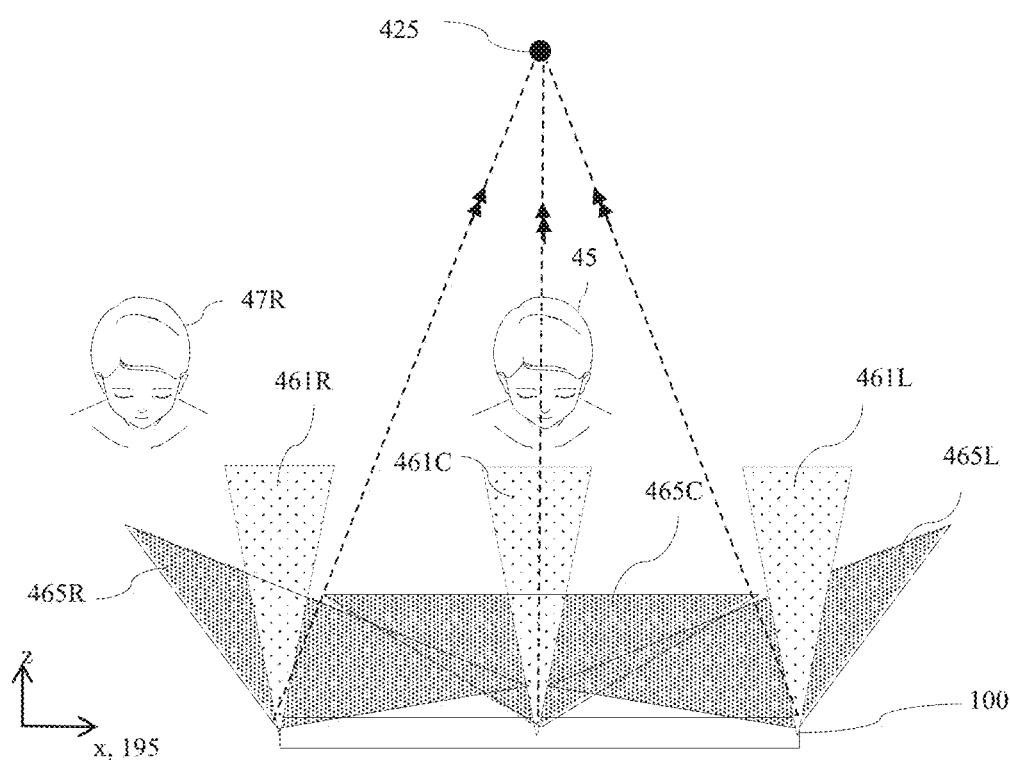
Figure 32C:
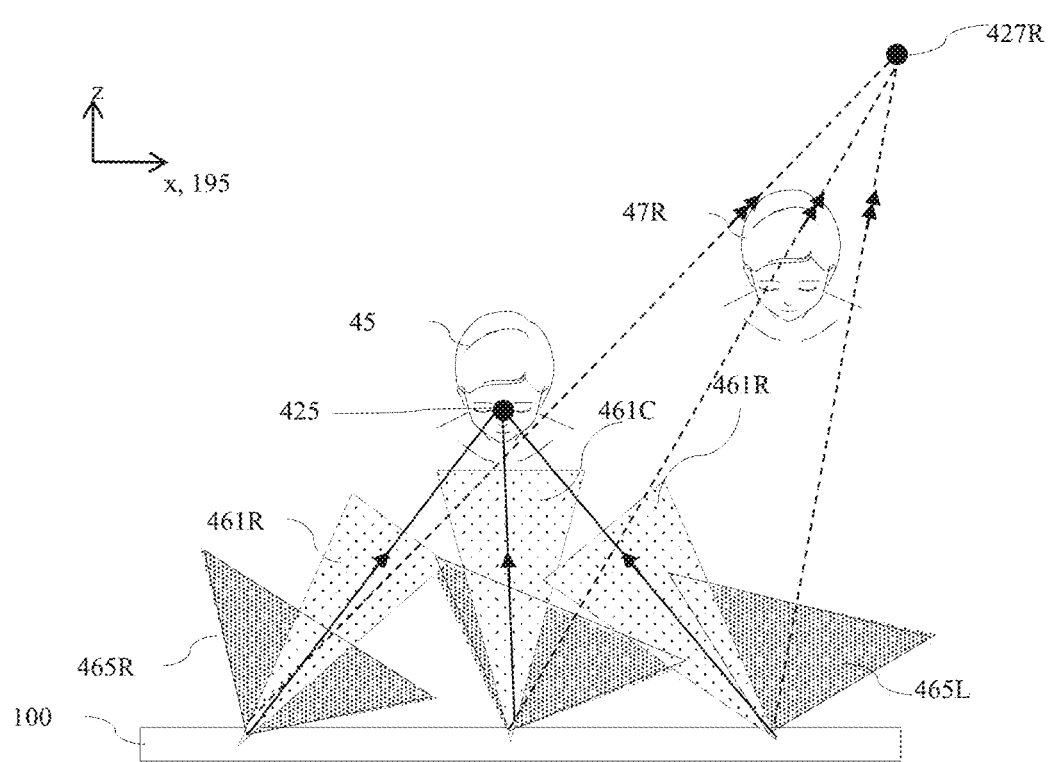
Figure 32D:
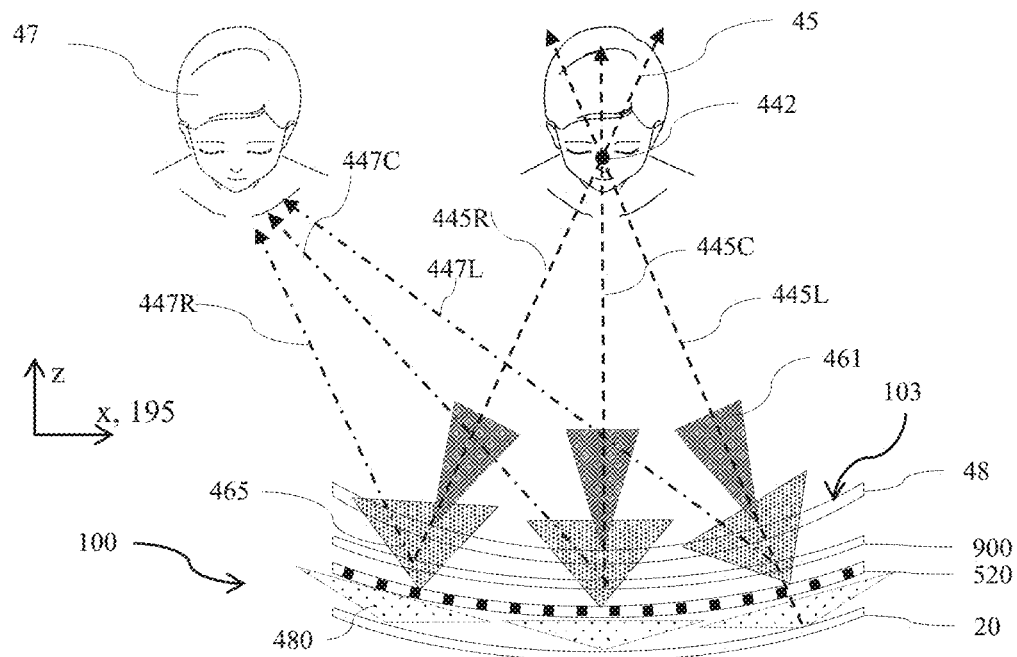
Figure 32E:
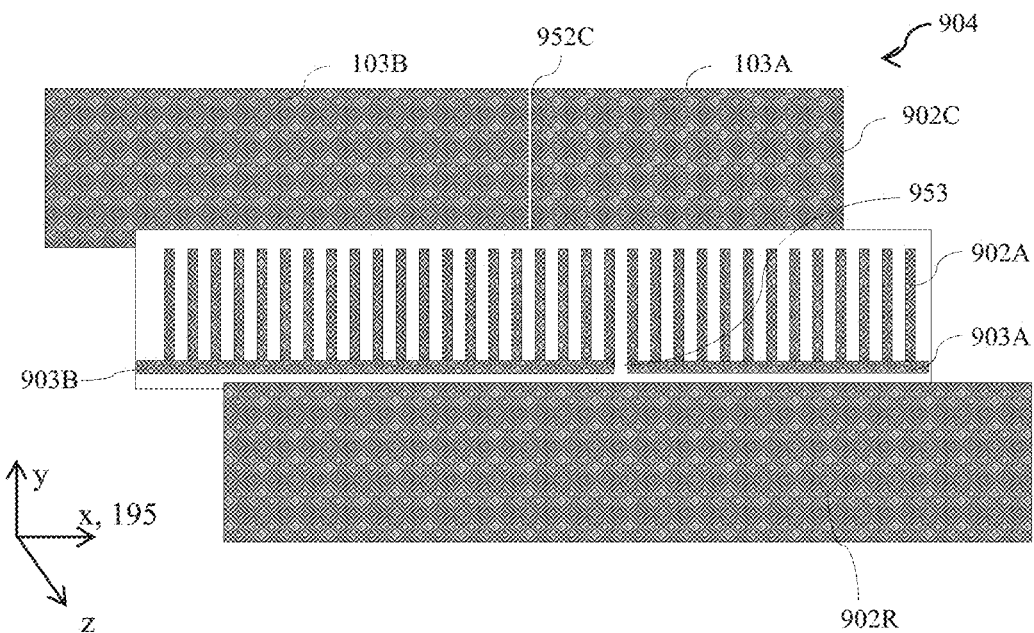
Figure 32F:
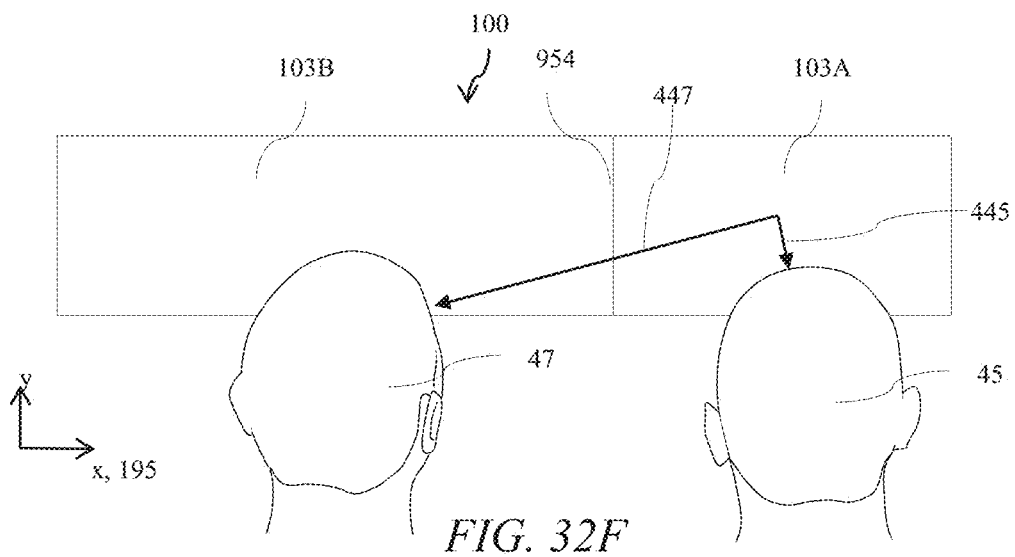
Figure 32G:
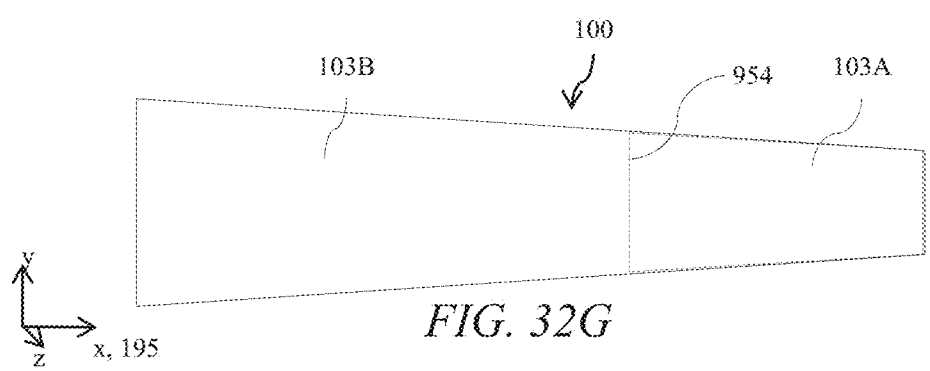
Figure 32H:
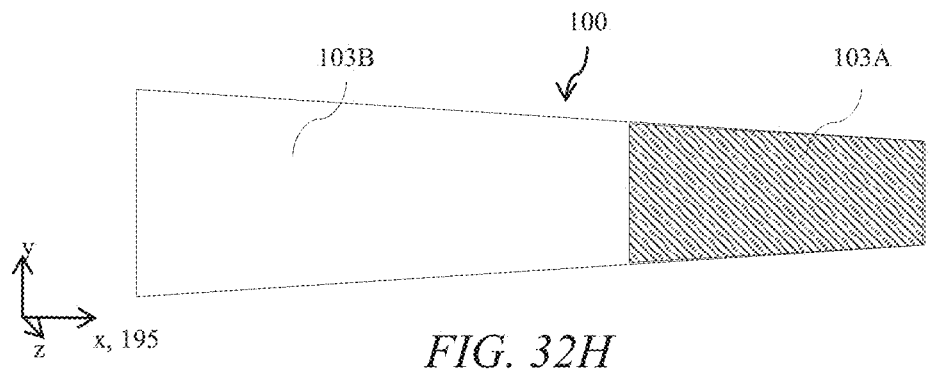
Figure 32I:
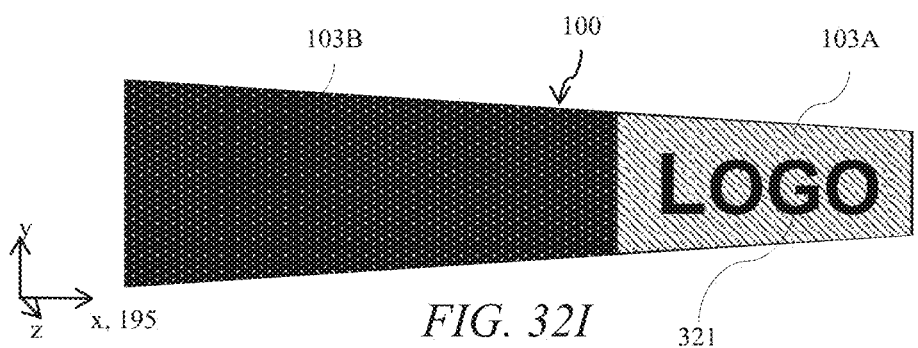
Figure 33A:
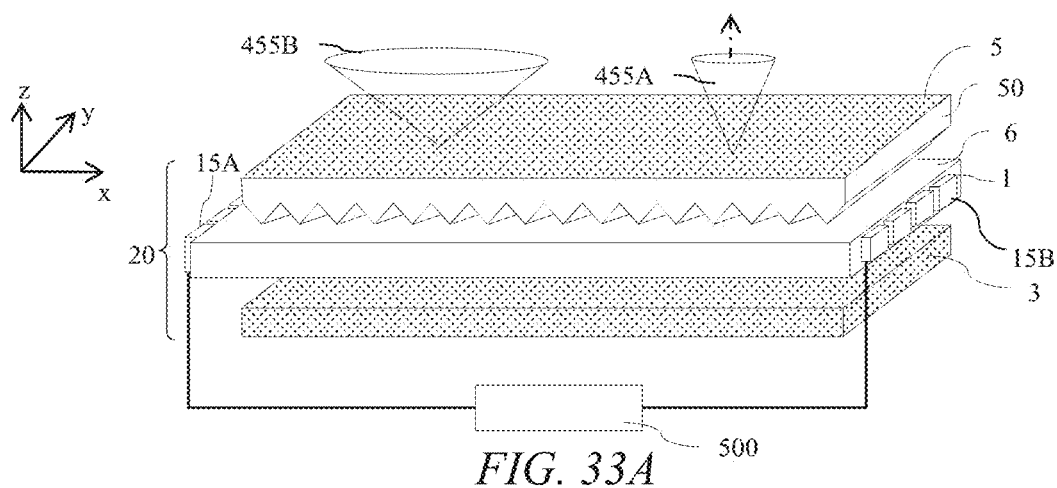
Figure 33B:
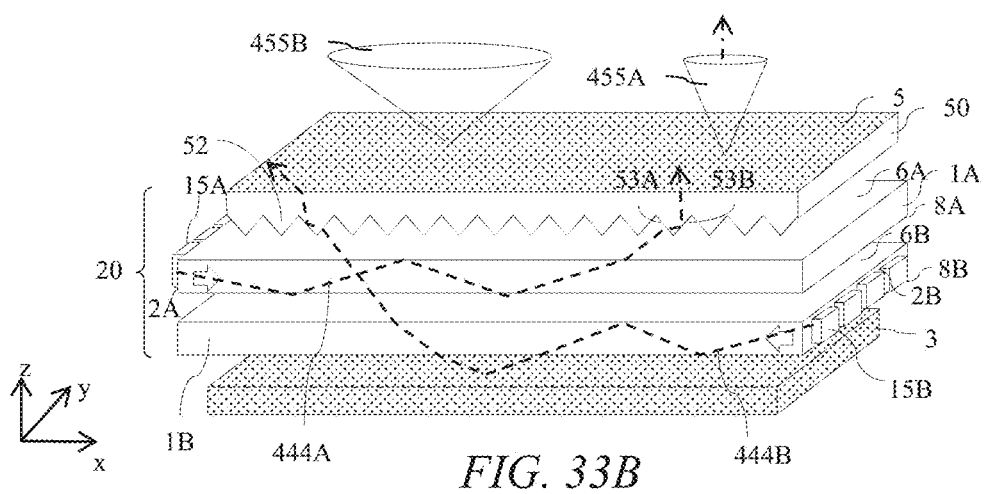
Figure 33C:
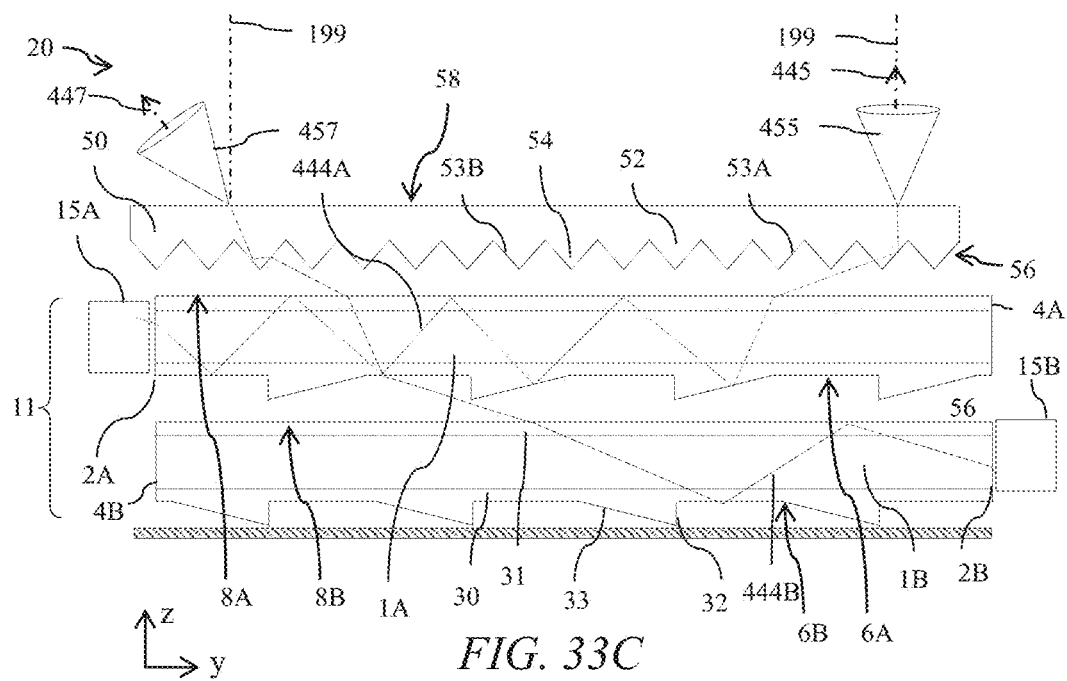
Figure 35A:
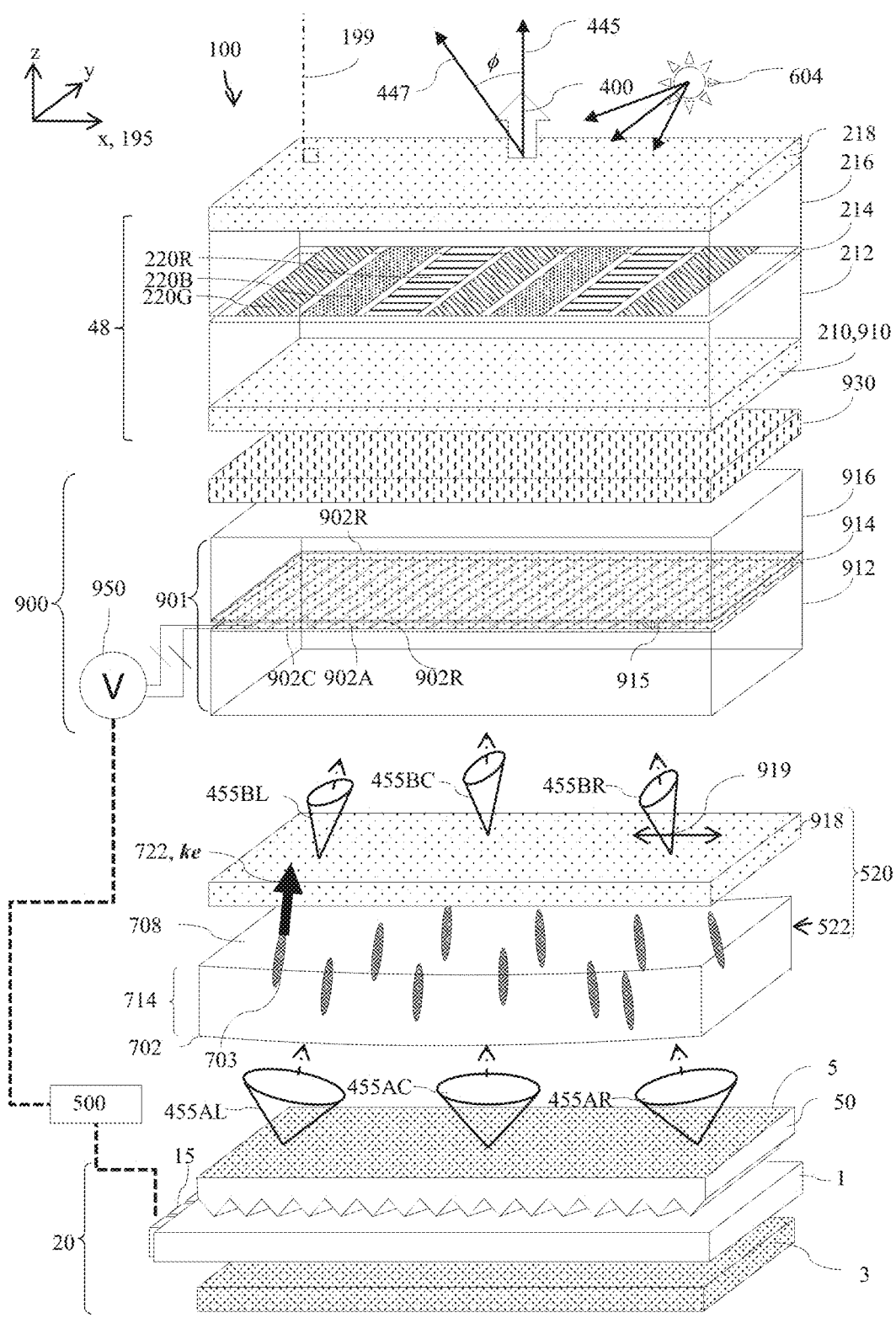
Figure 35B:
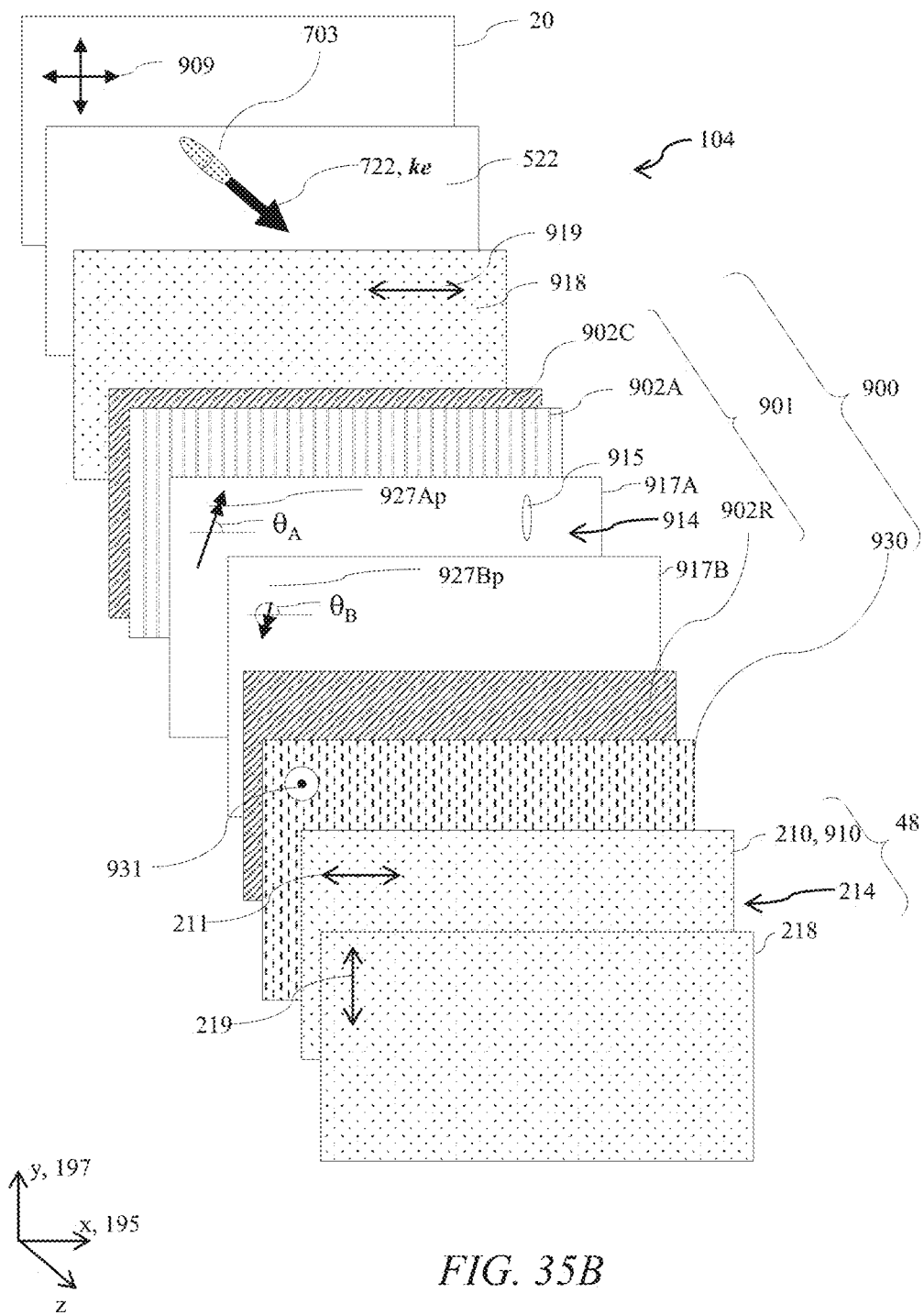
Figure 35C:
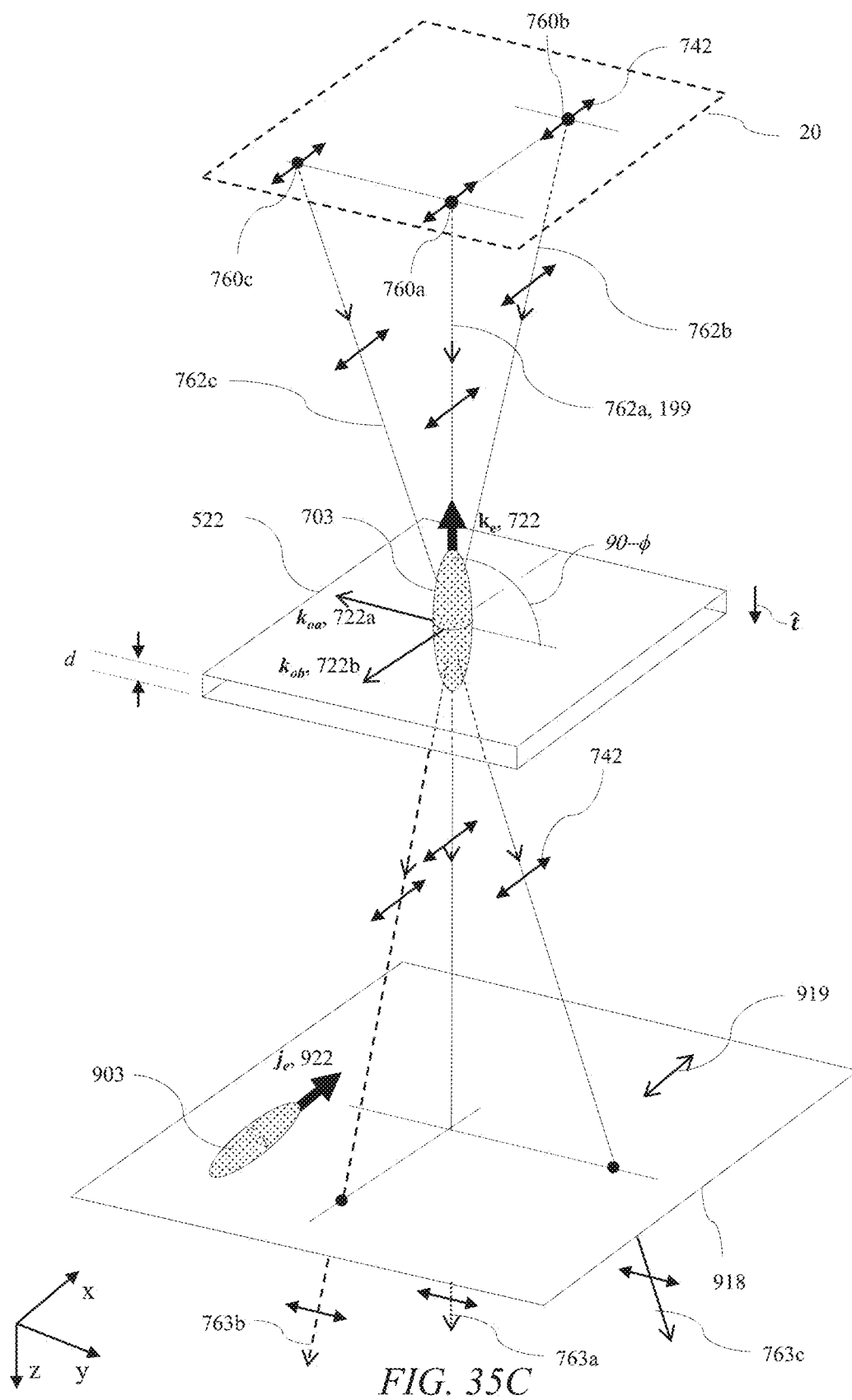
Figure 36A:
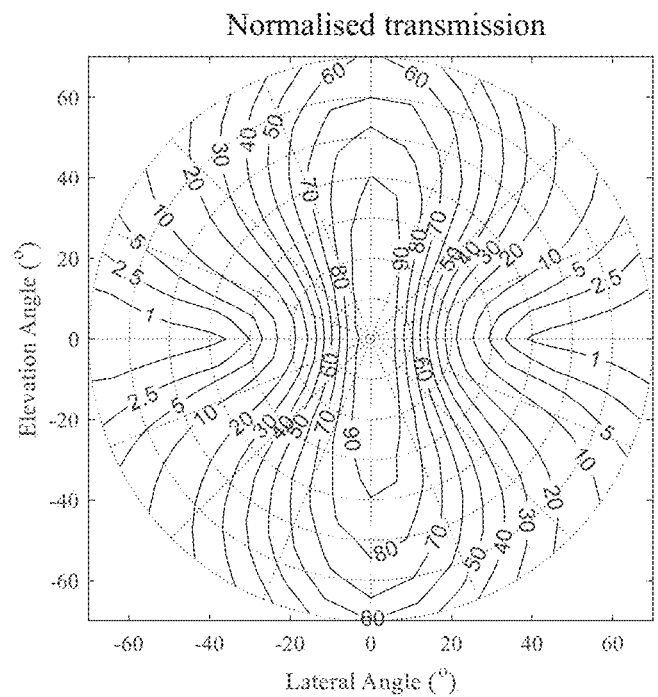
Figure 36B:
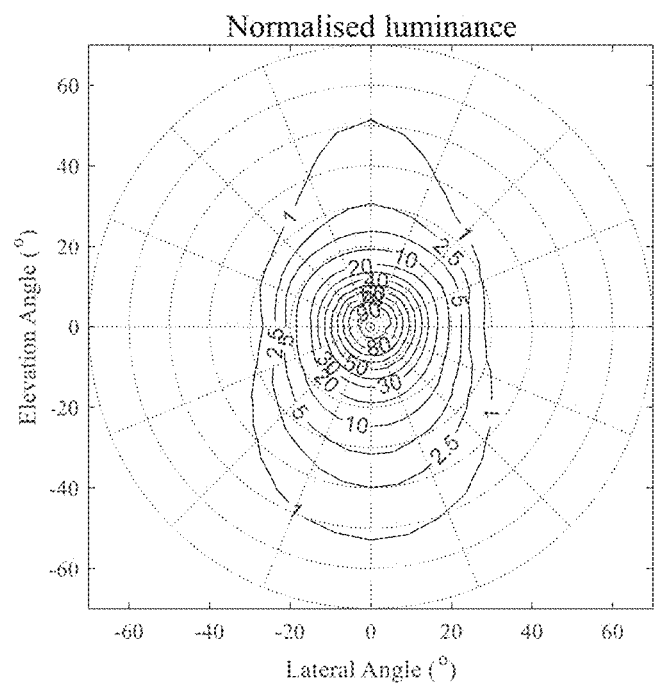
Figure 36C:
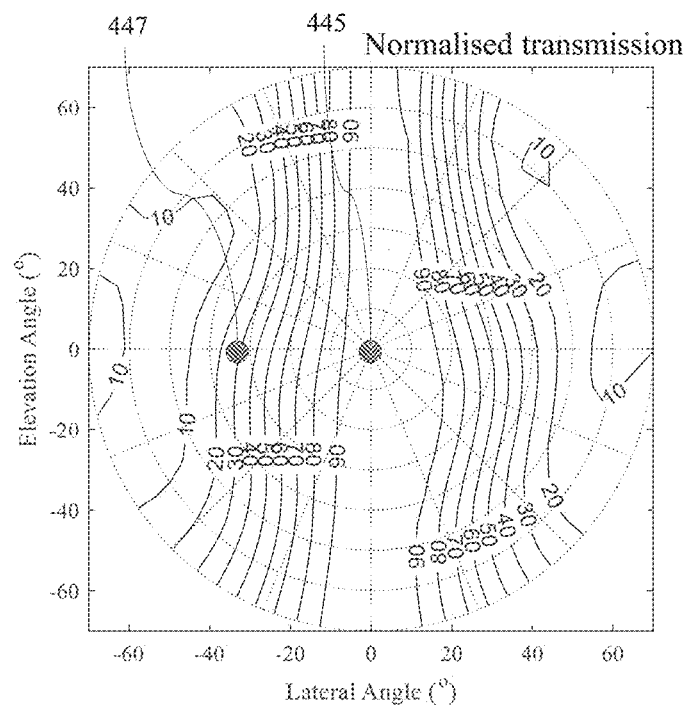
Figure 36D:
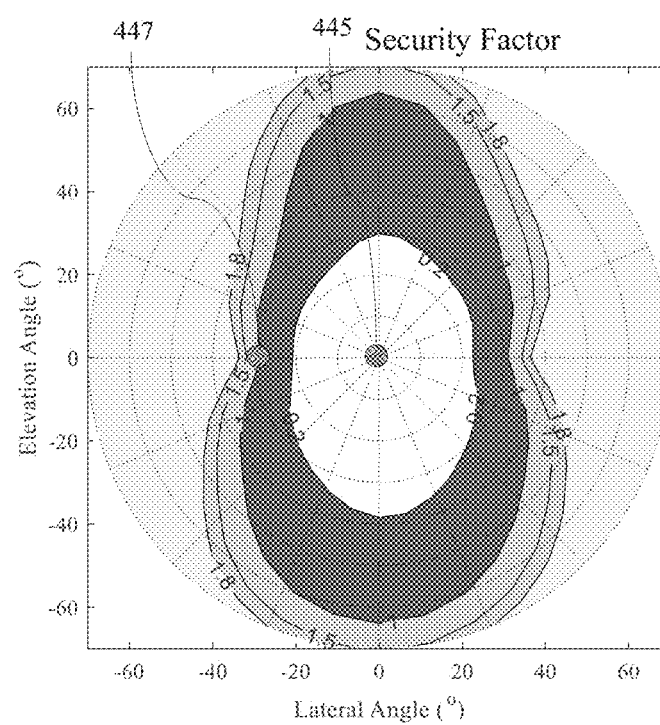
Figure 37A:
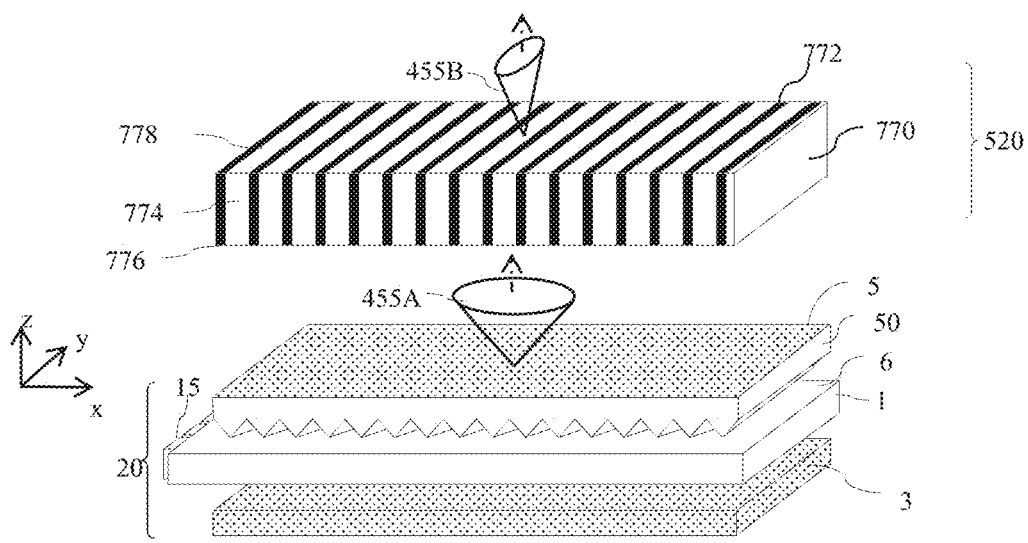
Figure 37B:
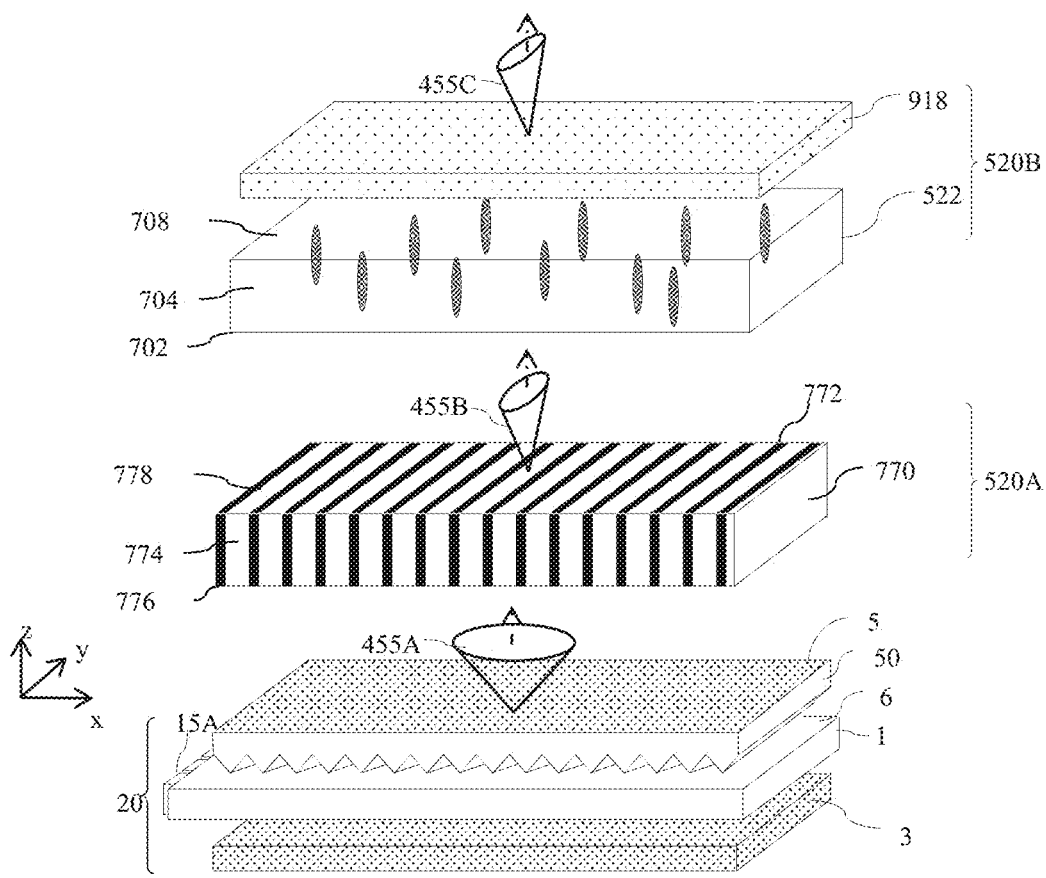
Figure 38A:
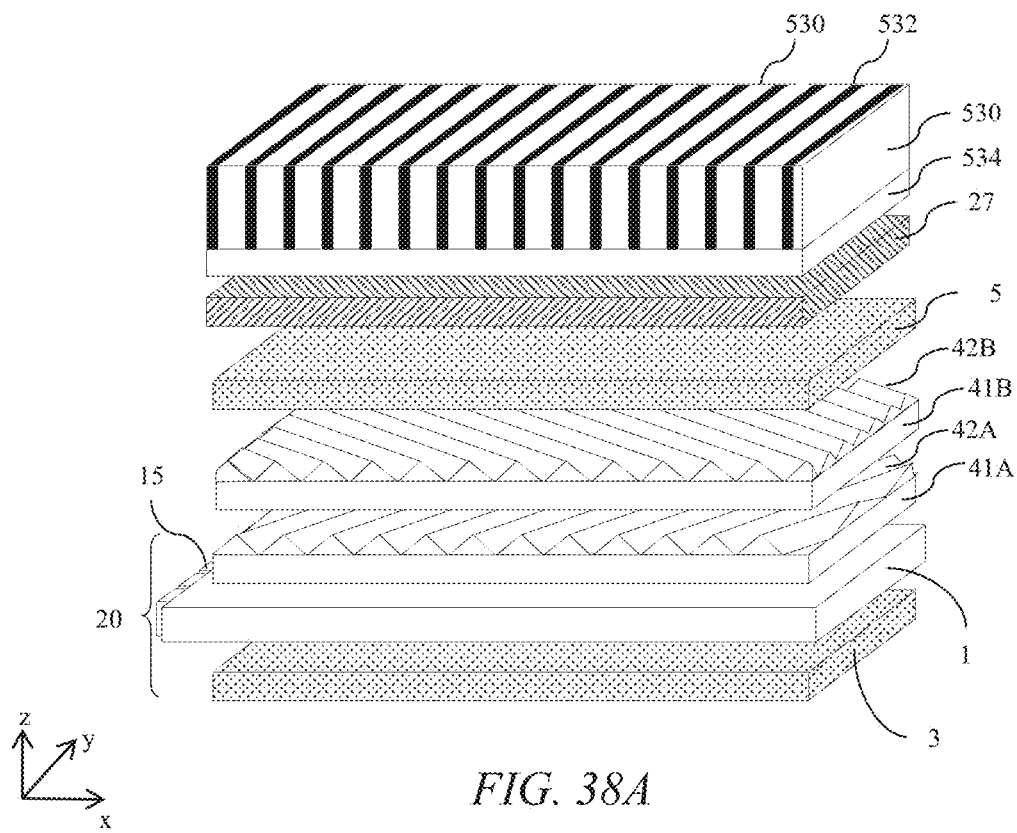
Figure 38B:
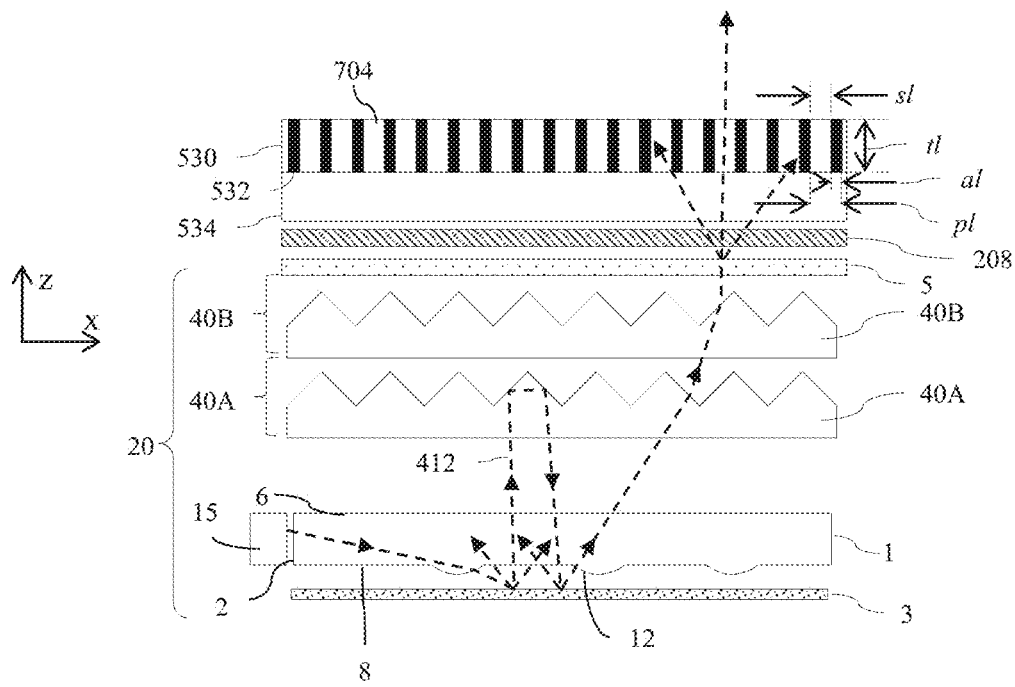
Figure 39A:
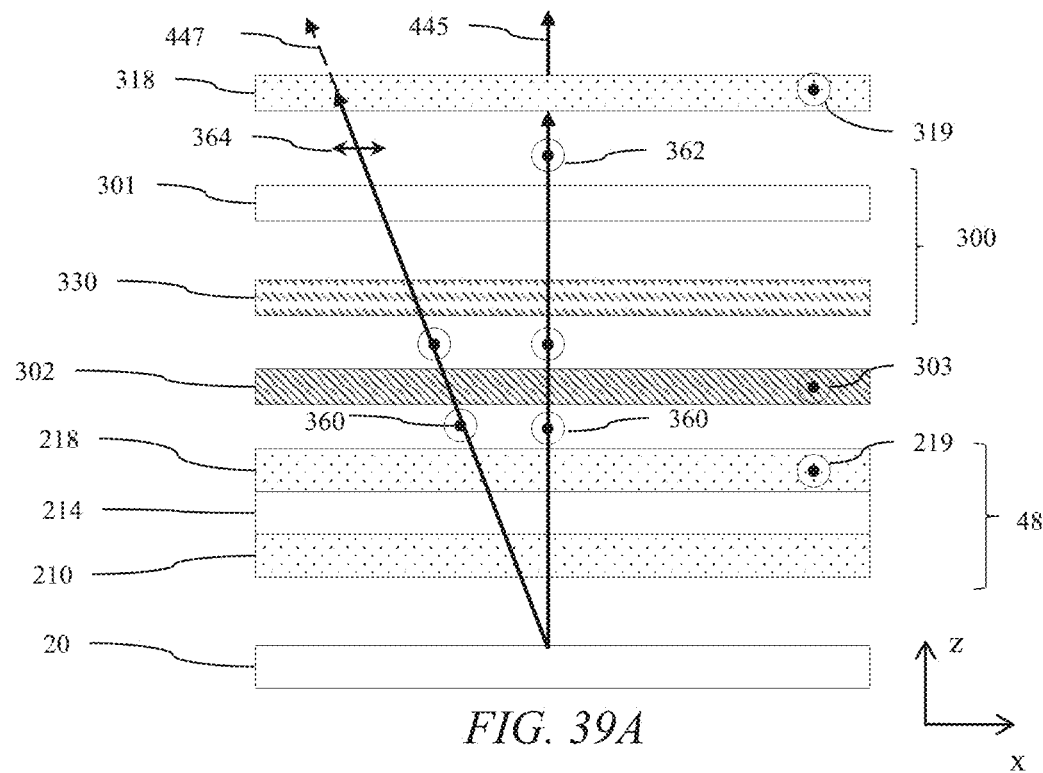
Figure 39B:
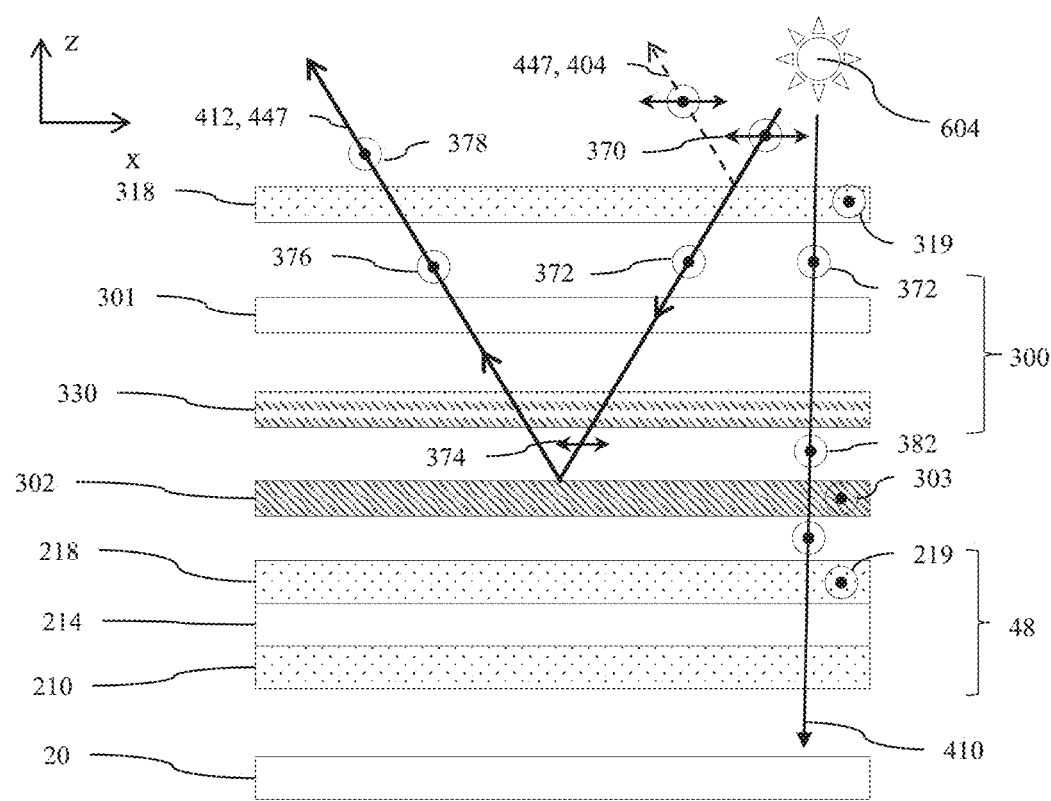
Figure 40A:
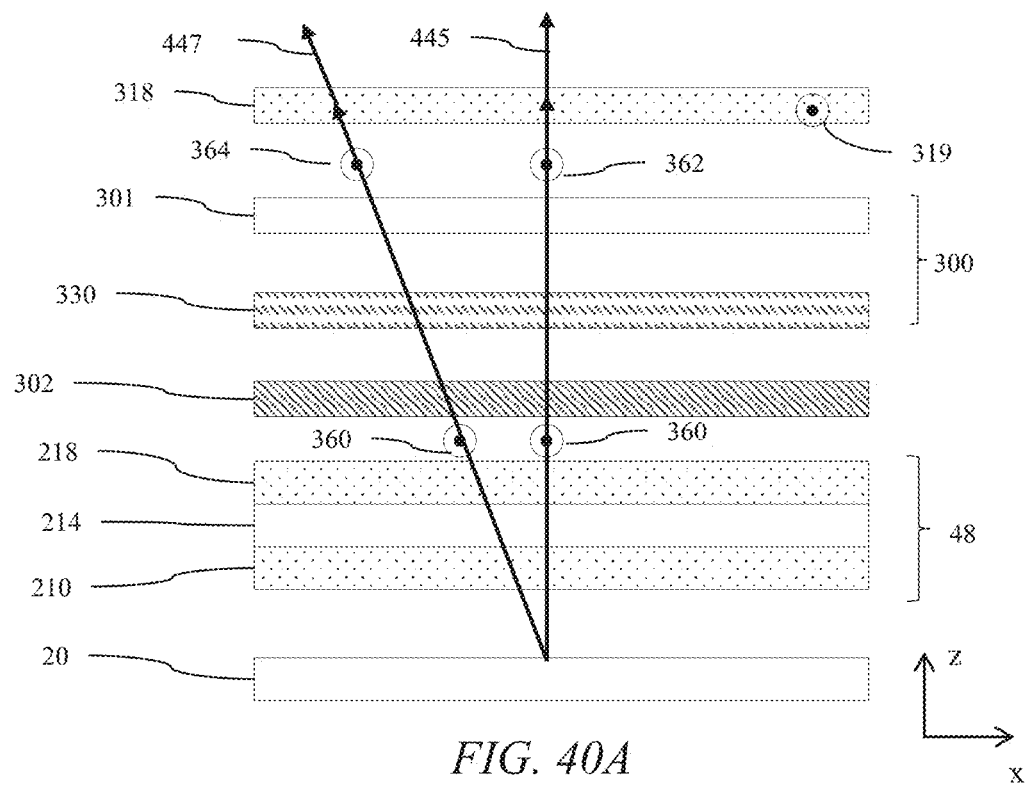
Figure 40B:
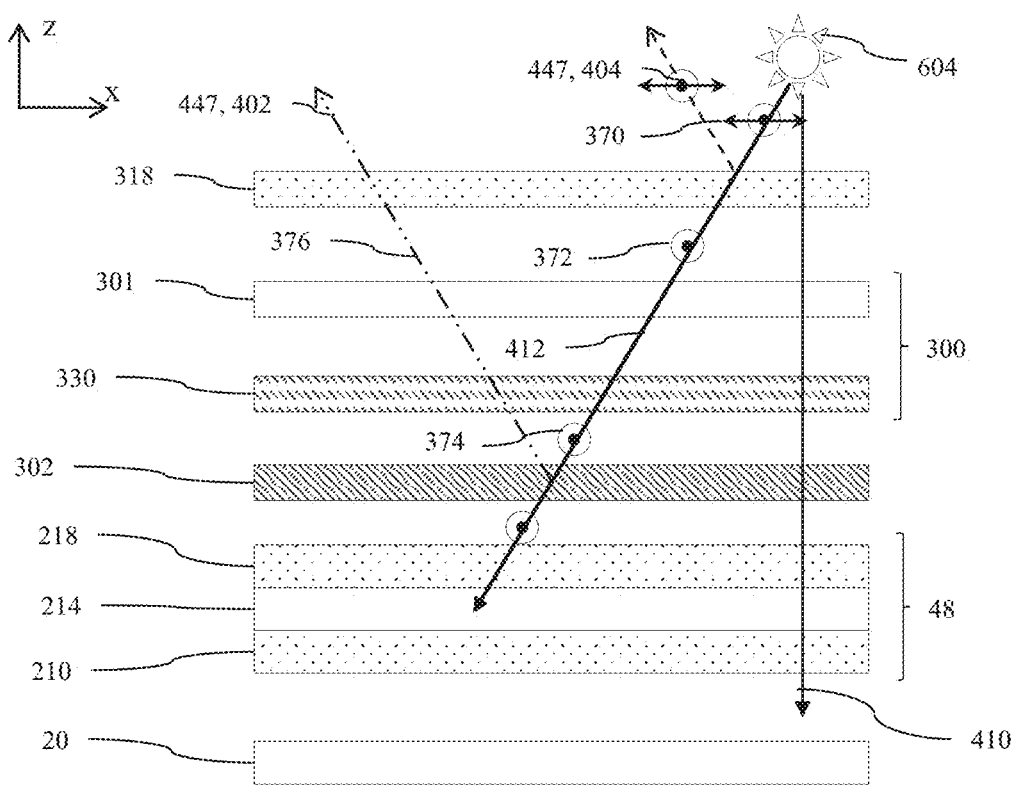

FIG. 28A, FIG. 28B, FIG. 28C, FIG. 28D, FIG. 28E, FIG. 28F, FIG. 28G, and FIG. 28H are schematic diagrams illustrating non-exhaustive side views of alternative switchable display devices;

FIG. 29A is a schematic diagram illustrating in perspective side view a switchable display device comprising a backlight; a switchable light dispersion arrangement comprising a switchable surface relief birefringent arrangement that comprises a surface relief birefringent light dispersion element and a polarisation control element; a transmissive SLM with input and output polarisers, a reflective polariser; a SNDLCRA and an additional polariser;

FIG. 29B is a schematic diagram illustrating in perspective front view alignment orientations for an optical stack for use in the embodiment of FIG. 29A;

FIG. 29C is a schematic diagram illustrating in top view operation of the switchable surface relief birefringent arrangement of FIGS. 29A-B in wide-angle state;

FIG. 29D is a schematic diagram illustrating in top view operation of the switchable surface relief birefringent arrangement of FIGS. 29A-B in narrow-angle state;

FIG. 29E is a schematic diagram illustrating in perspective front view a surface relief birefringent light dispersion element;

FIG. 30A is a schematic diagram illustrating in perspective front view a diffractive profile surface relief birefringent light dispersion element;

FIG. 30B is a schematic graph illustrating a profile of diffracted luminance into diffractive orders for the embodiment of FIG. 30A in wide-angle state;

FIG. 31A is a schematic diagram illustrating in top view a passenger infotainment display device for use in a vehicle;

FIG. 31B is a schematic diagram illustrating in top view operation of the passenger infotainment display device of FIG. 31A;

FIG. 32A is a schematic diagram illustrating in top view an alternative transmissive electrode arrangement wherein the electrode pitch p varies across the display device;

FIG. 32B is a schematic diagram illustrating in top view the operation of a display device comprising the alternative transmissive electrode arrangement of FIG. 32A;

FIG. 32C is a schematic diagram illustrating in top view the operation of a display device comprising the alternative transmissive electrode arrangement of FIG. 32A further comprising a pupillated backlight and/or pupillated switchable luminance liquid crystal switchable non-diffractive view angle control arrangement;

FIG. 32D is a schematic diagram illustrating in top view operation of a curved switchable display device;

FIG. 32E is a schematic diagram illustrating in perspective front view an electrode arrangement for a segmented switchable display device;

FIG. 32F is a schematic diagram illustrating in front view a segmented switchable display device;

FIG. 32G is a schematic diagram illustrating the appearance to an observer along an inclined axis of a segmented switchable display arranged to provide a uniform wide-angle state;

FIG. 32H is a schematic diagram illustrating in perspective front view the appearance to an observer along an inclined axis of a segmented switchable display arranged to provide a region in a narrow-angle state and a region in a wide-angle state;

FIG. 32I is a schematic diagram illustrating in perspective front view the appearance to an observer along an inclined axis of a segmented switchable display device arranged to provide visibility of a mark provided in at least one of the electrodes of the switchable display device;

FIG. 33A is a schematic diagram illustrating in perspective front view in perspective side view an alternative backlight comprising addressable first and second arrays of light sources;

FIG. 33B is a schematic diagram illustrating in perspective side view an alternative backlight comprising first and second waveguides and respective aligned first and second arrays of light sources;

FIG. 33C is a schematic diagram illustrating in top view operation of the backlight of FIG. 33B;

FIG. 33D is a schematic diagram illustrating in perspective rear view a light turning component;

FIG. 33E is a schematic diagram illustrating in top view a light turning component;

FIG. 34A is a schematic diagram illustrating in perspective side view an alternative backlight comprising an array of light sources that may be mini-LEDs and an array of light deflecting wells;

FIG. 34B is a schematic diagram illustrating in perspective side view an alternative backlight comprising an array of light sources provided on the edge of a waveguide, crossed brightness enhancement films, light control components; and an out-of-plane polariser arranged to output light to an additional polariser;

FIG. 35A is a schematic diagram illustrating in perspective side view a switchable display device comprising a backlight; a light control element comprising an out-of-plane polariser and the additional polariser that is an in-plane polariser; a SDVACRA; and a transmissive SLM;

FIG. 35B is a schematic diagram illustrating in perspective front view alignment orientations for an optical stack for use in the embodiment of FIG. 35A;

FIG. 35C is a schematic diagram illustrating in perspective side view the operation of an out-of-plane polariser and an additional polariser for light from the backlight;

FIG. 36A is a schematic graph illustrating the polar variation of transmission for an illustrative out-of-plane polariser and in-plane polariser;

FIG. 36B is a schematic graph illustrating the polar variation of luminance for an illustrative arrangement backlight profile of FIG. 8A and the out-of-plane polariser transmission profile of FIG. 36A;

FIG. 36C is a schematic graph illustrating the polar variation of transmission for an illustrative SDVACRA of TABLE 19;

FIG. 36D is a schematic graph illustrating the polar variation of security factor for an illustrative switchable display device of FIG. 35A comprising the backlight profile of FIG. 8A, the out-of-plane polariser profile of FIG. 36A; and the SDVACRA profile of FIG. 36C;

FIG. 37A is a schematic diagram illustrating in perspective side view the operation of a backlight comprising a light turning component, and a micro-louvre component;

FIG. 37B is a schematic diagram illustrating in perspective side view the operation of a backlight comprising a light turning component, a light control component; an out-of-plane polariser and an in-plane polariser;

FIG. 38A is a schematic diagram illustrating in perspective side view an alternative backlight comprising a light scattering waveguide, a rear reflector, crossed prismatic films and a light control element comprising louvres of thickness tl with pitch pl and louvre width al arranged between light transmissive regions of width sl; and arranged on substrate;

FIG. 38B is a schematic diagram illustrating in top view operation of the backlight of FIG. 38A;

FIG. 39A is a schematic diagram illustrating in top view propagation of output light along axes from a SLM through a switchable non-diffractive view angle control arrangement in a narrow-angle state;

FIG. 39B is a schematic diagram illustrating in top view propagation of ambient illumination light through the switchable non-diffractive view angle control arrangement in a narrow-angle state;

FIG. 40A is a schematic diagram illustrating in top view propagation of output light from a SLM through the switchable non-diffractive view angle control arrangement in wide-angle state; and FIG. 40B is a schematic diagram illustrating in top view propagation of ambient illumination light through the switchable non-diffractive view angle control arrangement in a wide-angle state.

DETAILED DESCRIPTION

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials, the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 500 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of net relative phase, η, that it imparts on the two polarization components: which is related to the birefringence Δn and the thickness d of the retarder by $$\eta = 2 \cdot \pi \cdot \Delta n \cdot d / \lambda_0 \qquad \text{eqn. 1}$$

In eqn. 1, Δn is defined as the difference between the extraordinary and the ordinary index of refraction, i.e.

$$\Delta n = n_e - n_o \qquad \text{eqn. 2}$$

For a half-wave retarder, the relationship between d, Δn, and $\lambda_0$ is chosen so that the phase shift between polarization components is η=π. For a quarter-wave retarder, the relationship between d, Δn, and $\lambda_0$ is chosen so that the phase shift between polarization components is η=π/2. The term half-wave retarder herein typically refers to light propagating normal to the retarder and normal to the spatial light modulator (SLM).

An absorption-type polariser transmits light waves of a specific polarisation state and absorbs light (in a spectral waveband) of different polarisation states which may be orthogonal polarisation states to the specific polarisation state. For a given wavefront, an absorptive linear polariser absorbs light waves of a specific linear polarisation state and transmits light waves of the orthogonal polarisation state of the wavefront. The absorptive linear polariser comprises an absorption axis with unit vector direction $k_e$ which may alternatively be termed the optical axis or the director of the absorption material. Orthogonal directions $k_o$ to the absorption axis direction may be termed transmission axes.

A dichroic material has different absorption coefficients $\alpha_e$, $\alpha_o$ for light polarized in different directions, where the complex extraordinary refractive index is:

$$\vec{n_e} = n_e + i \cdot \alpha_e \qquad \text{eqn. 3}$$

and the complex ordinary refractive index is:

$$\vec{n_o} = n_o + i \cdot \alpha_o \qquad \text{eqn. 4}$$

Absorptive linear polarisers may comprise a dichroic material such a dye or iodine. During manufacture a polyvinyl alcohol (PVA) layer is stretched so that the PVA chains align in one particular direction. The PVA layer is doped with iodine molecules, from which valence electrons are able to move linearly along the polymer chains, but not transversely. An incident polarisation state parallel to the chains is, at least in part, absorbed and the perpendicular polarisation state is substantially transmitted. Such a polariser may conveniently provide an in-plane polariser.

Another type of absorptive linear polariser is a liquid crystal dye type dichroic linear polariser. A thermotropic liquid crystal material is doped with a dye, and the liquid crystal material is aligned during manufacture, or by an electric field. The liquid crystal layers may be untwisted, or may incorporate a twist from one side of the device to the other. Alternatively alignment may be provided by lyotropic liquid crystal molecules that self-align onto a surface by provision of amphiphilic compounds (with hydrophilic and hydrophobic molecular groups) during manufacture. The alignment may be aided by mechanical movement of the liquid by for example a Meyer rod in a coating machine. The liquid crystal material may be a curable liquid crystal material. The dye may comprise an organic material that is aligned by the liquid crystal material or is provided in the liquid crystal molecules or may comprise silver nano-particles. Such polarisers may provide in-plane polarisers or may provide out-of-plane polarisers, wherein the optical axis direction $k_e$ or the absorption axis is out of the plane of the polariser. The directions $k_o$ of the transmission axes may be in the plane of the out-of-plane polariser. The direction $k_e$ may alternatively be referred to as the extraordinary axis direction and the directions $k_o$ may be referred to as the ordinary axis directions of the dichroic molecules.

If the absorbing dye molecules are rod-shaped then the polariser absorbs along single axes and transmits on orthogonal axes. If the absorbing dye molecules are disc-shaped rather than rod-shaped, then the polariser can absorb two orthogonal axes and transmit the third.

Some aspects of the propagation of light rays through a transparent retarder between a pair of polarisers will now be described.

The state of polarisation (SOP) of a light ray is described by the relative amplitude and phase shift between any two orthogonal polarization components. Transparent retarders do not alter the relative amplitudes of these orthogonal polarisation components but act only on their net relative phase. Providing a net phase shift between the orthogonal polarisation components alters the SOP whereas maintaining net relative phase preserves the SOP. In the current disclosure, the SOP may be termed the polarisation state.

A linear SOP has a polarisation component with a non-zero amplitude and an orthogonal polarisation component which has zero amplitude.

A linear polariser transmits a unique linear SOP that has a linear polarisation component parallel to the electric vector transmission direction of the linear polariser and attenuates light with a different SOP. The term "electric vector transmission direction" refers to a non-directional axis of the polariser parallel to which the electric vector of incident light is transmitted, even though the transmitted "electric vector" always has an instantaneous direction. The term "direction" is commonly used to describe this axis.

Absorbing polarisers are polarisers that absorb one polarisation component of incident light and transmit a second orthogonal polarisation component. Examples of absorbing linear polarisers are dichroic polarisers.

Reflective polarisers are polarisers that reflect one polarisation component of incident light and transmit a second orthogonal polarisation component. Examples of reflective polarisers that are linear polarisers are multilayer polymeric film stacks such as DBEF™ or APF™ from 3M Corporation, or wire grid polarisers such as ProFlux™ from Moxtek. Reflective linear polarisers may further comprise cholesteric reflective materials and a quarter waveplate arranged in series.

A retarder arranged between a linear polariser and a parallel linear analysing polariser that introduces no relative net phase shift provides full transmission of the light other than residual absorption within the linear polariser.

A retarder that provides a relative net phase shift between orthogonal polarisation components changes the SOP and provides attenuation at the analysing polariser.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plates, i.e. C-plates with a positive $\Delta n$. A 'negative C-plate' refers to negatively birefringent C-plates, i.e. C-plates with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \sigma \qquad \text{eqn. 5}$$

where $\sigma$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the surface alignment layers of the liquid crystal cell are slightly inclined as will be described below. Pretilt is arranged to minimise degeneracies in switching of cells or in alignment of curable liquid crystal layers before a curing step.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the surface alignment layer and is typically close to 90 degrees and for example may be 88 degrees.

In a twisted liquid crystal layer, a twisted configuration (also known as a helical structure or helix) of nematic liquid crystal molecules is provided. The twist may be achieved by means of a non-parallel alignment of surface alignment layers. Further, cholesteric dopants may be added to the liquid crystal material to break degeneracy of the twist direction (clockwise or anti-clockwise) and to further control the pitch of the twist in the relaxed (typically undriven) state. A supertwisted liquid crystal layer has a twist of greater than 180 degrees. A twisted nematic layer used in SLMs typically has a twist of 90 degrees.

Liquid crystal molecules with positive dielectric anisotropy may be switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy may be switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous surface alignment layers being parallel or more typically antiparallel. In the case of pre-tilted homeotropic alignment, the surface alignment layers may have components that are substantially parallel or antiparallel. Hybrid aligned liquid crystal cells may have one homogeneous surface alignment layer and one homeotropic surface alignment layer. Twisted liquid crystal cells may be provided by surface alignment layers that do not have parallel alignment, for example oriented at 90 degrees to each other.

Transmissive SLMs may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which a viewer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to a viewer, visual security may be given as:

$$V = (Y + R)/(Y - K) \qquad \text{eqn. 6}$$

where V is the visual security level (VSL), Y is the luminance of the white state of the display at a snooper viewing angle (which may be termed a non-viewing direction), K is the luminance of the black state of the display at the snooper viewing angle and R is the luminance of reflected light from the display.

Panel contrast ratio is given as:

$$C = Y/K \qquad \text{eqn. 7}$$

so the visual security level may be further given as:

$$V = (P \cdot Y_{max} + I \cdot \rho/\pi)/(P \cdot (Y_{max} - Y_{max}/C)) \qquad \text{eqn. 8}$$

where: $Y_{max}$ is the maximum luminance of the display; P is the off-axis relative luminance typically defined as the ratio of luminance at the snooper angle to the maximum luminance $Y_{max}$; C is the image contrast ratio; $\rho$ is the surface reflectivity; $\pi$ is a solid angle factor (with units steradians) and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0 degrees. By way of example, the maximum luminance $Y_{max}$ may occur at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the viewer location. For Lambertian illuminance, and for displays with a Lambertian front diffuser illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles, allowing the visual security level to be approximated to:

$$V = 1 + I \cdot \rho/(\pi \cdot P \cdot Y_{max}) \qquad \text{eqn. 9}$$

In the present embodiments, in addition to the exemplary definition of eqn. 6, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that a Security Factor, S is given by $$S = \log_{10}(V) \qquad \text{eqn. 10}$$

$$S = \log_{10}(1 + \alpha \cdot \rho/(\pi \cdot P)) \qquad \text{eqn. 11}$$

where $\alpha$ is the ratio of illuminance I to maximum luminance $Y_{max}$.

Desirable limits for S were determined in the following manner. In a first step a privacy display device was provided. Measurements of the variation of privacy level, P(θ) of the display device with polar viewing angle and variation of reflectivity ρ(θ) of the display device with polar viewing angle were made using photopic measurement equipment. A light source such as a substantially uniform luminance light box was arranged to provide illumination from an illuminated region that was arranged to illuminate the privacy display device along an incident direction for reflection to viewer positions at a polar angle of greater than 0° to the normal to the display device. The variation I(θ) of illuminance of a substantially Lambertian emitting lightbox with polar viewing angle was determined by and measuring the variation of recorded reflective luminance with polar viewing angle taking into account the variation of reflectivity ρ(θ). The measurements of P(θ), ρ(θ) and I(θ) were used to determine the variation of Security Factor S(θ) with polar viewing angle along the zero elevation axis.

In a second step a series of high contrast images were provided on the privacy display including (i) small text images with maximum font height 3 mm, (ii) large text images with maximum font height 30 mm and (iii) moving images.

In a third step each viewer (with eyesight correction for viewing at 1000 mm where appropriate) viewed each of the images from a distance of 1000 mm, and adjusted their polar angle of viewing at zero elevation until image invisibility was achieved for one eye from a position near on the display at or close to the centre-line of the display. The polar location of the viewer's eye was recorded. From the relationship S(θ), the security factor at said polar location was determined. The measurement was repeated for the different images, for various display luminance $Y_{max}$, different lightbox illuminance I(θ=0), for different background lighting conditions and for different viewers.

From the above measurements S<1.0 provides low or no visual security, and S≥1 makes the image not visible. In the range 1.0≤S<1.5, even though the image is not visible for practical purposes, some features of the image may still be perceived dependent on the contrast, spatial frequency and temporal frequency of image content, whereas in the range 1.5≤S<1.8, the image is not visible for most images and most viewers and in the range S≥1.8 the image is not visible, independent of image content for all viewers.

In practical display devices, this means that it is desirable to provide a value of S for an off-axis viewer who is a snooper that meets the relationship S≥$S_{min}$, where $S_{min}$ has a value of 1.0 or more to achieve the effect that in practical terms the displayed image is not visible to the off-axis viewer.

At an observation angle θ in question, the security factor $S_n$ for a region of the display labelled by the index n is given from eqn. 10 and eqn. 11 by:

$$S_n(\theta) = \log_{10}[1 + \rho_n(\theta) \cdot \alpha(\theta)/(\pi \cdot P_n(\theta))] \quad \text{eqn. 12}$$

where: α is the ratio of illuminance I(θ) onto the display that is reflected from the display to the angle in question and with units lux (lumen·m$^{-2}$), to maximum luminance $Y_{max}$ with units of nits (lumen·m$^{-2}$·sr$^{-1}$) where the units of α are steradians, π is a solid angle in units of steradians, $\rho_n(\theta)$ is the reflectivity of the display device along the observation direction in the respective n$^{th}$ region, and $\rho_n(\theta)$ is the ratio of the luminance of the display device along the observation direction in the respective n$^{th}$ region.

In human factors measurement, it has been found that desirable privacy displays of the present embodiments described hereinbelow typically operate with security factor $S_n$≥1.0 at the observation angle when the value of the ratio α of illuminance/to maximum luminance $Y_{max}$ is 4.0. For example, the illuminance I(θ=−45°) that illuminates the display and is directed towards the snooper at the observation direction (θ=+45°) after reflection from the display may be 1000 lux and the maximum display illuminance $Y_{max}$ that is provided for the user may be 250 nits. This provides an image that is not visible for a wide range of practical displays.

More preferably, the display may have improved characteristics of reflectivity $\rho_n(\theta=45°)$ and privacy $P_n(\theta=45°)$ by operating with security factor $S_n$≥1.0 at the observation angle when the ratio α is 2.0. Such an arrangement desirably improves the relative perceived brightness and contrast of the display to the primary user near to the direction of $Y_{max}$ while achieving desirable security factor, $S_n$≥1.0. Most preferably, the display may have improved characteristics of reflectivity $\rho_n(\theta=45°)$ and privacy $P_n(\theta=45°)$ by operating with security factor $S_n$≥1.0 at the observation angle when the ratio α is 1.0. Such an arrangement achieves desirably high perceived brightness and contrast of the display to the primary user near to the direction of $Y_{max}$ in comparison to the brightness of illuminated regions around the display, while achieving desirable security factor, $S_n$≥1.0 for an off-axis viewer 47 at the observation direction.

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S<0.2 may provide acceptable visibility (perceived contrast ratio) of the displayed image and more desirably S<0.1. In practical display devices, this means that it is desirable to provide a value of S for an on-axis viewer who is the intended user of the display device that meets the relationship S≤$S_{max}$, where $S_{max}$ has a value of 0.2.

In the present discussion the colour variation Δε of an output colour ($u_w'$+Δu', $v_w'$+Δv') from a desirable white point ($u_w'$, $v_w'$) may be determined by the CIELUV colour difference metric, assuming α typical display spectral illuminant and is given by:

$$\Delta\varepsilon = (\Delta u'^2 + \Delta v'^2)^{1/2} \quad \text{eqn. 13}$$

A diffractive effect of a liquid crystal layer relates to the interference or bending of waves around the corners of an obstacle or through an aperture into the region of the geometrical shadow of the obstacle/aperture. The diffractive effect arises from the interaction of plane waves incident onto the phase structure of the layer, rather than the propagation of rays through the layer.

The structure and operation of various directional display devices will now be described. In this description, common elements have common reference numerals. It is noted that the disclosure relating to any element applies to each device in which the same or corresponding element is provided. Accordingly, for brevity such disclosure is not repeated. For convenience, TABLE 1A describes reference numerals, acronyms and corresponding feature used in the present description; TABLE 1B describes features and sub-features of the respective features used in the present description; and TABLE 1C describes generic features and specific features of the generic features used in the present description.

TABLE 1A

| Reference numeral | Acronym | Feature |
|---|---|---|
| 200 | SLDA | Switchable light dispersion arrangement |
| 300 | SNDLCRA | Switchable non-diffractive liquid crystal retarder arrangement |
| 301 | SNDLCR | Switchable non-diffractive liquid crystal retarder |
| 330 | | Passive compensation retarder |
| 600 | SSRBA | Switchable surface relief birefringent arrangement |
| 601 | SRBLDE | Surface relief birefringent light dispersion element |
| 610 | PCE | Switchable polarisation control element |
| 800 | SDVACA | Switchable diffractive view angle control arrangement |
| 801 | SDLCE | Switchable diffractive liquid crystal element |
| 830 | | Passive correction retarder |
| 900 | SDVACRA | Switchable diffractive view angle control retarder arrangement |
| 901 | SDLCR | Switchable diffractive liquid crystal retarder |
| 930 | | Passive compensation retarder |

TABLE 1B

| Feature | Sub-features |
|---|---|
| Switchable non-diffractive liquid crystal retarder arrangement 300 | Switchable non-diffractive liquid crystal retarder 301<br>Passive compensation retarder 330 |
| Switchable surface relief birefringent arrangement 600 | Surface relief birefringent light dispersion element 601<br>Switchable polarisation control element 610 |
| Switchable diffractive view angle control arrangement 800 | Switchable non-diffractive liquid crystal retarder 301<br>or<br>Switchable diffractive liquid crystal retarder 901<br>Passive compensation retarder 330<br>or<br>Passive compensation retarder 930<br>Switchable diffractive liquid crystal element 801<br>Passive correction retarder 830 |
| Switchable diffractive view angle control retarder arrangement 900 | Switchable diffractive liquid crystal retarder 901<br>Passive compensation retarder 930 |

TABLE 1C

| Generic feature | Specific features |
|---|---|
| Switchable light dispersion arrangement 200 | Switchable surface relief birefringent arrangement 600<br>Switchable diffractive liquid crystal element 801 |

It may be desirable to provide a display device switchable between a narrow-angle state, and a wide-angle state. The structure of a switchable display device will now be described.

Figure 1A:
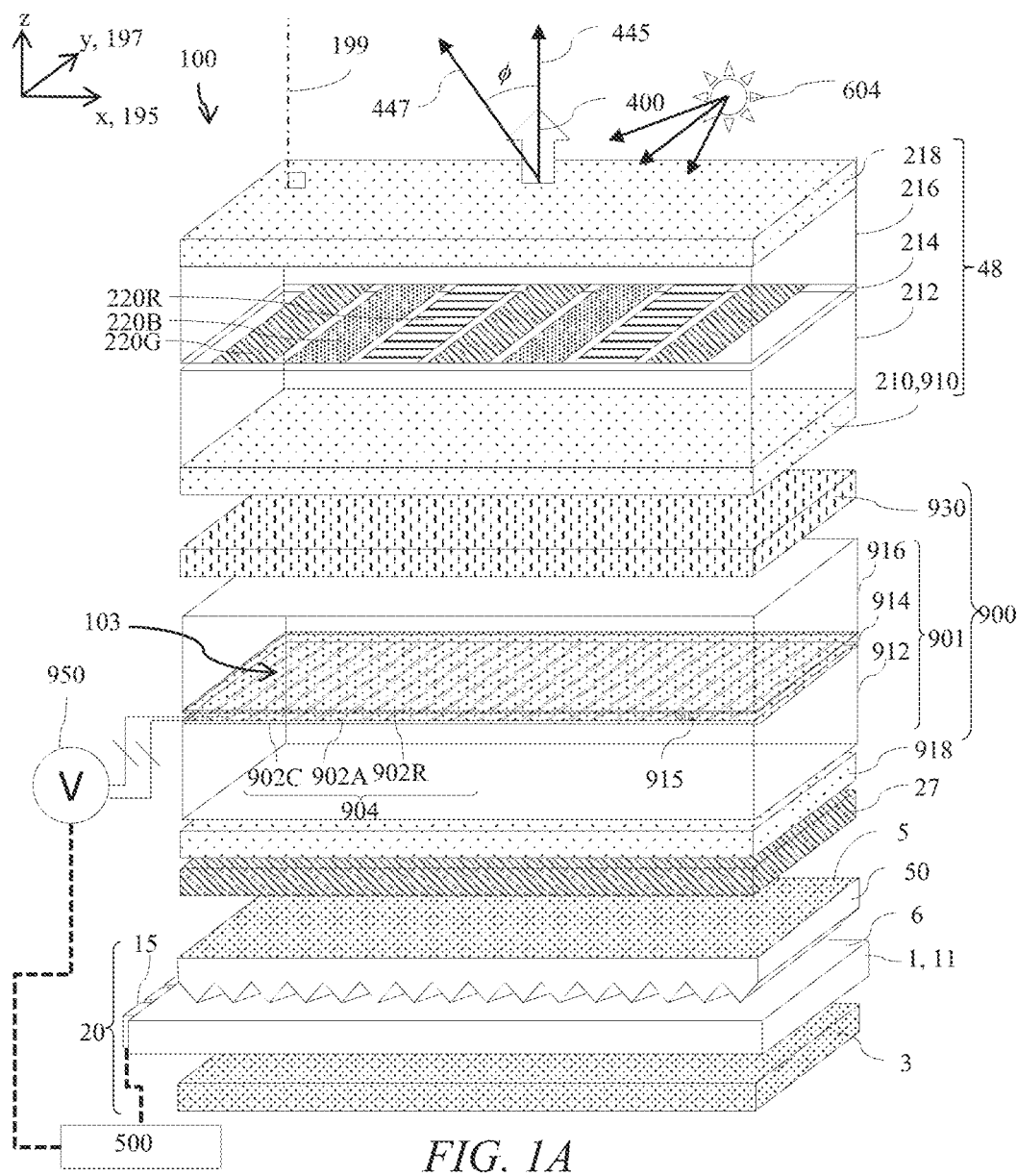
FIG. 1A is a schematic diagram illustrating in perspective side view a switchable display device comprising a backlight comprising an array of light sources, a waveguide, a rear reflector and a light turning component; a switchable diffractive view angle control retarder arrangement (SDVACRA) comprising a switchable diffractive liquid crystal retarder (SDLCR) and a passive compensation retarder; and a transmissive spatial light modulator (SLM)
Figure 1B:
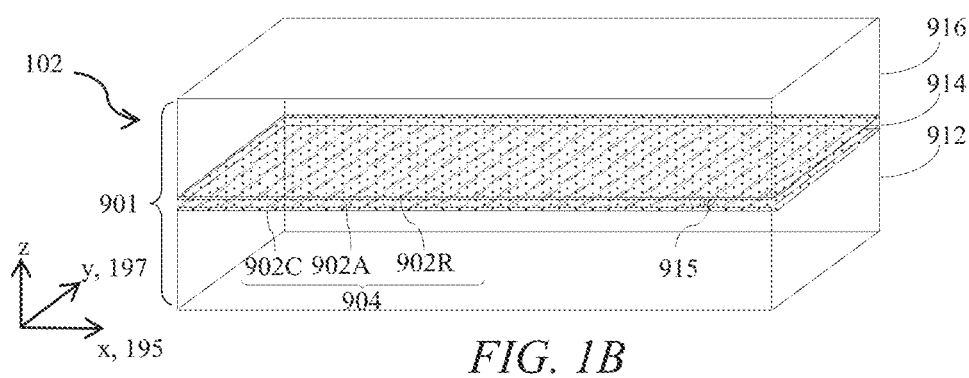
FIG. 1B is a schematic diagram illustrating in perspective side view a SDLCR component.
Figure 1C:
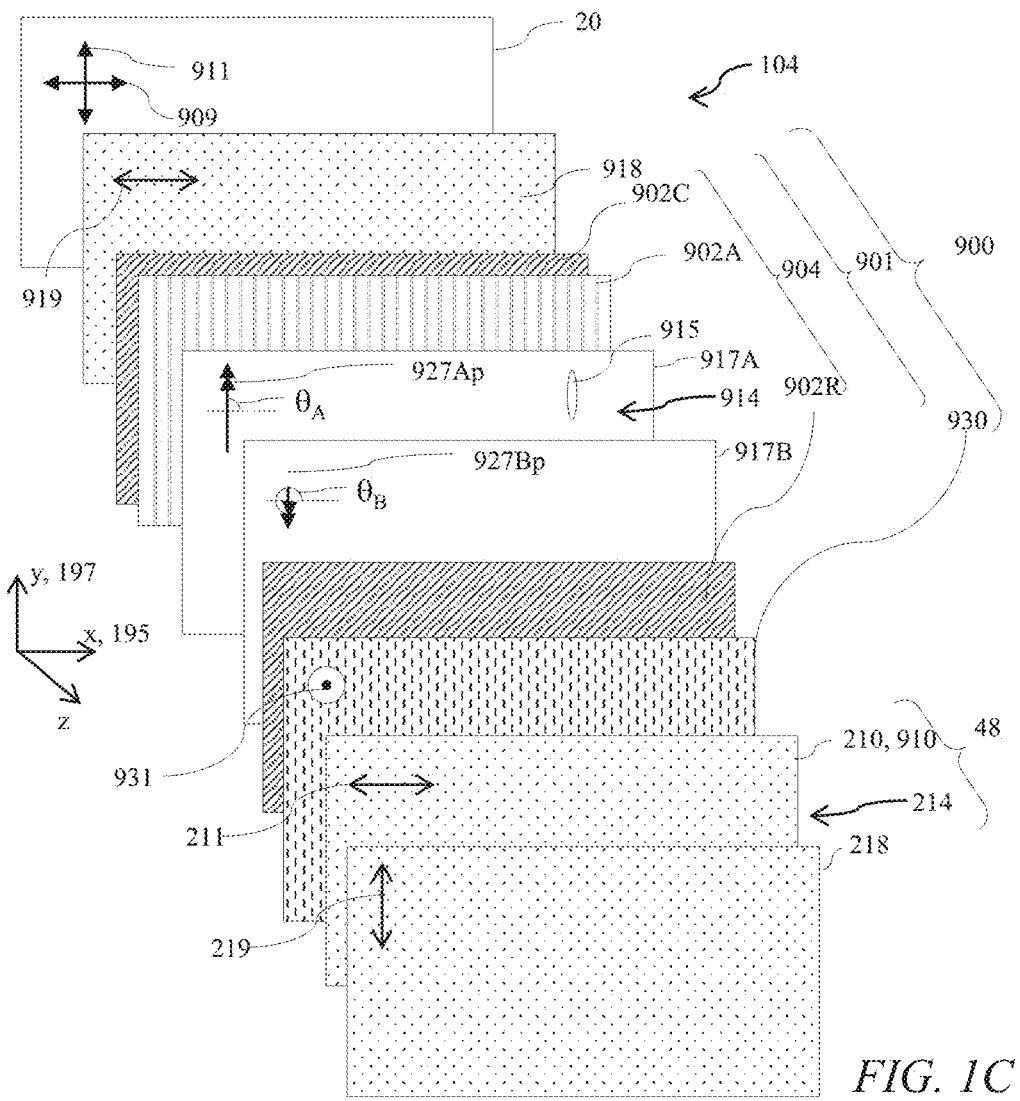
FIG. 1C is a schematic diagram illustrating in perspective front view alignment orientations for an optical stack for use in the display device of FIG. 1A.

FIG. 1A is a schematic diagram illustrating in perspective side view a switchable display device 100 comprising a backlight 20 comprising an array of light sources 15, a waveguide 1, a rear reflector 3 and a light turning component 50; a switchable diffractive view angle control retarder arrangement (SDVACRA) 900 comprising a switchable diffractive liquid crystal retarder (SDLCR) 901 and a passive compensation retarder 930; and a transmissive SLM 48; FIG. 1B is a schematic diagram illustrating in perspective side view a SDLCR 901 component 102; and FIG. 1C is a schematic diagram illustrating in perspective front view alignment orientations for an optical stack for use in the display device 100 of FIG. 1A. Features of the embodiments of FIGS. 1B-C not discussed in further detail may be assumed to correspond to the features of FIG. 1A with equivalent reference numerals, including any potential variations in the features.

The embodiment of FIG. 1A illustrates a display device 100 comprising a SLM 48 arranged to output spatially modulated light. The display device 100 further comprises a backlight 20 arranged to output light, and the SLM 48 is a transmissive SLM 48 arranged to receive the output light from the backlight 20. The SLM 48 comprises a liquid crystal display device comprising transparent substrates 212, 216, and liquid crystal layer 214 having red, green and blue pixels 220, 222, 224. The SLM 48 has an input display polariser 210 and an output display polariser 218 on opposite sides thereof. The display polarisers 210, 218 are arranged to provide high extinction ratio for light from the pixels 220R, 220G, 220B of the SLM 48 and have electric vector transmission directions 211, 219 respectively. Typical polarisers 210, 218 may be absorbing polarisers such as dichroic polarisers such as an iodine polariser on stretched PVA.

The backlight apparatus 20 comprises a rear reflector 3 and a waveguide arrangement 11 comprising waveguide 1, light sources 15, light turning film 50 and light control components 5 that may comprise diffusers and arranged to receive light exiting from the waveguide 1 and directed through the SLM 48. A reflective polariser 27 may be provided between the backlight 20 and the additional polariser 918 to improve the efficiency of output light from the backlight 20 to achieve improved luminance. The reflective polariser 27 may alternatively be omitted. The reflective polariser 27 is different in operation to the reflective polariser 302 described hereinbelow for example in FIG. 16A to achieve increased security factor. S. The backlight 20 of FIG. 1A may be referred to as a collimated backlight. Other types of backlight 20 are described hereinbelow and may be provided as alternatives to the backlight 20 of FIG. 1A.

In the embodiment of FIG. 1A, the display polariser 910 is the input display polariser 210 of the SLM 48 arranged on the input side of the SLM 48, the display polariser 910 being a linear polariser. In alternative embodiments described hereinbelow, the display polariser 910 may be the output polariser 218.

Additional polariser 918 is arranged on the same input side of the SLM 48 as the display polariser 910 outside the display polariser 910, the additional polariser 918 being a linear polariser. In other words, display polariser 910 is an input display polariser 210 arranged on the input side of the SLM 48, and the additional polariser 918 and the SDVA-CRA 900 are arranged between the backlight 20 and the SLM 48.

In the present description, a SDVACRA 900 comprises at least one switchable liquid crystal layer arranged between a pair of polarisers. In the embodiment of FIGS. 1A-D. SDVACRA 900 is arranged between the additional polariser 918 and the display polariser 910 which is input polariser 210. The SDVACRA 900 comprises a SDLCR 901 comprising a layer 914 of liquid crystal material 915 arranged between transparent substrates 912, 916. The SDVACRA 900 further comprises passive compensation retarder 930.

A transmissive electrode arrangement 904 comprises uniform electrodes 902R, 902C and patterned electrodes 902A; and is arranged to drive the layer 914 of liquid crystal material 915 by means of applied voltages V from voltage drivers 950. The display device 100 further comprises a control system 500 arranged to supply voltages by means of the drivers 950 to the transmissive electrode arrangement 904 for driving the layer 914 of liquid crystal material 915.

The display device 100 may provide a viewing axis 445 and an inclined axis 447 that is inclined to the viewing axis 445.

In the present embodiments, a narrow-angle state refers to the state of a display device 100 (or component thereof) into which the display device 100 (or component thereof) may be driven to provide for example a privacy mode of operation. The privacy mode of operation may be arranged to provide an image with high image visibility along the viewing axis 445 to a viewer 45; and may be arranged to provide an image to a viewer 47 that is a snooper with high security factor along the inclined axis 447 such that the viewer 47 does not see image data from the display device 100 when arranged in appropriate external illumination conditions. Alternatively the viewer 47 may be the driver of a vehicle and the privacy display arranged to reduce driver distraction when it provides infotainment images to a passenger that is the viewer 45.

The narrow-angle state may alternatively or additionally provide a low stray light mode of operation, so that the illuminance provided to the ambient environment is reduced. Such a display device 100 may advantageously reduce driver distraction arising from brightly illuminated internal surfaces of α vehicle within which the display device is arranged.

By way of comparison, the wide-angle state refers to the state of a display device 100 and may be used to provide for example a share mode of operation of the display device 100. The share mode of operation may be arranged to provide image data from the display device 100 to both the viewer 45 along axis 445 and the viewer along the inclined axis 447. Advantageously both viewers (or yet further viewers) can see images provided display device 100.

The intermediate state refers to the state of a display device 100 that is arranged to have luminance properties that are intermediate to the narrow-angle state and the wide-angle state. The intermediate state may be arranged to provide some image data to the viewer 47 while maintaining high image visibility to the viewer 45. The power consumption of the display device may be reduced in comparison to the wide-angle state and the intermediate state may provide a high efficiency mode of operation.

The display device has an optical axis 199 that is normal to at least one region of the display device 100.

The viewing axis 445 may be the direction in which the viewer 45 is provided with the maximum image visibility. The inclined axis 447 may be the nominal direction of a viewer 47 for which desirable security factor is achieved in a narrow-angle state of the display device 100. Alternatively the viewing axis 447 may be the minimum angle $\phi$ between the viewing axis 445 and the inclined axis 447 for which desirable security factor S is achieved. In an illustrative embodiment, the display device 100 may be arranged in a laptop, the viewing axis 445 is along the normal to the display device 100 and the inclined axis 447 is at 45° to the viewing axis laterally and with the same elevation. In an alternative illustrative embodiment, the display device 100 may be arranged in a passenger infotainment display, the viewing axis 445 at an angle of +5° offset in the lateral direction from the optical axis 199 and the inclined axis 447 is at −25° to the viewing axis laterally and with the same elevation. A driver 47 leaning towards the display device cannot see a distracting image at angles of 25° or greater from the normal 199 for zero degrees elevation.

The nominal display user 45 viewing axis 445 may be parallel to the optical axis 199, for example in displays such as laptops where the user 45 desirably aligns centrally to the display device 100. In other words, the viewing axis 445 is normal to a plane of the SLM 48. In applications such as automotive applications, the viewing axis 445 may be different to the optical axis 199 direction.

In the narrow-angle state, the non-viewing inclined axis 447, that is the direction in which a display snooper is located, is inclined at a polar angle $\phi$ to the viewing axis 445, for example at an angle of 5° offset in the lateral direction from the optical axis 199.

FIG. 1B is an alternative embodiment illustrating that the SDLCR 901 may be provided as a separate component 102. Component 102 may further comprise passive compensation retarder 930 and polariser 918. Component 102 may be added during manufacture of the display device 100 or alternatively may be added to the SLM 48 by a display user 45. Advantageously a switchable display device 100 upgrade may be provided.

The arrangement of the optical layers of the display device 100 will now be described. In the present illustrative embodiments, the direction of various orientations of respective layers is measured anticlockwise from an easterly direction when viewing the front of the display device 100.

FIG. 1C illustrates that the backlight 20 typically provides unpolarised or partially polarised light state 21. Additional polariser 918 with electric vector transmission direction 919 provides linear polarisation state output that is incident onto the SDVACRA 900.

The electrodes 902A of the SDLCR 901 are patterned and arranged to extend along the vertical axis, that is with an orientation angle of 90°. The direction of diffraction orders described hereinbelow is provided along the 0°-180° lateral axis (x-axis direction).

The SDLCR 901 comprises surface alignment layers 917A, 917B, the two surface alignment layers 917A, 917B being disposed adjacent to the layer 914 of liquid crystal material 915 and on opposite sides thereof, the two surface alignment layers 917A, 917B each being arranged to provide alignment of the adjacent liquid crystal material 915 at the surfaces of the surface alignment layers 917A, 917B.

The alignment directions 927A, 927B at the respective surface alignment layers 917A, 917B provide in-plane components 927Ap, 927Bp in the plane of the layer 914 of liquid crystal material 915. Further, pretilt of the alignment directions 927A, 927B provides an out-of-plane component in the thickness direction t̂ through the layer 914 of liquid crystal material 915 that reduces degeneracy of the structure 965 of liquid crystal material 915 orientations and advantageously improves uniformity across an area 103 of the layer 914 of liquid crystal material 915. An area 103 may be the entirety of the layer 914 that is seen by an observer 45, 47 or may be a portion of the active area as will be described further hereinbelow with respect to FIGS. 32E-I for example.

The surface alignment layer 917A on the side of the liquid crystal layer adjacent the array of separated electrodes 902A has a component 927Ap of alignment in the plane of the layer 914 of liquid crystal 915 material in the direction 197 that is orthogonal to the one direction 195.

The area 103 of the liquid crystal material 915 may extend across the entirety of the SLM 48. In certain modes of operation of the display device, the electrode arrangement 904 may be further arranged so that control system 500 and drivers 950 may control the display device 100 such that some regions 103A of the area 103 may be arranged to provide a first state of operation, and other regions 103B of the area 103 may provide a second state of operation that is different to the first state. For example one area 103A of the display device 100 may be arranged in a narrow-angle state and another area 103B may be arranged in a wide-angle state as described further hereinbelow.

Passive compensation retarder 930 may for example comprise a C-plate with an optical axis direction 931. Alternatively passive compensation retarder 930 may be provided by crossed A-plates for example.

Figure 1D:
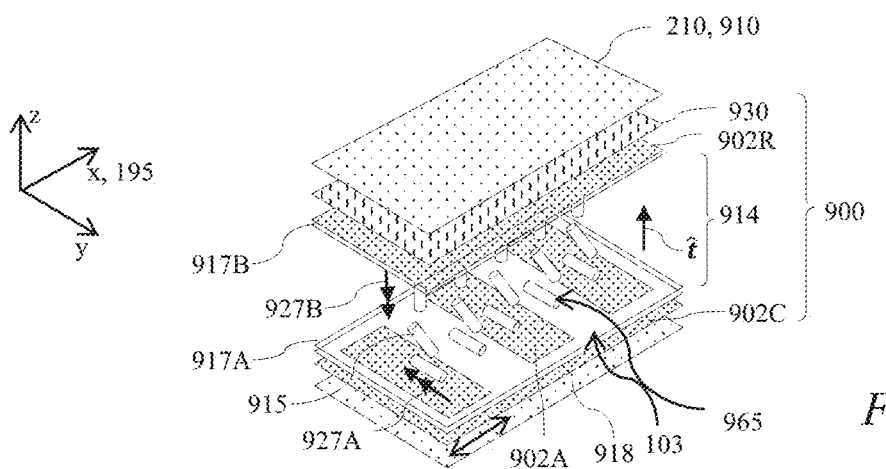
FIG. 1D is a schematic diagram illustrating in perspective front view an electrode and liquid crystal material structure for the SDLCR in an undriven mode.

FIG. 1D is a schematic diagram illustrating in perspective front view an electrode 902 and liquid crystal material structure for the SDLCR 901 in an undriven mode. Features of the embodiments of FIG. 1D not discussed in further detail may be assumed to correspond to the features with equivalent reference numerals as discussed above, including any potential variations in the features.

FIG. 1D is a schematic diagram illustrating in perspective front view an electrode and liquid crystal material 915 structure 965 for the SDVACRA 900 in an undriven mode, that is zero volts are applied across the layer 914 of liquid crystal material 915. At least one of the surface alignment layers 917A, 917B is arranged to provide homogeneous alignment of the adjacent liquid crystal material 915. As will be described further hereinbelow with respect to TABLE 2, surface alignment layer 917A is provided with homogeneous alignment and surface alignment layer 917B is provided with homeotropic alignment, providing respective alignment directions 927A, 927B. The liquid crystal material 915 has a splayed structure 965 through the layer 914 of liquid crystal material in the thickness direction t. The structure 965 describes the average arrangement of molecules of liquid crystal material 915 through the layer 914 in the thickness direction t̂ and across an area 103 of the layer 914, that is the structure 965 is a three dimensional average arrangement of liquid crystal material for a given drive condition. The structure 965 may typically vary in the thickness direction t̂, but with different structures in the thickness direction t̂ in both the narrow-angle and wide-angle states; and may further additionally vary across an area 103 of the layer 914 for the wide-angle state of operation.

An illustrative electrode arrangement 904 will now be described.

Figure 1E:
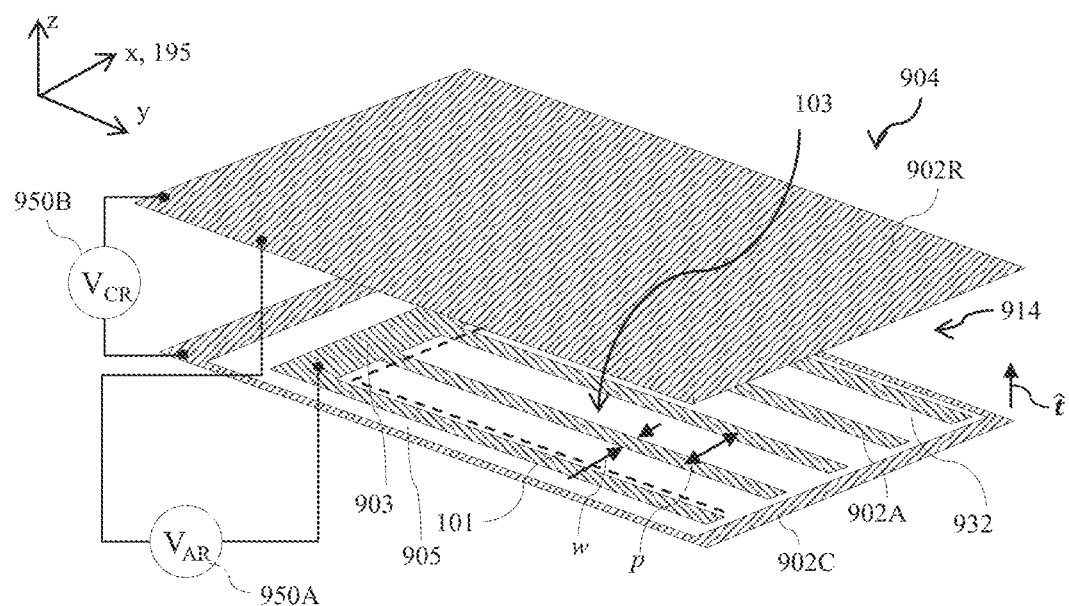
FIG. 1E is a schematic diagram illustrating in perspective side view a transmissive electrode arrangement for the SDLCR of FIG. 1A.
Figure 1F:
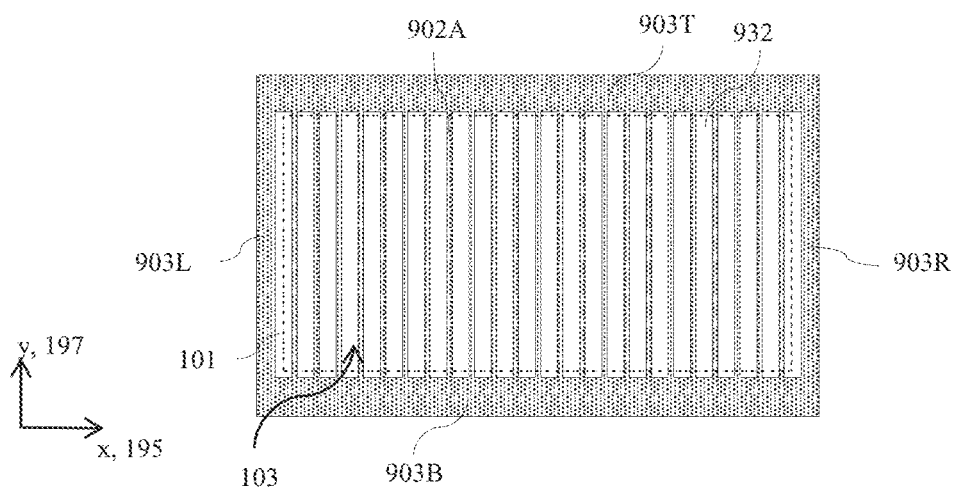
FIG. 1F is a schematic diagram illustrating in front view an alternative arrangement of a transmissive separated electrode.

FIG. 1E is a schematic diagram illustrating in perspective side view a transmissive electrode arrangement 904 for the SDLCR 901 of FIG. 1A; and FIG. 1F is a schematic diagram illustrating in front view an alternative arrangement of transmissive separated electrode 902A. Features of the embodiments of FIGS. 1E-F not discussed in further detail may be assumed to correspond to the features with equivalent reference numerals as discussed above, including any potential variations in the features.

The transmissive electrode arrangement 904 of FIG. 1E comprises transmissive separated electrodes 902A and transmissive uniform electrode 902C arranged on a first side of the layer 914 of liquid crystal material 915 and uniform transmissive reference electrode 902R arranged on the opposite side of the layer 914 of liquid crystal material 915. Dielectric material 905 such as SiOx or SiN may be arranged between the transmissive separated electrodes 902A and transmissive control electrode 902C. The electrodes 902A, 902C. 902R may be provided by transmissive conductive material such as ITO for example.

The electrodes 902A, 902C may be buried by the dielectric material 905 with respective refractive indices arranged to reduce diffraction from the electrodes 902A and the gaps 932 between the electrodes 902A in the direction 195. Advantageously diffraction is reduced in narrow-angle state and security factor S improved for off-axis snoopers 47 in privacy mode of operation.

The transmissive electrode arrangement 904 comprises an array of separated electrodes 902A and the array of separated electrodes 902A is arrayed in one direction 195, that is in across the lateral direction (x-axis). The separated electrodes 902A extend across an area 103 of the layer 914 of liquid crystal material 915 in the direction orthogonal to the one direction 195.

The electrode 902A width w and the electrode 902A pitch p may be selected to provide desirable diffractive properties of the SDLCR 901 when driven in the wide-angle state as will be described further hereinbelow.

In the embodiment of FIG. 1E, the separated electrodes 902A have a common connection bus bar 903. In other embodiments such as those described further hereinbelow, at least some of the separated electrodes 902A may be connected separately. The alternative embodiment of FIG. 1F illustrates common bus bars 903T. 903B, 903L and 903R. The common connection is formed by conductors located outside an area of the SLM 48, that is the common bus bar 903 is illustrated to be arranged outside of the border 101 of the active area 103 of the display device 100. FIG. 1E illustrates a common bus bar 903 to one end of the separated electrodes 902A, however the common bus bar 903 bus bar connection may be extended to enclose the separated electrodes 902A so that the bus bar extends along both ends 903T, 903B and optionally the sides 903L, 903R. Connecting at both ends enables a substantial reduction in the impedance of the "fingers" of the separated electrodes, which then become electrically connected in parallel, achieving reduced impedance. Further common electrode bus bars 903 may be provided by transparent common bus bar 903 electrodes within the active area or may be provided by transmissive or low impedance materials, such as metals, which are light blocking electrodes outside of the active area 103. Voltage drops along the transmissive electrodes 902 may be reduced, advantageously achieving increased uniformity.

The transmissive electrode arrangement 904 further comprises a control electrode 902C extending across the layer 914, the control electrode 902C being arranged on the same side of the layer 914 of liquid crystal material 915 as the array of separated electrodes 902A outside the array of separated electrodes 902A. The control electrode 902C and reference electrode 902R may be planar electrodes.

The transmissive electrode arrangement 904 further comprises a reference electrode 902R extending across the entirety of the SLM 48, the reference electrode 902R being arranged on the opposite side of the layer 914 of liquid crystal material 915 from the array of separated electrodes 902A.

Respective voltage drivers 950A, 950B are provided to drive the electrode arrangement 904 with voltage signal $V_{AC}$ between electrodes 902A, 902C and voltage signal $V_{CR}$ as will be described further hereinbelow.

The structure and operation of the display device 100 operating in wide-angle state will now be described further.

Figure 2A:
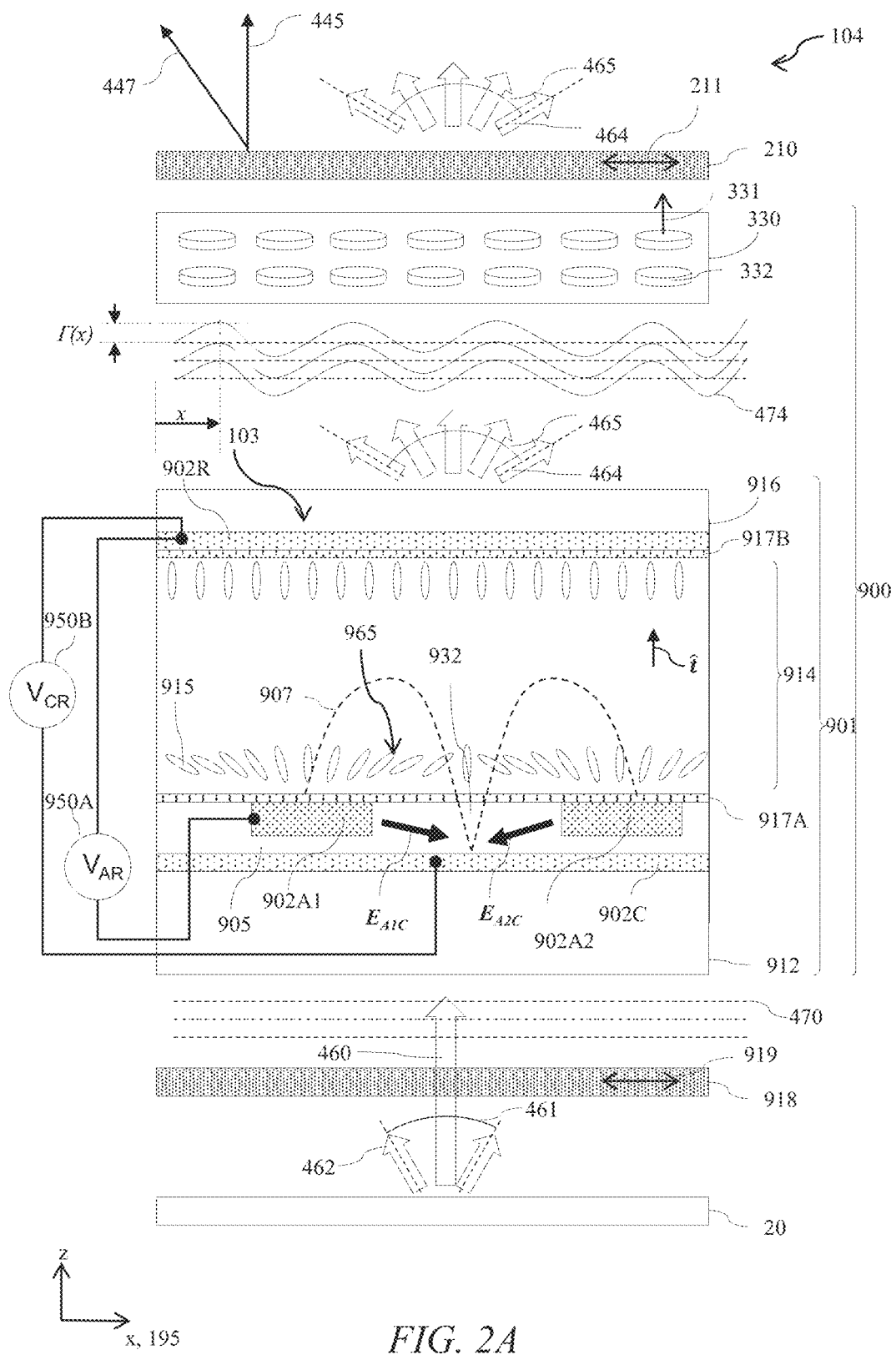
FIG. 2A is a schematic diagram illustrating in top view the structure and operation of the optical stack comprising a SDVACRA comprising a SDLCR with the electrode arrangement of FIG. 1E for wide-angle state.
Figure 2B:
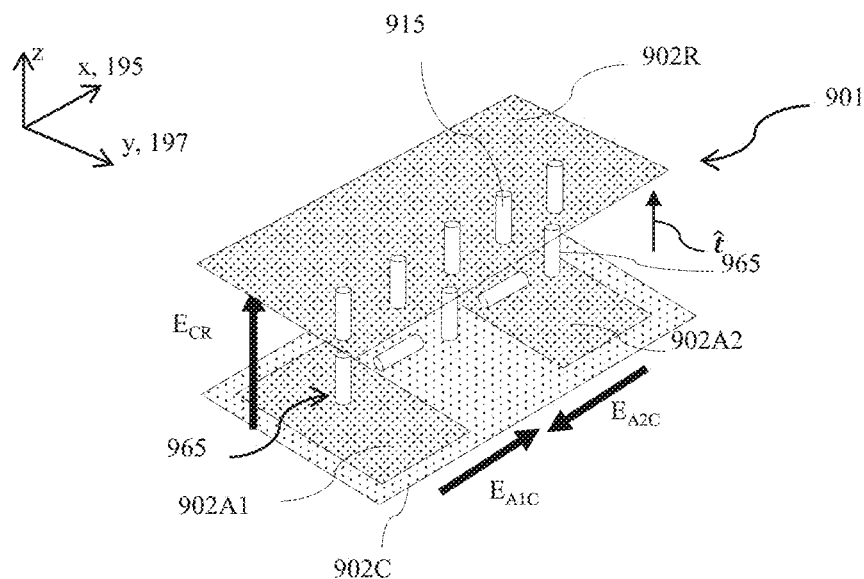
FIG. 2B is a schematic diagram illustrating in perspective front view a transmissive electrode arrangement and structure of liquid crystal material orientations for the SDLCR in wide-angle state.

FIG. 2A is a schematic diagram illustrating in top view the structure and operation of the optical stack comprising a SDVACRA 900 comprising SDLCR 901 with the electrode arrangement 904 of FIG. 1E for wide-angle state; FIG. 2B is a schematic diagram illustrating in perspective front view a transmissive electrode arrangement 904 and structure 965 of liquid crystal material 915 orientations for the SDLCR 901 in wide-angle state. Features of the embodiment of FIGS. 2A-B not discussed in further detail may be assumed to correspond to the features with equivalent reference numerals as discussed above, including any potential variations in the features.

FIG. 2A illustrates backlight 20 that provides light output in cone 461, with high luminance in direction 460 and lower luminance in directions 462. As will be described further hereinbelow in FIGS. 2F-G, plane waves 470 propagate in the direction 460. The SDVACRA operates to diffract the input light providing phase differences Γ(x) for the output wavefronts 474. Output light 464 is diffracted into cone 465 that has a full width half maximum angular spread in the lateral direction that is larger than the cone 461. Advantageously increased image visibility is seen at wide-angle locations in the wide-angle state.

FIGS. 2A-B illustrate that the voltages $V_{AC}$, $V_{CR}$, applied to respective electrodes 902A, 902C. 902R so that neighbouring electrodes 902A1, 902A2 provide electric fields $E_{A1C}$, $E_{A2C}$ with electric field lines 907 in the layer 914 that provide reorientation of the liquid crystal material 915 into the gaps 932 to provide a diffractive liquid crystal material 915 structure 965 across an area 103 and through the thickness direction t̂ that may be greatest in magnitude near the surface alignment layer 917A but also through the layer 914 of liquid crystal material 915.

Figure 2C:
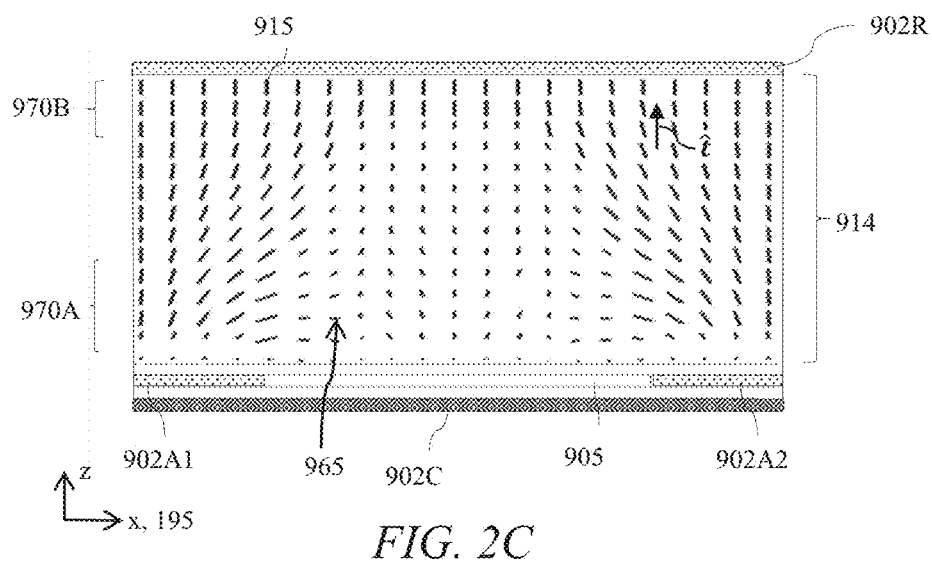
FIG. 2C is a schematic diagram illustrating in top view a transmissive electrode arrangement and simulated structure of liquid crystal material orientations for the SDLCR in wide-angle state for the illustrative embodiment of TABLES 2-3.

FIG. 2C is a schematic diagram illustrating in top view a transmissive electrode arrangement 904 and simulated structure 965 of liquid crystal material 915 orientations for the SDLCR 901 in wide-angle state for the illustrative embodiment of TABLES 2-3. Features of the embodiment of FIG. 2C not discussed in further detail may be assumed to correspond to the features with equivalent reference numerals as discussed above, including any potential variations in the features.

TABLE 2

| Item | Property | Illustrative embodiment |
|---|---|---|
| Display polariser 910 | Electric vector transmission direction, 911 | 0° |
| Electrode 902A | Pitch, p | 10 μm |
|  | Width, w | 4 μm |
| Dielectric 905 | Dielectric thickness | 0.4 μm |
|  | Dielectric material | SiN |
| Surface alignment layer 917A | Type | Homogeneous |
|  | In-plane alignment direction 927Ap angle $\theta_A$ | 90° |
|  | Pretilt angle | 2° |
| Surface alignment layer 917B | Type | Homeotropic |
|  | In-plane alignment direction 927Bp angle $\theta_B$ | 270° |
|  | Pretilt angle | 90° |
| LC layer 914 | Retardance | 1000 nm |
| Passive compensation retarder 930 | Type | Negative C-plate |
|  | Retardance | −800 nm |
| Additional polariser 918 | Electric vector transmission direction, 919 | 0° |

TABLE 3

| Item | Wide-angle state | Narrow-angle state | Intermediate state |
|---|---|---|---|
| FIG. | 2A | 4A | 6A |
| $V_{AR}$ | +10 V | +1.4 V | +10 V |
| $V_{CR}$ | −10 V | +1.4 V | +10 V |

In the present embodiments, a drive voltage of $+\bar{\omega}V$ refers to a voltage signal that varies between $+\bar{\omega}V$ and $-\bar{\omega}V$ to achieve DC balancing and minimise charge build up in the layer 914 of liquid crystal material where $\bar{\omega}$ is the voltage value in the TABLE 3 for example. A drive voltage of $-\bar{\omega}V$ refers to a voltage signal that varies between $-\bar{\omega}V$ and $+\bar{\omega}V$, that is in antiphase to the $+\bar{\omega}V$ signal.

FIG. 1A and TABLE 2 illustrate that the passive compensation retarder 930 is arranged on the side of the layer 914 of liquid crystal material 915 comprising the homeotropic alignment layer 917B. It may be desirable to provide the passive compensation retarder 930 on the input side of the SDLCR 901, in which case the alignment layer 917A is homeotropic and the alignment layer 917B is homogeneous. Similarly, the sequence of electrodes 902C, 902A, 902R is reversed, that is the patterned electrodes 902A are arranged next to the homogeneous alignment layer 917B.

FIG. 2C illustrates that the reorientation of the structure 965 may be primarily in a layer 970A close to the surface alignment layer 917A but does propagate through the layer 914 in the thickness direction t̂. The amplitude of the net phase shifts (described hereinbelow) across an area 103 may be increased, achieving increased efficiency of diffraction into higher diffraction orders as described further hereinbelow. The separated electrodes 902A are separated in the lateral direction 195, so that the reorientation of the structure 965 is also at least across the lateral direction 195.

Figure 2D:
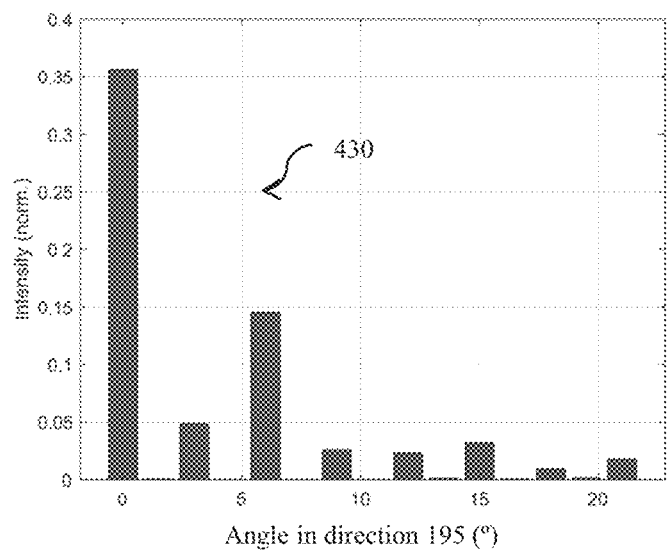
FIG. 2D is a schematic graph illustrating a profile of diffracted luminance into diffractive orders for the embodiment of FIG. 2C in wide-angle state.
Figure 2E:
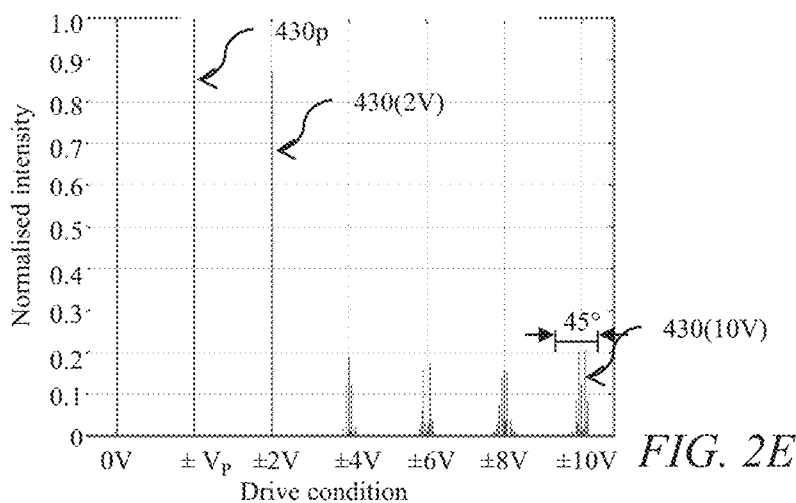
FIG. 2E is a schematic graph illustrating the variation of diffracted profile with drive voltage for the embodiment of FIG. 2C.
Figure 2F:
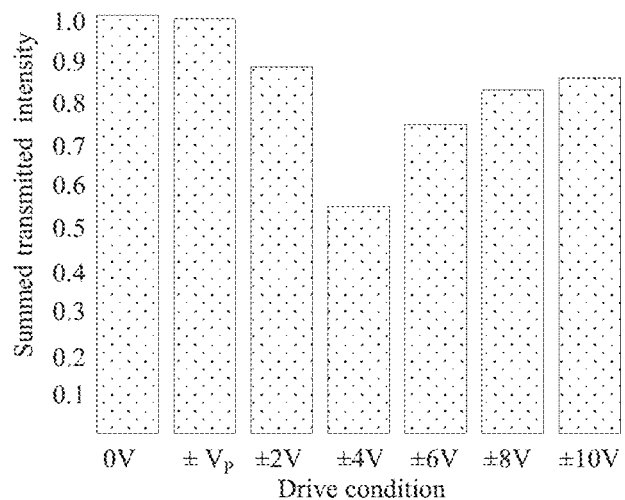
FIG. 2F is a schematic graph illustrating the variation of total diffracted intensity with drive voltage for the embodiment of FIG. 2E.
Figure 2G:
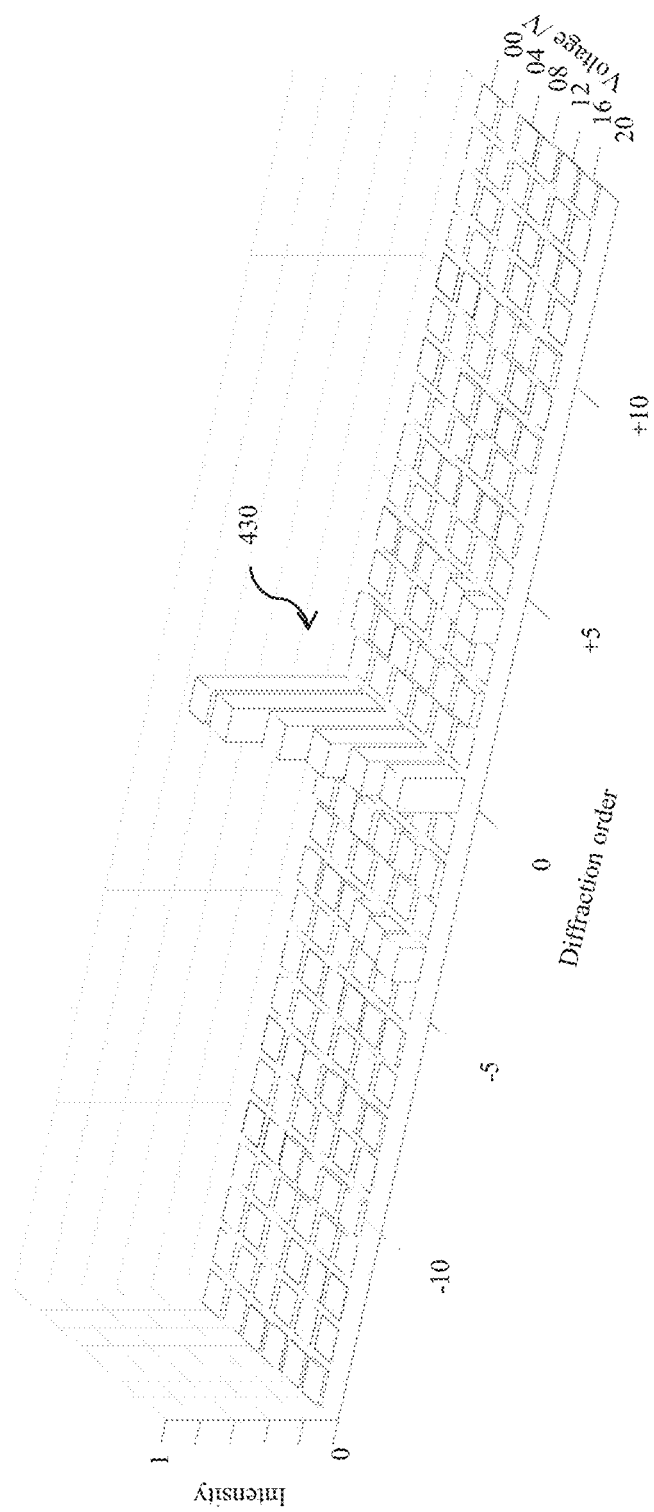
FIG. 2G is a schematic graph illustrating a profile of diffracted luminance into diffractive orders for the embodiment of FIG. 2C and TABLE 2 in wide-angle state for different drive voltages.

FIG. 2D is a schematic graph illustrating a profile 430 of diffracted luminance into diffractive orders for the embodiment of FIG. 2C in wide-angle state; FIG. 2E is a schematic graph illustrating the variation of diffracted profile with drive voltage for the embodiment of FIG. 2C; FIG. 2F is a schematic graph illustrating the variation of total diffracted intensity with drive voltage for the embodiment of FIG. 2E; and FIG. 2G is a schematic graph illustrating a profile 430 of diffracted luminance into diffractive orders for the embodiment of FIG. 2C and TABLE 2 in wide-angle state for different drive voltages. Features of the embodiments of FIGS. 2D-G not discussed in further detail may be assumed to correspond to the features with equivalent reference numerals as discussed above, including any potential variations in the features.

FIG. 2D illustrates the diffraction for the light 460 into higher orders, providing profile 430. The final output distribution, for example as will be illustrated in FIG. 8G hereinbelow, may be provided by the interaction of the input light cone such as illustrated in FIG. 8A hereinbelow with the SDVACRA 900.

TABLE 2 shows exemplary voltages in three different modes of operation applied for example using the waveforms of FIGS. 7A-C hereinbelow. The applied voltages $V_{AC}$ and $V_{CR}$ are typically alternating voltages so that no net DC voltage is applied for any longer than 1 second to the liquid crystal material 915. Charge build-up in the layer 914 of liquid crystal material 915 is reduced and advantageously lifetime extended.

An alternative structure of SDVACRA 900 driven for various wide-angle states will now be described.

FIG. 2E illustrates various diffractive output profiles 430 for different drive voltages $V_{AC}$. The profile 430 of FIG. 2D is that illustrated as the profile 430 (10V) for +/−10V in FIG. 2E. As the voltage is increased, diffractive spreading increases.

FIG. 2F illustrates the total power that is output through the display polariser 910 of FIG. 2A for different drive voltages where Vp is the desirable voltage provided for narrow-angle state operation. For low voltages, there is little modification of the linear polarisation state 919 input into the SDVACRA 900 and most input light is transmitted through the display polariser 910.

FIG. 2G illustrates that the amount of light dispersion provided by the SDVACRA 900 may be modified by adjusting the drive voltage levels $V_{AC}$, $V_{CR}$ in the wide-angle state. The control system 500 may be arranged to provide selection of the peak luminance, power efficiency and image visibility by control of the respective voltage drivers 950. Advantageously increased display performance may be achieved depending on desirable characteristics for display device 100 operation.

For intermediate drive voltages, the reorientation of the structure 965 provides different retardation in the layer 914 of liquid crystal material 915. As illustrated in FIG. 5D hereinbelow, phase differences η are provided for orthogonal polarisation states propagating through the layer 914 of liquid crystal material for different angular directions and some light is absorbed at the display polariser 910. Additionally wavefront phase differences Γ are provided across the lateral direction that achieve the diffraction effect.

For higher drive voltages such as +/−10V, the total output luminance increases again as such phase differences η for orthogonal polarisation states reduce and the structure 965 provides mostly diffraction wavefront phase differences Γ.

The drive voltage can be adjusted to provide increased efficiency, improved visibility along inclined axis 447 and reduced power consumption.

The operation of the display device 100 in wide-angle state will now be further described.

Figure 3A:
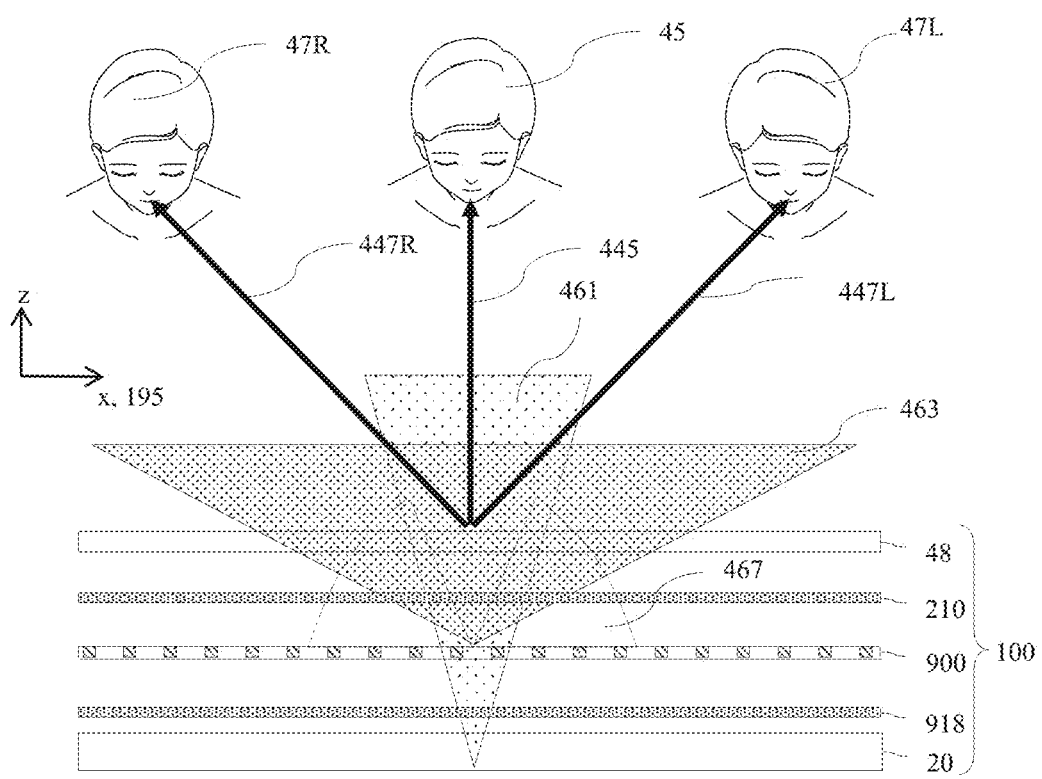
FIG. 3A is a schematic diagram illustrating in top view the structure and operation of the display device comprising a SDVACRA for wide-angle state.

FIG. 3A is a schematic diagram illustrating in top view the structure and operation of the display device comprising a SDVACRA 900 for wide-angle state. Features of the embodiment of FIG. 3A not discussed in further detail may be assumed to correspond to the features with equivalent reference numerals as discussed above, including any potential variations in the features.

Backlight 20 provides light in light cone 461. The size of cone 461 may for example be determined by the angle of full width half maximum luminance. In the wide-angle state, diffraction in the SDLCR 901 provides output cone 463 that has increased cone angle. In angular cones 467, the SDVACRA 900 provides small or substantially no reduction of luminance of the light directed into cone 463 arising from phase differences η in the SDVACRA 900.

In operation, viewer 45 near to viewing axis 445 and further viewers 47L, 47R near to inclined axis 447L, 447R also see light directed from the display device with higher luminance than would be provided by light from the light cone 461. Advantageously wide-angle state luminance is increased and image visibility to viewers 47L, 47R. In the present description, the inclined axis 447 is inclined with respect to the viewing axis 445.

A further description of phase shifts for light that is diffracted in SDLCR 901 will now be given.

Figure 3B:
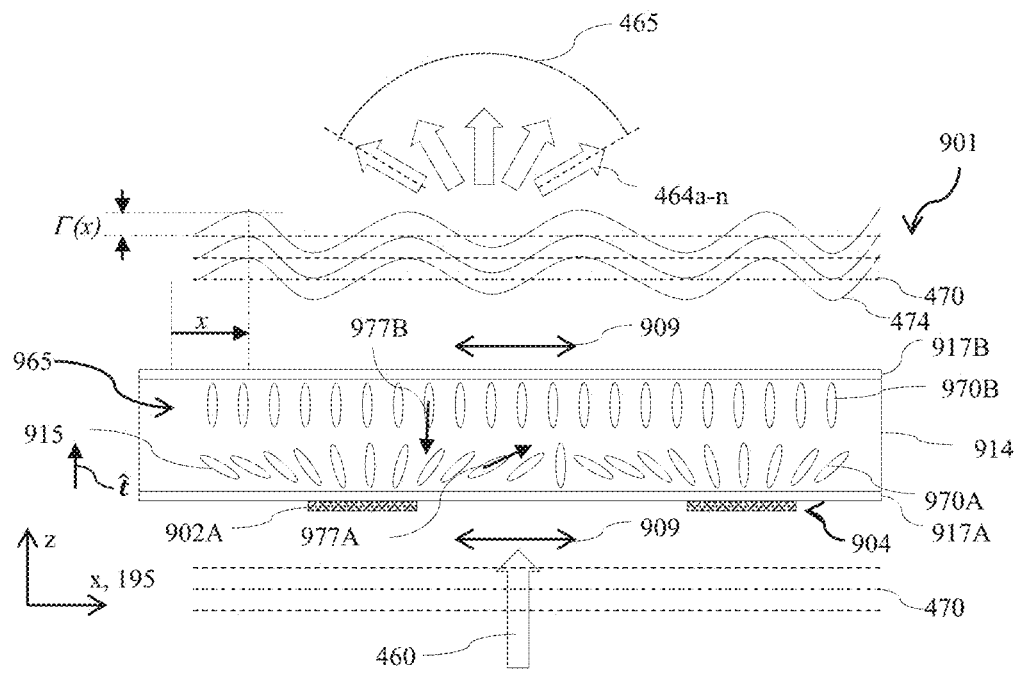
FIG. 3B is a schematic diagram illustrating in top view the propagation of a first linear polarisation state through a SDLCR arranged in wide-angle state.
Figure 3C:
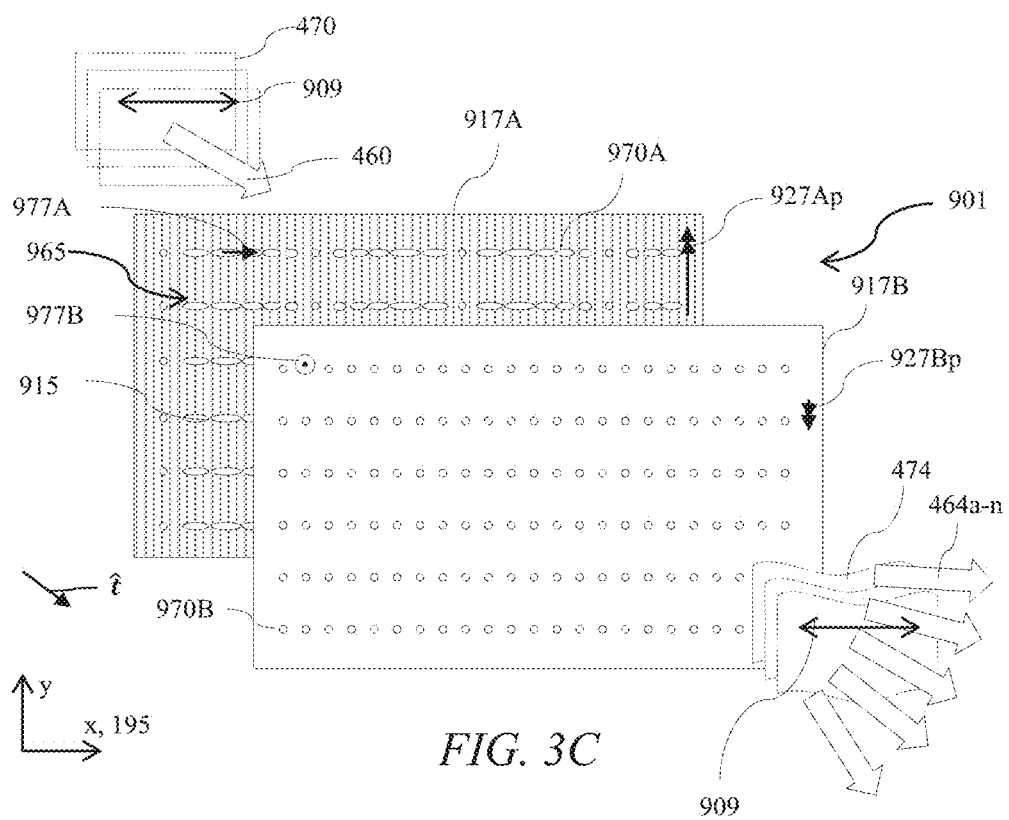
FIG. 3C is a schematic diagram illustrating in perspective front view the propagation of the first polarisation state through the SDLCR arranged in wide-angle state.
Figure 3D:
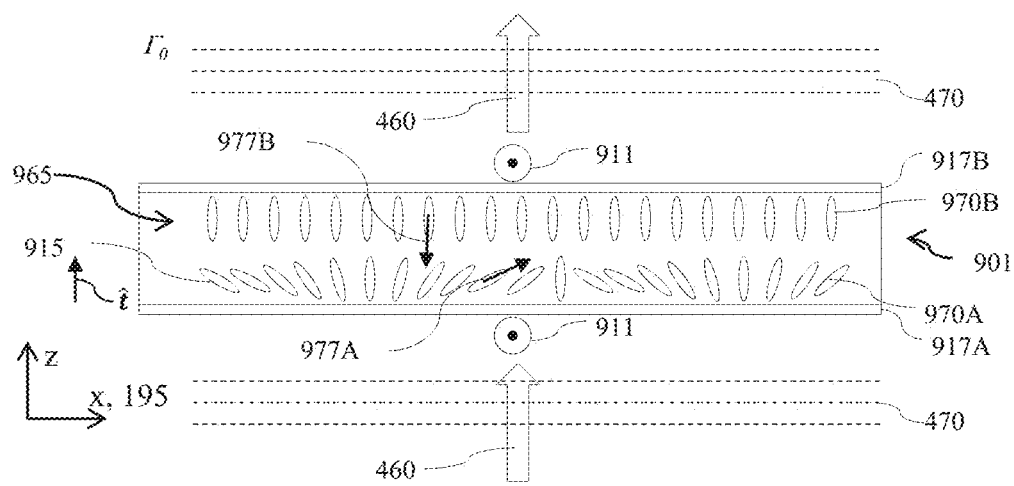
FIG. 3D is a schematic diagram illustrating in top view the propagation of a second linear polarisation state orthogonal to the first polarisation state through the layer comprising a SDLCR arranged in wide-angle state.
Figure 3E:
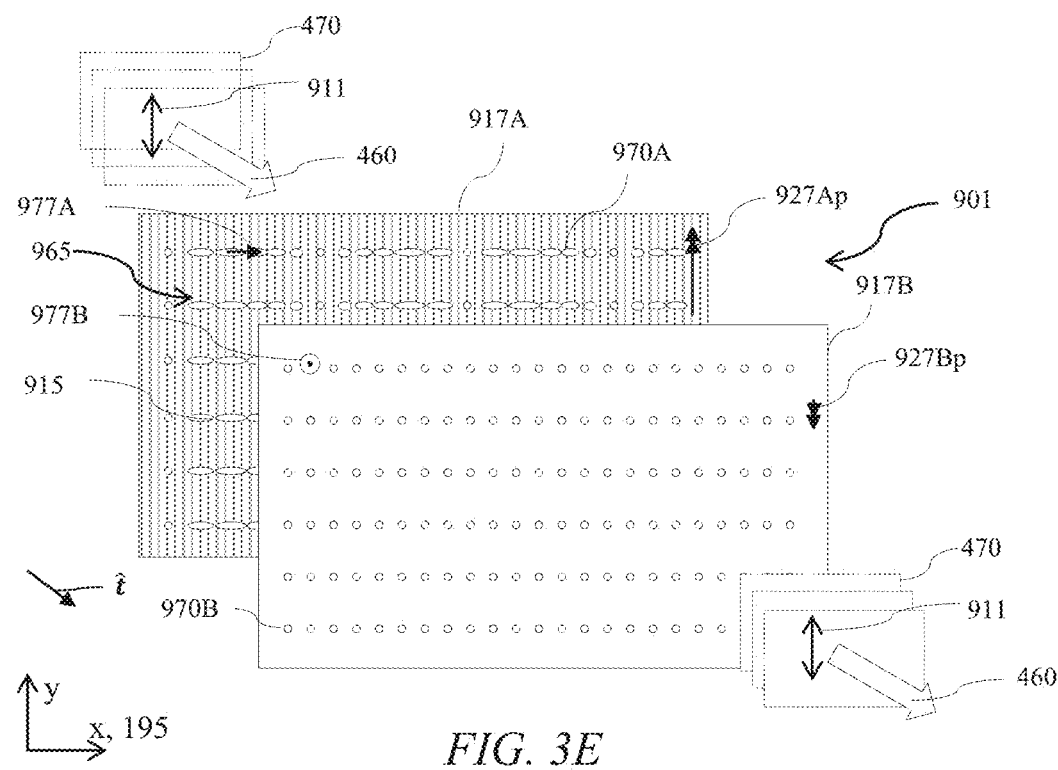
FIG. 3E is a schematic diagram illustrating in perspective front view the propagation of the second polarisation state through a layer comprising a SDLCR arranged in wide-angle state.

FIG. 3B is a schematic diagram illustrating in top view the propagation of a first linear polarisation state 909 through a SDLCR 901 arranged in wide-angle state; FIG. 3C is a schematic diagram illustrating in perspective front view the propagation of the first polarisation state 909 through the SDLCR 901 arranged in wide-angle state; FIG. 3D is a schematic diagram illustrating in top view the propagation of a second linear polarisation state 911 orthogonal to the first polarisation state 909 through the layer 914 comprising a SDLCR 901 arranged in wide-angle state; and FIG. 3E is a schematic diagram illustrating in perspective front view the propagation of the second polarisation state 911 through a layer comprising a SDLCR 901 arranged in wide-angle state. Features of the embodiment of FIGS. 3B-E not discussed in further detail may be assumed to correspond to the features with equivalent reference numerals as discussed above, including any potential variations in the features.

FIG. 3B illustrates a plane wave 470 with linear polarisation state 909 that propagates through the layer 914 of liquid crystal material 915. Said layer 914 has a structure 965 of orientations of liquid crystal material 915 that in the wide-angle state are spatially varying in the lateral direction 195.

FIGS. 3B-C illustrate a light ray 460 provided by plane waves 470 incident onto a SDLCR 901. The input polarisation state 909 is incident at differing angles with respect to the optical axis directions 977 of the liquid crystal material 915 so that the plane waves 470 with polarisation state 909 in the region 970A near the surface alignment layer 917A see a refractive index that can vary between the extraordinary index $n_e$ and the ordinary index $n_o$ of the liquid crystal material 915. In other words, in some locations the wavefront 470 with input polarisation state 909 experiences the ordinary refractive index of the liquid crystal material 915, whereas in spatially separated locations the wavefront 470 with input polarisation state 909 experiences a refractive index which is closer to the extraordinary refractive index of the liquid crystal material 915. Such spatially varying refractive index profiles thus provide net relative phase shifts to the input light represented by wavefront 470 that vary spatially.

By way of comparison with FIGS. 3B, FIG. 3D illustrates a plane wave 470 with linear polarisation state 911 that propagates through the layer 914 of liquid crystal material 915. In the arrangement of FIGS. 3D-E, the polarisation state 911 sees approximately the same ordinary index of the liquid crystal material 915 for all spatial positions. Thus the plane waves 470 with the polarisation state 911 sees no or small modulation of phase $\Gamma_0$ and the layer 914 of liquid crystal material 915 provides no or small diffractive effect. A plane wave 470 that experiences a uniform birefringent material of the layer 914 of liquid crystal material 915 has uniform phase $\Gamma_0$ and does not diffract.

Spatially varying phase shifts to incident polarisation states 909, 911 of light transmitted through the layer 914 of liquid crystal material 915 of a SDLCR 901 arranged in wide-angle mode will now be discussed further.

Figure 3F:
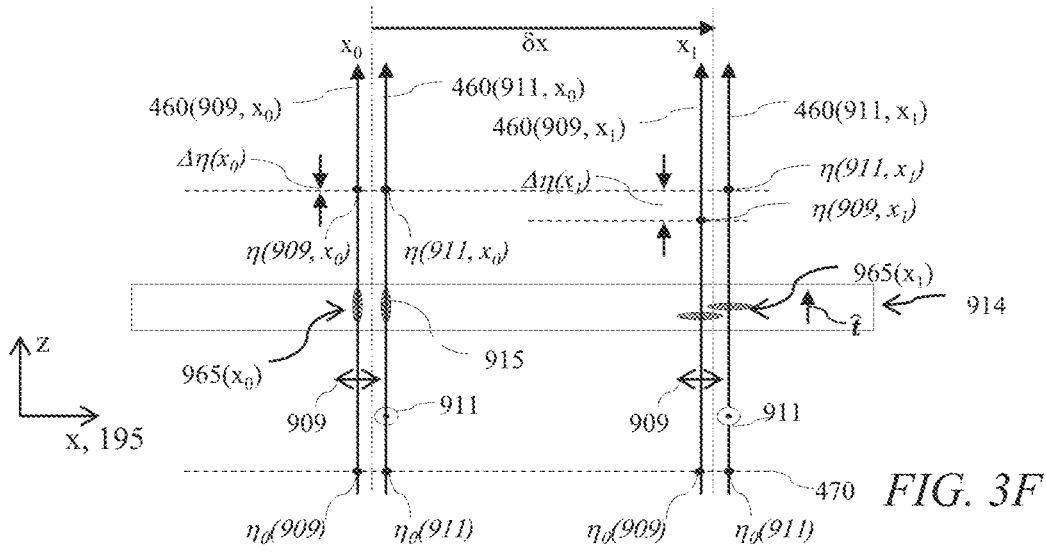
FIG. 3F is a schematic diagram illustrating in top view the propagation through the layer of a SDLCR arranged in wide-angle state for rays comprising orthogonal polarisation states for two different positions $x_0$, $x_1$ across the layer.
Figure 3G:
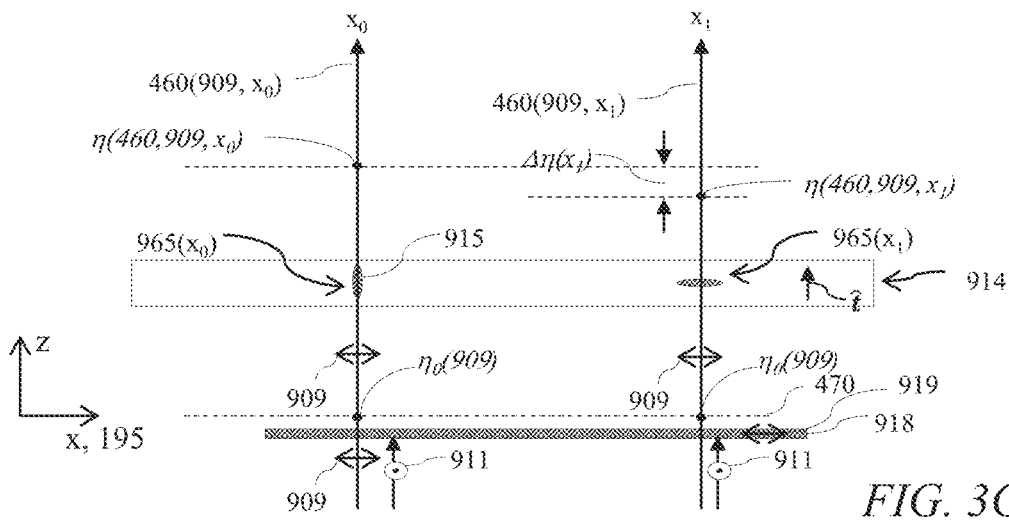
FIG. 3G is a schematic diagram illustrating in top view the arrangement of FIG. 3F and with an input polariser that is the additional polariser.
Figure 3H:
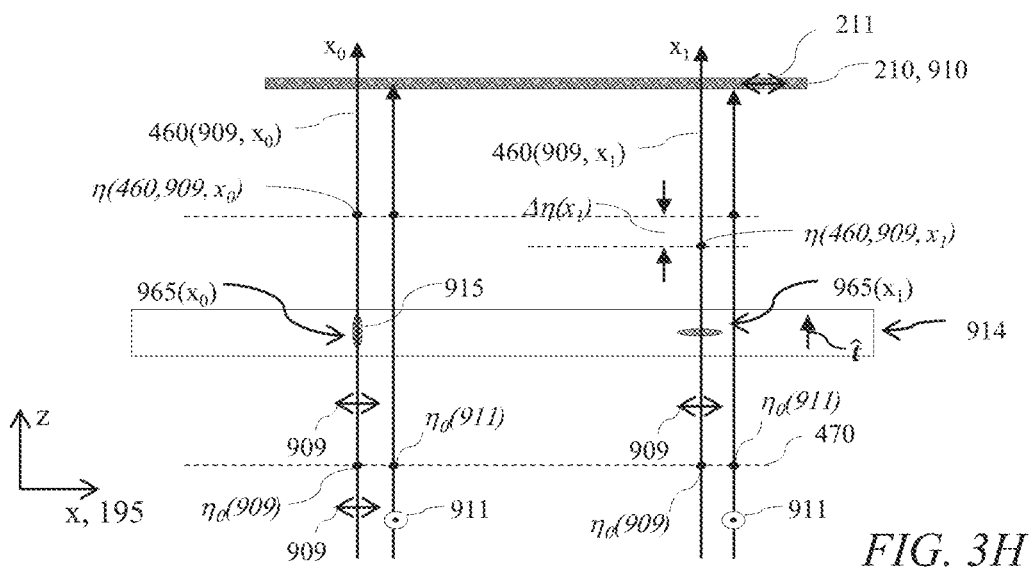
FIG. 3H is a schematic diagram illustrating in top view the arrangement of FIG. 3F and with an output polariser that is the display polariser that is the input polariser.

FIG. 3F is a schematic diagram illustrating in top view the propagation through the layer 914 of a SDLCR 901 arranged in wide-angle state for light rays 460 comprising orthogonal polarisation states 909, 911 for two different positions $x_0$, $x_1$ across the layer 914; FIG. 3G is a schematic diagram illustrating in top view the arrangement of FIG. 3F and with an input polariser that is the additional polariser 918; and FIG. 3H is a schematic diagram illustrating in top view the arrangement of FIG. 3F and with an output polariser that is the display polariser 910 that is the input polariser 210. Features of the embodiments of FIGS. 3F-H not discussed in further detail may be assumed to correspond to the features with equivalent reference numerals as discussed above, including any potential variations in the features.

FIGS. 3F-H illustrates the illumination by rays 460(909), 460(911) of a layer 914 of liquid crystal material wherein the rays comprise polarisation states 909, 911 respectively. Input wavefront 470 is arranged so that the polarisation states 909, 911 have the same nominal phase $\eta_0(909)$, $\eta_0(911)$ and so that the net phase shift $\Delta\eta$ after propagation through the layer 914 can be determined.

The polarisation states 909, 911 may alternatively describe orthogonal components of a single polarisation state, wherein orthogonal polarisation components are eigenstates of a polarisation state and can be used to determine the behaviour of the polarisation state passing through a birefringent layer.

An incident ray 460(909, $x_0$) with polarisation state 909 that is incident onto the layer 914 at location $x=x_0$ with the structure 965($x_0$) experiences the ordinary refractive index $n_o$ of the liquid crystal material 915. Incident ray 460(911, $x_0$) with polarisation state 911 that is incident onto the layer 914 at location $x=x_0$ with the structure 965($x_0$) also experiences the ordinary refractive index $n_o$ of the liquid crystal material 915; and the net phase shift $\Delta\eta(x_0)$ to orthogonal polarisation states 909, 911 of light transmitted through the layer 914 is zero.

By comparison at a location $x_1$ that is spatially separated from the location $x_0$ by the distance $\delta x$ in the lateral direction 195, incident ray 460(909, $x_1$) with polarisation state 909 that is incident onto the layer 914 at location $x=x_1$ with the structure 965($x_1$) experiences the extraordinary refractive index $n_e$ of the liquid crystal material 915 while incident ray 460(911, $x_1$) with polarisation state 911 that is incident onto the layer 914 at location $x=x_1$ with the structure 965($x_1$) experiences the ordinary refractive index $n_o$ of the liquid crystal material 915. The net phase shift $\Delta\eta(x_1)$ to orthogonal polarisation states 909, 911 of light transmitted through the layer 914 is thus non-zero. The net phase shift $\Delta\eta_r(\delta x)$ to orthogonal polarisation states 909, 911 (that may be orthogonal polarisation components of a polarisation state) of light transmitted through the layer 914 is thus $$\Delta\eta_r(\delta x) = \Delta\eta(x_1) - \Delta\eta(x_0) \qquad \text{eqn. 14}$$

and said net phase shift $\Delta\eta_r$ varies spatially.

In FIG. 3G the additional polariser 918 absorbs the ray 460(911) and the phase shift $\Delta\eta_r(\delta x)$ of the polarisation state 909 only is considered. For the ray 460(909, $x_0$) with polarisation state 909, a net phase shift is thus $$\Delta\eta_r(\delta x) = \Delta\eta(x_1) \qquad \text{eqn. 15}$$

which in the embodiment of FIGS. 3F-H with the same result as for eqn. 14.

By way of comparison with FIG. 3F, the display polariser 910 absorbs the ray 460(911) after transmission through the layer 914. The net phase shift is the same as for eqn. 14.

A wide-angle state is thus provided in which the layer 914 of liquid crystal material 915 has α structure 965 of orientations which causes the layer 914 of liquid crystal material 915 to introduce net phase shifts $\Delta\eta_r(x)$ to the light 460 having the predetermined polarisation state 909 that vary spatially across the area 103 of the layer 914 of liquid crystal material 915 and thereby cause the layer 914 of liquid crystal material 915 to provide a diffractive effect to the light 460 having the predetermined polarisation state 909.

As illustrated in FIGS. 3B-C such spatially varying net phase shifts $\Delta\eta_r(\delta x)$ provide an output wavefront 474 from across the area of the layer 914 with a wavefront net phase difference $\Gamma$ on exiting the material that is also spatially varied as $\Gamma(x)$. This spatial variation of net phase shift $\Delta\eta_r(x)$ and subsequently wavefront net phase difference $\Gamma(x)$ provides the diffracted wavefront 474 whereby the light output 464 may be alternatively considered as a series of plane waves propagating with differing luminance and angles.

The transmissive electrode arrangement 904 is thus patterned to be capable of driving the layer 914 of liquid crystal material 915 selectively into a structure 965 of orientations which causes the layer 914 of liquid crystal material 915 to introduce net phase shifts to the light having the predetermined polarisation state 909 that vary spatially across the area 103 of the layer 914 of liquid crystal material 915 and thereby cause the layer 914 of liquid crystal material 915 to provide a diffractive effect to the light having the predetermined polarisation state 909.

The separated electrodes 902A are arranged across the lateral direction 195 and in the wide-angle state the structure 965 of orientations of the layer 914 of liquid crystal material 915 cause net phase shifts that provide wavefront net phase difference $\Gamma(x)$ that vary spatially in one direction 195 across an area 103 of the layer 914 of liquid crystal material 915 and to cause the layer 914 of liquid crystal material 915 to provide a diffractive effect in the one direction 195. Referring to FIG. 2A, the control system 500 is arranged in a wide-angle state, to supply voltages to the transmissive electrode arrangement 904 that are selected to drive the liquid crystal material 915 into the structure 965 of orientations providing net phase shifts $\Delta\eta$ with resultant wavefront net phase difference Γ(x) that vary spatially across an area 103 of the layer 914 of liquid crystal material 915 and to cause the layer 914 of liquid crystal material 915 to provide a diffractive effect.

Another way of expressing the present embodiments is that at least one polar control retarder is arranged between the additional polariser 918 and the display polariser 910 wherein the at least one polar control retarder is the SDVA-CRA 900 (or the SDVACA 800 in embodiments hereinbelow). In the present description, a polar control retarder is a retarder that is arranged to provide a variation of transmission with viewing angle in at least one mode of operation when arranged between a pair of polarisers.

The at least one polar control retarder includes a switchable liquid crystal retarder comprising a layer 914 of liquid crystal material 915; and a transmissive electrode arrangement 904 arranged to drive the layer 914 of liquid crystal material 915. The transmissive electrode arrangement 904 is patterned to be capable of driving the layer 914 of liquid crystal material 915 into a structure 965 of orientations providing net phase shifts Δη(x) that vary spatially across an area 103 of the layer 914 of liquid crystal material 915 so that the layer 914 of liquid crystal material 915 provides a diffractive effect. The transmissive electrode arrangement 904 is also capable of driving the layer 914 of liquid crystal material 915 into a structure 965 of orientations providing uniform phase shifts η across the area 103 of the layer 914 of liquid crystal material 915 so that the layer 914 of liquid crystal material 915 provides no diffractive effect.

The operation of the display device 100 operating in narrow-angle state will now be described.

Figure 4A:
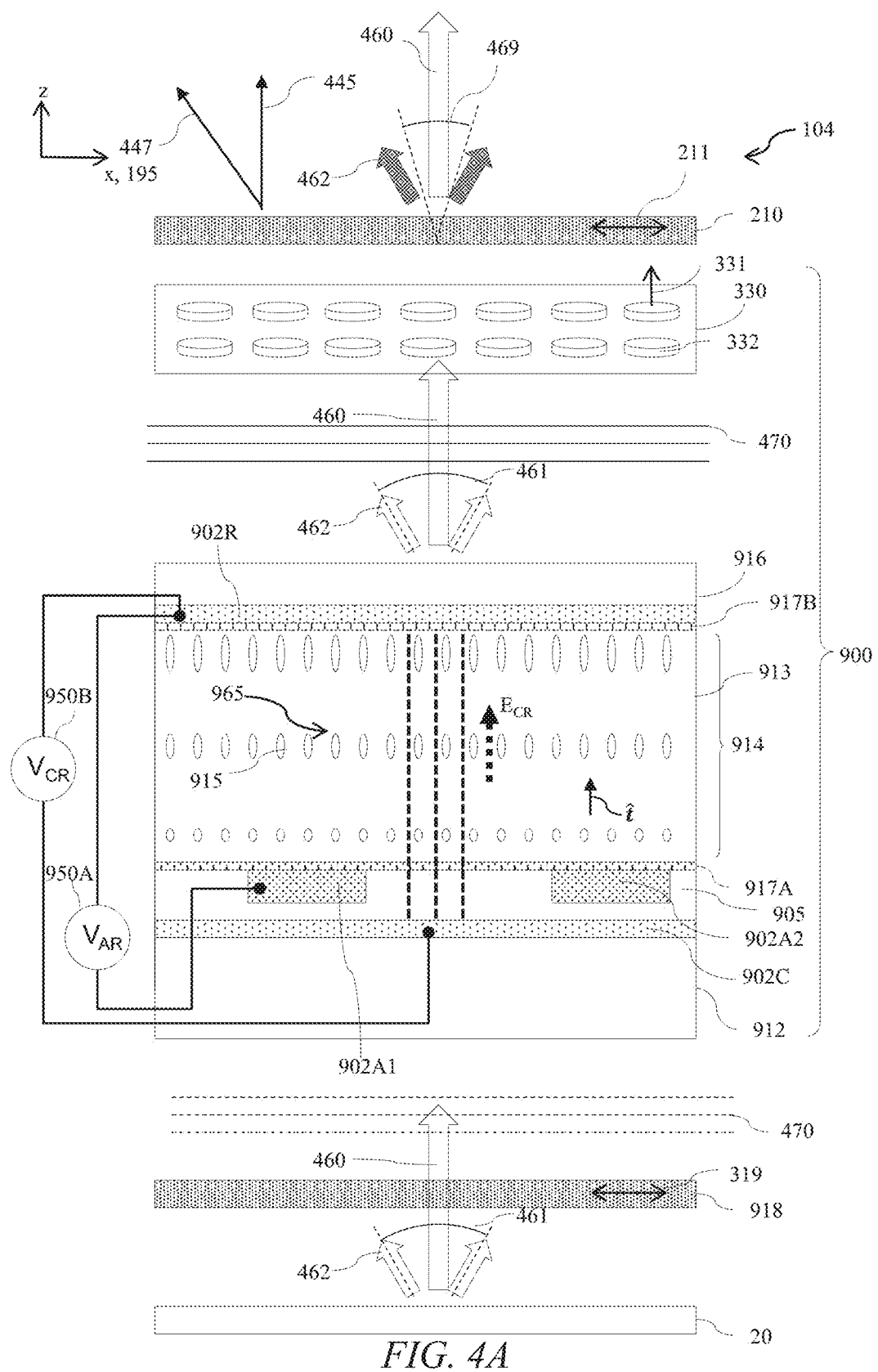
FIG. 4A is a schematic diagram illustrating in top view the structure and operation of the optical stack comprising a SDVACRA for narrow-angle state.
Figure 4B:
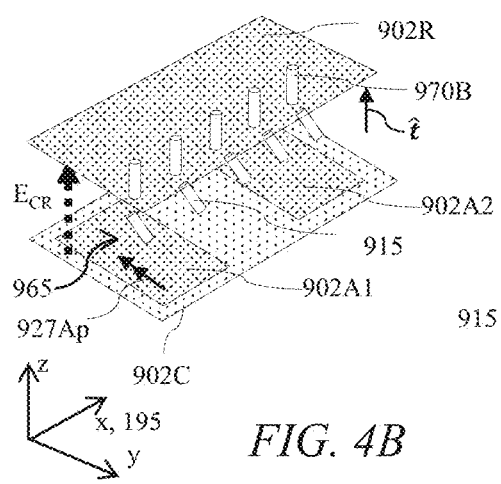
FIG. 4B is a schematic diagram illustrating in perspective front view an arrangement of electrodes, and structure of liquid crystal material orientations for a SDLCR in narrow-angle state.
Figure 4C:
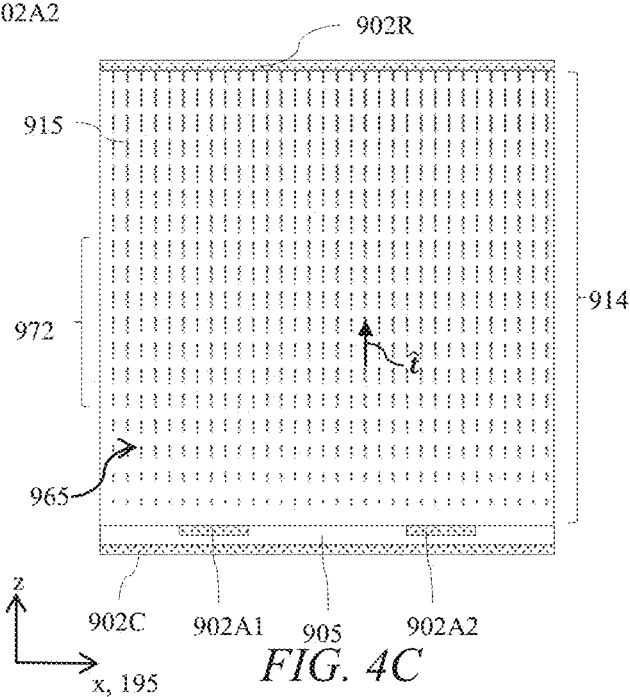
FIG. 4C is a schematic diagram illustrating in top view an arrangement of electrodes, and structure of liquid crystal material orientations for a SDLCR in narrow-angle state.

FIG. 4A is a schematic diagram illustrating in top view the structure and operation of the optical stack 104 comprising a SDVACRA 900 for narrow-angle state; FIG. 4B is a schematic diagram illustrating in perspective front view an arrangement 904 of electrodes 902A, 902C, 902R and structure 965 of liquid crystal material 915 orientations for a SDLCR 901 in narrow-angle state; and FIG. 4C is a schematic diagram illustrating in top view an arrangement 904 of electrodes 902A, 902C, 902R and structure 965 of liquid crystal material 915 orientations for a SDLCR 901 in narrow-angle state. Features of the embodiments of FIGS. 4A-C not discussed in further detail may be assumed to correspond to the features with equivalent reference numerals as discussed above, including any potential variations in the features.

The control system 500 is arranged: in a narrow-angle state as illustrated in FIG. 4A, to supply voltages to the transmissive electrode arrangement 904 that are selected to drive the layer 914 of liquid crystal material 915 into the-narrow-angle state; and in a wide-angle state as illustrated in FIG. 2A hereinabove, to supply voltages to the transmissive electrode arrangement 904 that are selected to drive the layer 914 of liquid crystal material 915 into the wide-angle state.

In the alternative embodiment of FIG. 4A, the control system 500 of FIG. 1A is arranged in a narrow-angle state, to supply voltages to the transmissive electrode arrangement 904 that are selected to drive the liquid crystal material 915 into a structure 965 of orientations providing net phase shifts with wavefront net phase difference Γ(x) that are uniform across an area 103 of the layer 914 of liquid crystal material 915.

Referring to TABLE 3, voltages $V_{CR}$ is applied to the separated electrodes 902A, and control electrode 902C with respect to the reference electrode 902R so that a uniform structure 965 of orientations of liquid crystal material 915 is provided across an area 103. In other words, the transmissive electrode arrangement 904 is capable of driving the layer 914 of liquid crystal material 915 selectively into a narrow-angle state (for example for use in privacy mode of operation) in which the layer 914 of liquid crystal material 915 has a structure 965 of orientations which causes the layer 914 of liquid crystal material 915 to introduce net phase shifts to light having a predetermined polarisation state 909 that are uniform across an area 103 of the layer 914 of liquid crystal material 915 and thereby cause the layer 914 of liquid crystal material 915 to provide no diffractive effect, that is the SDLCR 901 does not disperse light in the narrow-angle state.

Comparing the alternative embodiment of FIGS. 4B-C with FIGS. 2B-C hereinabove, the material 915 has substantially the same alignment across an area 103 of the layer 914.

The present embodiments achieve switching between (i) a wide-angle state with optical axis 977 of the liquid crystal material 915 with an alignment direction with a component along the direction 195; and (ii) a narrow-angle state with optical axis of the liquid crystal material 915 with an alignment direction perpendicular to the direction 195, for example provided by the surface alignment layer 917A direction 927Ap. In other words, switching may be provided by in-plane rotation of the liquid crystal material 915 by application of suitable drive voltages.

Further, the layer 914 of liquid crystal material 915 causes the SDVACRA 900 to introduce net relative phase shifts to orthogonal polarisation components of the light having the predetermined polarisation state 909 that differ along a viewing axis 445 and an inclined axis 447 that is inclined to the viewing axis 445 as will be described hereinbelow with respect to FIGS. 5D-E for example.

Figure 5A:
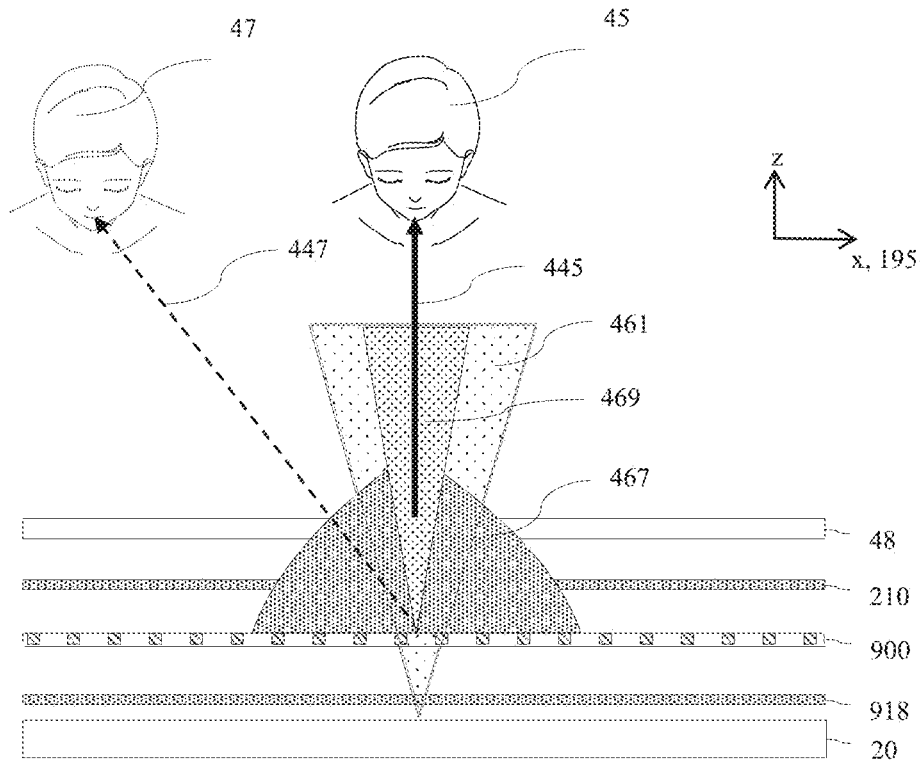
FIG. 5A is a schematic diagram illustrating in top view the structure and operation of the display device comprising a SDVACRA for wide-angle state.

FIG. 5A is a schematic diagram illustrating in top view the structure and operation of the display device 100 comprising a SDVACRA 900 for wide-angle state. Features of the embodiment of FIG. 5A not discussed in further detail may be assumed to correspond to the features with equivalent reference numerals as discussed above, including any potential variations in the features.

By way of comparison with FIG. 3A, the cone 461 is not diffused by diffraction of the SDLCR 901. Further, the layer 914 of liquid crystal material 915 provides luminance reduction in light cones 467 so that output cone 469 is reduced in size in comparison to the input light cone 461. Viewer 47 along inclined axis 447 sees reduced image luminance.

Such arrangements advantageously achieve high image security S at desirable non-viewing inclined axis 447 in privacy mode, while providing switching into a wide-angle state with high image visibility in said viewing axis 445 as illustrated in FIG. 3A.

The operation of the SDLCR 901 when driven uniformly across an area 103 will now be described.

Figure 5B:
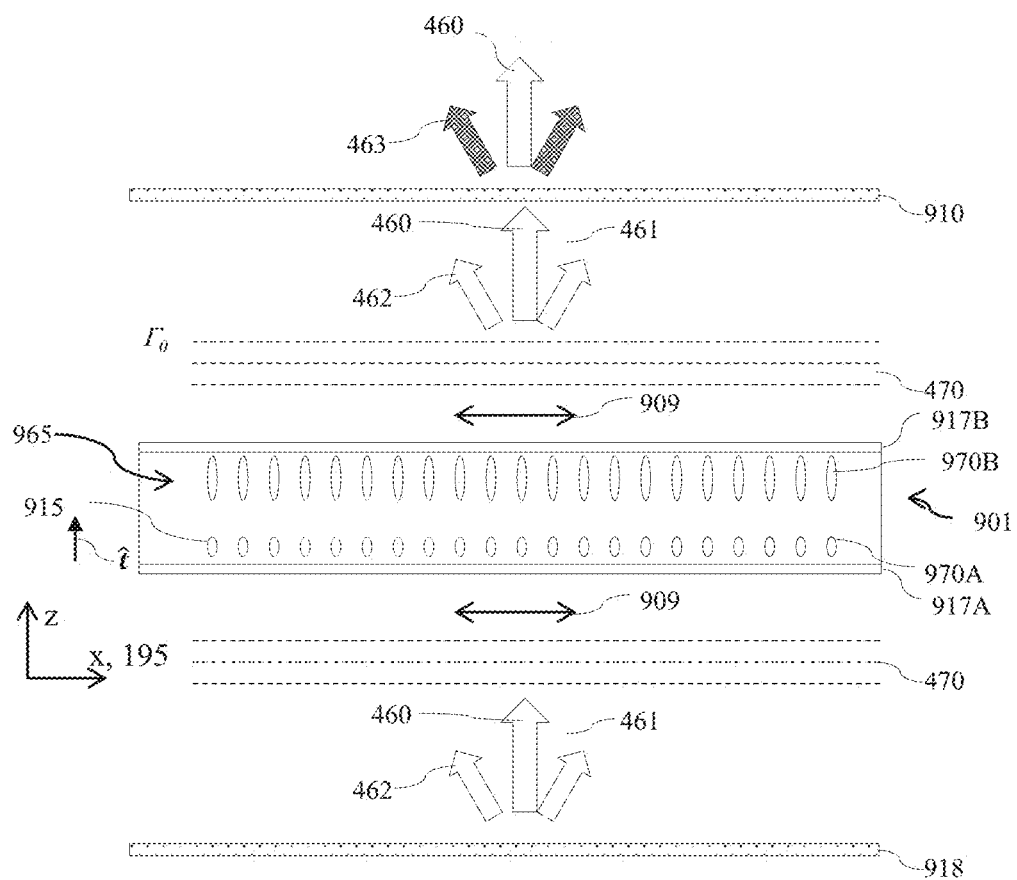
FIG. 5B is a schematic diagram illustrating in top view the propagation of the first linear polarisation state through the layer comprising a SDLCR arranged in narrow-angle state.
Figure 5C:
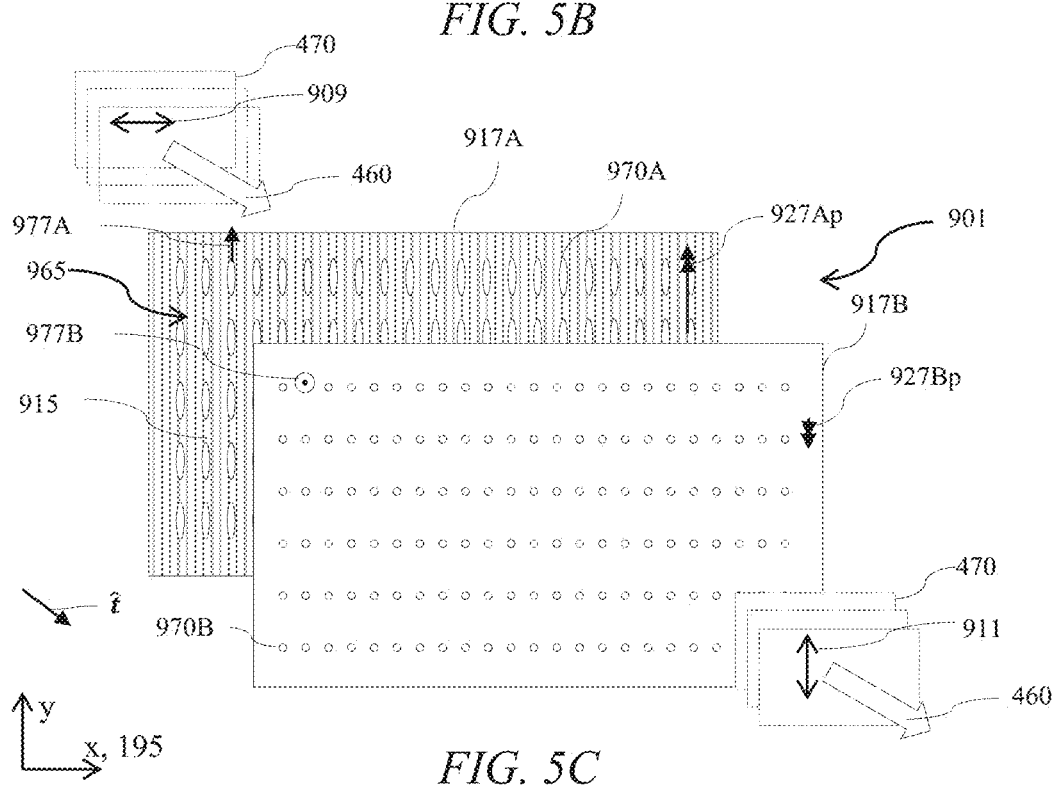
FIG. 5C is a schematic diagram illustrating in perspective front view the propagation of the first linear polarisation state through the layer comprising a SDLCR arranged in narrow-angle state.
Figure 5D:
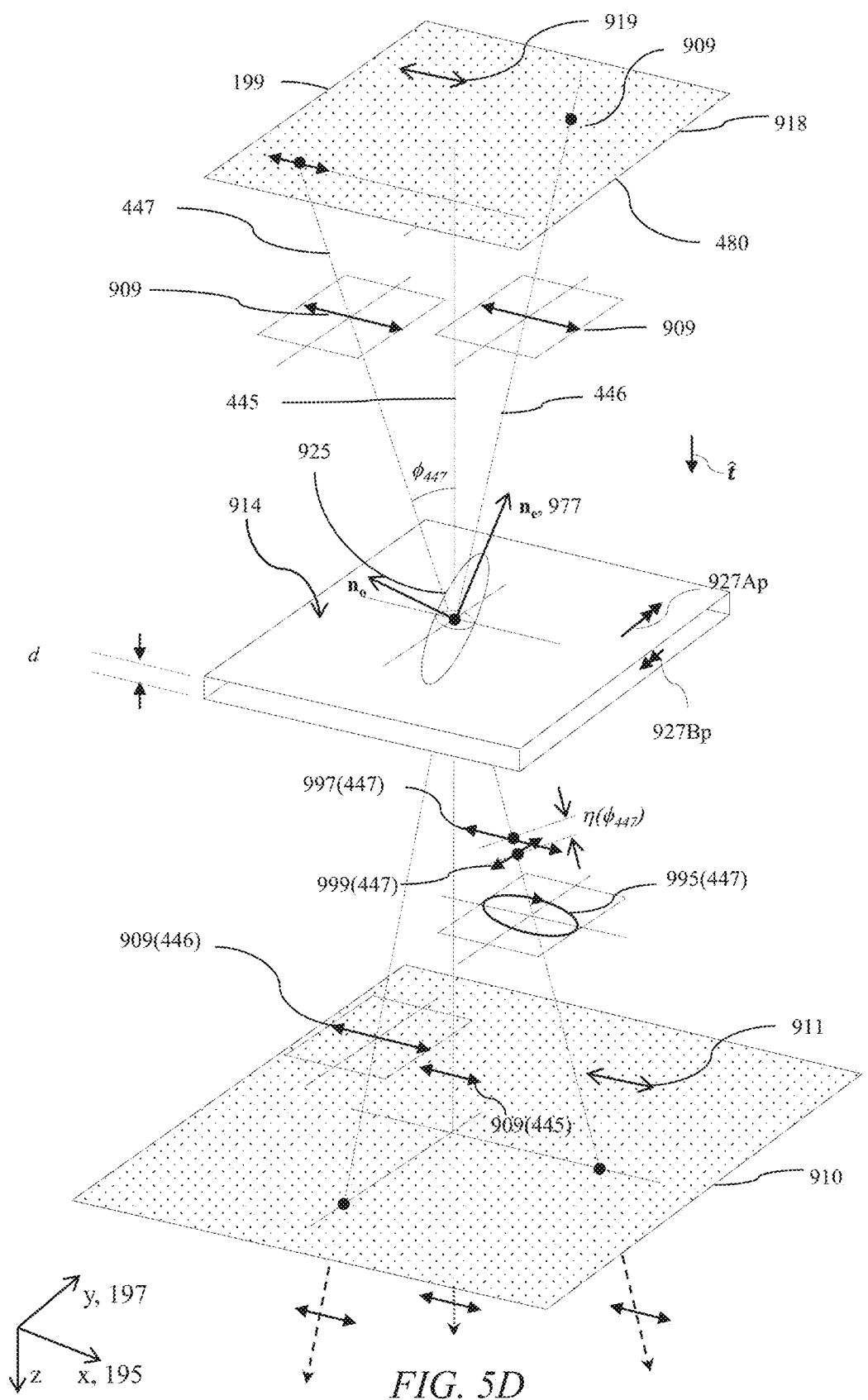
FIG. 5D is a schematic diagram illustrating in perspective side view the propagation of a first linear polarisation state through a layer comprising an inclined liquid crystal molecule for first and second different polar directions.

FIG. 5B is a schematic diagram illustrating in top view the propagation of the first linear polarisation state 909 through the layer 914 comprising a SDLCR 901 arranged in narrow-angle state; and FIG. 5C is a schematic diagram illustrating in perspective front view the propagation of the first linear polarisation state 909 through the layer 914 comprising a SDLCR 901 arranged in narrow-angle state. Features of the embodiment of FIGS. 5B-C not discussed in further detail may be assumed to correspond to the features with equivalent reference numerals as discussed above, including any potential variations in the features.

By way of comparison with FIGS. 3B-C, the alternative embodiments of FIGS. 5B-C illustrate that input plane waves 470 are substantially unmodified by the phase structure of the SDLCR 901 and a uniform output phase shift $\Gamma_0$ is obtained. Light rays 462 are output with reduced intensity as light rays 463 along inclined axis 447 whereas light rays 460 are output with substantially full luminance. Advantageously small cone 461 is provided for narrow-angle state operation.

Modification of transmission with polar angle by the SDLCR 901 when driven for a narrow-angle state will now be described.

FIG. 5D is a schematic diagram illustrating in perspective side view the propagation of a first linear polarisation state 909 through a layer 914 comprising an inclined liquid crystal molecule 925 for first and second different polar directions 447, 446. Features of the embodiment of FIG. 5D not discussed in further detail may be assumed to correspond to the features with equivalent reference numerals as discussed above, including any potential variations in the features.

FIG. 5D shows an illustrative single liquid crystal molecule 925 that is aligned with non-zero inclinations $\phi$(446), $\phi$(447), away from the normal direction 199 such as provided by the narrow-angle state voltage driving condition of FIG. 4A. In practice, the orientation $\phi$ of the molecule optical axes 977 vary through the layer 914 in the thickness direction $\hat{t}$ as described elsewhere herein.

Polarisation state 909 (445) along viewing axis 445 (propagating downwards and in FIG. 5D parallel to the normal direction 199) sees the ordinary refractive index of the molecule 915 and thus is unmodified through the layer 914.

Polarisation state 909 (446) along axis 446 inclined at an angle in the direction 197 also sees the ordinary refractive index of the molecule 915 and thus is unmodified through the layer 914.

Figure 8B:
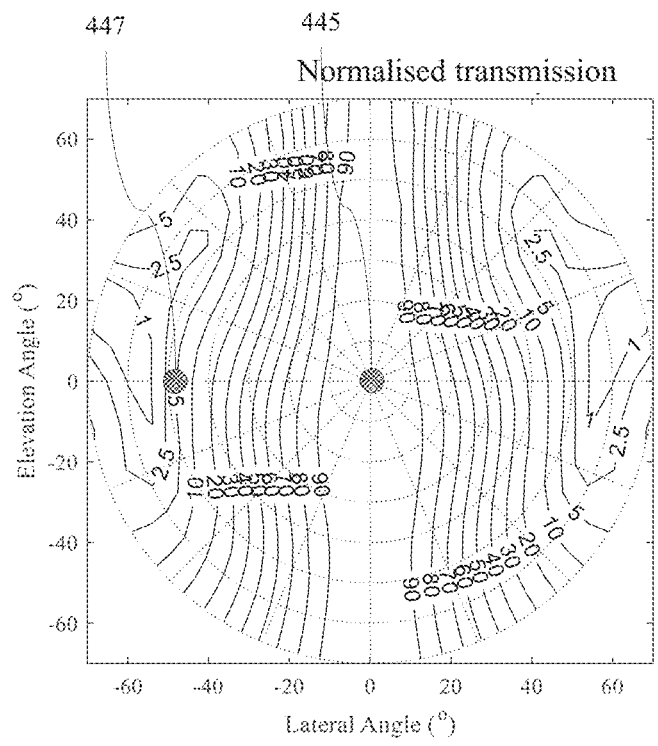
FIG. 8B is a schematic graph illustrating the polar variation of transmission for an illustrative SDVACRA of FIG. 1A and TABLE 2 operating in narrow-angle state.

By comparison, light ray 447 is incident on the molecule 925 such that the polarisation state 909(447) is resolved into eigenstates 997(447), 999(447) that see both components ne, no of the birefringence of the molecule 925. A phase shift $\eta(\phi_{447})$ at the angle $\phi_{447}$ between the polarisation eigenstates 997(447), 999(447) provides a resultant elliptical polarisation state 995(447) that is different to the input state 909 (447). Component 999(447) is absorbed at the display polariser 910 and the off-axis luminance reduced along the axis 447. The transmission of the layer 914 arranged between parallel polarisers thus varies with angle $\phi$. Such an arrangement provides a transmission profile for example as illustrated in FIG. 8B hereinbelow.

In the present disclosure, the spatially varying phase shift with wavefront net phase difference $\Gamma(x)$ of the diffractive structure 965 of FIG. 3B hereinabove is thus different to the phase shift $\eta$ that provides the angular polarisation modification of FIG. 5B with non-diffractive structure 965.

Returning to the description of FIGS. 3B-C, the structure 965 of orientations of liquid crystal material 915 providing wavefront net phase difference $\Gamma(x)$ that vary across an area 103 of the layer 914 of liquid crystal material 915 are further desirably arranged to cause the SDVACRA 900 to introduce no net relative phase shift $\eta(\phi_{445})$ to orthogonal polarisation components 997(445), 999(445) of light passed by the additional polariser 918 along a viewing axis 445; and are arranged to desirably to cause the SDVACRA 900 to introduce no net relative phase shift $\eta(\phi_{447})$ to orthogonal polarisation components 997(447), 999(447) of light passed by the additional polariser 918 along an inclined axis 447 inclined to the viewing axis 445. A wide-angle state may be provided.

Returning to the description of FIGS. 5B-C, the structure 965 of orientations of liquid crystal material 915 providing wavefront net phase difference $\Gamma_0$ that are uniform across an area 103 of the layer 914 of liquid crystal material 915 are further desirably arranged to cause the SDVACRA 900 to introduce no net relative phase shift $\eta(\phi_{445})$ to orthogonal polarisation components 997(445), 999(445) of light passed by the additional polariser 918 along a viewing axis 445; and are arranged to desirably to cause the SDVACRA 900 to introduce a net relative phase shift $\eta(\phi_{447})$ to orthogonal polarisation components 997(447), 999(447) of light passed by the additional polariser 918 along an inclined axis 447 inclined to the viewing axis 445. A narrow-angle state may be provided.

Returning to the graph of FIG. 2F, in practice, in embodiments where the optical axis of a birefringent material varies spatially, both diffractive wavefront net phase differences $\Gamma(x)$ and net relative phase shift $\eta(\phi_{447})$ may be present that provides polarisation mixing between orthogonal polarisation states 995, 997. It may be desirable to provide a drive voltage to minimise the polarisation net relative phase shift $\eta(\phi_{447})$ to provide increased efficiency at wide angle. To reduce polarisation mixing, the structure 965 of liquid crystal material 915 orientations in the diffractive state are provided with optical axis directions 977 to lie oriented in the lateral direction 195 (x-axis) making their projected optic axes parallel or perpendicular through the layer 914 of liquid crystal material 915 to the horizontally or vertically polarized 909, 911 plane waves 470 travelling in the horizontal plane. Advantageously light loss is reduced. The alignment conditions when driven provide luminance modification that is small, for example greater than 60% transmission efficiency and preferably greater than 80% transmission efficiency in comparison to a condition in which the optical axis direction 977 is uniformly aligned parallel or orthogonal to the incident polarisation state 909.

Figure 5E:
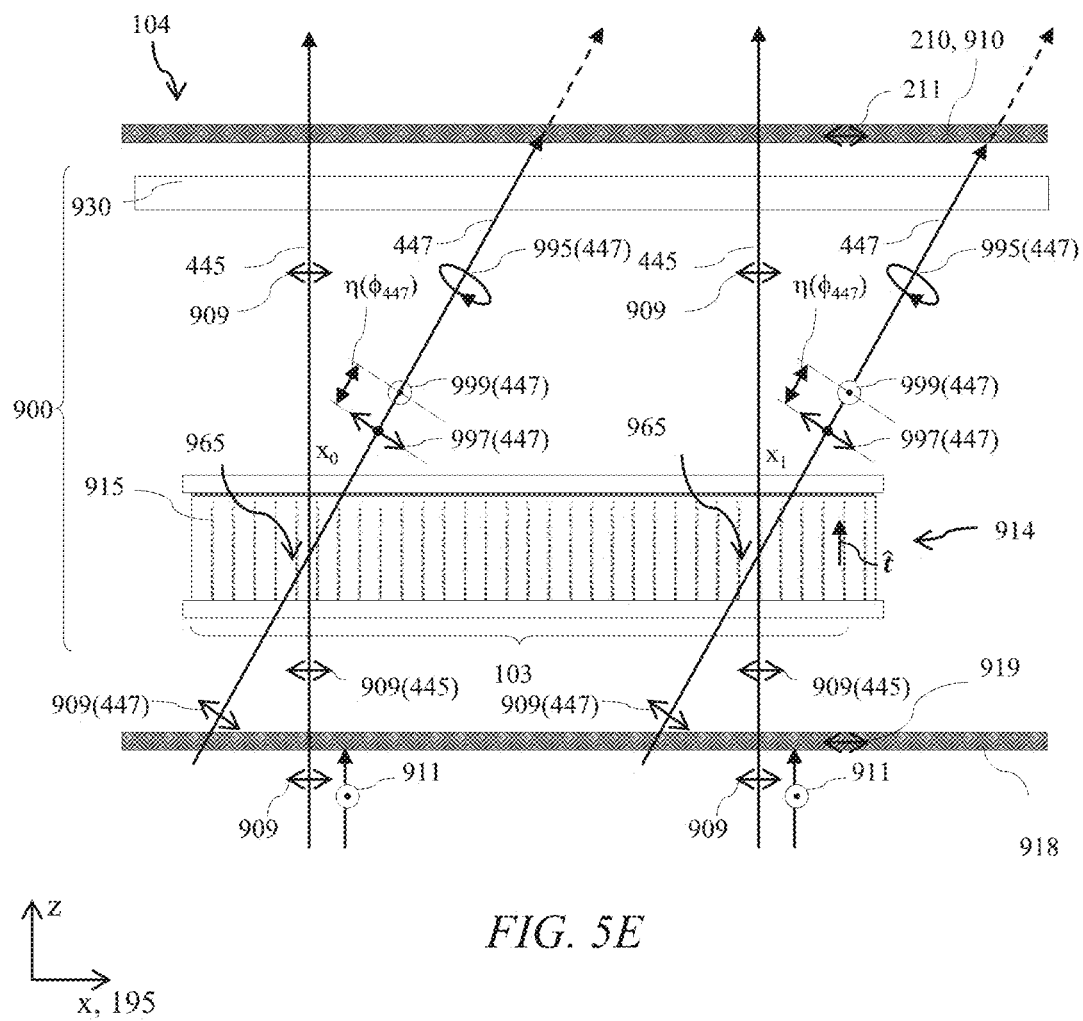
FIG. 5E is a schematic diagram illustrating in top view the propagation through the layer of a SDLCR arranged in narrow-angle state for rays along the viewing axis and inclined axis for two different positions $x_0$, $x_1$ across the area of the layer of liquid crystal material.

FIG. 5E is a schematic diagram illustrating in top view the propagation through the layer 914 of a SDLCR 901 arranged in narrow-angle state for light rays along the viewing axis 445 and inclined axis 447 for two different positions $x_0$, $x_1$ across the area 103 of the layer 914 of liquid crystal material 915. Features of the embodiment of FIGURE 5E not discussed in further detail may be assumed to correspond to the features with equivalent reference numerals as discussed above, including any potential variations in the features.

By way of comparison with FIGS. 3F-H, FIG. 5E illustrates the narrow-angle state of the layer 914 of liquid crystal material 915.

The layer 914 of liquid crystal material 915 has a structure 965 of orientations which: causes the layer 914 of liquid crystal material 915 to introduce net phase shifts $\eta$(445), $\eta$(447) to light having a predetermined polarisation state 909 that are uniform across an area 103 of the layer 914 of liquid crystal material 915 and thereby cause the layer 914 of liquid crystal material 915 to provide no diffractive effect to the light rays along axes 445, 447 having the predetermined polarisation state 909. Thus the operation of the layer 914 is uniform across the area 103 in the plane of the layer 914 and the behaviour at location $x_0$ is the same as the behaviour at location $x_1$.

Further, the layer 914 of liquid crystal material 915 has a structure 965 of orientations which causes the SDVACRA 900 to introduce net relative phase shifts $\eta(\phi 445)$, $\eta(\phi 447)$ to orthogonal polarisation components 997, 999 of the light having the predetermined polarisation state 909 that differ along a viewing axis 445 and an inclined axis 447 that is inclined to the viewing axis 445. Along the viewing axis 445, the net relative phase shift η(φ445) may be zero and the polarisation state 909 is preserved. By comparison along the inclined axis the net relative phase shift η(φ447) is non-zero and the polarisation state 909 is converted to an elliptical polarisation state 995(447) due to the net relative phase shift η(φ447) of the polarisation components 997(447), 999(447).

Reduced transmission of the SDVACRA 900 may be provided along the inclined direction 447 and scatter arising from diffraction in the layer 914 is minimised so that improved security factor, S achieved in privacy mode of operation.

An alternative drive arrangement will now be described.

Figure 5F:
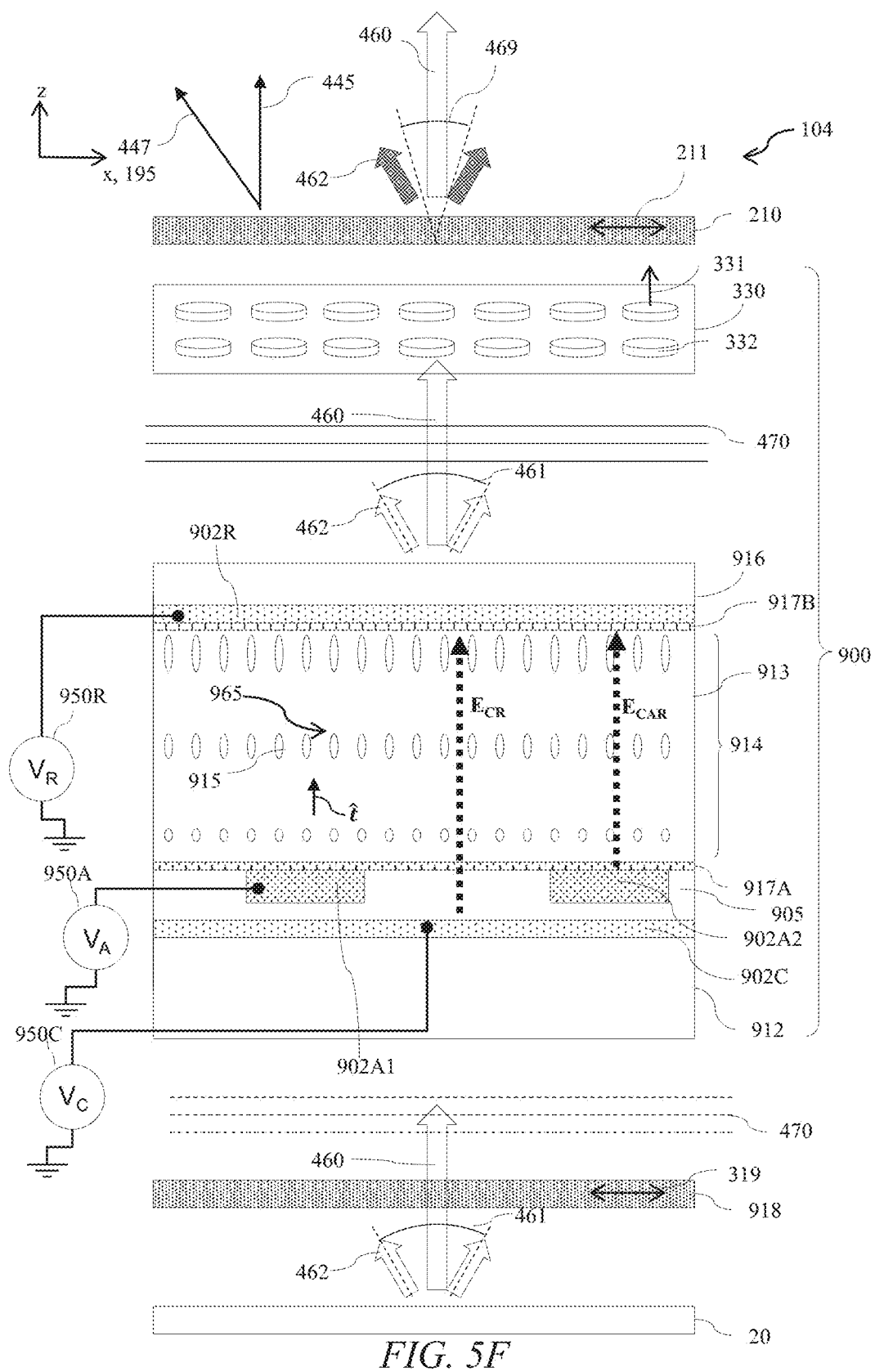
FIG. 5F is a schematic diagram illustrating in top view the structure and operation of the optical stack comprising a SDVACRA for narrow-angle state with an alternative driver arrangement to that illustrated in FIG. 4A.

FIG. 5F is a schematic diagram illustrating in top view the structure and operation of the optical stack 104 comprising a SDVACRA 900 for narrow-angle state with an alternative driver arrangement to that illustrated in FIG. 4A. Features of the embodiment of FIG. 5F not discussed in further detail may be assumed to correspond to the features with equivalent reference numerals as discussed above, including any potential variations in the features.

By way of comparison with FIG. 4A, the embodiment of FIG. 5F illustrates an alternative drive arrangement comprising ground referenced drivers 950R, 950A, 950C for electrodes 902R, 902A, 902C respectively. When in the narrow-angle state (for example operating in the privacy mode) it is desired to have the retardance across the liquid crystal 914 uniform in the lateral direction 195 and to minimize any angular spread of the on-axis light rays 460, to minimise the diffraction from the liquid crystal 914. This can be achieved by setting the voltages $V_A$ and $V_C$ on the electrodes 902A1 and 902C to the same potential with respect to the reference electrode 902R. Electrode 902A2 is set to the same potential as 902A1 in this state. The voltages $V_A$ and $V_C$ are generally alternating voltages, for example square waves. The reference electrode 902R voltage $V_R$ may be set at ground potential.

Alternatively the voltages may be level-shifted with respect to ground potential. Alternatively the voltage $V_R$ may be an alternating voltage and the voltages $V_A$ and $V_C$ adjusted accordingly. Advantageously the voltage at the electrodes 902C or 902R may have a smaller excursion and produce less interference to an adjacent touch panel function.

It may be desirable to improve the operation of the display device 100 operating in the narrow-angle state. When operating in the narrow-angle state as described above, with $V_A$ equal to $V_C$, the regions of the liquid crystal 914 above the electrode 902A1 and above the gap between electrodes 902A1 and 902A2 will experience slightly different electric fields because of the capacitive divider effect of the dielectric layer 905 in series with the capacitance of the liquid crystal layer 914 in the gaps between electrodes 902A1 and 902A2. Typically, the capacitance of the dielectric layer 905 is much larger than the capacitance of the liquid crystal layer 914 and so the majority of the voltage provided in the gaps by potential $V_C$ on electrode 902C is dropped across the liquid crystal later 914. However to achieve improved matching of the electric field $E_{CAR}$ seen by the liquid crystal layer 914 above electrode 902A1 and the electric field $E_{CR}$ above the gap between the electrodes 902A1 and 902A2, the potential $V_C$ may be increased slightly (for example in the illustrative embodiment of TABLE 4A by 100 mV in the narrow-angle state) to compensate for said capacitive divider effect. This may be adjusted for the specific material-relative permittivity and thickness of the dielectric layer 905 and the layer 914 thickness and dielectric constants of the liquid crystal material 915.

Figure 6A:
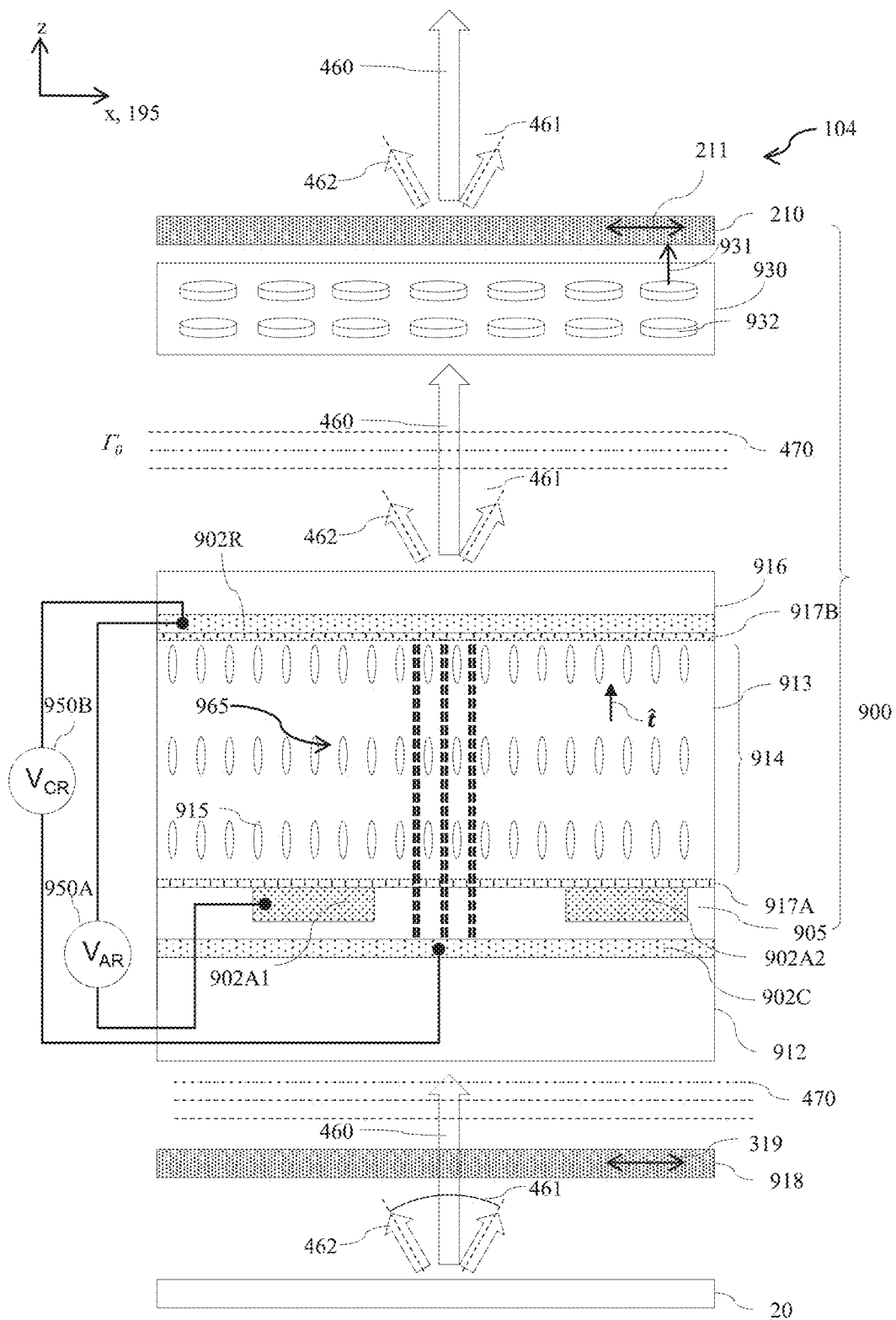
FIG. 6A is a schematic diagram illustrating in top view the structure and operation of the optical stack comprising a SDVACRA for an intermediate state of operation.

The voltages may be arranged as illustrated in FIG. 5F as an alternative to those illustrated in FIG. 2A, FIG. 4A and FIG. 6A.

When arranged in the wide-angle state, the magnitude of voltage $V_C$ similarly may be adjusted compared to magnitude of $V_A$ to compensate for the capacitive divider effect and the voltages $V_A$, $V_C$ are in anti-phase. The change in the voltage offset is adjusted depending on the material parameters as described above.

Illustrative potentials for the operating modes are shown in TABLE 4A. Alternative voltages may be selected wherein the electrodes 902R, 902C, 902A1, 902A2 are at different potentials, for example as illustrated in TABLE 4B where $V_A$ is at ground. Adjusting the potential on the $V_C$ electrode 902C to be slightly larger than that of the $V_A$ electrode 902A1, 902A2 improves the uniformity of the electric field $E_{914}$ across the layer 914 liquid crystal material 915 in the lateral direction 195. Residual diffraction is reduced and advantageously the performance in the narrow-angle state is further improved.

TABLE 4A

| Item | Wide-angle state | Narrow-angle state | Intermediate state |
| --- | --- | --- | --- |
| $V_R$ | 0 V | 0 V | 0 V |
| $V_C$ | −11 V | +1.5 V | 0 V |
| $V_A$ | +10 V | +1.4 V | 0 V |

TABLE 4B

| Item | Wide-angle state | Narrow-angle state | Intermediate state |
| --- | --- | --- | --- |
| $V_R$ | +5.5 V | +1.4 V | 0 V |
| $V_C$ | +11.5 V | −0.14 V | 0 V |
| $V_A$ | 0 V | 0 V | 0 V |

It may be desirable to provide operation of the display device 100 operating in an intermediate state.

Figure 6B:
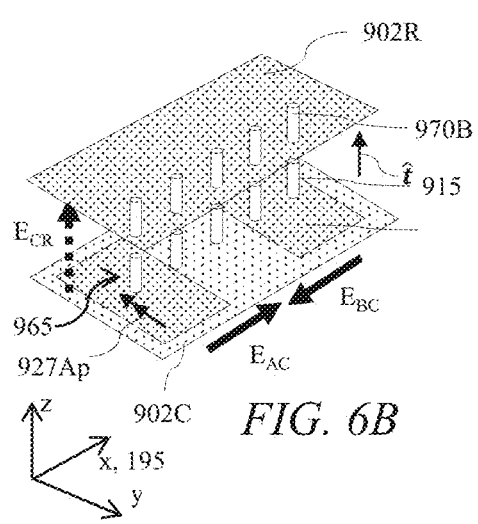
FIG. 6B is a schematic diagram illustrating in perspective front view arrangement of electrodes and structure of liquid crystal material orientations for a SDLCR in the intermediate state.
Figure 6C:
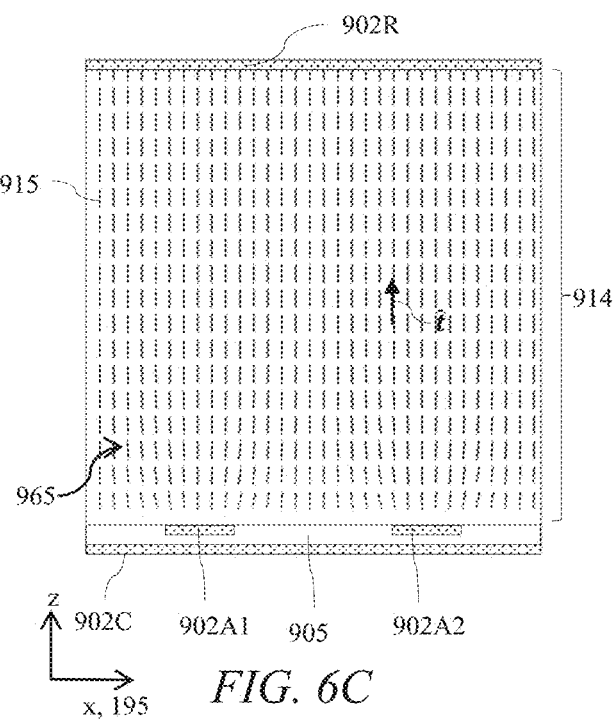
FIG. 6C is a schematic diagram illustrating in top view arrangement of electrodes and structure of liquid crystal material orientations for a SDLCR in the intermediate state.
Figure 6D:
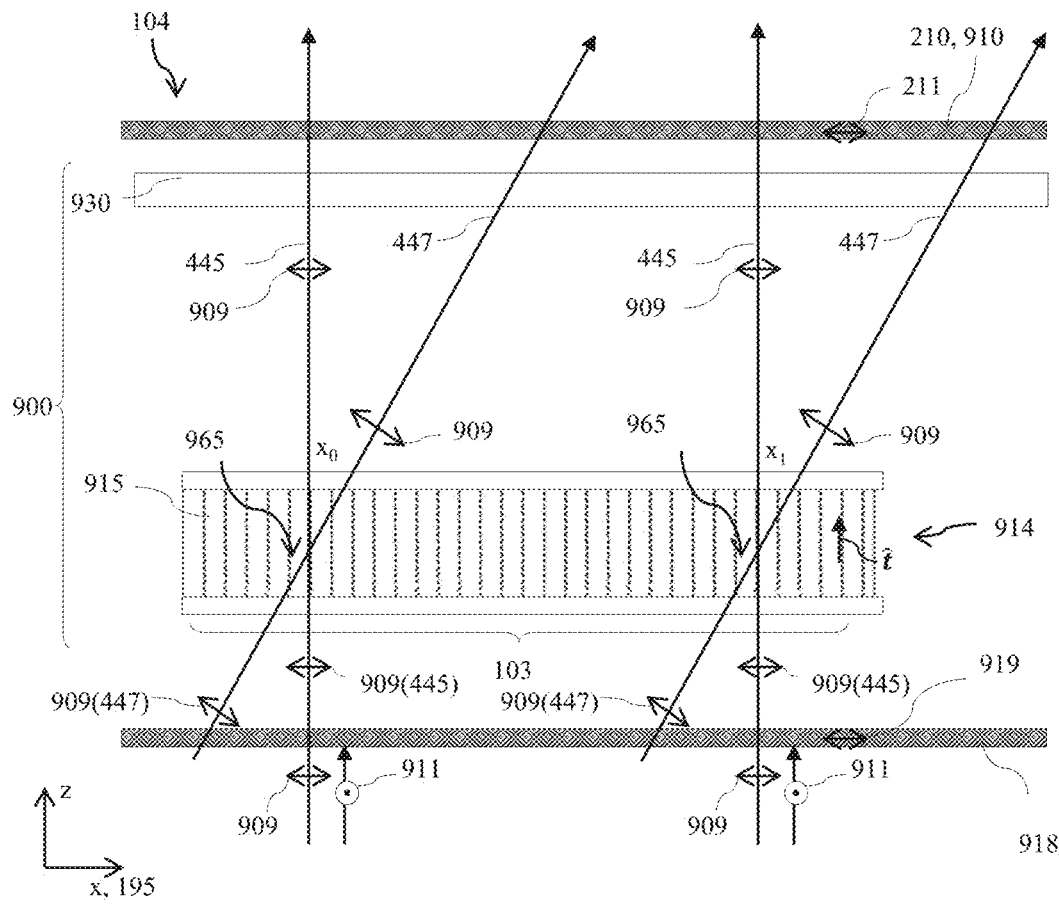
FIG. 6D is a schematic diagram illustrating in top view the propagation through the layer of a SDLCR arranged in intermediate state for rays along the viewing axis and inclined axis for two different positions $x_0$, $x_1$ across the area of the layer of liquid crystal material.

FIG. 6A is a schematic diagram illustrating in top view the structure and operation of the optical stack 104 comprising a SDVACRA 900 for an intermediate state of operation; FIG. 6B is a schematic diagram illustrating in perspective front view arrangement 904 of electrodes 902A, 902C, 902R and structure 965 of liquid crystal material 915 orientations for a SDLCR 901 in the intermediate state; FIG. 6C is a schematic diagram illustrating in top view arrangement 904 of electrodes 902A, 902C, 902R and structure 965 of liquid crystal material 915 orientations for a SDLCR 901 in the intermediate state; and FIG. 6D is a schematic diagram illustrating in top view the propagation through the layer 914 of a SDVACRA 900 arranged in intermediate state for rays along the viewing axis 445 and inclined axis 447 for two different positions $x_0$, $x_1$ across the area 103 of the layer 914 of liquid crystal material 915. Features of the embodiment of FIGS. 6A-D not discussed in further detail may be assumed to correspond to the features with equivalent reference numerals as discussed above, including any potential variations in the features.

By way of comparison with FIG. 2A, in the alternative embodiment of FIG. 6A, the layer 914 of liquid crystal material 915 is driven to provide substantially uniform vertically oriented structure 965 of liquid crystal material 915.

The alternative embodiment of FIGS. 6A-D illustrates that the transmissive electrode arrangement 904 is patterned to be capable of driving the layer 914 of liquid crystal material 915 selectively into an intermediate state in which the layer 914 of liquid crystal material 915 has a structure 965 of orientations which: causes the layer 914 of liquid crystal material 915 to introduce net phase shifts η to the light having the predetermined polarisation state 909 that are uniform across the area 103 of the layer 914 of liquid crystal material 915 and thereby cause the layer 914 of liquid crystal material 915 to provide no diffractive effect to the light having the predetermined polarisation state 909; and cause the SDVACRA 900 to introduce net relative phase shifts η(φ445), η(φ447) to the orthogonal polarisation components of the light having the predetermined polarisation state that are the same along the viewing axis 445 and the inclined axis 447.

By way of comparison with FIGS. 2A-C, low levels of diffraction are provided and the luminance of the on-axis light rays 460 is thus increased. By way of comparison to FIGS. 4A-C, the material 915 has a structure 965 that is vertically oriented. Such increase provides reduction of the depolarisation as illustrated by ray 447 of FIG. 5D, providing higher luminance for off-axis directions as illustrated in FIG. 6D. Advantageously light losses are reduced and higher efficiency is achieved.

The operation of the passive compensation retarder 930 will now be further described.

Figure 6E:
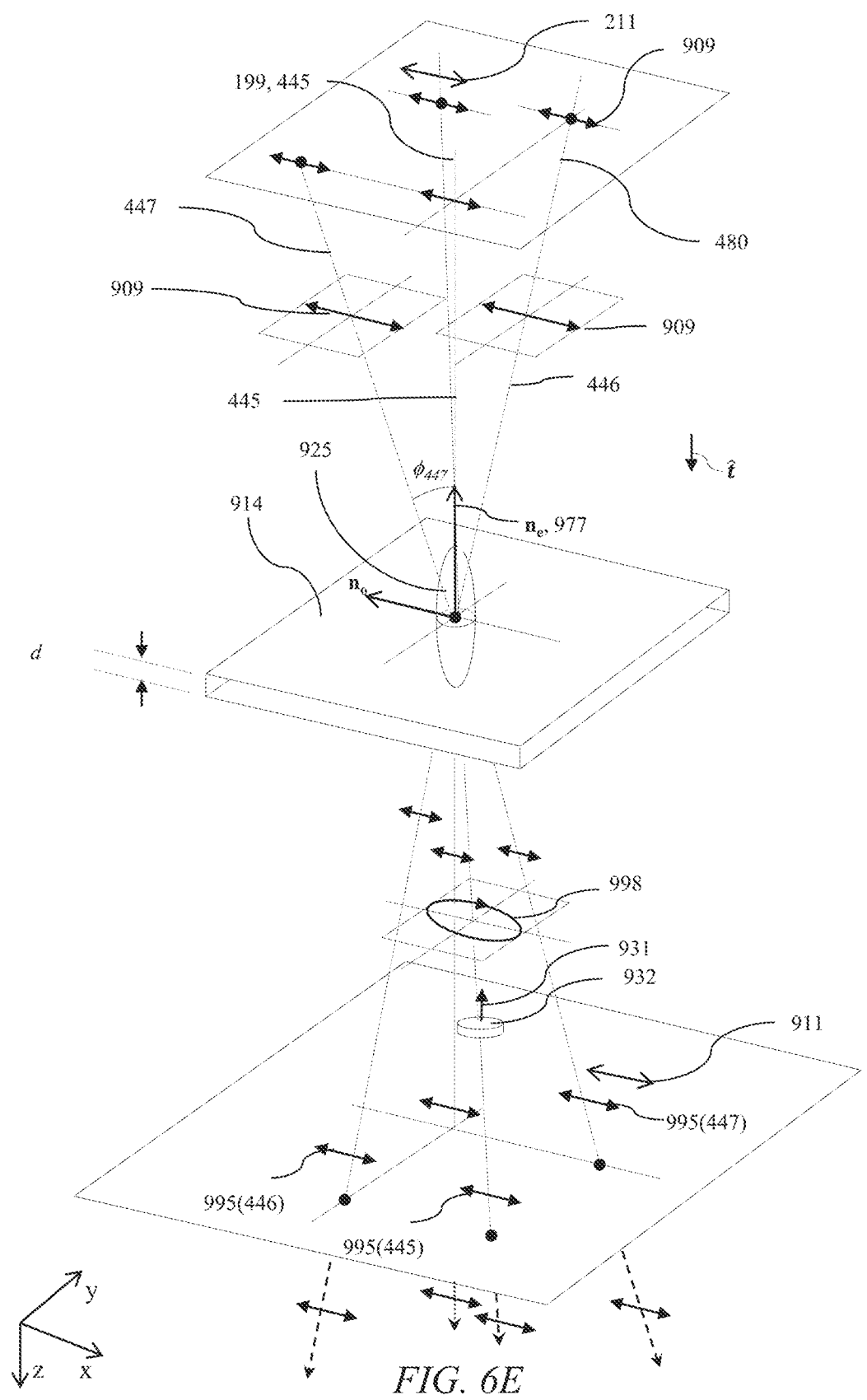
FIG. 6E is a schematic diagram illustrating in side perspective view the propagation of a first linear polarisation state through a layer comprising a vertically aligned liquid crystal molecule and passive compensation retarder.

FIG. 6E is a schematic diagram illustrating in side perspective view the propagation of a first linear polarisation state through a layer comprising a vertically aligned liquid crystal molecule and passive compensation retarder. Features of the embodiment of FIG. 6E not discussed in further detail may be assumed to correspond to the features with equivalent reference numerals as discussed above, including any potential variations in the features.

By way of comparison with FIG. 5D, the alternative embodiment of FIG. 6E illustrates that the molecule 925 is vertically oriented, and non-zero phase difference η(447) is provided. Passive compensation retarder 930 may be provided by a negative C-plate between the additional polariser 918 and display polariser 910. Such negative C-plate provides a negative phase difference η'(447) for the components 997(447), 999(447) that compensates for the positive phase difference η(447) such that the resultant net relative phase shift that provides the output polarisation state 995(447) is minimised and the output polarisation state from the SDVACRA 900 (comprising the SDLCR 901 and the passive compensation retarder 930) is substantially aligned with the electric vector transmission direction 911 of the display polariser 910. Advantageously high transmission is provided.

Figure 6F:
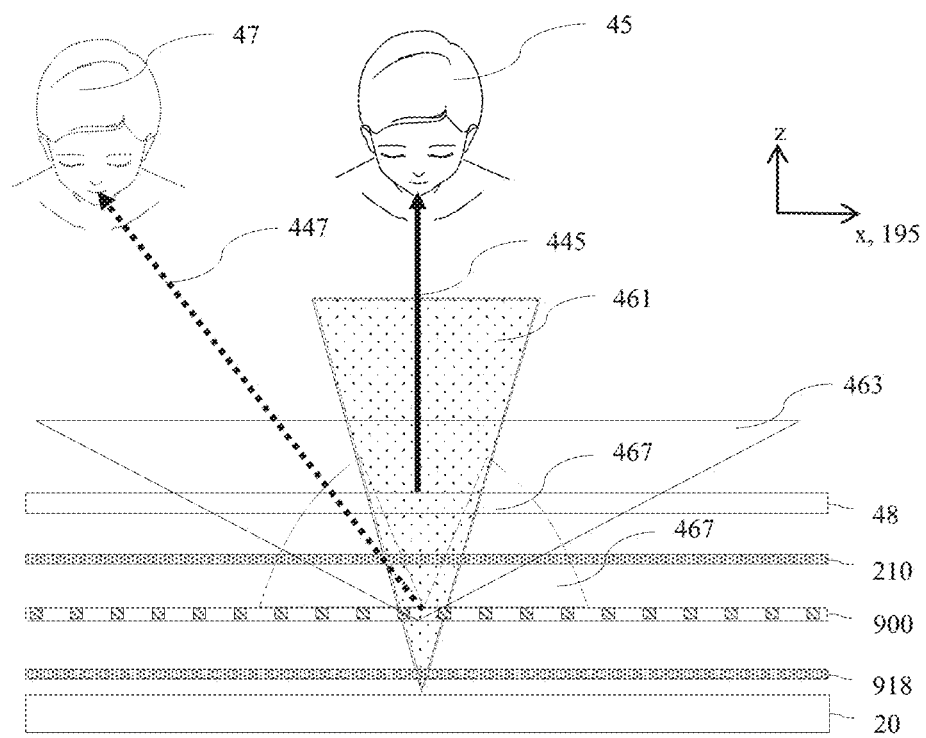
FIG. 6F is a schematic diagram illustrating in top view the structure and operation of an alternative optical stack comprising a SDVACRA in the intermediate state.

FIG. 6F is a schematic diagram illustrating in top view the structure and operation of an alternative optical stack 104 comprising a SDVACRA 900 in the intermediate state. Features of the embodiment of FIG. 6F not discussed in further detail may be assumed to correspond to the features with equivalent reference numerals as discussed above, including any potential variations in the features.

By way of comparison with FIG. 5A, in the alternative embodiment of FIG. 6F, light cone angle 461 output is maintained to be the same as provided by the backlight 20. Advantageously the viewing freedom of the display is increased. Off-axis viewer 447 sees light from the display device 100 with improved image visibility in comparison to the narrow-angle state.

The intermediate state achieves increased luminance in the viewing axis 445 in comparison to the wide-angle state as light is not diffracted to higher viewing angles. Further the intermediate state achieves increased image visibility to users along inclined axis 447. Power consumption may be reduced to provide an intermediate state. The efficiency of operation of the display device 100 for the image supplied to the user 45 along the viewing axis 445 is determined by transmission of layers such as electrode layers, polarisers and other light absorbing layers.

Electrical drive schemes will now be described.

Figure 7A:
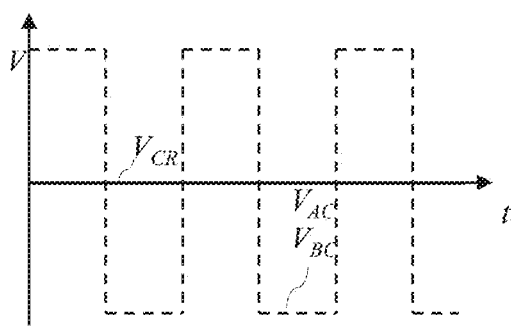
FIG. 7A is a schematic graph illustrating drive waveforms of the SDLCR of the optical stack of FIG. 2A for wide-angle state.

FIG. 7A is a schematic graph illustrating drive waveforms of the SDLCR 901 of the optical stack 104 of FIG. 2A for wide-angle state; FIG. 7B is a schematic graph illustrating alternative drive waveforms of the SDLCR 901 of the optical stack 104 of FIG. 4A for narrow-angle state; and FIG. 7C is a schematic graph illustrating drive waveforms of the SDLCR 901 of the optical stack 104 of FIG. 6A for an intermediate state. Features of the embodiments of FIGS. 7A-C not discussed in further detail may be assumed to correspond to the features with equivalent reference numerals as discussed above, including any potential variations in the features.

Figure 7B:
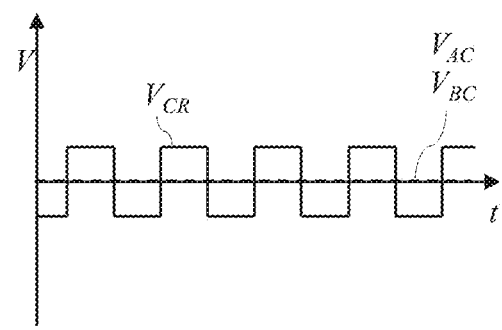
FIG. 7B is a schematic graph illustrating alternative drive waveforms of the SDLCR of the optical stack of FIG. 4A for narrow-angle state.
Figure 7C:
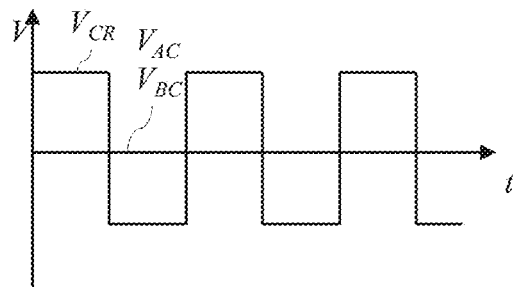
FIG. 7C is a schematic graph illustrating drive waveforms of the SDLCR of the optical stack of FIG. 6A for an intermediate state.

Control system 500 is arranged to control which of the waveforms of FIGS. 7A-C are provided to voltage drivers 950 to provide wide-angle state, privacy mode or intermediate states of operation. The alternating profiles provide DC balancing, achieving increased device lifetime. Non-square voltage profiles may be provided to achieve desirable addressing levels for the layer 914 of liquid crystal material 915.

Illustrative polar variations of luminance and transmission will now be described.

FIG. 8A is a schematic graph illustrating the polar variation of luminance output for an illustrative backlight 20 of FIG. 1A. Features of the embodiment of FIG. 8A not discussed in further detail may be assumed to correspond to the features with equivalent reference numerals as discussed above, including any potential variations in the features.

In the current disclosure, the polar angle is described using a coordinate convention having an elevation coordinate angle and a lateral coordinate angle. In an alternative coordinate convention, the polar angle may have a polar coordinate angle (which is different to the polar angle referred to herein) which is the angle of inclination from the normal direction to a plane, and the azimuthal coordinate angle which is the rotation angle in the said plane from a reference direction in said plane. In the present embodiments, the nominal polar angle for an on-axis viewer 45 is marked by axis 445 polar angle location and the nominal polar angle for an illustrative off-axis viewer 47 with zero elevation angle is marked by axis 447 polar angle location.

The backlight 20 provides a luminance at polar angles to the normal 199 to the SLM 48 greater than 45 degrees that is at most 30% of the luminance along the normal 199 to the SLM 48, preferably at most 20% of the luminance along the normal 199 to the SLM 48, and most preferably at most 10% of the luminance along the normal 199 to the SLM 48. In the illustrative example of FIG. 8A, less than 2.5% of peak luminance is provided at inclined axis 447.

Illustrative operation in narrow-angle state will now be described.

Figure 8C:
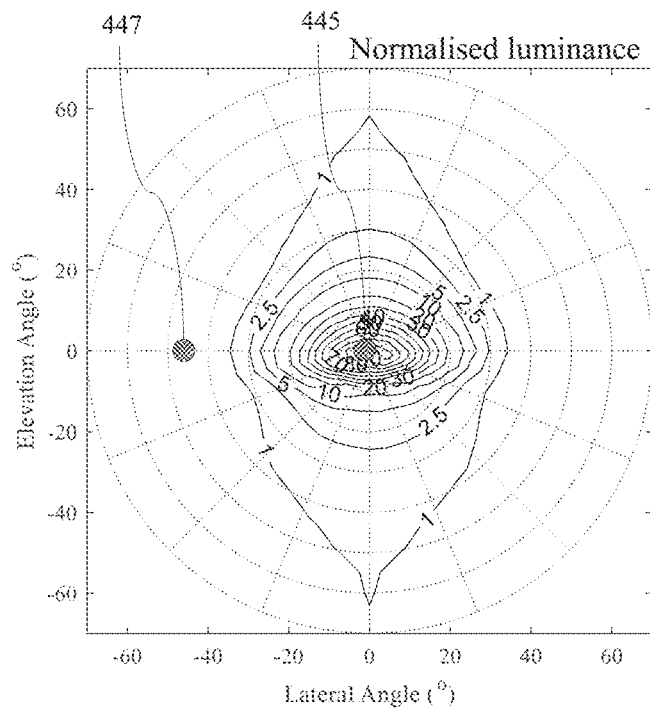
FIG. 8C is a schematic graph illustrating the polar variation of luminance output for the display of FIG. 1A comprising the illustrative backlight of FIG. 8A, the SDVACRA polar variation of FIG. 8B for narrow-angle state.
Figure 8D:
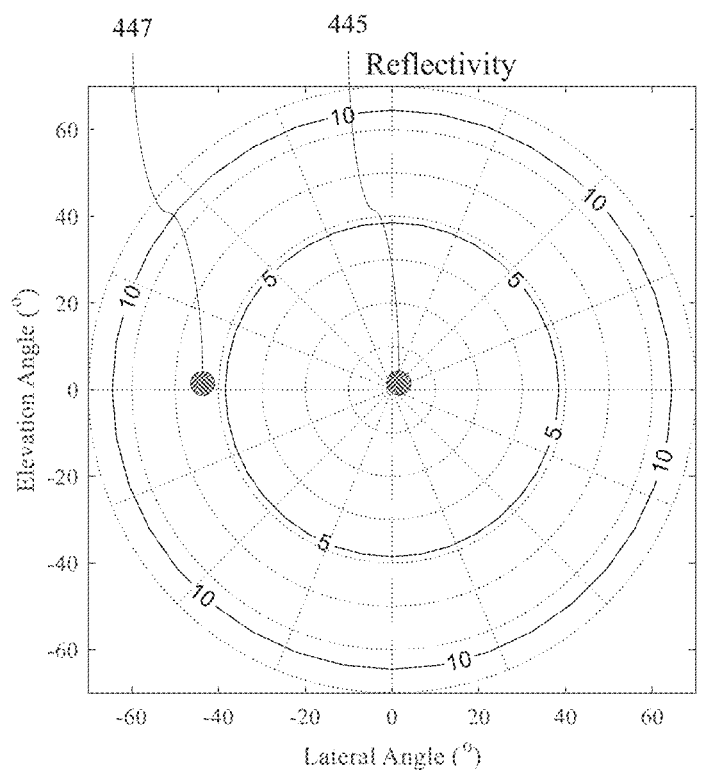
FIG. 8D is a schematic graph illustrating the polar variation of reflectivity for the illustrative SDVACRA of FIG. 1A and TABLE 2 operating in narrow-angle state.
Figure 8E:
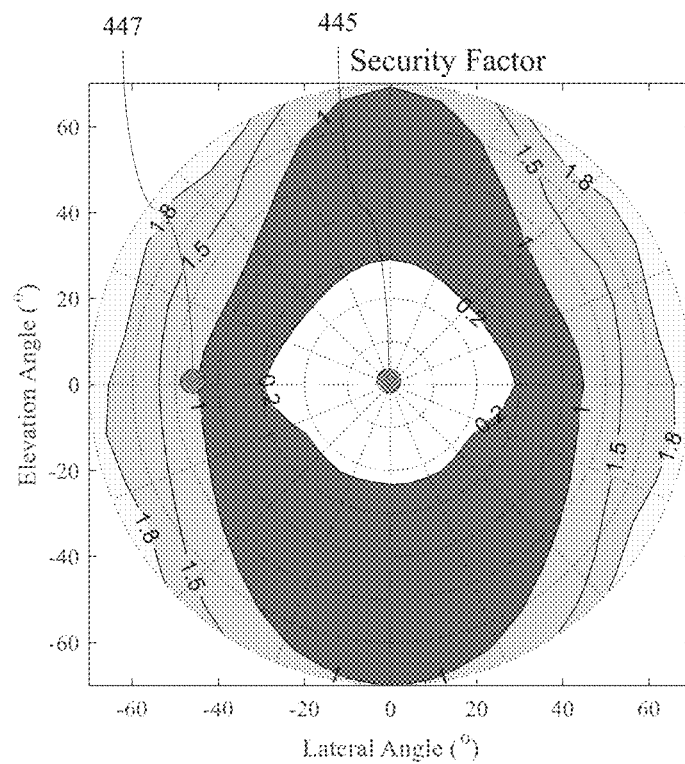
FIG. 8E is a schematic graph illustrating the polar variation of security factor, S for the illustrative backlight of FIG. 8A, SDVACRA of TABLE 2, FIG. 8B and FIG. 8D operating in narrow-angle state.

FIG. 8B is a schematic graph illustrating the polar variation of transmission for an illustrative SDVACRA 900 of FIG. 1A and TABLE 2 operating in narrow-angle state; FIG. 8C is a schematic graph illustrating the polar variation of luminance output for the display of FIG. 1A comprising the illustrative backlight 20 of FIG. 8A, the SDVACRA 900 polar variation of FIG. 8B for narrow-angle state; FIG. 8D is a schematic graph illustrating the polar variation of reflectivity for the illustrative SDVACRA 900 of FIG. 1A and TABLE 2 operating in narrow-angle state; and FIG. 8E is a schematic graph illustrating the polar variation of security factor, S for the illustrative backlight 20 of FIG. 8A, SDVACRA 900 of TABLE 2, FIG. 8B and FIG. 8D operating in narrow-angle state. Features of the embodiments of FIGS. 8B-E not discussed in further detail may be assumed to correspond to the features with equivalent reference numerals as discussed above, including any potential variations in the features.

FIG. 8D illustrates that no reflective polariser 302 is provided, for example as will be described in FIG. 16A hereinbelow and thus the reflectivity represents front surface reflections of the display device 100.

Illustrative operation in wide-angle state will now be described.

Figure 8F:
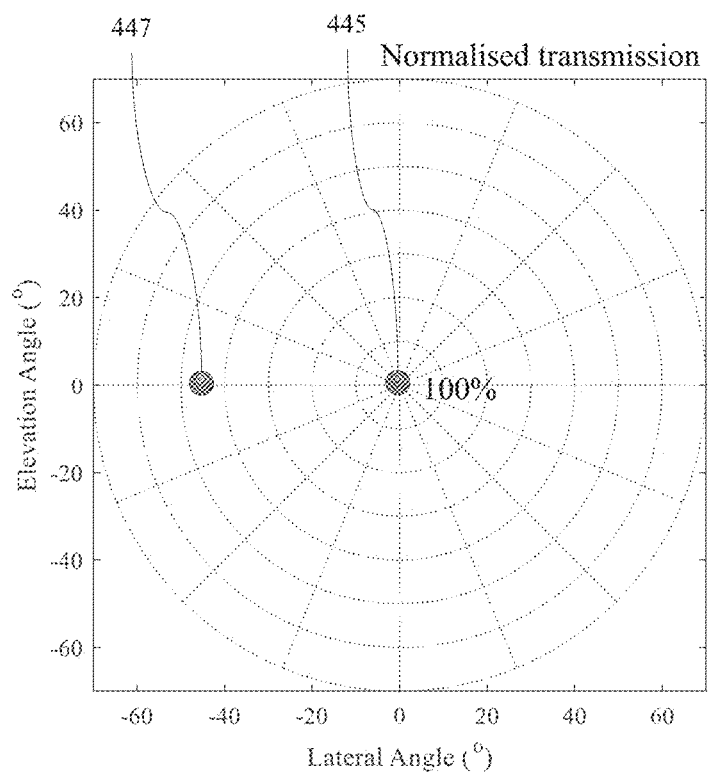
FIG. 8F is a schematic graph illustrating the polar variation of transmission for an illustrative SDVACRA of FIG. 1A and TABLE 2 operating in wide-angle state.
Figure 8G:
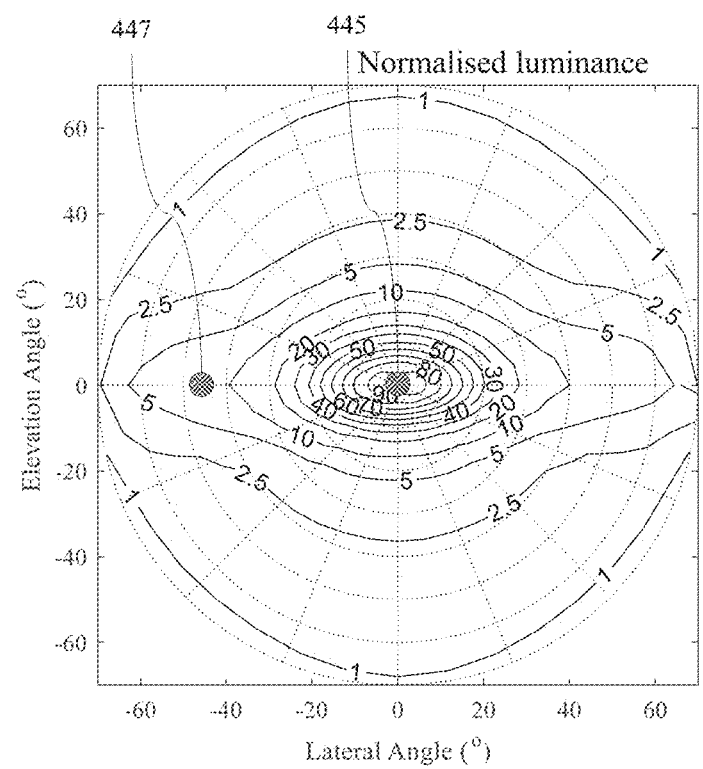
FIG. 8G is a schematic graph illustrating the polar variation of luminance output for the display device of FIG. 1A comprising the illustrative backlight of FIG. 8A, the SDVACRA of FIG. 8F for wide-angle state.

FIG. 8F is a schematic graph illustrating the polar variation of transmission for an illustrative SDVACRA 900 of FIG. 1A and TABLE 2 operating in wide-angle state and FIG. 8G is a schematic graph illustrating the polar variation of luminance output for the display device 100 of FIG. 1A comprising the illustrative backlight 20 of FIG. 8A, the SDVACRA 900 of FIG. 8F for wide-angle state. Advantageously the luminance to the viewing inclined axis 447 increases to almost 10%, providing substantially increased image visibility to off-axis display user 47 when the display device 100 is arranged in wide-angle state.

It may be desirable to reduce the transmission of the SDVACRA 900 at viewing angles φ(447) that are closer to the axis 445.

Figure 9A:
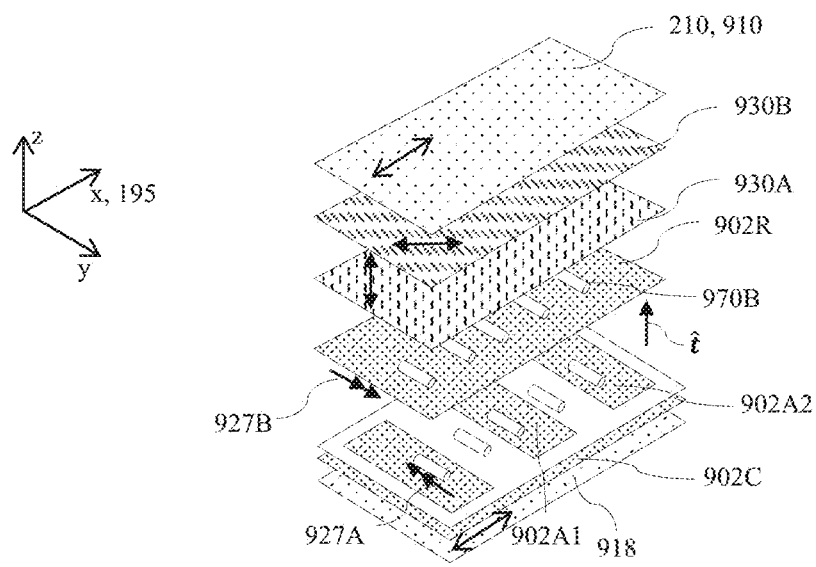
FIG. 9A is a schematic diagram illustrating in perspective front view an electrode and liquid crystal material structure for a SDLCR comprising two parallel homogeneous surface alignment layers in an undriven mode.
Figure 9B:
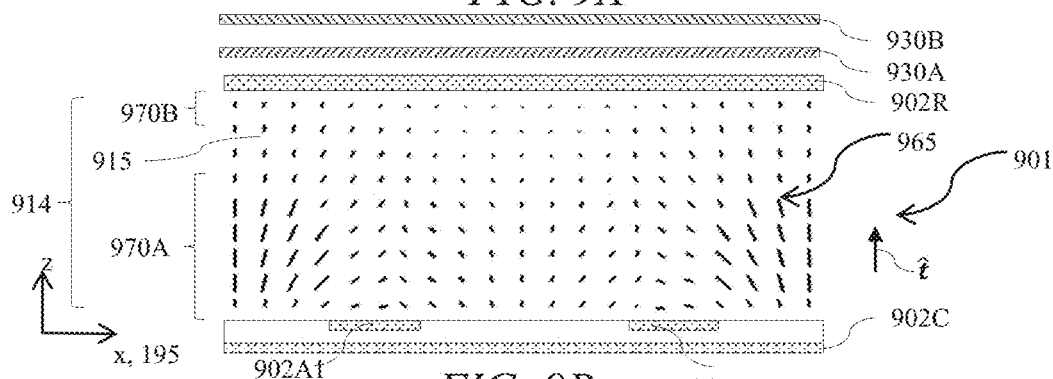
FIG. 9B is a schematic diagram illustrating in top view the alternative homogeneous liquid crystal alignment of the SDLCR of FIG. 9F in wide-angle state.
Figure 9C:
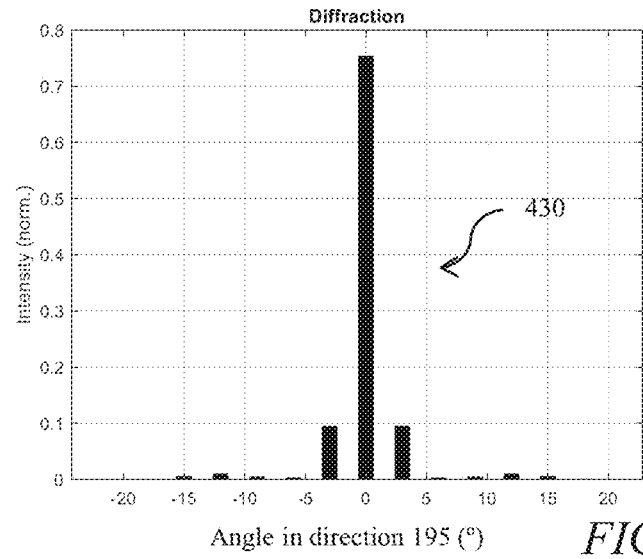
FIG. 9C is a schematic graph illustrating a profile of diffracted luminance into diffractive orders for the embodiment of FIG. 9B.
Figure 9D:
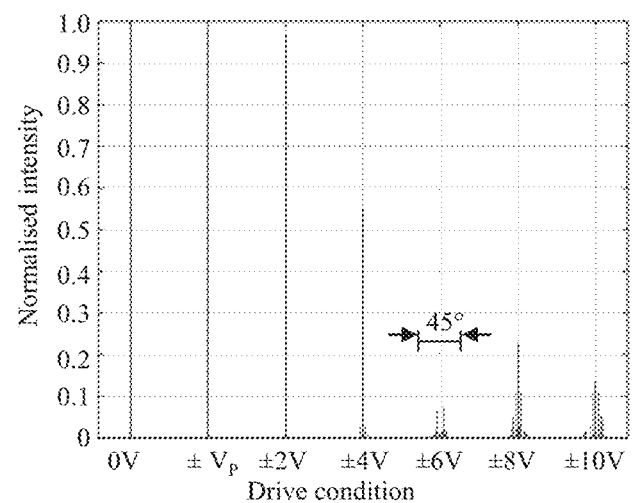
FIG. 9D is a schematic graph illustrating the variation of normalised intensity against angle for each of seven different drive voltages for the arrangement of FIG. 9B.
Figure 9E:
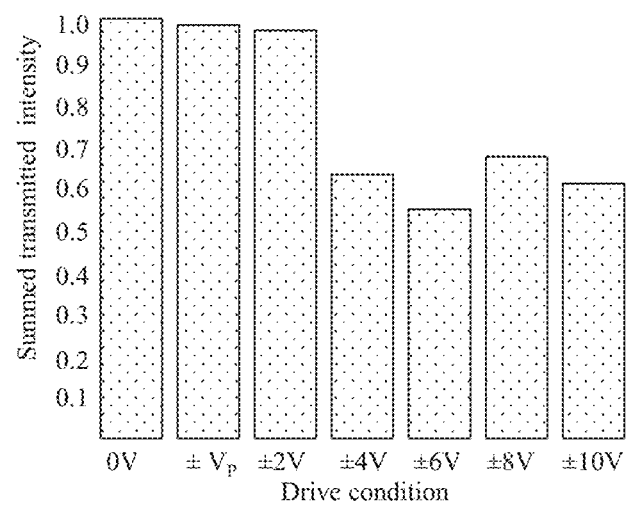
FIG. 9E is a schematic graph illustrating the variation of summed transmitted intensity for each of the seven different drive voltages for the arrangement of FIG. 9B.
Figure 9F:
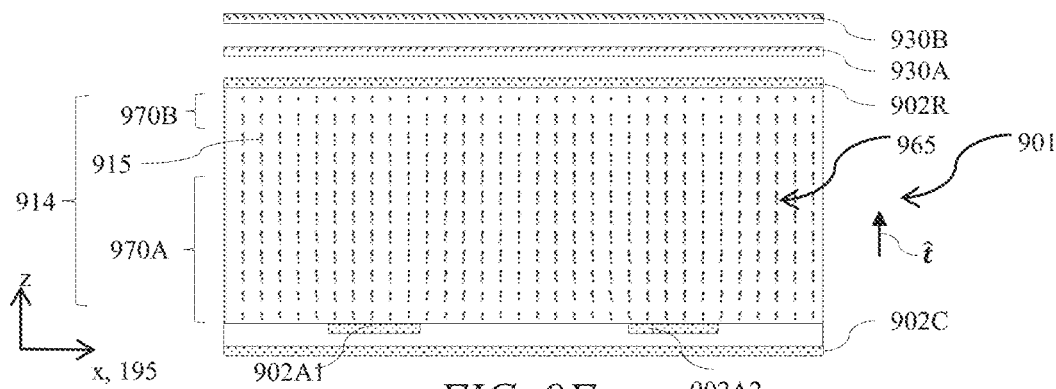
FIG. 9F is a schematic diagram illustrating in top view an alternative homogeneous liquid crystal alignment of a SDLCR for use in the embodiment of FIG. 1A, comprising the electrode arrangement of FIG. 1E and arranged in narrow-angle state.
Figure 9G:
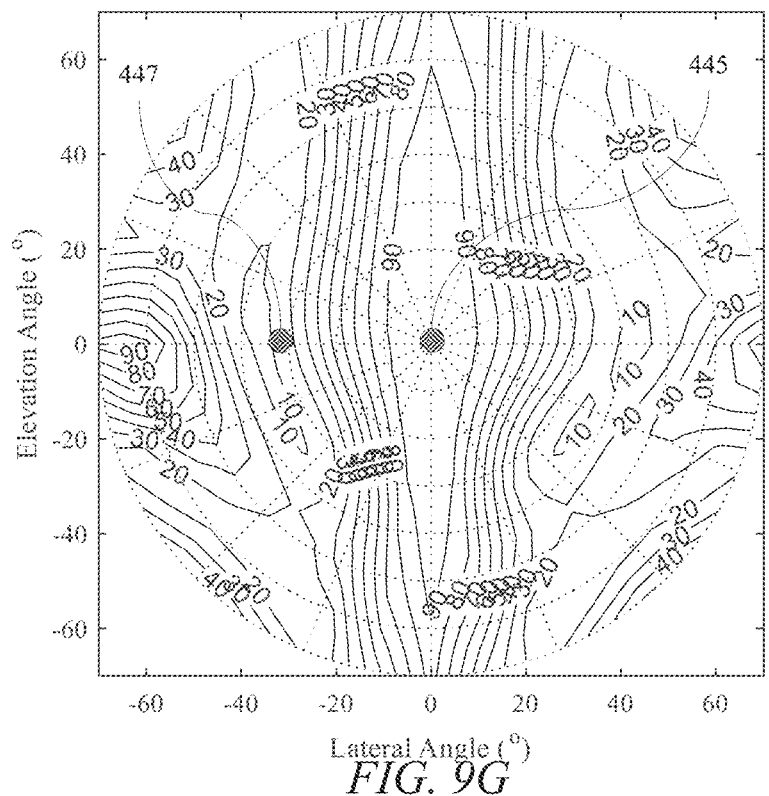
FIG. 9G is a schematic graph illustrating the polar variation of transmission for an illustrative SDLCR of FIG. 9A and TABLES 5-6 in narrow-angle state.
Figure 9H:
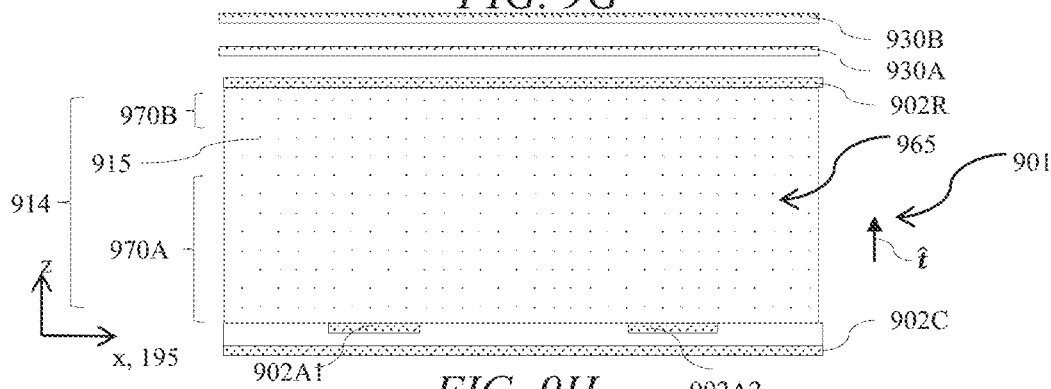
FIG. 9H is a schematic diagram illustrating in top view the alternative homogeneous liquid crystal alignment of the SDLCR of FIG. 9F and arranged in intermediate state.

FIG. 9A is a schematic diagram illustrating in perspective front view an electrode and liquid crystal material structure for a SDLCR 901 comprising two parallel homogeneous surface alignment layers in an undriven mode; FIG. 9B is a schematic diagram illustrating in top view the alternative homogeneous liquid crystal alignment 965 of the SDLCR 901 of FIG. 9F and arranged in wide-angle state; FIG. 9C is a schematic graph illustrating a profile 430 of diffracted luminance into diffractive orders for the embodiment of FIG. 9B; FIG. 9D is a schematic graph illustrating the variation of normalised intensity against angle for each of seven different drive voltages for the arrangement of FIG. 9B; FIG. 9E is a schematic graph illustrating the variation of summed transmitted intensity for each of the seven different drive voltages for the arrangement of FIG. 9B; FIG. 9F is a schematic diagram illustrating in top view an alternative homogeneous liquid crystal alignment 965 of a SDLCR 901 for use in the embodiment of FIG. 1A, comprising the electrode arrangement of FIG. 1E and arranged in narrow-angle state; FIG. 9G is a schematic graph illustrating the polar variation of transmission for an illustrative SDLCR 901 of FIG. 9A and TABLES 5-6 operating in narrow-angle state; and FIG. 9H is a schematic diagram illustrating in top view the alternative homogeneous liquid crystal alignment 965 of the SDLCR 901 of FIG. 9F and arranged in intermediate state. Features of the embodiment of FIGS. 9A-H not discussed in further detail may be assumed to correspond to the features with equivalent reference numerals as discussed above, including any potential variations in the features.

TABLE 5

| Item | | Property | Illustrative embodiment |
|---|---|---|---|
| SDLCR 901 | Electrode 902A | Pitch, p | 10 μm |
| | | Width, w | 4 μm |
| | Surface alignment layer 917A | Type | Homogeneous |
| | | In-plane alignment direction 927Ap angle $\theta_A$ | 90° |
| | | Pretilt angle | 2° |
| | Surface alignment layer 917B | Type | Homogeneous |
| | | In-plane alignment direction 927Bp angle $\theta_B$ | 270° |
| | | Pretilt angle | 2° |
| | LC layer 914 | Retardance | 750 nm |
| Passive compensation retarder 930 | A-plate 930A | In-plane alignment direction 931A angle $\theta_A$ | 45° |
| | | Retardance | +600 nm |
| | A-plate 930B | In-plane alignment direction 931A angle $\theta_B$ | 135° |
| | | Retardance | +600 nm |

TABLE 6

| Item | Wide-angle state | Narrow-angle state | Intermediate state |
|---|---|---|---|
| FIGS. | 9B | 9D | 9F |
| $V_{AR}$ | −20 V | +2.8 V | 0 V |
| $V_{CR}$ | +20 V | +2.8 V | 0 V |

By way of comparison with FIGS. 2C-D, FIG. 4C and FIG. 6C, the alternative embodiment of FIGS. 9B-C, FIG. 9F and FIG. 9H respectively illustrate arrangements wherein both sides of the SDLCR 901 have homogeneous surface alignment layers and have patterned electrodes 902 on one side of the layer 914 of liquid crystal material 915. The passive compensation retarder 930 is further provided by a pair of A-plate retarders 930A, 930B with respective crossed optical axes as illustrated in TABLE 5. Some asymmetry of luminance profile may be achieved across the lateral direction. Displays such as passenger infotainment displays may be provided advantageously with improved security factor in narrow-angle state to a driver 47 on one side of the passenger 45 for example as illustrated in FIGS. 31A-B hereinbelow. In alternative embodiments, the pair of A-plate passive compensation retarders 930A, 930B may be provided by a C-plate. Advantageously thickness and cost is reduced.

Further, in comparison to the embodiment of FIG. 8B, as illustrated in FIG. 9G a luminance minimum may be achieved at angles φ(447) that are closer to the viewing axis 445. Advantageously increased security factor S may be provided at said small angles φ(447). A display device 100 suitable for use in a vehicle may be provided with increased security factor in the inclined axis 447 of the driver 47.

Alternative arrangements for the liquid crystal layer 914 of the SDLCR 901 and liquid crystal layer 314 of a switchable non-diffractive liquid crystal retarder (SNDLCR) 301 will now be described in TABLE 7.

Retardances herein are the retardance of the layer 914, 314 of liquid crystal material 915, 315 for light of a wavelength of 550 nm. The retardance ranges of TABLE 7 illustrate suitable parameters to achieve desirable angles φ of minima of transmission in narrow-angle state for inclined axis 447. Higher retardances may achieve small angle φ but may provide higher transmission at angles greater than φ that may provide further reduction of transmission. Alternatively smaller retardances may reduce transmission at higher inclined angles φ but may provide inadequate suppression at smaller inclined angles φ.

TABLE 7

| Surface alignment layer 917A, 317B | Surface alignment layer 917B, 317B | Layer 914, 314 illustrative retardance (Retardance range) | −C plate passive compensation retarder 930, 330 illustrative retardance (retardance range) | Crossed A-plate passive compensation retarder 930A, 930B or 330A, 330B illustrative retardance (retardance range) |
|---|---|---|---|---|
| Homogeneous | Homogeneous | 750 nm (500 nm to 900 nm) | −450 nm (−300 nm to −700 nm) | +500 nm (+300 nm to +800 nm) |
| Homogeneous | Homeotropic | 1000 nm (700 nm to 2000 nm) | −880 nm (−300 nm to −1800 nm) | +880 nm (+300 nm to +1800 nm) |
| Homeotropic | Homeotropic | 750 nm (500 nm to 1000 nm) | −750 nm (−300 nm to −900 nm) | +750 nm (+300 nm to +800 nm) |

In the SDLCR 901 of the present embodiments, each of the surface alignment layers 917A, 917B may be arranged to provide homogeneous alignment of the adjacent liquid crystal material 915; the layer 914 of liquid crystal material 915 of the SDLCR 901 has a retardance for light of a wavelength of 550 nm in a range from 500 nm to 900 nm; and the SDLCR 901 further comprises either: a passive uniaxial retarder that is compensation retarder 930 having an optical axis 931 perpendicular to the plane of the retarder 930 and having a retardance for light of a wavelength of 550 nm in a range from −300 nm to −700 nm; or a pair of passive uniaxial retarders 930A, 930B having optical axes 931A, 931B in the plane of the retarders 930A, 930B that are crossed and each having a retardance for light of a wavelength of 550 nm in a range from 300 nm to 800 nm. Alternatively, one of the surface alignment layers 917A, 917B may be arranged to provide homogeneous alignment of the adjacent liquid crystal material 915 and the other of the surface alignment layers 917A, 917B arranged to provide homogeneous alignment of the adjacent liquid crystal material 915; the layer 914 of liquid crystal material 915 of the SDLCR 901 has a retardance for light of a wavelength of 550 nm in a range from 700 nm to 2000 nm; and the SDLCR 901 further comprises either: a passive uniaxial retarder that is compensation retarder 930 having an optical axis 931 perpendicular to the plane of the retarder and having a retardance for light of a wavelength of 550 nm in a range from −300 nm to −1800 nm; or a pair of passive uniaxial retarders 930A, 930B having optical axes 931A, 931B in the plane of the retarders 930A, 930B that are crossed and each having a retardance for light of a wavelength of 550 nm in a range from 300 nm to 1800 nm. Alternatively, each of the surface alignment layers 917A, 917B may be arranged to provide homeotropic alignment of the adjacent liquid crystal material 915; the layer 914 of liquid crystal material 915 of the SDLCR 901 has a retardance for light of a wavelength of 550 nm in a range from 500 nm to 1000 nm; and the SDLCR 901 further comprises either: a passive uniaxial retarder that is compensation retarder 930 having an optical axis 931 perpendicular to the plane of the retarder and having a retardance for light of a wavelength of 550 nm in a range from −300 nm to −900 nm; or a pair of passive uniaxial retarders 930A, 930B having optical axes 931A, 931B in the plane of the retarders that are crossed and each having a retardance for light of a wavelength of 550 nm in a range from 300 nm to 800 nm.

SNDLCR 301 is described further hereinbelow, including but not limited to FIG. 18B, FIG. 18E, FIG. 18F and FIGS. 20A-B. In the SNDLCR 301 of the present embodiments, each of the surface alignment layers 317A, 317B may be arranged to provide homogeneous alignment of the adjacent liquid crystal material 315; the layer 314 of liquid crystal material 315 of the SNDLCR 301 has a retardance for light of a wavelength of 550 nm in a range from 500 nm to 900 nm; and the SNDLCR 301 further comprises either: a passive uniaxial retarder that is compensation retarder 330 having an optical axis 331 perpendicular to the plane of the retarder 330 and having a retardance for light of a wavelength of 550 nm in a range from −300 nm to −700 nm; or a pair of passive uniaxial retarders 330A, 330B having optical axes 331A, 331B in the plane of the retarders 330A, 330B that are crossed and each having a retardance for light of a wavelength of 550 nm in a range from 300 nm to 800 nm. Alternatively, one of the surface alignment layers 317A, 317B may be arranged to provide homogeneous alignment of the adjacent liquid crystal material 315 and the other of the surface alignment layers 317A, 317B arranged to provide homogeneous alignment of the adjacent liquid crystal material 315; the layer 314 of liquid crystal material 315 of the SNDLCR 301 has a retardance for light of a wavelength of 550 nm in a range from 700 nm to 2000 nm; and the SNDLCR 301 further comprises either: a passive uniaxial retarder that is compensation retarder 330 having an optical axis 331 perpendicular to the plane of the retarder and having a retardance for light of a wavelength of 550 nm in a range from −300 nm to −1800 nm; or a pair of passive uniaxial retarders 330A, 330B having optical axes 331A, 331B in the plane of the retarders 330A, 330B that are crossed and each having a retardance for light of a wavelength of 550 nm in a range from 300 nm to 1800 nm. Alternatively, each of the surface alignment layers 317A, 317B may be arranged to provide homeotropic alignment of the adjacent liquid crystal material 315; the layer 314 of liquid crystal material 315 of the SNDLCR 301 has a retardance for light of a wavelength of 550 nm in a range from 500 nm to 1000 nm; and the SNDLCR 301 further comprises either: a passive uniaxial retarder that is compensation retarder 330 having an optical axis 331 perpendicular to the plane of the retarder and having a retardance for light of a wavelength of 550 nm in a range from −300 nm to −900 nm; or a pair of passive uniaxial retarders 330A, 330B having optical axes 331A, 331B in the plane of the retarders that are crossed and each having a retardance for light of a wavelength of 550 nm in a range from 300 nm to 800 nm.

Further arrangements of layers 914 of liquid crystal material 915 for SDLCR 901 and optionally passive compensation retarders 930; and SNDLCRA 300 comprising SNDLCR 301 and optionally passive compensation retarders 330 are described in U.S. Pat. No. 11,092,851, in U.S. Pat. No. 10,976,578, and in U.S. Patent Publ. No. 2023-0254457, all of which are herein incorporated by reference in their entireties. Such arrangements are suitable for providing switching between desirable narrow-angle and wide-angle states of operation as described herein.

It may be desirable to provide a narrow-angle state for a viewing axis 445 that is not close to the optical axis 199.

Figure 10A:
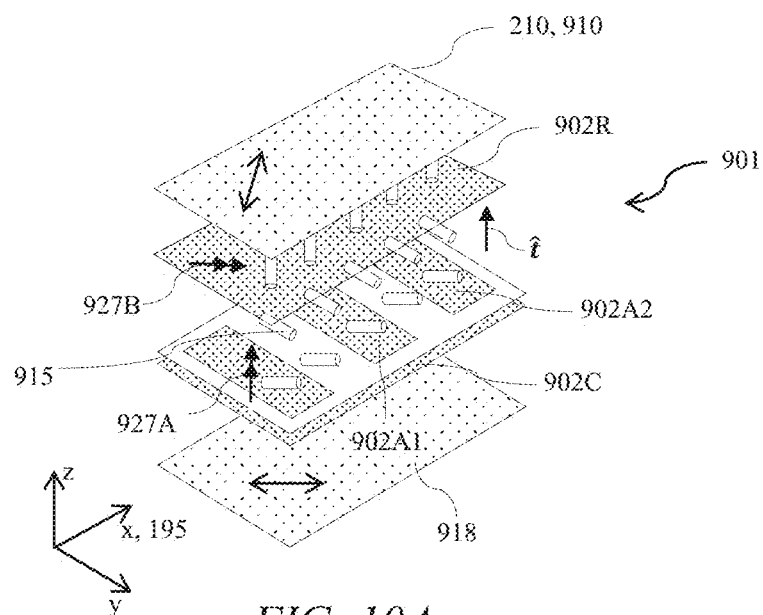
FIG. 10A is a schematic diagram illustrating in perspective front view a SDLCR comprising an electrode arrangement, a pair of orthogonally aligned homogeneous surface alignment layers and liquid crystal material alignment structure for a SDLCR in an undriven mode.
Figure 10B:
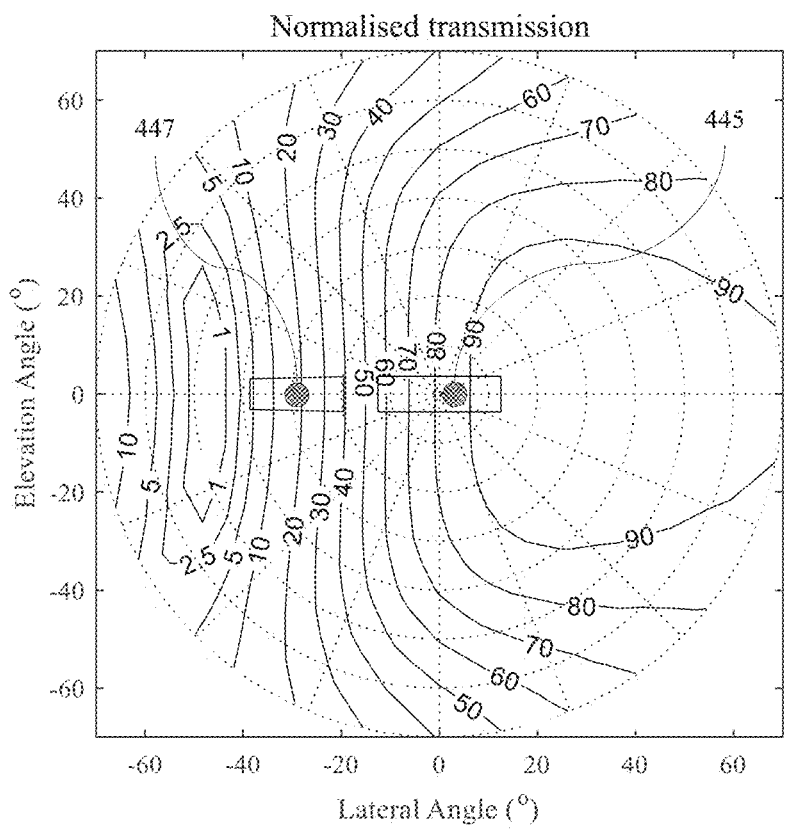
FIG. 10B is a schematic graph illustrating the polar variation of transmission for an illustrative SDVACRA of FIG. 10A and TABLE 8 operating in narrow-angle state.

FIG. 10A is a schematic diagram illustrating in perspective front view a SDLCR 901 comprising an electrode arrangement 904, a pair of orthogonally aligned homogeneous surface alignment layers 917A, 917B and liquid crystal material 915 alignment structure 965 for a SDLCR 901 in an undriven mode; FIG. 10B is a schematic graph illustrating the polar variation of transmission for an illustrative SDVACRA 900 of FIG. 10A and TABLE 8 operating in narrow-angle state; FIG. 10C is a schematic diagram illustrating in top view the alternative homogeneous liquid crystal alignment structure 965 of a SDLCR 901 comprising the arrangement of FIG. 10A and arranged in narrow-angle state;

FIG. 10D is a schematic diagram illustrating in top view the alternative homogeneous liquid crystal alignment structure 965 of a SDLCR 901 comprising the arrangement of FIG. 10A and arranged in wide-angle state; FIG. 10E is a schematic graph illustrating the variation of normalised intensity against angle for each of seven different drive voltages for the arrangement of FIG. 10D; and FIG. 10F is a schematic graph illustrating the variation of summed transmitted intensity for each of the seven different drive voltages for the arrangement of FIG. 10D. Features of the embodiments of FIGS. 10A-F not discussed in further detail may be assumed to correspond to the features with equivalent reference numerals as discussed above, including any potential variations in the features.

By way of comparison with FIG. 9A, the alternative embodiment of FIG. 10A illustrates a twist through the thickness direction $\hat{t}$ through the layer 914 of liquid crystal material 915. A chiral dopant may further be provided with the liquid crystal material to bias the rotation direction of the twist. By way of comparison with FIG. 1A the passive compensation retarder 930 is omitted. Advantageously cost, thickness and complexity is reduced.

TABLE 8

| Item | Property | Illustrative embodiment |
|---|---|---|
| Display polariser 910 | Electric vector transmission direction, 911 | 135° |
| Electrode 902A | Pitch, p | 10 μm |
| | Width, w | 3 μm |
| Surface alignment layer 917A | Type | Homogeneous |
| | In-plane alignment direction 927Ap angle $\theta_A$ | 45° |
| | Pretilt angle | 2° |
| Surface alignment layer 917B | Type | Homogeneous |
| | In-plane alignment direction 927Bp angle $\theta_B$ | 315° |
| | Pretilt angle | 2° |

TABLE 8-continued

| Item | Property | Illustrative embodiment |
|---|---|---|
| LC layer 914 | Retardance | 500 nm |
| Passive compensation retarder 930 | Not present | |
| Additional polariser 918 | Electric vector transmission direction, 919 | 45° |

By way of comparison with the embodiment of FIG. 8B and FIG. 9G, the location of the viewing axis 445 may be conveniently provided in a direction different to the normal to the display device 100. Further the location of the inclined axis 447 may be at a reduced angle $\phi(447)$ to achieve improved driver 47 distraction in operation of a passenger infotainment display in narrow-angle state.

A SDLCR 901 comprising twisted layers of liquid crystal material 915 such as illustrated in TABLE 8 and FIGS. 10A-B may further be driven with a voltage across the layer 914 of liquid crystal material 915 that varies across an area 103 of the layer 914. Such variation may be provided across an area 103 of the corresponding electrode arrangement 904. For example, at least one electrode 902A, 902C, 902R may be provided with a voltage that varies in the lateral direction 195. Such a varying voltage can achieve improved uniformity of luminance to an observer 45 at a given viewing axis 445 from across the display device 100 area 103 and improved uniformity of security factor in the inclined axis 447. Such varying voltages are described in U.S. Patent Publ. No. 2023-0254457, which is herein incorporated by reference in its entirety.

A SDLCR 901 comprising twisted layers of liquid crystal material 915 such as illustrated in TABLE 8 and FIGS. 10A-B may further be driven with a voltage across the layer 914 of liquid crystal material 915 that varies in correspondence to the measured location of a moving observer 45 and/or observer 47. For example, at least one electrode 902A, 902C, 902R may be provided with a voltage that varies in correspondence to the observer location. Such a varying voltage can achieve improved uniformity of luminance to a moving observer 45 of the display device 100 and improved uniformity of security factor to a moving observer 47 that is a snooper or driver. Such varying voltages in correspondence to observer location are described in U.S. Patent Publ. No. 2023-0375863, which is herein incorporated by reference in its entirety.

It may be desirable to reduce the complexity of the electrode arrangement 904.

Figure 11A:
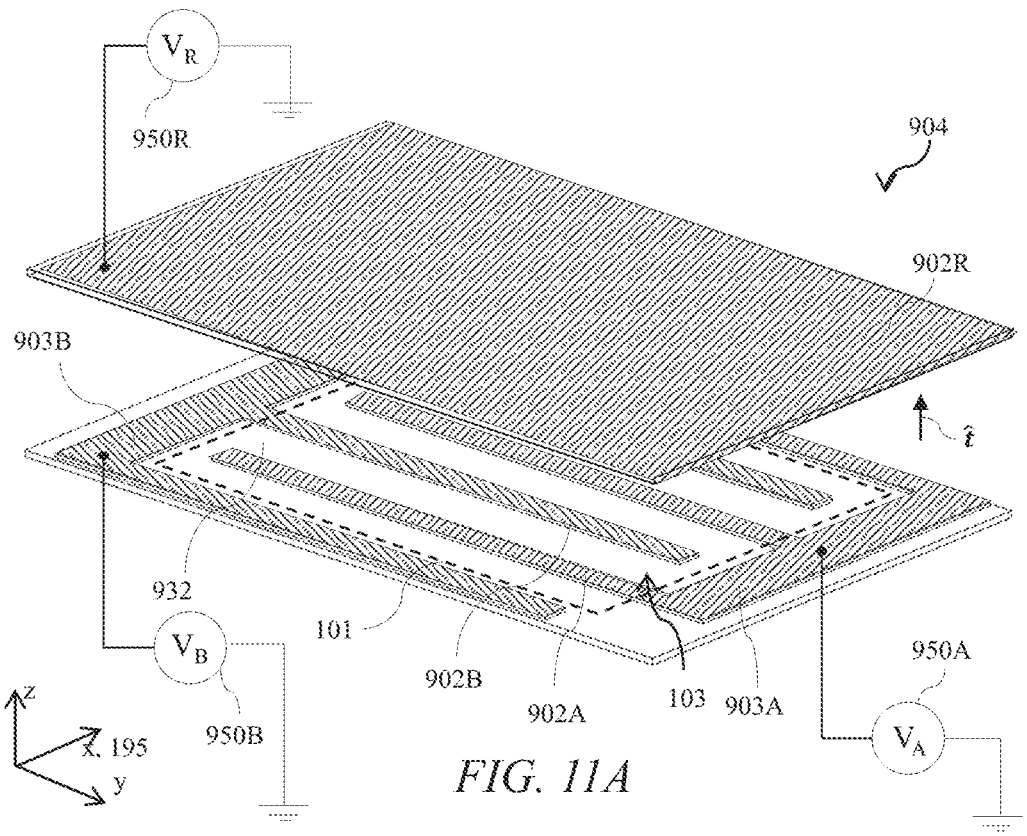
FIG. 11A is a schematic diagram illustrating in perspective side view an alternative transmissive electrode arrangement for the SDLCR of FIG. 1A wherein the control electrode is omitted.
Figures 11B, 11C:
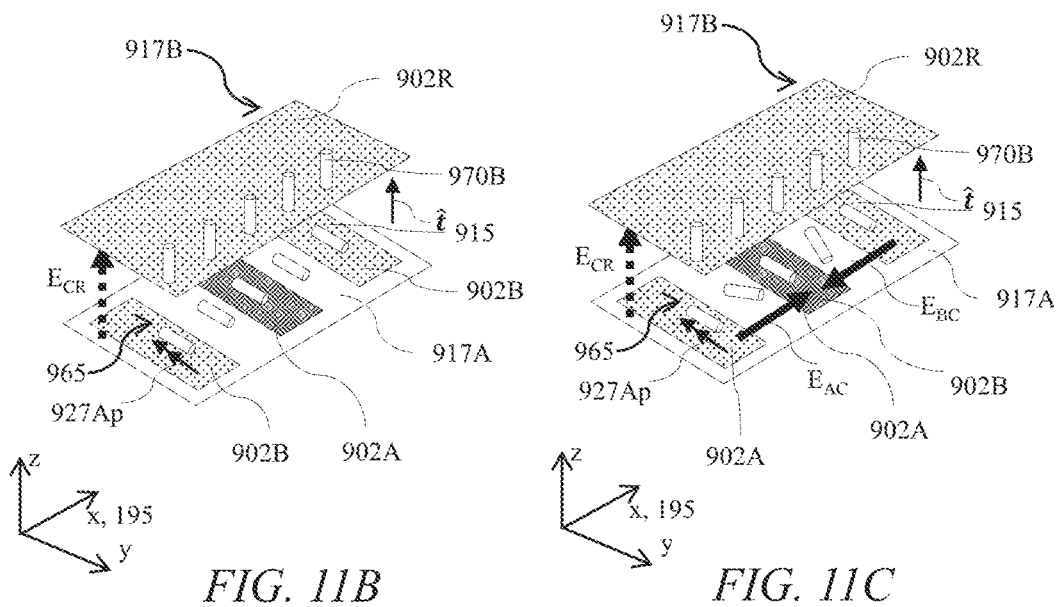
FIG. 11B is a schematic diagram illustrating in perspective front view the electrode arrangement of FIG. 11A and liquid crystal material alignment structure for a SDLCR comprising a surface alignment layer providing homogeneous alignment of liquid crystal material and a surface alignment layer providing homeotropic alignment of liquid crystal material driven for narrow-angle state.
FIG. 11C is a schematic diagram illustrating in perspective front view the electrode arrangement of FIG. 11A and liquid crystal material alignment structure for a SDLCR comprising a surface alignment layer providing homogeneous alignment of liquid crystal material and a surface alignment layer providing homeotropic alignment of liquid crystal material driven for wide-angle state.
Figure 11D:
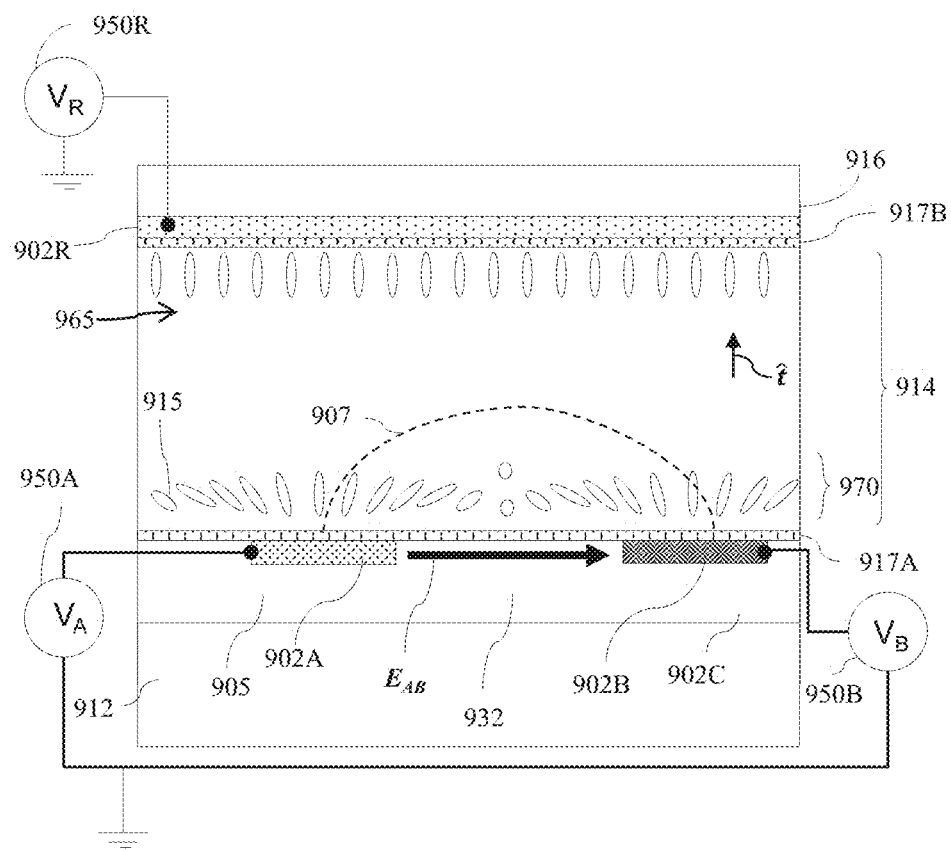
FIG. 11D is a schematic diagram illustrating in top view the structure of the SDLCR of FIGS. 11A-C for operation in wide-angle state.
Figure 11E:
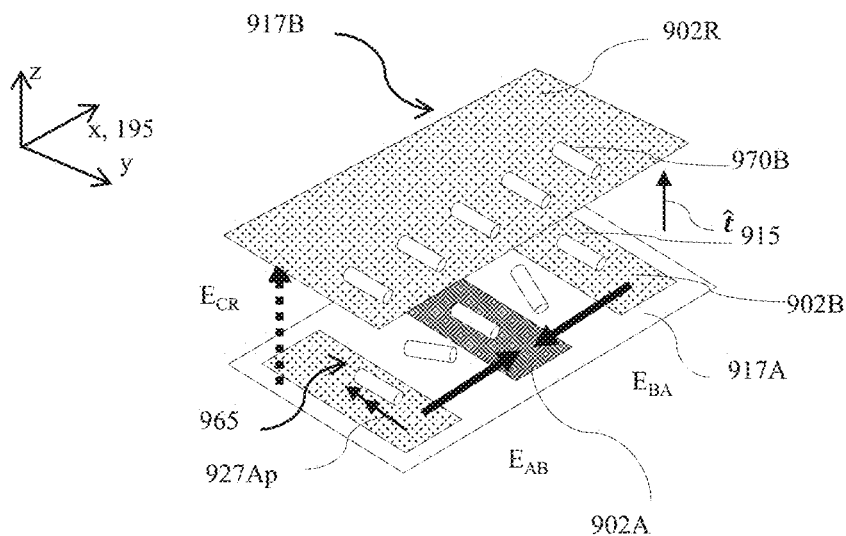
FIG. 11E is a schematic diagram illustrating in perspective front view the electrode arrangement of FIG. 11A and liquid crystal material alignment structure for a SDLCR comprising two surface alignment layers, providing homogeneous alignment of liquid crystal material and driven for wide-angle state.

FIG. 11A is a schematic diagram illustrating in perspective side view an alternative transmissive electrode arrangement 904 for the SDLCR 901 of FIG. 1A wherein the control electrode 902C is omitted; FIG. 11B is a schematic diagram illustrating in perspective front view the electrode arrangement 904 of FIG. 11A and liquid crystal material 915 alignment structure 965 for a SDLCR 901 comprising a surface alignment layer 917A providing homogeneous alignment of liquid crystal material 915 and a surface alignment layer 917B providing homeotropic alignment of liquid crystal material 915 in narrow-angle state; FIG. 11C is a schematic diagram illustrating in perspective front view the electrode arrangement 904 of FIG. 11A and liquid crystal material 915 alignment structure 965 for a SDLCR 901 comprising a surface alignment layer 917A providing homogeneous alignment of liquid crystal material 915 and a surface alignment layer 917B providing homeotropic alignment of liquid crystal material 915 in wide-angle state; FIG. 11D is a schematic diagram illustrating in top view the structure of the SDLCR 901 of FIGS. 11A-C in wide-angle state; FIG. 11E is a schematic diagram illustrating in perspective front view the electrode arrangement 904 of FIG. 11A and liquid crystal material 915 alignment structure 965 for a SDLCR 901 comprising two surface alignment layers 917A, 917B providing homogeneous alignment of liquid crystal material 915 in wide-angle state; FIG. 11F is a schematic diagram illustrating in top view the alternative liquid crystal alignment structure 965 of a SDLCR 901 comprising the arrangement of FIG. 11B in narrow-angle state; FIG. 11G is a schematic diagram illustrating in top view the alternative homogeneous liquid crystal alignment structure 965 of a SDLCR 901 comprising the arrangement of FIGS. 11B-C in wide-angle state; FIG. 11H is a schematic graph illustrating the variation of normalised intensity against angle for each of seven different drive voltages for the arrangement of FIG. 11G; FIG. 11I is a schematic graph illustrating the variation of summed transmitted intensity for each of the seven different drive voltages for the arrangement of FIG. 11G; FIG. 11J is a schematic diagram illustrating in top view the alternative homogeneous liquid crystal alignment structure 965 of a SDLCR 901 comprising the arrangement of FIG. 11E in narrow-angle state; FIG. 11K is a schematic diagram illustrating in top view the alternative homogeneous liquid crystal alignment structure 965 of a SDLCR 901 comprising the arrangement of FIG. 11E in wide-angle state; FIG. 11L is a schematic graph illustrating the variation of normalised intensity against angle for each of seven different drive voltages for the arrangement of FIG. 11K; and FIG. 11M is a schematic graph illustrating the variation of summed transmitted intensity for each of the seven different drive voltages for the arrangement of FIG. 11K. Features of the embodiments of FIGS. 11A-M not discussed in further detail may be assumed to correspond to the features with equivalent reference numerals as discussed above, including any potential variations in the features.

By way of comparison with the embodiments of transmissive electrode arrangement 904 comprising control electrode 902C hereinabove, in the alternative embodiments of FIGS. 11A-M, the separated electrodes 902A, 902B are sufficiently close to be capable of driving the layer 914 of liquid crystal material 915 into the narrow-angle state by application of a common voltage thereto.

By way of comparison with FIG. 1E, in the alternative embodiment of FIG. 11A, the patterned electrode 902 comprises interdigitated electrodes 902A, 902B separated by gaps 932 across an area 103 with respective bus bars 903A, 903B outside the area 103.

In the narrow-angle state and intermediate state, $V_A$ and $V_B$ are set to the same potential with respect to the potential of $V_R$ and control of the layer 914 of liquid crystal material 915 is provided by the relative voltage to the potential of reference electrode 902R. The electrode spacing of 902A and 902B is smaller or similar compared to the separation between electrode 902A and electrode 902R, so that the electric field across the layer 914 arising from the separated electrodes 902A and 902B is able to substantially control the liquid crystal material 915 in the spacing between the respective separated electrodes 902A, 902B. As illustrated in FIG. 11F, the gaps 932 of width γ are sufficiently small that the electrodes 902A, 902B of width ω provide a sufficient electric field that switches the layer 914 of liquid crystal material 915 in α substantially uniform manner across an area 103. In other words, the gaps 932 have a sufficiently small width γ to achieve substantially uniform switching of the layer 914 of liquid crystal material 915 so that substantially no diffraction is provided by the layer 914 of liquid crystal material 915.

By comparison, in the wide-angle state $V_A$ and $V_B$ are set to different potentials with respect to each other, typically opposite potentials or in antiphase, to provide electric fields $E_{AB}$, $E_{BA}$ as illustrated in FIG. 11C and FIG. 11E and provide a diffractive structure 965 as illustrated elsewhere herein. $V_R$ may be set to a potential which may be ground.

The transmissive electrode arrangement 904 of FIG. 1E comprises a capacitive dielectric layer 905 between the electrodes 902C, 902R. By comparison FIG. 11A does not comprise dielectric layer 905 and advantageously achieves reduced power consumption due to the reduced capacitive load of the SDLCR 901. Further complexity and cost of the fabrication of the electrode arrangement 904 is reduced.

The ends of the "fingers" electrodes 902A and 902B may each be joined together to reduce the voltage drop along the length of electrodes 902B and 902A as described elsewhere herein.

Alternative electrode arrangements 904 for use in SDLCR 901 will now be described.

Figure 12:
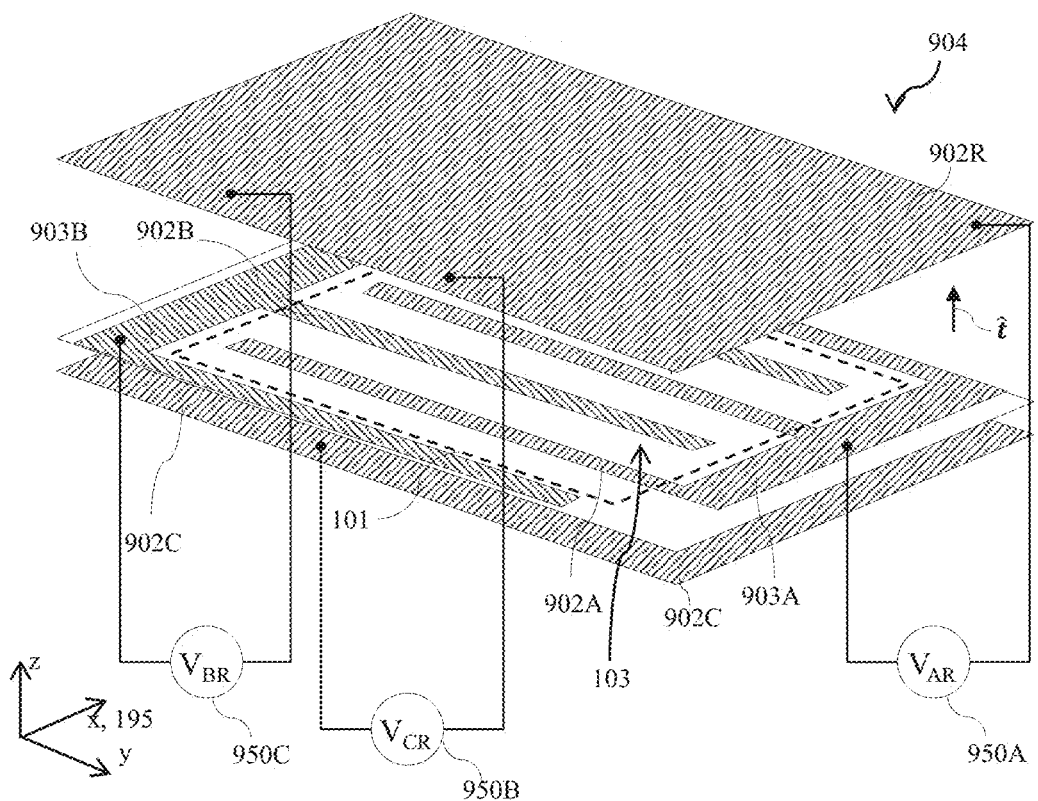
FIG. 12 is a schematic diagram illustrating in perspective side view an alternative transmissive electrode arrangement comprising interdigitated electrodes.

FIG. 12 is a schematic diagram illustrating in perspective side view alternative transmissive electrode arrangements 904 comprising interdigitated electrodes 902A, 902B. Features of the embodiment of FIG. 12 not discussed in further detail may be assumed to correspond to the features with equivalent reference numerals as discussed above, including any potential variations in the features.

By way of comparison to FIG. 1E, in the alternative embodiment of FIG. 12, the array of separated electrodes 902 comprises two interdigitated sets of separated electrodes 902A, 902B. Each set of separated electrodes 902A, 902B comprises a respective common bus bar 903A, 903B arranged outside the area 103 that may be the active area of the SLM 48. The electrodes 902A, 902B may be formed by etching a single layer of transparent conductor. Alternatively, the electrodes may be formed by etching two transparent conductors separated by an insulator (not shown). In this case each of the electrodes 902A, 902B may be formed with a bus bar 903A at each end in order to reduce the electrode impedance, as described in FIG. 1F.

The alternative embodiment of FIG. 12 comprises the transmissive reference electrode 902R, which may be embodied by ITO or silver nanowire for example. FIG. 12 illustrates voltages $V_{AC}$ and $V_{BC}$ which are the voltages applied respectively to the common bus bar 903A and 903B, each with respect to the potential of the control electrode 902C. The potentials $V_{AC}$ and $V_{BC}$ may be equal to each other to provide a symmetrical diffraction effect. Alternatively the potentials $V_{AC}$ and $V_{BC}$ may be different to provide an asymmetrical diffraction effect.

The reference electrode 902R may when driven provide an electric field perpendicular to the plane of the cell that may augment or substantially override the effect of the surface alignment layers 917A, 917B (not shown). When a homogeneous surface alignment layer is used at either side of layer 914 such as illustrated in FIG. 9B, the electric field can at least partially override the alignment of the layer 914 of liquid crystal material 915 on opposing sides of the layer 914 of liquid crystal material 915.

It may be desirable to modify the liquid crystal material 915 structure 965 in the wide-angle state.

Figure 13:
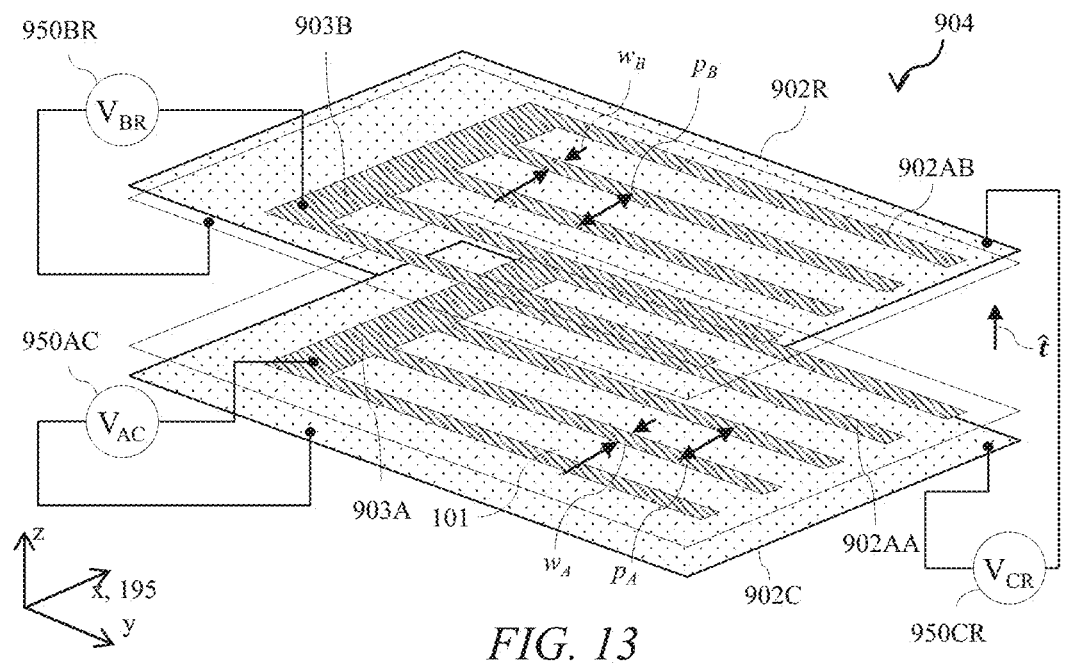
FIG. 13 is a schematic diagram illustrating in perspective side views an alternative electrode arrangement comprising spaced transmissive electrodes arranged on opposite sides of the layer of liquid crystal material.

FIG. 13 is a schematic diagram illustrating in perspective side views an alternative electrode arrangement 904 comprising spaced transmissive electrodes 902AA, 902AB arranged on opposite sides of the layer 914 of liquid crystal material 915. Features of the embodiment of FIG. 13 not discussed in further detail may be assumed to correspond to the features with equivalent reference numerals as discussed above, including any potential variations in the features.

By way of comparison with the SDLCR 901 of FIG. 1A, the alternative embodiment of FIG. 13 comprises an electrode arrangement 904 comprising separated electrodes 902AA between a control electrode 902C and the layer 914 of liquid crystal material 915; and separated electrodes 902AB, between a reference electrode 902R and the layer 914 of liquid crystal material 915.

In operation, the embodiment of FIG. 13 may provide increased modification in the thickness direction t of the structure 965 of liquid crystal material 915 in comparison to the embodiment for example of FIG. 2C. Increased luminance of diffracted light may be achieved, advantageously increasing image visibility to viewers 47 in directions 447.

It may be desirable to modify the liquid crystal material 915 structure 965 in the wide-angle state.

Figure 14A:
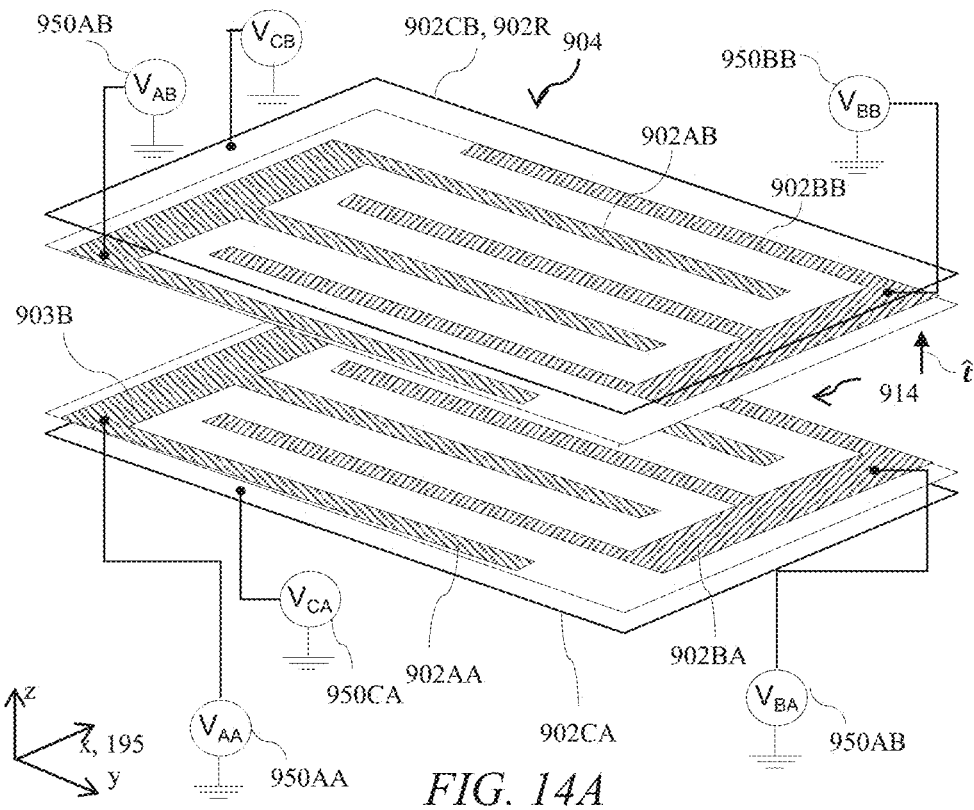
FIG. 14A is a schematic diagram illustrating in perspective side views an alternative electrode arrangement comprising spaced interdigitated transmissive electrodes and further interdigitated transmissive electrodes arranged on opposite sides of the layer of liquid crystal material.
Figure 14B:
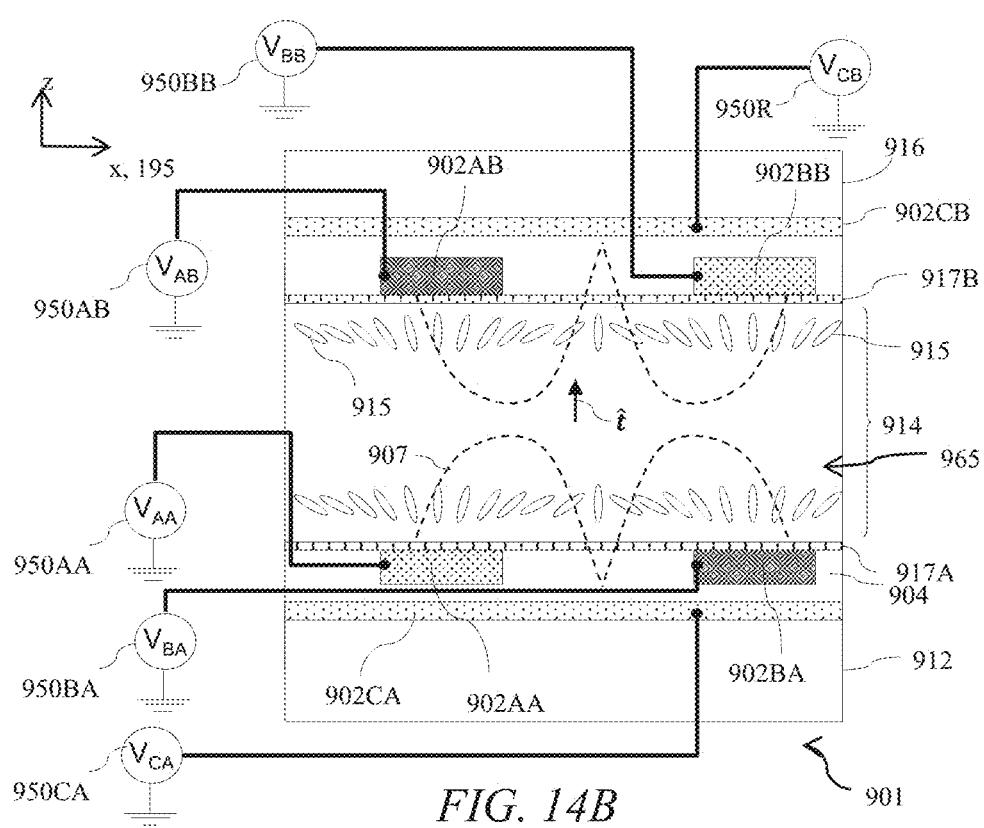
FIG. 14B is a schematic diagram illustrating in top view a driving arrangement for a SDLCR comprising the electrode arrangement of FIG. 14A.

FIG. 14A is a schematic diagram illustrating in perspective side views an alternative electrode arrangement 904 comprising spaced interdigitated transmissive electrodes 902AA, 902BA and interdigitated transmissive electrodes 902AB, 902BB arranged on opposite sides of the layer 914 of liquid crystal material 915; and FIG. 14B is a schematic diagram illustrating in top view a driving arrangement for a SDLCR 901 comprising the electrode arrangement 904 of FIG. 14A. Features of the embodiments of FIGS. 14A-B not discussed in further detail may be assumed to correspond to the features with equivalent reference numerals as discussed above, including any potential variations in the features.

In the alternative embodiment of FIG. 14A, the at least one array of separated electrodes 902 comprises two arrays of separated electrodes 902AA, 902BA and 902AB, 902BB on opposite sides of the SDLCR 901, each comprising two interdigitated sets of separated electrodes.

By way of comparison with the SDLCR 901 of FIG. 1A, the alternative embodiment of FIG. 14A comprises an electrode arrangement 904 comprising interdigitated separated electrodes 902AA, 902BA between a control electrode 902CA and the layer 914 of liquid crystal material 915; and separated electrodes 902AB, 902BB, between a further control electrode 902CB (that may alternatively be referred to as a reference electrode 902R) and the layer 914 of liquid crystal material 915.

In operation, the embodiment of FIG. 14A may provide increased modification in the thickness direction t of the structure 965 of liquid crystal material 915 in comparison to the embodiment for example of FIG. 2C. Increased luminance of diffracted light may be achieved, advantageously increasing image visibility to viewers 47 in directions 447. The potentials $V_{AA}$, $V_{BA}$ and potentials $V_{AB}$, $V_{BB}$ may also be set differently from each other to provide an asymmetrical diffraction effect.

The further control electrode 902C provides for a mode in which a uniform field perpendicular to the plane of the of the layer 914 of liquid crystal material 915 may be provided. In this case the potential $V_{AA}$, $V_{BA}$ and $V_{CA}$ may be set to zero volts. In a further mode $V_{CB}$ may also be set to zero. In these modes the structure may operate like a polar control retarder, that is a retarder that provides transmission that varies with polar angle, as described elsewhere herein, for example FIG. 6E. In another mode, when $V_{AA}$ and $V_{BA}$ are set to the same potential and $V_{CA}$ is set to a potential that is different, typically the inverse or antiphase to $V_{AA}$, then an electric field pattern that produces a periodic phase pattern in the liquid crystal layer 914 is produced. This may be implemented by using three ground referenced voltages applied to electrodes 902BA, 902AA and 902C. The same effect may be produced on the top side of the liquid crystal layer 914 by using three ground referenced voltages applied to $V_{AB}$, $V_{BB}$ and $V_{CB}$. The periodic phase pattern may be produced on the top or the bottom or both sides of liquid crystal layer 914. Increased control of the structure 965 of liquid crystal material 915 orientations may be provided. Increased diffusion into light cone 465 may be achieved and advantageously increased visibility in inclined axis 447.

The structure may also be operated with $V_{CA}$ and $V_{BA}$ set to different voltages such as $V_{BA}$ is the negative (antiphase) waveform to that for $V_{CA}$. Different distributions of diffraction orders may be produced. Advantageously the visibility of the wide-angle state in the inclined axis 447 may be adjusted by the control system 500.

In the alternative embodiment of FIG. 14B, voltages $V_{AA}$, $V_{BA}$ and $V_{CA}$ may be set equal to each other. Similarly $V_{AB}$, $V_{BB}$ and $V_{CB}$ may be set equal to each other. The effective voltage between the separated electrodes 902CA, 902CB i.e. $V_{CB}$-$V_{CA}$ which then provides the transmission profile as described elsewhere herein.

In a further embodiment, the alternating potentials $V_{BA}$ and $V_{AA}$ may be set to produce opposing potentials to each other to produce a periodic phase pattern in the liquid crystal layer 914. Such a phase structure is able to diffract and therefore diffuse incident light. The separated electrodes 902AA, 902BA and separated electrodes 902AB, 902BB may be aligned with each other perpendicular to the plane of the cell, and $V_{BB}$ and $V_{AB}$ may have voltages corresponding to those applied to $V_{BA}$ and $V_{AA}$, in this case the diffractive diffusion effect may be increased.

In a further embodiment, the voltages $V_{AA}$ and $V_{BA}$ and the voltages $V_{AB}$ and $V_{BB}$ may be set equal to each other, to provide operation similar to that illustrated in FIG. 11A.

The separated electrodes 902AA, 902BA and separated electrodes 902AB, 902BB may be offset from one another as shown in more detail in FIGS. 16C-D hereinbelow.

It may be desirable to provide asymmetric diffraction in the wide-angle state.

Figure 15A:
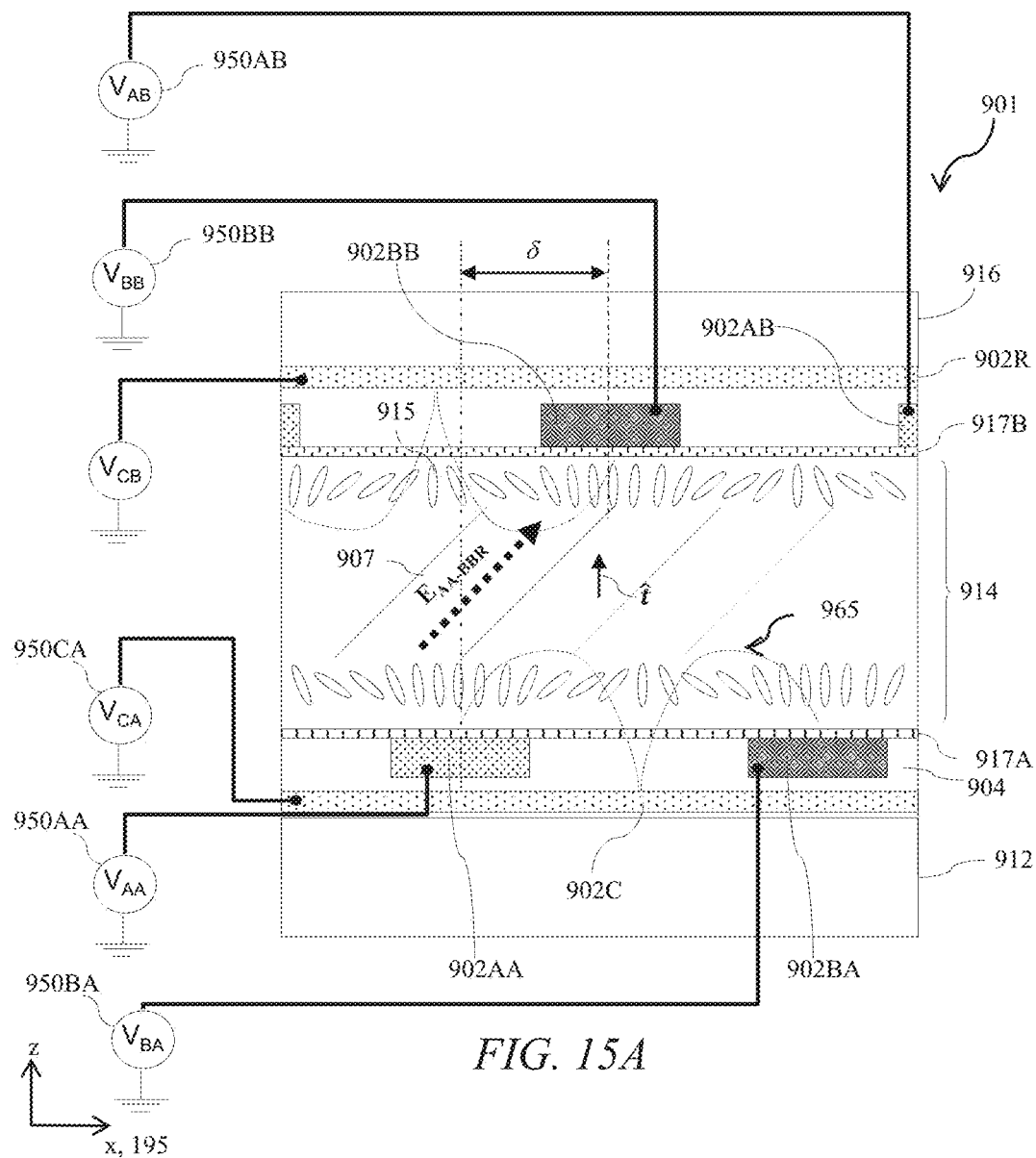
FIG. 15A is a schematic diagram illustrating in top view the structure and operation of a SDLCR comprising the alternative electrode arrangement of FIG. 14A wherein the separated electrodes and separated electrodes on opposite sides of the layer of liquid crystal material are offset by a distance δ in the lateral direction.
Figure 15B:
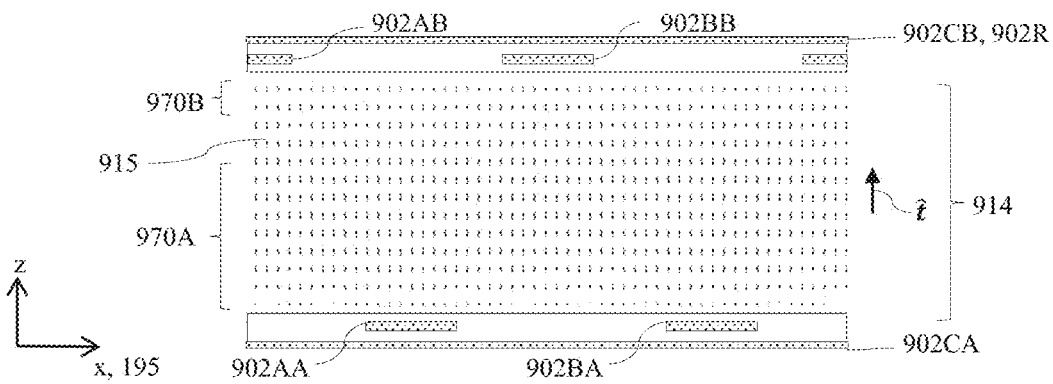
FIG. 15B is a schematic diagram illustrating in top view a liquid crystal alignment of SDLCR comprising an electrode arrangement of FIG. 15A in narrow-angle state.
Figure 15C:
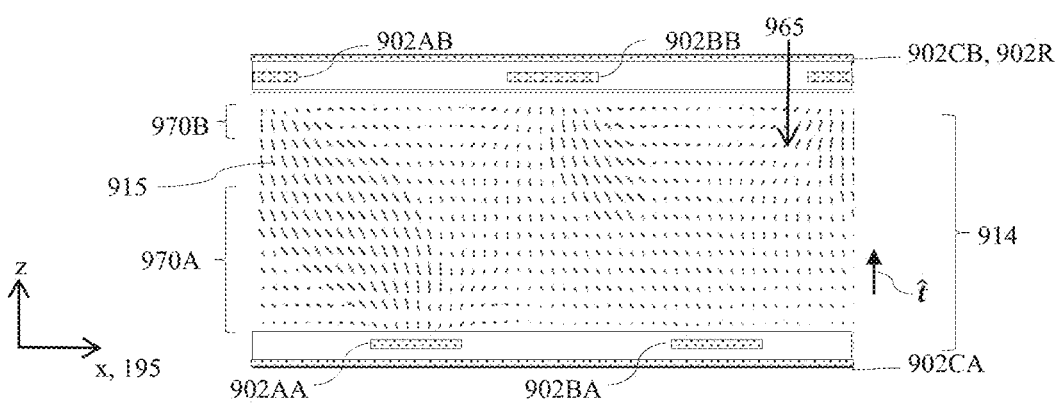
FIG. 15C is a schematic diagram illustrating in top view a liquid crystal alignment of SDLCR comprising an electrode arrangement of FIG. 15A and TABLES 9-10 in wide-angle state.
Figure 15D:
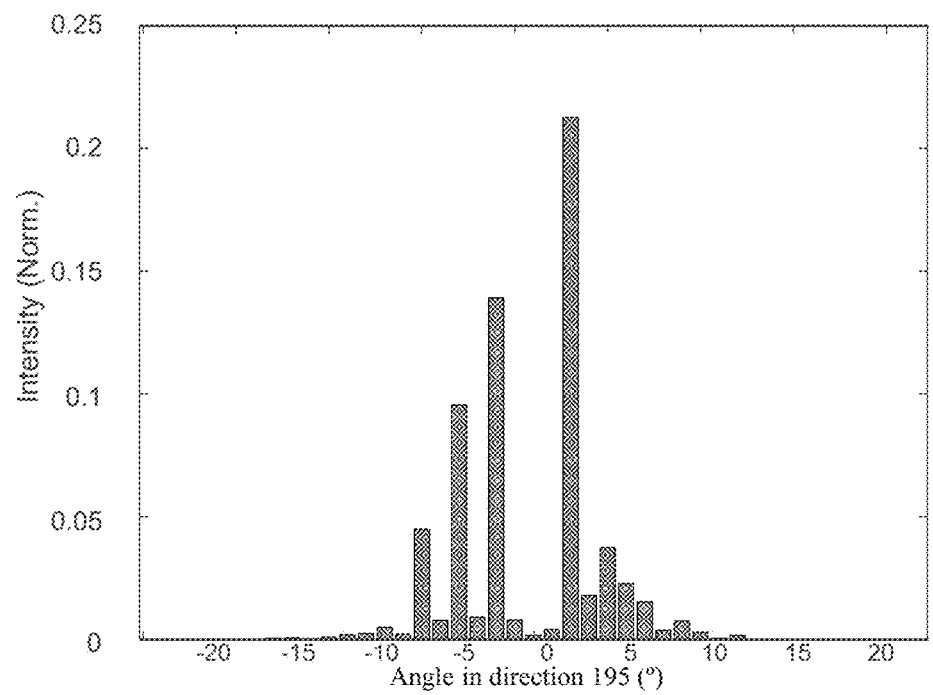
FIG. 15D is a schematic graph illustrating a profile of diffracted luminance into diffractive orders for the embodiment of FIG. 15C.

FIG. 15A is a schematic diagram illustrating in top view the structure and operation of α SDLCR comprising the alternative electrode arrangement of FIG. 14A wherein the separated electrodes 902AA, 902BA and separated electrodes 902AB, 902BB on opposite sides of the layer 914 of liquid crystal material 915 are offset by a distance δ in the lateral direction 195; FIG. 15B is a schematic diagram illustrating in top view a liquid crystal alignment 965 of SDLCR 901 comprising an electrode arrangement 904 of FIG. 15A in narrow-angle state; FIG. 15C is a schematic diagram illustrating in top view a liquid crystal alignment 965 of SDLCR 901 comprising an electrode arrangement 904 of FIG. 15A and TABLES 9-10 in wide-angle state; and FIG. 15D is a schematic graph illustrating a profile 430 of diffracted luminance into diffractive orders for the embodiment of FIG. 15C. Features of the embodiments of FIGS. 15A-D not discussed in further detail may be assumed to correspond to the features with equivalent reference numerals as discussed above, including any potential variations in the features.

TABLE 9

| Item | Property | Illustrative embodiment |
|---|---|---|
| SDLCR 901 | Electrode 902AA, 902BA, | Pitch, p | 10 µm |
| | | Width, w | 3 µm |
| | | Offset, δ | 4.5 µm |
| | Surface alignment layer 917A | Type | Homogeneous |
| | | In-plane alignment direction 927Ap angle $\theta_A$ | 90° |
| | | Pretilt angle | 2° |
| | Surface alignment layer 917B | Type | Homogeneous |
| | | In-plane alignment direction 927Bp angle $\theta_B$ | 270° |
| | | Pretilt angle | 2° |
| | LC layer 914 | Retardance | 750 nm |

TABLE 10

| Item | Wide-angle state | Narrow-angle states | Intermediate state |
|---|---|---|---|
| $V_{AA}$ | −5 V | +2.6 V | 0 V |
| $V_{BA}$ | +5 V | +2.6 V | 0 V |
| $V_{CA}$ | 0 V | +2.6 V | 0 V |
| $V_{AB}$ | 5 V | 0 V | 0 V |
| $V_{BB}$ | −1 V | 0 V | 0 V |
| $V_{CB}$ | 0 V | 0 V | 0 V |

By way of comparison with FIG. 14B, the alternative embodiment of FIG. 15A illustrates an offset δ provides field lines 907 that are inclined through the thickness of the layer 914 of liquid crystal material 915 and can provide an asymmetric structure 965 of liquid crystal material 915 orientations.

Such an arrangement may provide a diffraction pattern that is asymmetric and may be controlled by appropriate drive of respective interdigitated electrodes 902AA, 902BA, 902AB, 902BB. Such asymmetric diffraction pattern may provide a wide-angle mode that has increased luminance biased to one side of the display device 100. Such an arrangement may be used to provide increased luminance to driver 47 in a passenger infotainment display device 100 such as illustrated in FIG. 31A-B hereinbelow.

FIG. 15B illustrates a uniform alignment may be achieved over the area 103 of the layer 914 of liquid crystal material 915 to provide intermediate state without an applied voltage due to the homeotropic alignment. In the narrow-angle state, voltage $V_{CA-CB}$ is applied to provide some out-of-plane alignment of the structure 965. Alternatively the control electrodes 902CA, 902CB may be omitted and the separated electrodes 902AA, 902BA are sufficiently close to be capable of driving the layer 914 of liquid crystal material 915 in to the narrow-angle state by application of a common voltage thereto. Advantageously power consumption, cost and complexity may be reduced.

FIG. 15C illustrates the asymmetric wide-angle state the structure 965 of liquid crystal material 915 orientations that achieves asymmetric diffraction profile 430 of FIG. 15D and which may be tuned by adjusting the drive voltages.

Further arrangements of display device 100 comprising the SDVACRA 900 will now be described. It may be desirable to increase the security factor of the display device 100 in narrow-angle state.

Figure 16A:
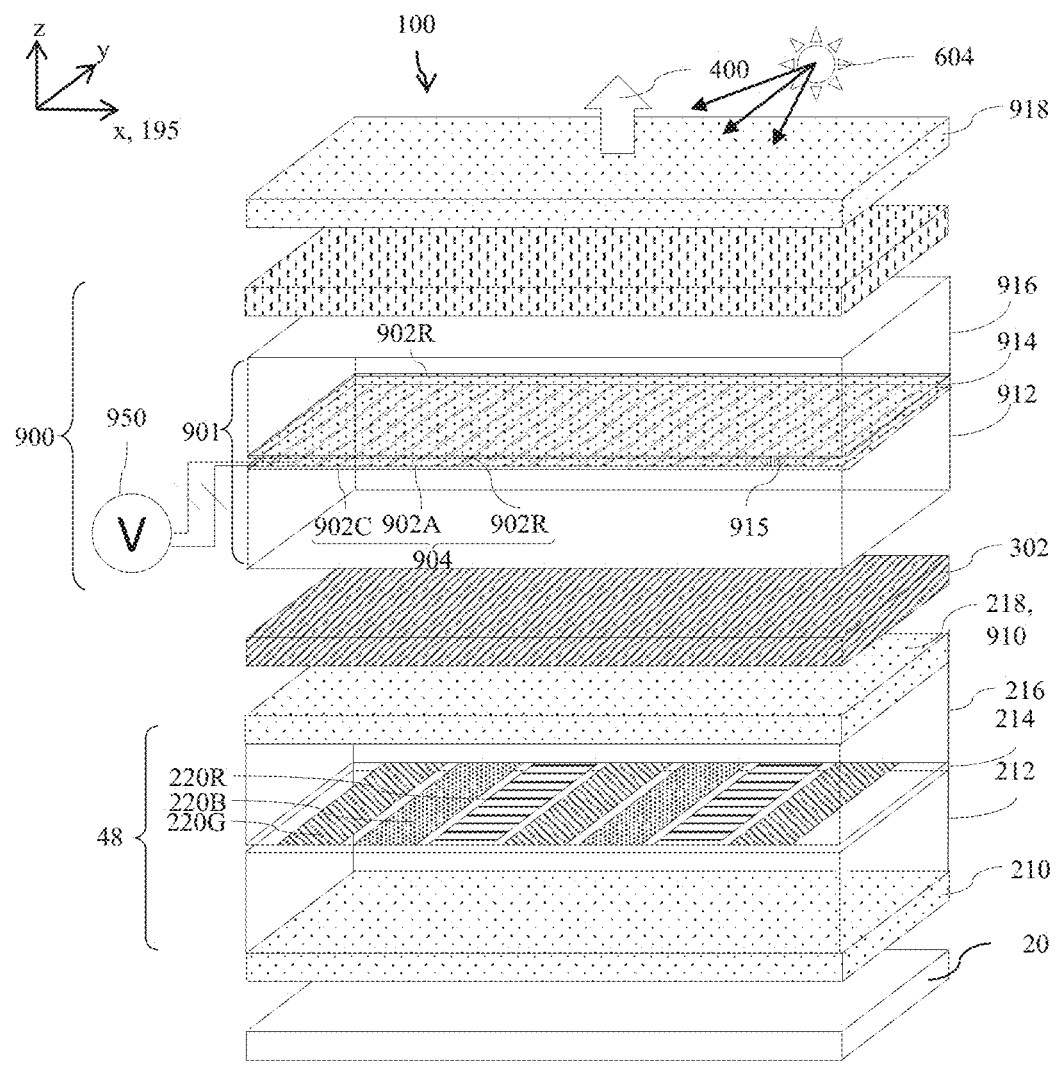
FIG. 16A is a schematic diagram illustrating in perspective side view a switchable display device comprising a collimated backlight, a SLM, a reflective polariser, a SDVACRA and an additional polariser.

FIG. 16A is a schematic diagram illustrating in perspective side view a switchable display device 100 comprising a backlight 20, a SLM 48, a reflective polariser 302, a SDVA-CRA 900 and an additional polariser 918. Features of the embodiment of FIG. 16A not discussed in further detail may be assumed to correspond to the features with equivalent reference numerals as discussed above, including any potential variations in the features.

In comparison to FIG. 1A, in the alternative embodiment of FIG. 16A the display polariser 910 is an output display polariser 218 arranged on the output side of the SLM 48. The SDVACRA 900 and an additional polariser 918 of FIG. 16A are arranged to receive light from the SLM 48. The embodiment of FIG. 16A further comprises a reflective polariser 302 arranged between the output polariser 218 and the SDVACRA 900, the reflective polariser 302 being a linear polariser with electric vector transmission direction 303 arranged to pass the same linearly polarised polarisation state as the output polariser 218. The reflective polariser 302 may alternatively be omitted.

The operation in narrow-angle state of the arrangement of FIG. 16A is further illustrated in FIGS. 39A-B hereinbelow. Advantageously increased security factor may be achieved along the inclined axis 447.

In the wide-angle state, light from the backlight 20 and SLM 48 is diffused by the SDVACRA 900 to improve visibility to the inclined axis 447 and high transmission is achieved, for example as illustrated in FIG. 40A. The thickness of the substrates 216, 912 and polarisers 218, 302 may be minimised to achieve reduced visibility of blurring of pixels 220. In wide-angle state, the off-axis reflectivity may be reduced such as illustrated in FIG. 40B.

It may be desirable to provide a display device 100 comprising an emissive SLM 48.

Figure 16B:
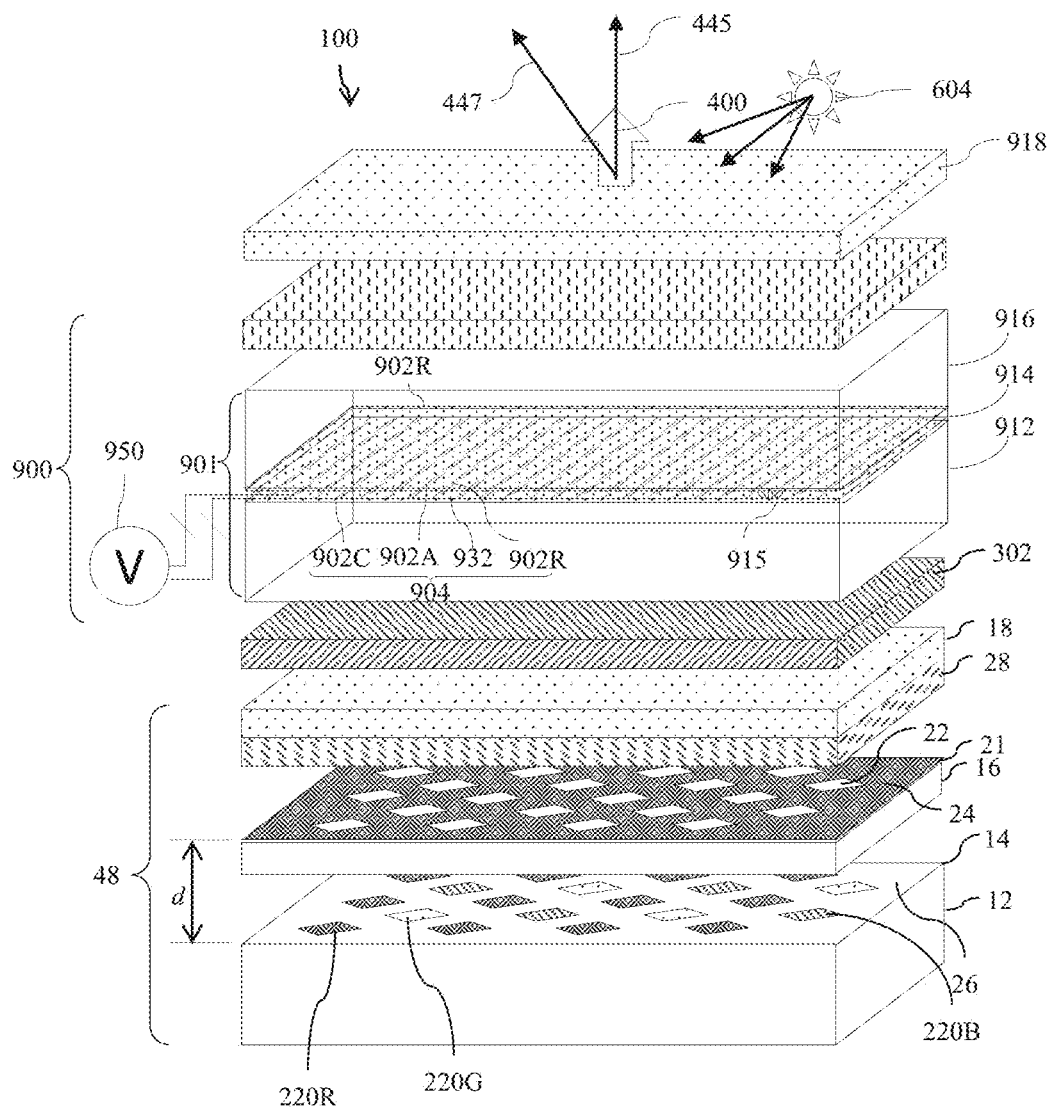
FIG. 16B is a schematic diagram illustrating in perspective side view a switchable display device comprising an emissive SLM; an aperture array; a display polariser; a reflective polariser, a SDVACRA and an additional polariser.

FIG. 16B is a schematic diagram illustrating in perspective side view a switchable display device 100 comprising an emissive SLM 48; an aperture array 750; a display polariser 910; a reflective polariser 302, a SDVACRA 900 and an additional polariser 918. Features of the embodiment of FIG. 16B not discussed in further detail may be assumed to correspond to the features with equivalent reference numerals as discussed above, including any potential variations in the features.

In the alternative embodiment of FIG. 16B, the SLM 48 comprises an emissive SLM 48. The emissive SLM 48 comprises an array of red, green and blue pixels 220R, 220G, 220B arranged in a pixel layer 14 on backplane substrate 12. The pixels are arranged to output light 400 along an output direction. The pixels 220R, 220G, 220B comprise light emitting diodes that are organic light emitting diodes comprising an organic light emitting material 32. The regions 26 between the pixels 220R, 220G, 220B comprises control electronics and are typically reflective for organic light emitting diode (OLED) pixel layers 214. Alternatively, the pixels 220R, 220G, 220B may comprise inorganic microLEDs or a combination of OLEDs and inorganic microLEDs.

Parallax barrier 21 comprises an array of apertures 22 with a light absorbing region 24 between the apertures 22. The parallax barrier 21 is a two dimensional array of apertures 22, each pixel 220R, 220G, 220B being aligned with a respective aperture. The parallax barrier 21 is arranged on a spacer layer 26 that provides a separation from the pixel layer 14 with a parallax distance d along an axis 199 along a normal to the plane of the pixel layer 14. The operation of the SLM 48 of FIG. 16B is described further in U.S. Pat. No. 11,573,437, which is herein incorporated by reference in its entirety.

An output display polariser 218, 910 is arranged on the output of the SLM 48, the output polariser 218 being a linear polariser with an electric vector transmission direction 219. A reflection control quarter-wave retarder 228 with optical axis direction 29 is arranged between the output polariser 218 and SLM 48. The retarder 28 may be provided by a stretched birefringent film such as polycarbonate. Advantageously low-cost retarders 28 may be provided and visibility of reflections from the regions 26 may be reduced.

The parallax barrier 21 is arranged between the pixel layer 214 and the reflection control quarter-wave retarder 28. In other embodiments (not shown) the quarter-wave retarder 228 may be provided by α layer formed between the pixel layer 214 and the parallax barrier 21. Such retarders 28 may comprise cured reactive mesogen liquid crystal layers for example. Advantageously a retarder may be provided with thickness that is the same or less than the desirable thickness d as will be described further below.

In emissive displays, high luminance is typically provided at high polar angles. A typical emissive display such as an OLED display may for example provide luminance of greater than 25% of head-on luminance at a polar angle of 60 degrees. Micro-LED displays that comprise inorganic LEDs may have substantially Lambertian luminance output so luminance at 60 degrees may approach 100% of head-on luminance.

It would be desirable to provide a switchable display device 100 with high visual security in narrow-angle state at polar angles greater than 45 degrees and with high image visibility in wide-angle state at polar angles greater than 45 degrees. Desirably luminance along inclined axis 447 may be at least 2.5% and preferably at least 5% of luminance along viewing axis 445 for high image visibility in typical ambient lighting conditions. Desirably luminance along inclined axis 447 may be less than 1% and preferably less than 0.5% of luminance along viewing axis 445 for high image security in typical ambient lighting conditions.

The parallax barrier 21 may be arranged to provide an output luminance profile that has a peak luminance along the viewing axis 445 and the luminance reduces for off-axis directions 447. In narrow-angle state, the security factor 447 in the off-axis direction may be increased. In wide-angle state, the visibility of the image on the pixels 220R, 220G, 220B of the SLM 48 is increased from viewing inclined axis 447. Advantageously improved wide-angle state may be achieved.

In the embodiments of FIGS. 16A-B one or both of transparent substrates 216 (if present) and 912 may be thin substrates such as thinned glass. Further polarisers 218, 302 and respective adhesive layers may be arranged with small thickness. The separation of the layer 914 to the layer 214 may be reduced. Advantageously blurring of pixels 220 from light dispersion in the lateral direction 195 in wide-angle state may be reduced.

Figure 16C:
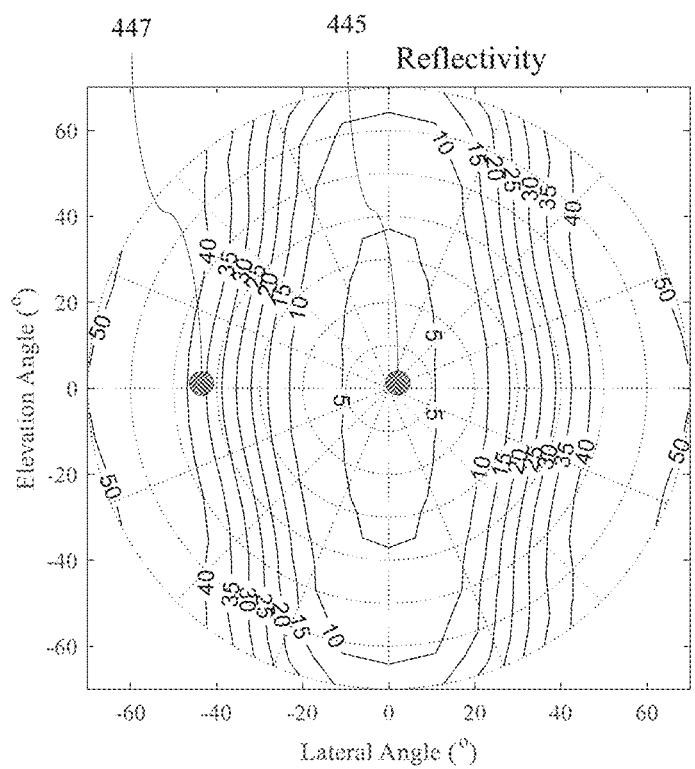
FIG. 16C is a schematic graph illustrating the polar variation of reflectivity for the illustrative SDVACRA of FIG. 16A and TABLE 2 operating in narrow-angle state.
Figure 16D:
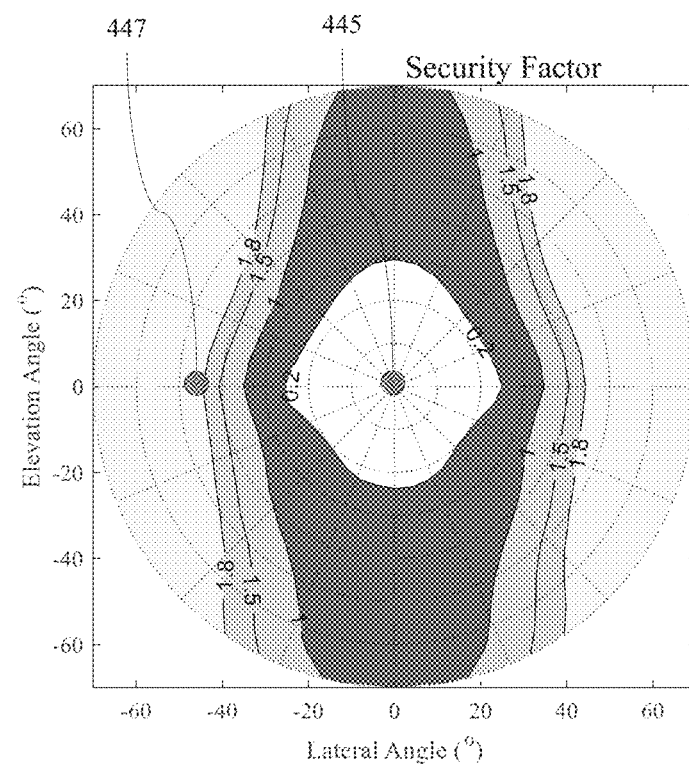
FIG. 16D is a schematic graph illustrating the profile of security factor, S for the illustrative backlight of FIG. 8A, SDVACRA of TABLE 2, and profiles FIG. 8B and FIG. 16C operating in narrow-angle state.

FIG. 16C is a schematic graph illustrating the polar variation of reflectivity for the illustrative SDVACRA 900 of FIG. 16A and TABLE 2 operating in narrow-angle state; and FIG. 16D is a schematic graph illustrating the profile of security factor. S for the illustrative backlight of FIG. 8A, SDVACRA 900 of TABLE 2, and profiles FIG. 8B and FIG. 16C operating in narrow-angle state. Features of the embodiments of FIGS. 16C-D not discussed in further detail may be assumed to correspond to the features with equivalent reference numerals as discussed above, including any potential variations in the features.

By way of comparison with FIG. 8E, FIG. 16D illustrates that the size of the region over which desirable security factor (S>1) is achieved is advantageously increased.

Various alternative stacks 104 of optical components comprising the SDVACRA 900 of FIG. 1A will now be illustrated.

FIGS. 17A-E are schematic diagrams illustrating side views of alternative optical stack 104 arrangements for a switchable display device 100 comprising the SDVACRA 900 of FIG. 1A. Features of the embodiments of FIGS. 17A-E not discussed in further detail may be assumed to correspond to the features with equivalent reference numerals as discussed above, including any potential variations in the features.

In the alternative embodiments of FIGS. 17A-E, the various stacks provide different levels of security factor, frontal reflections from electrodes and transmissive or emissive displays. The SDVACRA 900 may be arranged to achieve desirable characteristics for display device 100 performance.

Alternative arrangements of switchable display devices 100 comprising a further switchable liquid crystal retarder will now be described.

It may be desirable to provide increased diffusion in the wide-angle state.

Figure 18A:
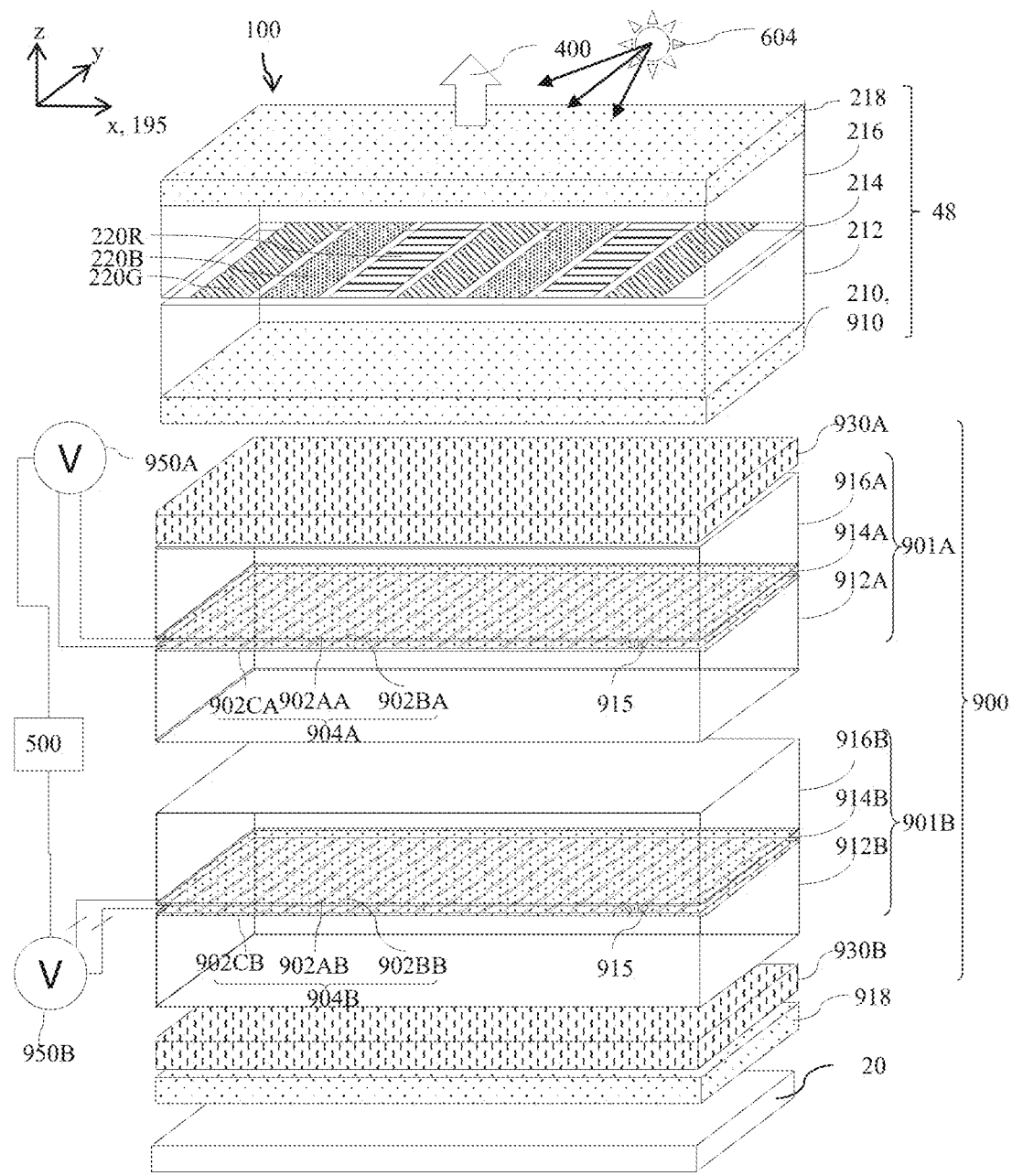
FIG. 18A is a schematic diagram illustrating in perspective side view a switchable display device comprising a SDVACRA comprising a SDLCR and a further retarder comprising a further SDLCR.

FIG. 18A is a schematic diagram illustrating in perspective side view a switchable display device comprising a SDVACRA 900 comprising a SDLCR 901A and a further retarder comprising a further SDLCR 901B. Features of the embodiment of FIG. 18A not discussed in further detail may be assumed to correspond to the features with equivalent reference numerals as discussed above, including any potential variations in the features.

In the alternative embodiment of FIG. 18A, the SDVACRA 900 comprises SDLCR 901A and further comprises a further SDLCR 901B comprising a layer 914B of liquid crystal material 915B and α further transmissive electrode arrangement 904B arranged to drive the layer 914B of liquid crystal material 915B of the further SDLCR 901B.

In the alternative embodiment of FIG. 18A the display device 100 may be arranged wherein the SDVACRA 900 further comprises a further switchable liquid crystal retarder that is a SDLCR 901B comprising a layer 914B of liquid crystal material 915B and a further transmissive electrode arrangement 904B arranged to drive the layer 914B of liquid crystal material 915B of the further switchable liquid crystal retarder (SDLCR 901B), wherein the further transmissive electrode arrangement 904B is capable of driving the layer 914B of liquid crystal material 915B of the further switchable liquid crystal retarder selectively into: a narrow-angle state in which the layer 914B of liquid crystal material 915B has a structure 965B of orientations which causes the further switchable liquid crystal retarder to introduce net relative phase shifts to the orthogonal polarisation components 997, 999 of the light having the predetermined polarisation state 909 that vary along the viewing axis 445 and the inclined axis 447; and a wide-angle state in which the layer 914B of liquid crystal material 915B has a structure 965B of orientations which causes the further switchable liquid crystal retarder to introduce net relative phase shifts to the orthogonal polarisation components 997, 999 of the light having the predetermined polarisation state 909 that are the same along the viewing axis 445 and the inclined axis 447.

The further switchable liquid crystal retarder that is SDLCR 901B in FIG. 18A is thus capable of switching between a narrow-angle state with reduced transmission along the inclined axis and a wide-angle state wherein the transmission along the inclined axis is similar to or the same as the transmission along the viewing axis.

Further, the further switchable liquid crystal retarder is a SDLCR 901B, wherein: in the narrow-angle state, the layer 914B of liquid crystal material 915B has a structure 965B of orientations which causes the layer 914B of liquid crystal material 915B to introduce net phase shifts to the light having the predetermined polarisation state 909 that are uniform across an area 103 of the layer 914B of liquid crystal material 915B and thereby cause the layer 914B of liquid crystal material 915 to provide no diffractive effect to the light having the predetermined polarisation state 909; and in the wide-angle state, the layer 914B of liquid crystal material 915 has a structure 965B of orientations which causes the layer 914B of liquid crystal material 915B to introduce net phase shifts to the light having the predetermined polarisation state 909 that vary spatially across the area 103 of the layer 914 of liquid crystal material 915B and thereby cause the layer of liquid crystal material to provide a diffractive effect to the light having the predetermined polarisation state. The further switchable liquid crystal retarder may provide switching between no light dispersion for a narrow-angle state and light diffraction for a wide-angle state.

Driver 950A and driver 950B may be controlled by control system 500 to switch the display device 100 between narrow-angle and wide-angle states.

By way of comparison with the embodiment of FIG. 1A, light dispersion in the wide-angle mode of operation may be increased. Visibility of image data along the inclined axis 447 may be advantageously improved. The total retardance of the layers 914, 314 may be increased. The angle φ between the viewing axis 445 and inclined axis 447 for high security factor may be reduced.

Embodiments with a SNDLCR 301 will now be described.

Figure 18B:
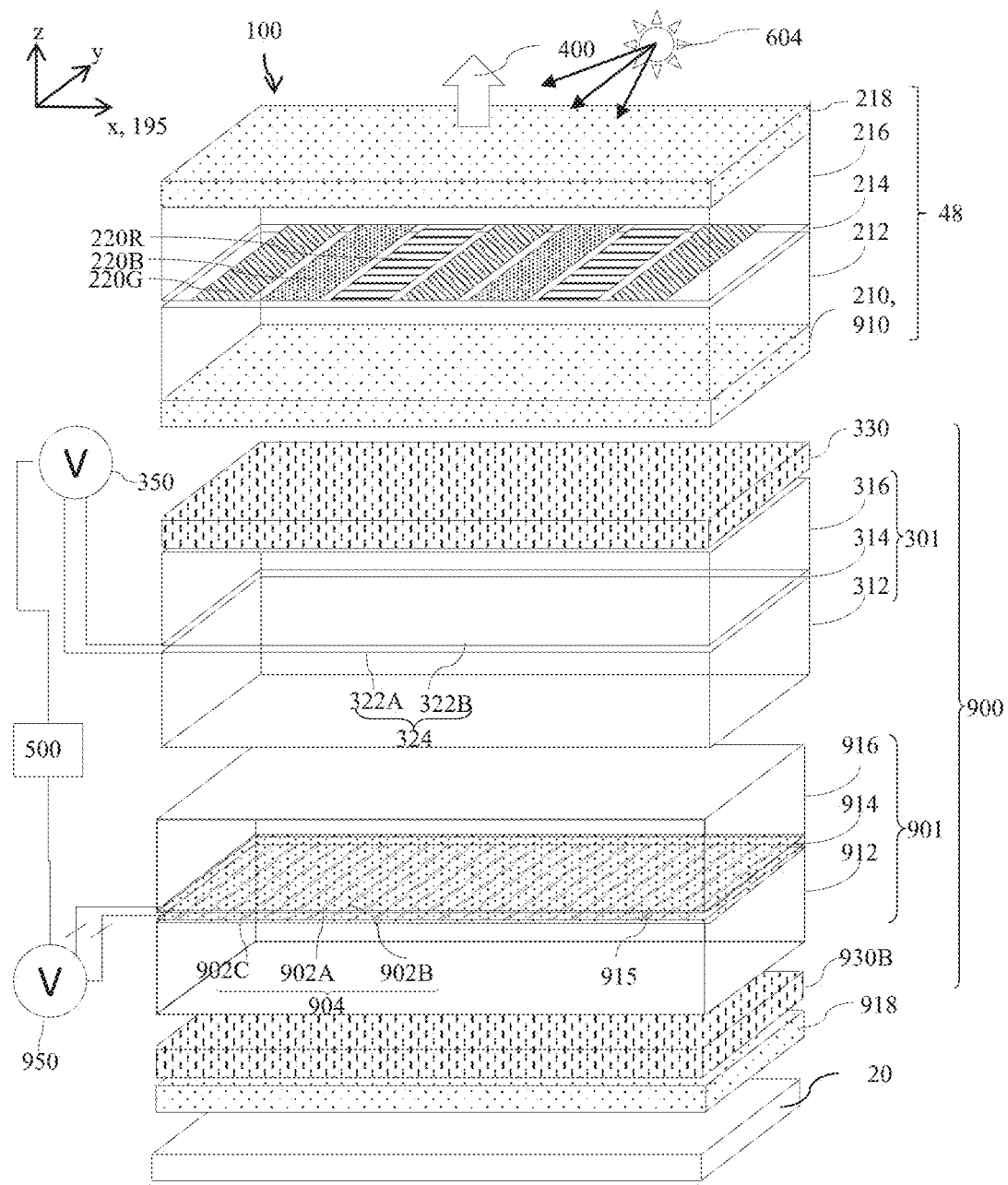
FIG. 18B is a schematic diagram illustrating in perspective side view a switchable display device comprising a SDVACRA comprising a SDLCR and a further retarder comprising a switchable non-diffractive liquid crystal retarder (SNDLCR)

FIG. 18B is a schematic diagram illustrating in perspective side view a switchable display device comprising a SDVACRA 900 comprising a SDLCR 901 and a further retarder comprising α SNDLCR 301. Features of the embodiment of FIG. 18A not discussed in further detail may be assumed to correspond to the features with equivalent reference numerals as discussed above, including any potential variations in the features.

In the alternative embodiment of FIG. 18B the SDVACRA 900 comprises a SDLCR 901 and may further comprise a further retarder that is a SNDLCR 301 comprising a layer 314 of liquid crystal material 315 and a further transmissive electrode arrangement 324 arranged to drive the layer 314 of liquid crystal material 315 of the further SNDLCR 301, wherein the further transmissive electrode arrangement 324 is capable of driving the layer 314 of liquid crystal material 315 of the further SNDLCR 301 selectively into: a narrow-angle state in which the layer 314B of liquid crystal material 315B has a structure 365B of orientations which causes the further switchable liquid crystal retarder to introduce net relative phase shifts to the orthogonal polarisation components 997, 999 of the light having the predetermined polarisation state 909 that vary along the viewing axis 445 and the inclined axis 447; and a wide-angle state in which the layer 314B of liquid crystal material 315B has a structure 365B of orientations which causes the further switchable liquid crystal retarder to introduce net relative phase shifts to the orthogonal polarisation components 997, 999 of the light having the predetermined polarisation state 909 that are the same along the viewing axis 445 and the inclined axis 447.

The further switchable liquid crystal retarder is a SNDLCR 301, wherein, in each of the narrow-angle state and the wide-angle state, the layer 314 of liquid crystal material 315 has a structure 365 of orientations which cause the layer 314 of liquid crystal material 315 to introduce net phase shifts to the light having the predetermined polarisation state 909 and thereby cause the layer 314 of liquid crystal material 315 to provide no diffractive effect to the light having the predetermined polarisation state. In comparison to the embodiment of FIG. 18A, residual diffraction in the narrow-angle state may be reduced. Improved security factor may be achieved along the inclined axis 447.

As will be described further hereinbelow, SNDLCR 301 comprises a layer 314 of liquid crystal material 315 and surface alignment layers 317A, 317B on opposing sides of the layer 314 of liquid crystal material 315; and a transmissive electrode arrangement 324 comprising uniform (not patterned) electrodes 322A, 322B on opposing sides of the layer 314 of liquid crystal material 315 and arranged to drive the layer 314 of liquid crystal material 315. Driver 350 and driver 950 may be controlled by control system 500 to switch the display device 100 between narrow-angle and wide-angle states.

By way of comparison with the embodiment of FIG. 18A, the total retardance of the layers 914, 314 may be increased. The angle φ between the viewing axis 445 and inclined axis 447 for high security factor may be reduced.

Figure 18C:
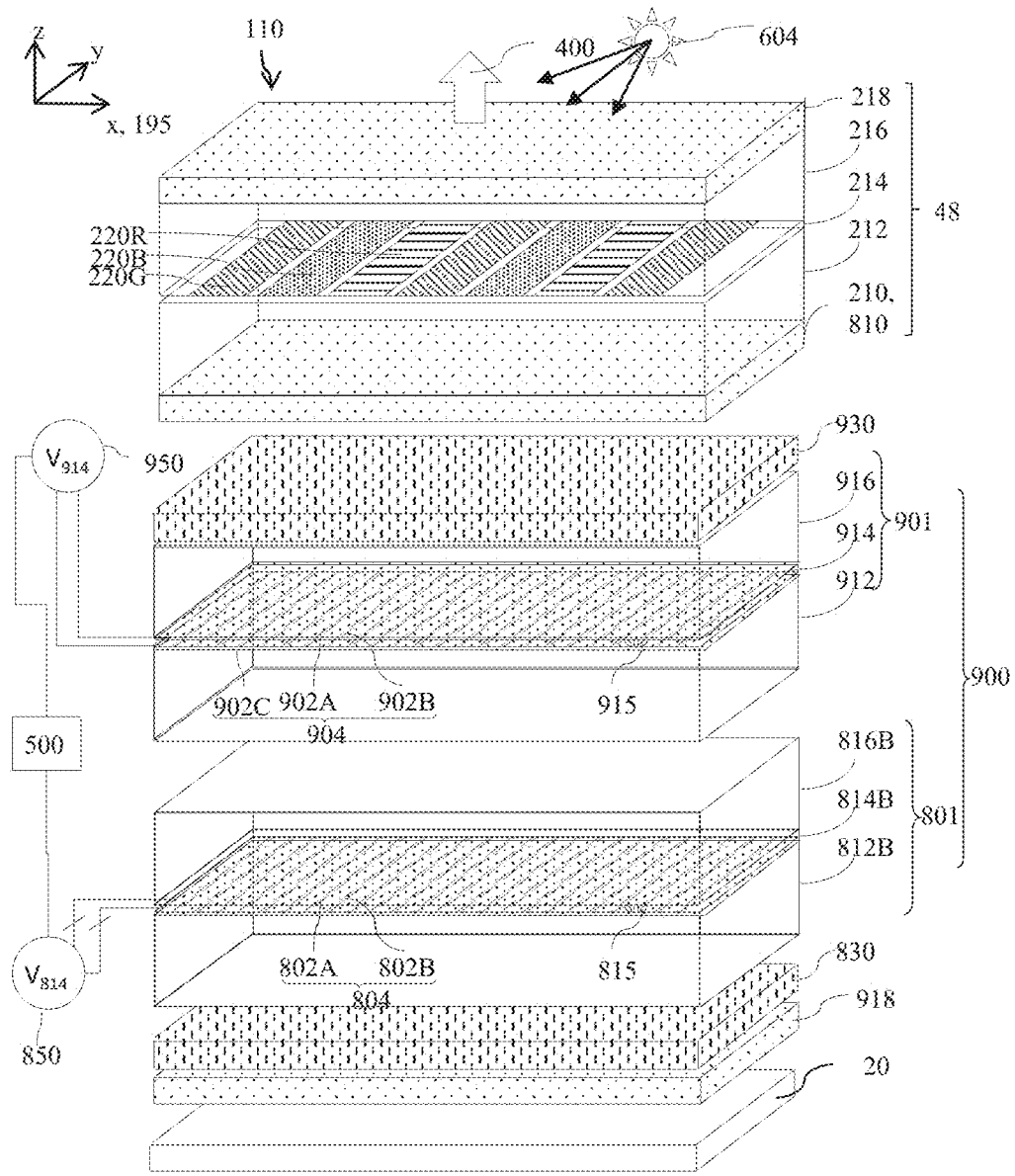
FIG. 18C is a schematic diagram illustrating in perspective side view a switchable display device comprising a backlight; an additional polariser; a switchable diffractive view angle control arrangement (SDVACA) arranged between the additional polariser and a display polariser; wherein the SDVACA comprises a switchable diffractive liquid crystal element (SDLCE) and a SDLCR.

FIG. 18C is a schematic diagram illustrating in perspective side view a switchable display device 110 comprising a backlight 20; an additional polariser 818; a SDVACA 800 arranged between the additional polariser 818 and a display polariser 210, 810; wherein the SDVACA 800 comprises a SDLCE 801 and a SDVACRA 900. Features of the embodiment of FIG. 18C not discussed in further detail may be assumed to correspond to the features with equivalent reference numerals as discussed above, including any potential variations in the features.

By way of comparison with FIG. 1A, the SDVACRA 900 further comprises a switchable diffractive liquid crystal element (SDLCE) 801 (as will be described further hereinbelow) comprising α layer 814 of liquid crystal material 815 and a further transmissive electrode arrangement 804 arranged to drive the layer 814 of liquid crystal material 815 of the SDLCE 801 wherein the further transmissive electrode arrangement 804 is patterned to be capable of driving the layer 814 of liquid crystal material 815 of the further SDLCR selectively into: a non-diffractive state in which the layer 814 of liquid crystal material 815 has a structure 865 of orientations which cause the layer 814 of liquid crystal material 815 to introduce net phase shifts to the light having the predetermined polarisation state that are uniform across an area of the layer 814 of liquid crystal material 815 and thereby cause the layer 814 of liquid crystal material 815 to provide no diffractive effect to the light having the predetermined polarisation state 909; and a wide-angle state in which the layer 814 of liquid crystal material 815 has a structure 865 of orientations which cause the layer 814 of liquid crystal material 815 to introduce net phase shifts to the light having the predetermined polarisation state 909 that vary spatially across the area 103 of the layer 814 of liquid crystal material 815 and thereby cause the layer 814 of liquid crystal material 815 to provide a diffractive effect to the light having the predetermined polarisation state.

By way of comparison with FIG. 18A, the alternative embodiment of FIG. 18C illustrates that the further switchable liquid crystal retarder may comprise a SDLCE 801 rather than a further SDLCR 901B. In operation in wide-angle state the SDVACRA 900 is arranged to provide further diffraction, increasing the spreading in the wide-angle mode but desirably does not significantly change the performance in narrow-angle state provided by the SDLCR 900. The SDLCE 801 may have reduced cost, complexity and power consumption in comparison to the further SDLCR 901B of FIG. 18A.

It may be desirable to increase security factor in narrow-angle state. Embodiments with a further additional polariser will now be described.

Figure 18D:
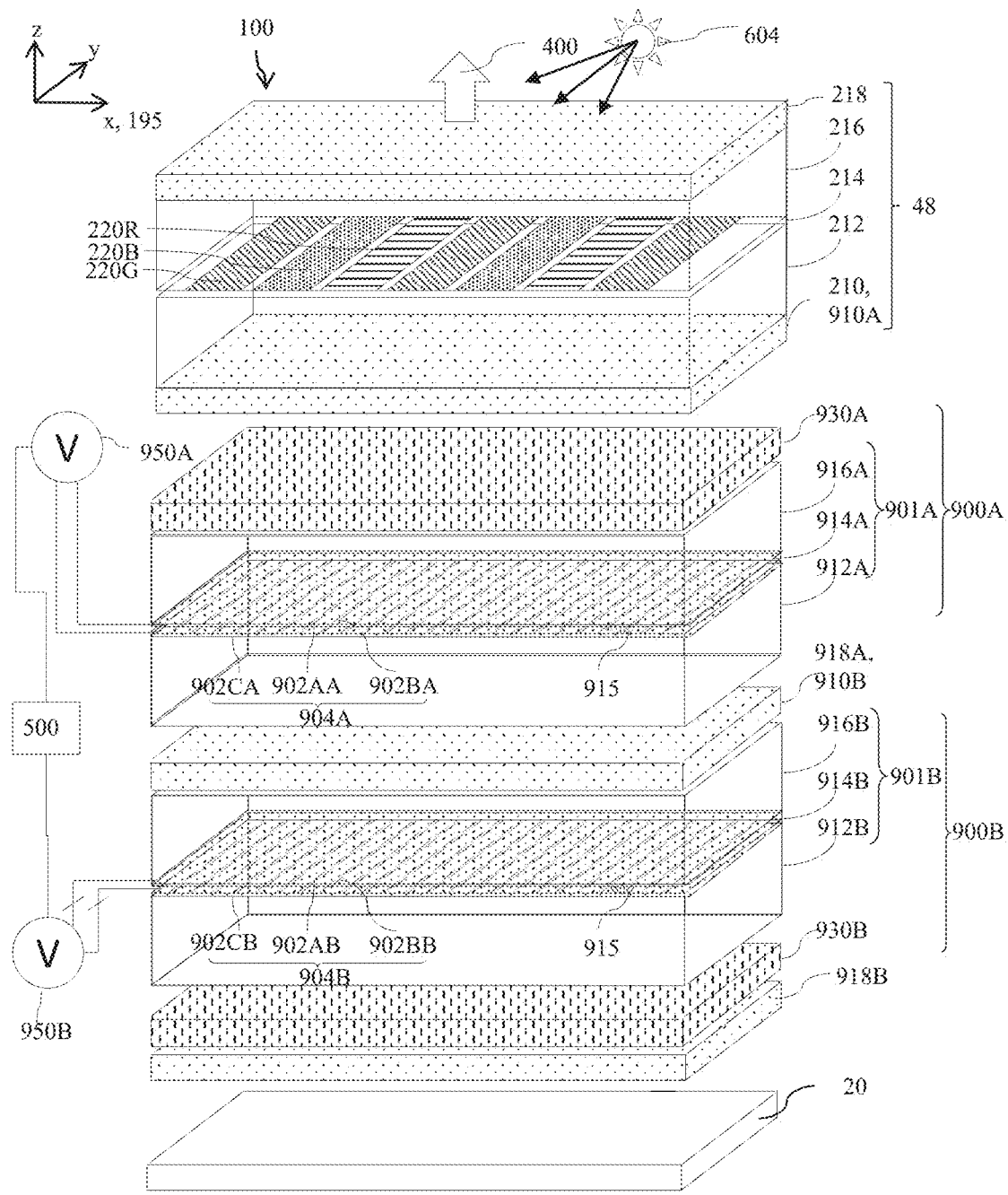
FIG. 18D is a schematic diagram illustrating in perspective side view a switchable display device comprising a display polariser, SDVACRA, additional polariser, further SDVACRA and a further additional polariser.

FIG. 18D is a schematic diagram illustrating in perspective side view a switchable display device 100 comprising a display polariser 210, SDVACRA 900A, additional polariser 918A, further SDVACRA 900B and a further additional polariser 918B. Features of the embodiment of FIG. 18D not discussed in further detail may be assumed to correspond to the features with equivalent reference numerals as discussed above, including any potential variations in the features.

Most generally, the display device 100 may comprise a further additional polariser 918B on the same side of the SLM 48 as the first-mentioned additional polariser 918A and arranged either a) between the display polariser 910 and the first-mentioned SDVACRA 900A or b) outside the first-mentioned additional polariser 918A, the further additional polariser 918B being a linear polariser; and a further switchable liquid crystal retarder arrangement that is arranged either a) between the further additional polariser 918B and the display polariser 910 in the case that the further additional polariser 918A is arranged between the display polariser 910 and the first-mentioned SDVACRA 900A or b) between the first additional polariser 918A and the further additional polariser 918B in the case that the further additional polariser 918B is arranged outside the first-mentioned additional polariser 918A.

The further switchable liquid crystal retarder arrangement comprises a further switchable liquid crystal retarder comprising a layer of liquid crystal material and a further transmissive electrode arrangement arranged to drive the layer of liquid crystal material of the further switchable liquid crystal retarder arrangement.

The further transmissive electrode arrangement is capable of driving the layer of liquid crystal material of the further switchable liquid crystal retarder selectively into: a narrow-angle state in which the layer of liquid crystal material has a structure of orientations which causes the further switchable liquid crystal retarder arrangement to introduce net relative phase shifts to the orthogonal polarisation components 997, 999 of the light having the predetermined polarisation state that vary along the viewing axis 445 and the inclined axis 447; and a wide-angle state in which the layer of liquid crystal material has a structure of orientations which causes the further switchable liquid crystal retarder to introduce net relative phase shifts to the orthogonal polarisation components 997, 999 of the light having the predetermined polarisation state 909 that are the same along the viewing axis 445 and the inclined axis 447.

In the alternative embodiment of FIG. 18D, display device 100 comprises additional polariser 918A and further comprises a further additional polariser 918B being a linear polariser on the same side of the SLM 48 as the first-mentioned additional polariser 918A. The further SDVACRA 900B is arranged between the additional polariser 918A and the further additional polariser 918B. The further SDVACRA 900B comprises a layer 914B of liquid crystal material 915B and a further transmissive electrode arrangement 904B arranged to drive the layer 914B of liquid crystal material 915B of the SDVACRA 900B, and the further transmissive electrode arrangement 904B is capable of driving the layer 914B of liquid crystal material of the SDVACRA 900B selectively into the narrow-angle state and the wide-angle state.

By way of comparison with FIG. 18A, in the narrow-angle state of operation, reduced luminance along the inclined axis 447 may be achieved, for example with the illustrative transmission profile of FIG. 8B, FIG. 9G or FIG. 10B advantageously achieving increased security factor S for viewers 47 along the inclined axis 447.

By way of comparison with FIG. 1A, in the wide-angle state the further SCVACRA 900B may achieve increased diffusion of light from the backlight 20. Increased luminance may be provided along the inclined axis 447 and advantageously image visibility achieved.

It may be desirable to provide increased reflectivity of the display device in narrow-angle state to increase security factor S.

Figure 18E:
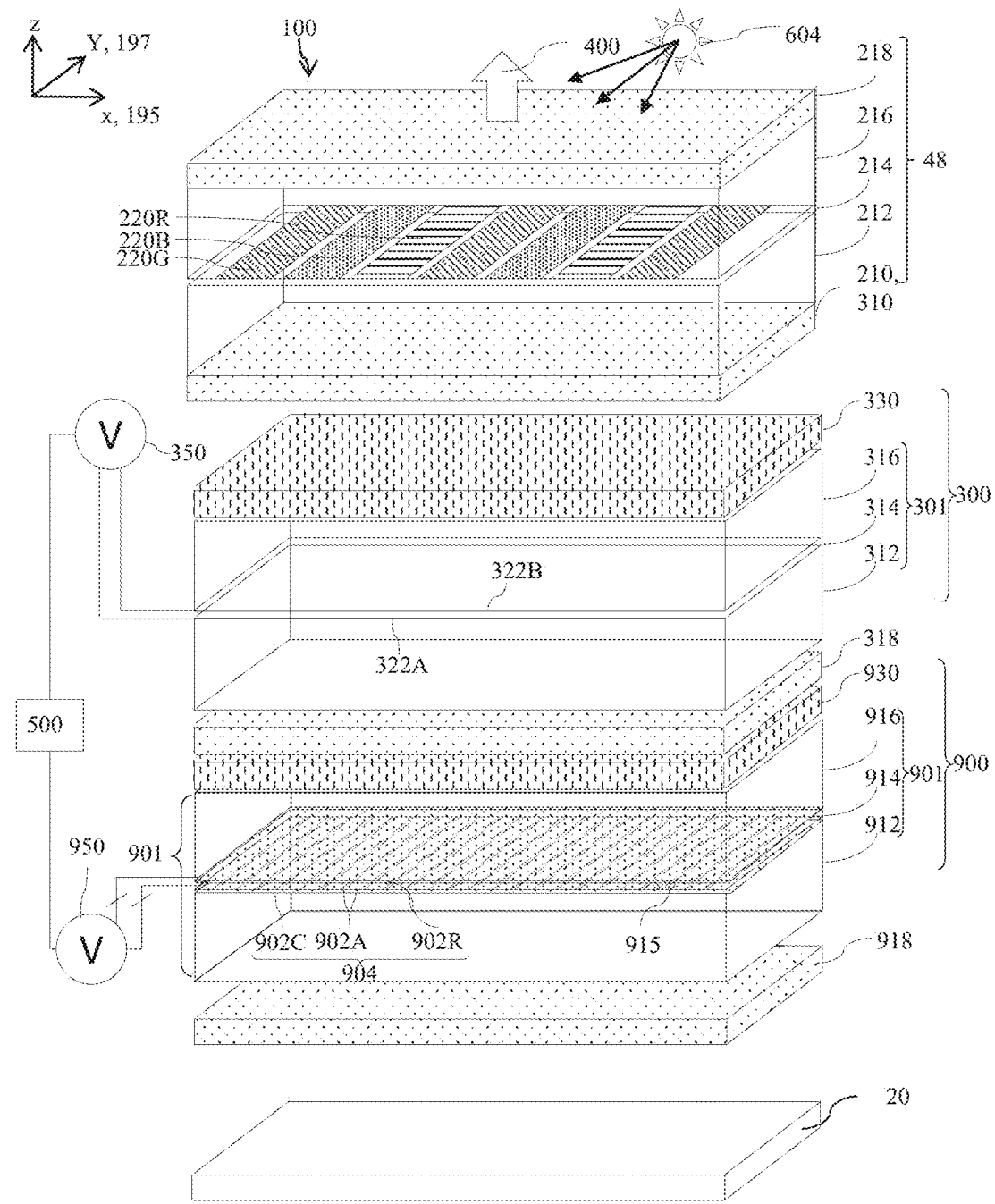
FIG. 18E is a schematic diagram illustrating in perspective side view a switchable display device comprising a display polariser, a SNDLCRA, a further additional polariser, a SDVACRA comprising a SDLCR and an additional polariser.

FIG. 18E is a schematic diagram illustrating in perspective side view a switchable display device 100 comprising a display polariser 210, a SNDLCRA 300, a further additional polariser 318, a SDVACRA 900 comprising a SDLCR 901 and an additional polariser 918. Features of the embodiment of FIG. 18E not discussed in further detail may be assumed to correspond to the features with equivalent reference numerals as discussed above, including any potential variations in the features.

In the alternative embodiment of FIG. 18E, display device 100 comprises SDVACRA 900 and additional polariser 918. The display device 100 further comprises a further additional polariser 318 on the same side of the SLM 48 as the first-mentioned additional polariser 918 and arranged between the display polariser 210 and the first-mentioned SNDLCRA 300, the further additional polariser 318 being a linear polariser; and a further switchable liquid crystal retarder arrangement that is a SNDLCRA 300 arranged between the first additional polariser 918A and the further additional polariser 318A wherein the further SNDLCRA 300 comprises a further switchable liquid crystal retarder that is SNDLCR 301 comprising a layer 314 of liquid crystal material 315 and a further transmissive electrode arrangement 304 arranged to drive the layer 314 of liquid crystal material 315 of the further SNDLCRA 300, and the further transmissive electrode arrangement 304 is capable of driving the layer 314 of liquid crystal material 315 of the further SNDLCRA 300 selectively into: a narrow-angle state in which the layer 314 of liquid crystal material 315 material has a structure 365 of orientations which causes the further switchable liquid crystal retarder arrangement that is SNDLCRA 900 to introduce net relative phase shifts to the orthogonal polarisation components 997, 999 of the light having the predetermined polarisation state 909 that vary along the viewing axis 445 and the inclined axis 447; and a wide-angle state in which the layer 314 of liquid crystal material 315 has a structure 365 of orientations which causes the further switchable liquid crystal retarder to introduce net relative phase shifts to the orthogonal polarisation components 997, 999 of the light having the predetermined polarisation state 909 that are the same along the viewing axis 445 and the inclined axis 447.

In alternative embodiments, not shown, the sequence of the SDVACRA 900 and SNDLCRA 300 may be reversed. More generally display device 100 comprises additional polariser 918 and further comprises: a further additional polariser 318 on the same side of the SLM 48 as the first-mentioned additional polariser 918 and arranged either a) between the display polariser 210 and the first-mentioned SDVACRA 900 or b) outside the first-mentioned additional polariser 918; and a further switchable liquid crystal retarder arrangement that is arranged either a) between the further additional polariser and the display polariser in the case that the further additional polariser is arranged between the display polariser and the first-mentioned SDVACRA 900 or b) between the first additional polariser 918 and the further additional polariser in the case that the further additional polariser is arranged outside the first-mentioned additional polariser 918, wherein the further switchable liquid crystal retarder arrangement comprises α layer of liquid crystal material and a further transmissive electrode arrangement arranged to drive the layer of liquid crystal material of the further switchable liquid crystal retarder, and the further transmissive electrode arrangement is capable of driving the layer of liquid crystal material of the further switchable liquid crystal retarder arrangement selectively into a narrow-angle state or a wide-angle state.

The SNDLCRA 300 comprises a SNDLCR 301 and further comprises a passive compensation retarder 330. In alternative embodiments such as for SNDLCR 301 comprising a twist the passive compensation retarder 330 may be omitted. SNDLCRA is arranged between display polariser 310 and further additional polariser 318. Driver 350 and driver 950 may be controlled by control system 500 to switch the display device 100 between narrow-angle and wide-angle states.

The SDVACRA 900 is arranged between the additional polariser 918 and a further additional polariser 318. The SNDLCRA 300 is arranged between the additional polariser 318 and display polariser 210. The separation of the SDLCRA from the pixel plane 214 is increased and Moiré advantageously reduced. In alternative embodiments, as illustrated in FIGS. 19A-E hereinbelow, the SDLCRA may be arranged between the additional polariser 918 and input display polariser 210, and the SNDLCRA may be arranged between the further additional polariser 318 and the additional polariser 918.

In the narrow-angle state of operation, the SNDLCRA 300 and respective polarisers 210, 318 of FIG. 18E may achieve reduced luminance along the inclined axis 447, for example with the illustrative transmission profile of FIG. 8B, FIG. 9G or FIG. 10B advantageously achieving increased security factor S for viewers 47 along the inclined axis 447.

It may be desirable to provide increased security factor in the narrow-angle state.

Figure 18F:
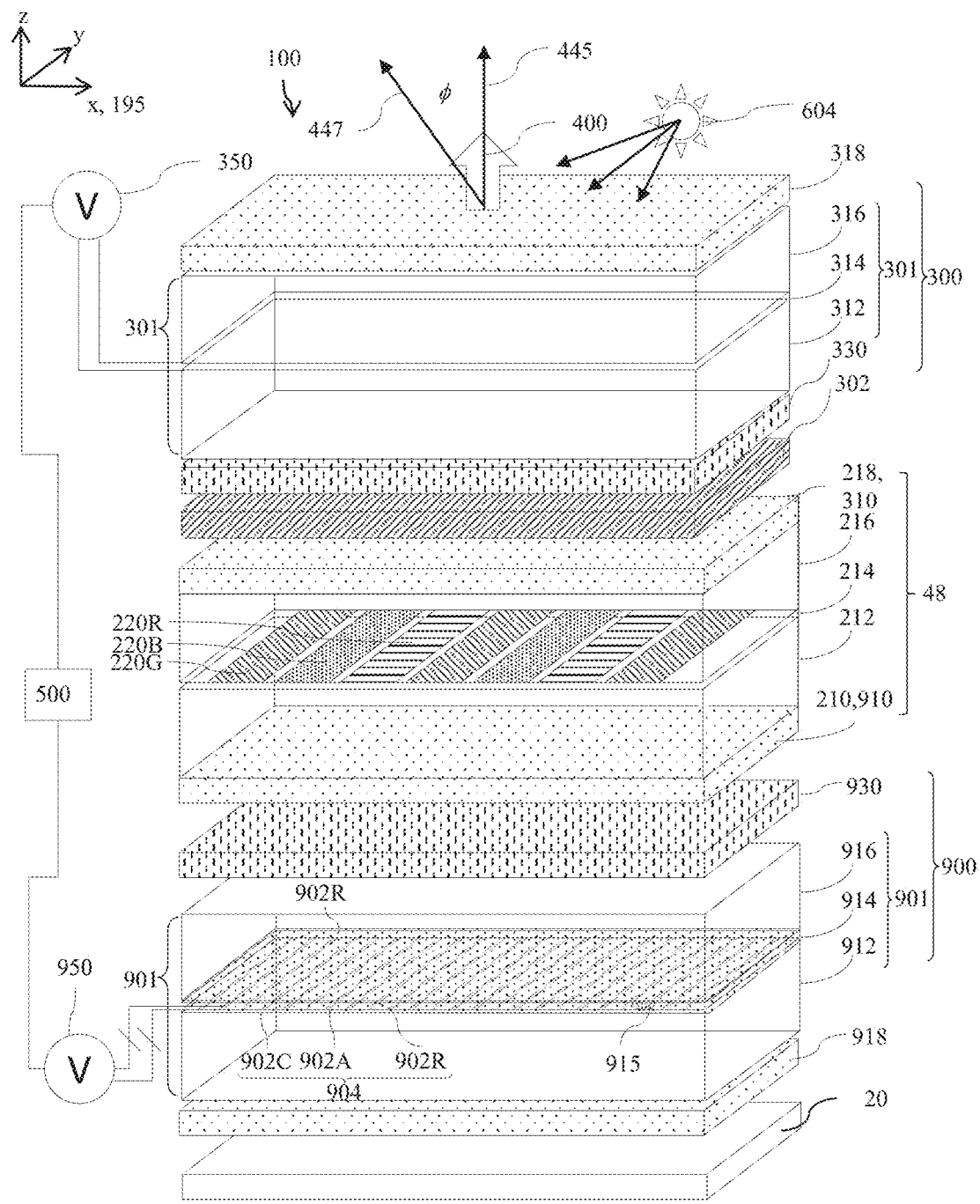
FIG. 18F is a schematic diagram illustrating in perspective side view a switchable display device comprising a backlight; additional polariser; a SDVACRA; a transmissive SLM, a reflective polariser, a SNDLCRA and a further additional polariser.

FIG. 18F is a schematic diagram illustrating in perspective side view a switchable display device 100 comprising a backlight 20; additional polariser 918; a SDVACRA 900; a transmissive SLM 48, a reflective polariser 302, a SNDLCRA 300 and a further additional polariser 318. Features of the embodiment of FIG. 18F not discussed in further detail may be assumed to correspond to the features with equivalent reference numerals as discussed above, including any potential variations in the features.

The display device 100 may further comprise a backlight 20 arranged to output light; the SLM 48 is a transmissive SLM 48 arranged to receive the output light from the backlight 20; the first-mentioned display polariser 910 is either a) an input polariser 210 or b) an output polariser 218; the display device 100 further comprises a further display polariser 310 that is either a) an output polariser 218 in the case that the first display polariser 910 is an input polariser 210, or b) an input polariser 210 in the case that the first display polariser 190 is an output polariser 218; the display device 100 further comprises a further additional polariser 318 arranged either a) on the output side of the output polariser 218 in the case that the first display polariser 910 is an input polariser 210, or b) between the input polariser 210 and the backlight 20 in the case that the first display polariser 910 is an output polariser 218; and the display device 100 further comprises a further switchable liquid crystal retarder arrangement that in FIG. 18F is SNDLCRA 300 that is arranged between the further additional polariser 318 and the further display polariser 310, wherein the further SNDLCRA 300 comprises a further SNDLCR 301 comprising a layer 314 of liquid crystal material 315 and a further transmissive electrode arrangement arranged to drive the layer 314 of liquid crystal material 315 of the further switchable liquid crystal retarder, and the further transmissive electrode arrangement is capable of driving the layer 314 of liquid crystal material 315 of the further SNDLCR 301 selectively into: a narrow-angle state in which the layer 314 of liquid crystal material 315 has a structure 365 of orientations which causes the further switchable liquid crystal retarder arrangement to introduce net relative phase shifts to the orthogonal polarisation components 997, 999 of the light having the predetermined polarisation state 909 that vary along the viewing axis 445 and the inclined axis 447; and a wide-angle state in which the layer 314 of liquid crystal material 315 has a structure 865 of orientations which causes the further switchable liquid crystal retarder arrangement to introduce net relative phase shifts to the orthogonal polarisation components 997, 999 of the light having the predetermined polarisation state 909 that are the same along the viewing axis 445 and the inclined axis 447.

In other words the display device further comprises a backlight arranged to output light; the SLM is a transmissive SLM arranged to receive the output light from the backlight; the first-mentioned display polariser is either a) an input polariser or b) an output polariser; the display device further comprises α further display polariser that is either a) an output polariser in the case that the first display polariser is an input polariser, or b) an input polariser in the case that the first display polariser is an output polariser; the display device further comprises a further additional polariser arranged either a) on the output side of the output polariser in the case that the first display polariser is an input polariser, or b) between the input polariser and the backlight in the case that the first display polariser is an output polariser; and the display device further comprises a further switchable liquid crystal retarder arrangement that is arranged between the further additional polariser and the further display polariser, wherein the further switchable liquid crystal retarder arrangement comprises a further switchable liquid crystal retarder comprising a layer of liquid crystal material and a further transmissive electrode arrangement arranged to drive the layer of liquid crystal material of the further switchable liquid crystal retarder, and the further transmissive electrode arrangement is capable of driving the layer of liquid crystal material of the further switchable liquid crystal retarder selectively into: a narrow-angle state in which the layer of liquid crystal material has a structure of orientations which causes the further switchable liquid crystal retarder arrangement to introduce net relative phase shifts to the orthogonal polarisation components of the light having the predetermined polarisation state that vary along the viewing axis and the inclined axis; and a wide-angle state in which the layer of liquid crystal material has a structure of orientations which causes the further switchable liquid crystal retarder arrangement to introduce net relative phase shifts to the orthogonal polarisation components of the light having the predetermined polarisation state that are the same along the viewing axis and the inclined axis.

By way of comparison with FIG. 18E, the alternative embodiment of FIG. 18F in narrow-angle state achieves increased security factor S in narrow-angle state arising from the reflective polariser 302, the operation of which is described in FIG. 39B hereinbelow. An illustrative reflectivity profile is given in FIG. 16C. By way of comparison with FIG. 16B, the embodiment of FIG. 18F in wide-angle state achieves reduced blurring of the pixels 220. Further, security factor S is increased.

Figure 18G:
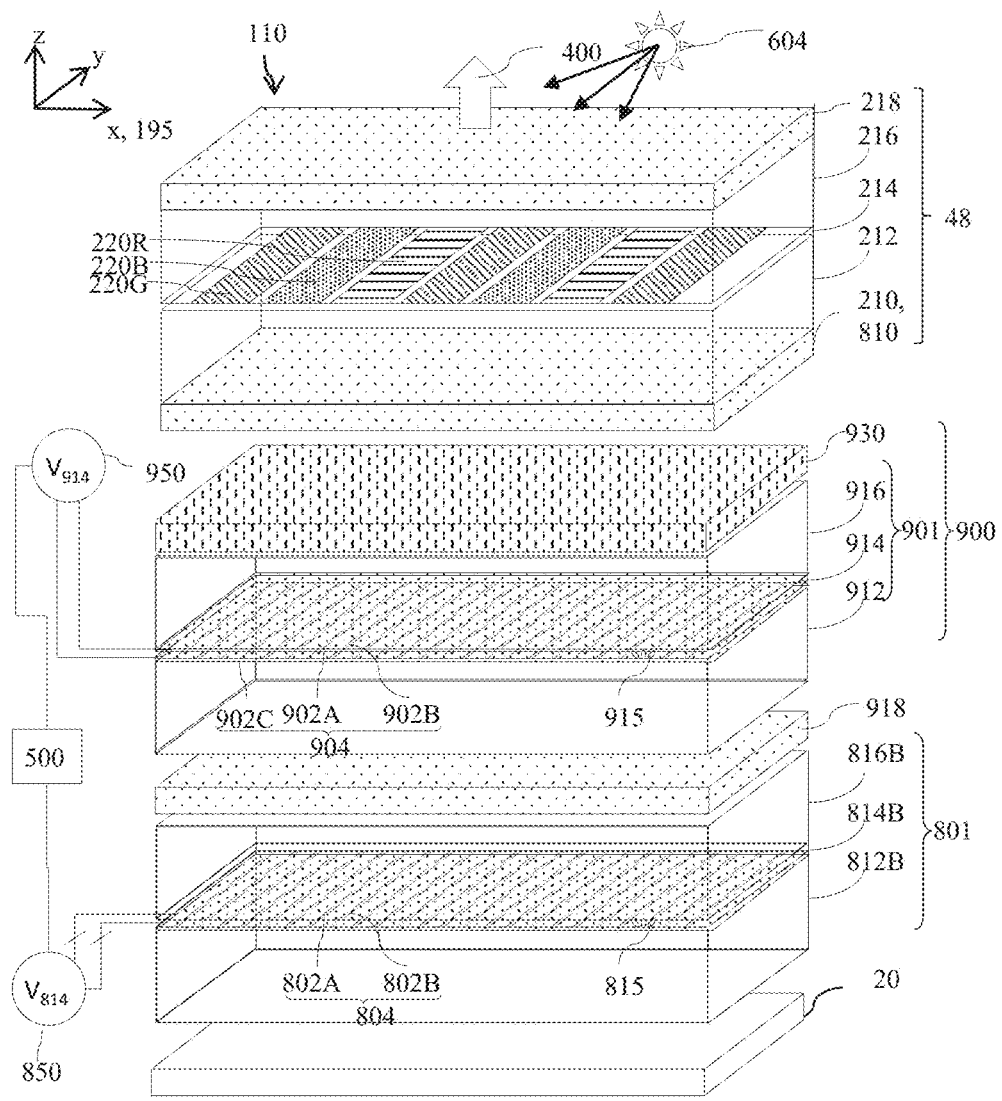
FIG. 18G is a schematic diagram illustrating in perspective side view a switchable display device comprising a backlight; a SDLCE; an additional polariser; a SDVACA arranged between the additional polariser and a display polariser; wherein the SDVACA comprises a SDLCR and a passive compensation retarder.
Figure 19A:
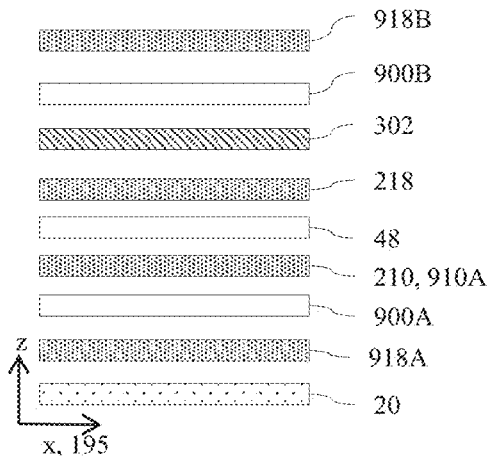
FIG. 19A, FIG. 19B, FIG. 19C, FIG. 19D, and FIG. 19E are schematic diagrams illustrating side views of alternative stacking arrangements for a switchable display device comprising at least one SDVACRA and a further switchable view angle control arrangement and a transmissive SLM and backlight.
Figure 19C:
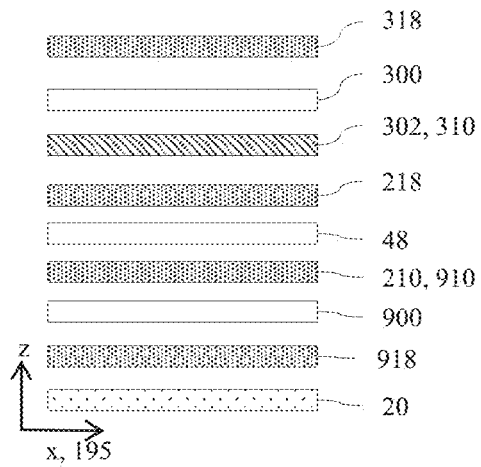
Figure 19B:
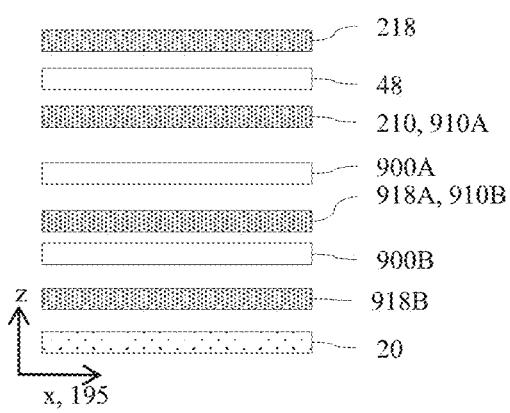
Figure 19D:
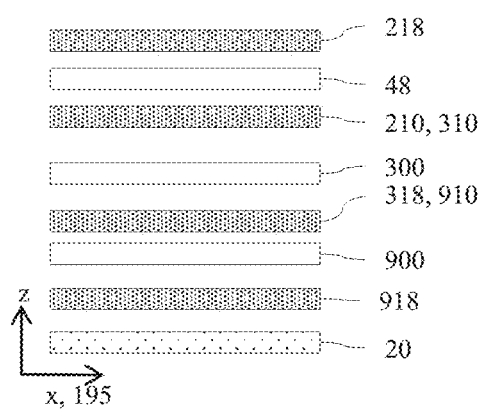
Figure 19E:
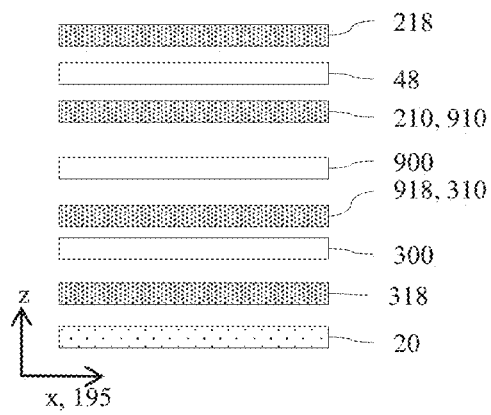

FIG. 18G is a schematic diagram illustrating in perspective side view a switchable display device 100 comprising a backlight 20; a SDLCE 801; an additional polariser 918; a SDLCRA 900 between the additional polariser 918 and a display polariser 210, 910; wherein the SDLCRA 900 comprises a SDLCR 901 and a passive compensation retarder 930. Features of the embodiment of FIG. 18G not discussed in further detail may be assumed to correspond to the features with equivalent reference numerals as discussed above, including any potential variations in the features.

In the alternative embodiment of FIG. 18G, the SDLCE 801 is arranged outside the additional polariser 918. As described hereinbelow, the SDLCE 801 is arranged to switch between a narrow-angle state and a wide-angle diffractive state. In comparison to the embodiment of FIG. 18C, stray light in narrow-angle mode may be reduced and security factor, S increased along the inclined axis 447.

Additional description and further non-exhaustive alternative arrangements of display device comprising SDVA-CRA 900 will now be described.

FIGS. 19A-E are schematic diagrams illustrating side views of alternative stacking arrangements for a switchable display device 100 comprising at least one SDVACRA 900 and a further switchable view angle control arrangement and a transmissive SLM 48 and backlight 20. Features of the embodiments of FIGS. 19A-E not discussed in further detail may be assumed to correspond to the features with equivalent reference numerals as discussed above, including any potential variations in the features.

The various alternative embodiments of at least FIG. 19A-E may be selected to achieve desirable properties of increased security factor, reduced image blur, increased wide-angle visibility, thickness and complexity to achieve desirable switchable display properties.

Alternative switchable display devices 110 will now be described.

Figure 20A:
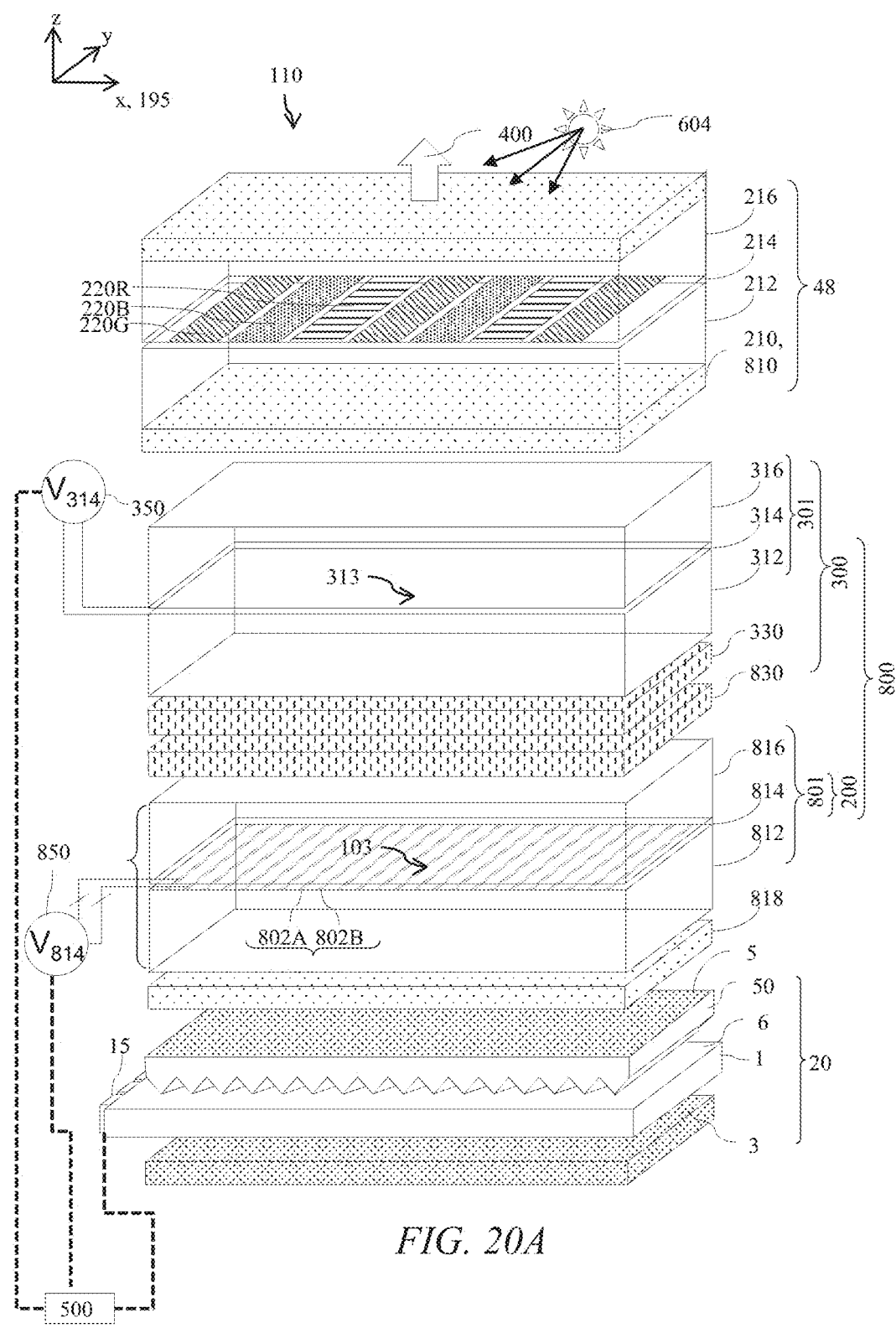
FIG. 20A is a schematic diagram illustrating in perspective side view a switchable display device comprising a backlight; an additional polariser; a SDVACA; and a SLM wherein the SDVACA is arranged between the additional polariser and a display polariser that is the input polariser of the SLM.
Figure 20B:
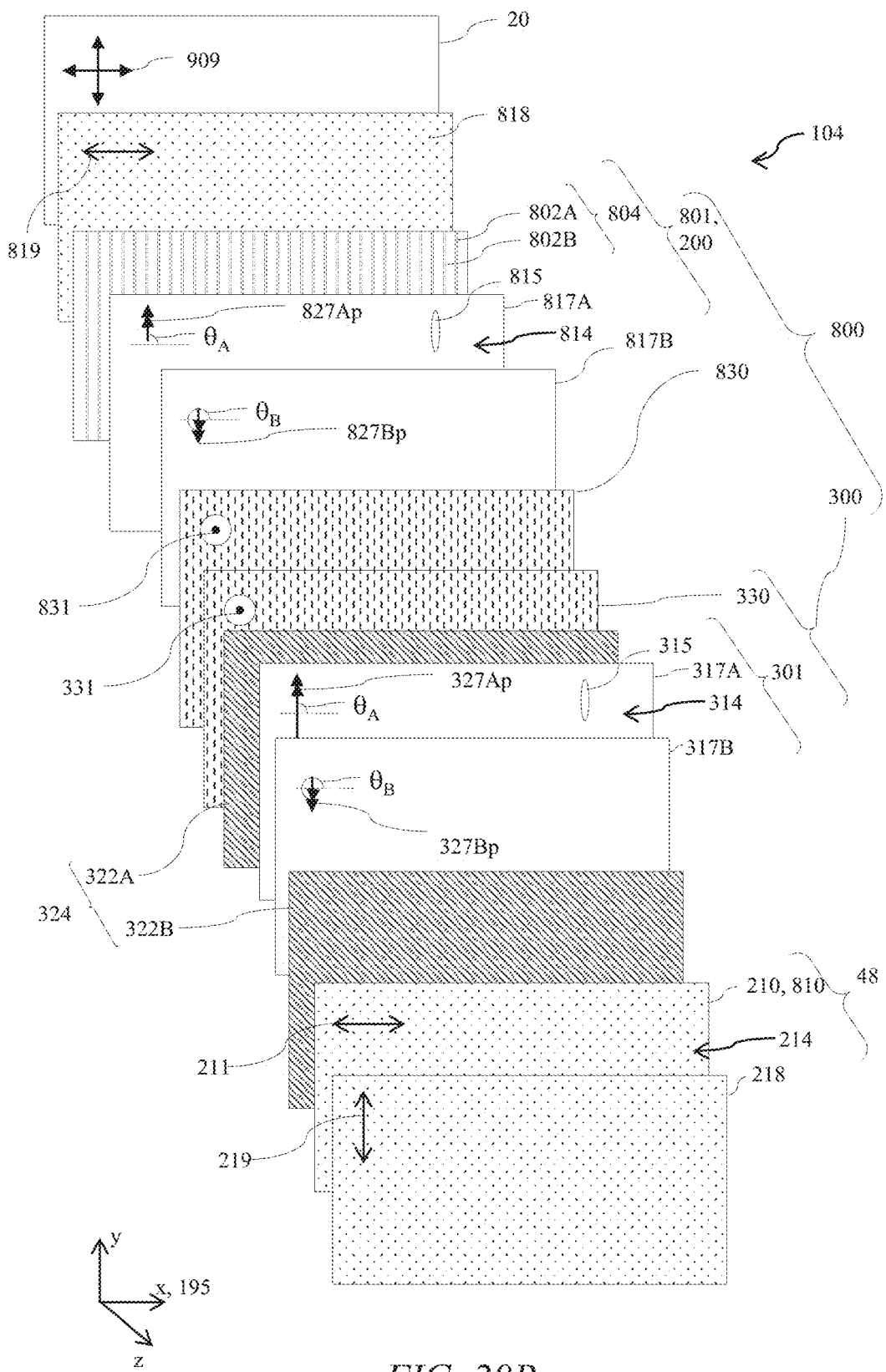
FIG. 20B is a schematic diagram illustrating in perspective front view alignment orientations for an optical stack for use in the embodiment of FIG. 20A.

FIG. 20A is a schematic diagram illustrating in perspective side view a switchable display device 110 comprising a backlight 20; an additional polariser 818; a switchable diffractive view angle control arrangement (SDVACA) 800; and a SLM 48 wherein the SDVACA 800 is arranged between the additional polariser 818 and a display polariser 810 that is the input polariser 210 of the SLM 48; and FIG. 20B is a schematic diagram illustrating in perspective front view alignment orientations for an optical stack 104 for use in the embodiment of FIG. 20A. Features of the embodiment of FIGS. 20A-B not discussed in further detail may be assumed to correspond to the features with equivalent reference numerals as discussed above, including any potential variations in the features.

By way of comparison with the embodiments described hereinabove, a display device 100 may alternatively comprise a SLM 48 arranged to output spatially modulated light; a display polariser 810 arranged on a side of the SLM 48, the display polariser 810 being a linear polariser; an additional polariser 818 arranged on the same side of the SLM 48 as the display polariser 810 outside the display polariser 810, the additional polariser 818 being a linear polariser; a SNDL-CRA 300 arranged between the additional polariser 818 and the display polariser 810, the SNDLCRA 300 comprising a SNDLCR 301 comprising a layer 314 of liquid crystal material 315 and a transmissive electrode arrangement 324 arranged to drive the layer 314 of liquid crystal material 315 selectively into: a narrow-angle state in which the layer 314 of liquid crystal material 315 causes the SNDLCRA 300 to introduce net relative phase shifts to orthogonal polarisation components 997, 999 of light having a predetermined polarisation state 909 that vary along a viewing axis 445 and an inclined axis 447 that is inclined to the viewing axis 445; and a wide-angle state in which the layer 314 of liquid crystal material 315 causes the SNDLCRA 300 to introduce net relative phase shifts to the orthogonal polarisation components 997, 999 of the light having the predetermined polarisation state 909 that are the same along the viewing axis 445 and the inclined axis 447; and a switchable light dispersion arrangement (SLDA) 200 arranged in series with the SLM 48, the display polariser 810, the additional polariser 818 and the SNDLCRA 300, wherein the SLDA 200 is switchable between a non-dispersive state not providing dispersion of light and a dispersive state providing dispersion of light.

The display device 110 comprises a SLM 48 arranged to output spatially modulated light; a display polariser 810 arranged on a side of the SLM 48, the display polariser 810 being a linear polariser; and an additional polariser 818 arranged on the same side of the SLM 48 as the display polariser 810 outside the display polariser 810, the additional polariser 818 being a linear polariser with electric vector transmission direction 819.

In the embodiment of FIGS. 20A-B, the display device 110 further comprises a backlight 20 arranged to output light 400, the SLM 48 is a transmissive SLM 48 arranged to receive the output light from the backlight 20, and the display polariser 810 is an input display polariser 210 arranged on the input side of the SLM 48.

The SDVACA 800 comprises a SNDLCRA 300 as described hereinabove and a SLDA 200 and is arranged between the additional polariser 818 and the display polariser 810 that is the input polariser 210 of the SLM 48.

The SLDA 200 is switchable between a non-dispersive state not providing dispersion of light and a dispersive state providing dispersion of light and the SLDA 200 is arranged between the display polariser 810 and the additional polariser 818.

In the present description light dispersion refers to the amount of dispersion, scattering, diffraction or refraction of an incident plane wave into multiple inclined plane waves. Switchable light dispersion refers to switching the amount of dispersion between the wide-angle state (with high dispersion) and the narrow-angle state (with low dispersion). By comparison, switchable retarders such as SNDLCR 301 reduce the transmission of the inclined axis 447 in comparison to the transmission in the viewing axis 445 in the narrow-angle state and maintain the transmission of the inclined axis 447 in comparison to the transmission in the viewing axis 445 in the narrow-angle state.

In the embodiment of FIGS. 20A-B the SLDA 200 comprises a SDLCE 801.

SDLCE 801 comprises: a layer 814 of liquid crystal material 815; and a transmissive electrode arrangement 804 arranged to drive the layer 814 of liquid crystal material 815 wherein the transmissive electrode arrangement 804 is patterned to be capable of driving the layer 814 of liquid crystal material 815 selectively into: a non-diffractive state corresponding to the non-dispersive state of the SLDA 200 in which the layer 814 of liquid crystal material 815 has a structure of orientations which causes the layer 814 of liquid crystal material 815 to introduce net phase shifts to the light having the predetermined polarisation state 909 that are uniform across the area of the layer 814 of liquid crystal material 815 and thereby cause the layer 814 of liquid crystal material 815 to provide no dispersion of the light having the predetermined polarisation state 909; and a diffractive state corresponding to the dispersive state of the SLDA 200 in which the layer 814 of liquid crystal material 815 has a structure of orientations which causes the layer 814 of liquid crystal material 815 to introduce net phase shifts to the light having the predetermined polarisation state 909 that vary spatially across the area of the layer 814 of liquid crystal material 815 and thereby cause the layer 814 of liquid crystal material 815 to provide the dispersion of light by a diffractive effect to the light having the predetermined polarisation state 909.

SDLCE 801 comprises transparent substrates 812, 816, the layer 814 of liquid crystal material 815 arranged there between; surface alignment layers 817A, 817B on opposing sides of the layer 814 of liquid crystal material 815; electrode arrangement 804 comprising interdigitated spatially separated electrodes 802A, 802B with gaps 832 and a driver 850. The surface alignment layers 817A, 817B are arranged to provide homeotropic alignment directions 827A, 827B at respective surfaces of the liquid crystal material 815. SDLCE 801 comprises a transmissive electrode arrangement 804 arranged to drive the layer 814 of liquid crystal material 815, wherein the transmissive electrode arrangement 804 is patterned to be capable of driving the layer 814 of liquid crystal material 815 into a structure 865 of orientations providing net relative phase shifts to provide wavefront net phase differences Γ(x) that vary spatially across an area 103 of the layer 814 of liquid crystal material 815 and to cause the layer 814 of liquid crystal material 815 to provide a diffractive effect.

SDLCE 801 provides dispersion of light by diffraction in the dispersive wide-angle state as will be described by way of illustrative embodiments hereinbelow. In the narrow-angle state, the SLDA 200 may provide some residual luminance modification between the axes 445, 447; however the primary function is light dispersion in the wide-angle state and reduced light dispersion in the narrow-angle state. A passive correction retarder 830 with optical axis direction 831 may be provided between the SLDCE 801 and the SNDLCRA 300 as will be described hereinbelow.

The SNDLCRA 300 comprises a SNDLCR 301 comprising: transparent substrates 312, 316; a layer 314 of liquid crystal material 315 and surface alignment layers 317A, 317B on opposing sides of the layer 314 of liquid crystal material 315; and a transmissive electrode arrangement 324 comprising electrodes 322A, 322B on opposing sides of the layer 314 of liquid crystal material 315.

The SNDLRCA 300 may further comprise a passive compensation retarder 330. The primary purpose of the SNDLCRA 300 when arranged between display polariser 810 and additional polariser 818 is to reduce the transmitted luminance in the inclined axis 447 compared to the viewing axis 445 when operated in the narrow-angle state for example as illustrated in FIG. 39A; and to maintain the transmitted luminance in the inclined axis 447 compared to the viewing axis 445 when operated in the wide-angle state for example as illustrated in FIG. 40A.

The display device 110 further comprises a control system 500 arranged to control the SNDLCR 301 by supply of voltages $V_{314}$ to the transmissive electrode arrangement 324 for driving the layer 314 of liquid crystal material 315 by means of voltage driver 350. The control system 500 is further arranged to control the SDLCE 801 by supply of voltages $V_{814}$ to the transmissive electrode arrangement 804 for driving the layer 814 of liquid crystal material 815 by means of voltage driver 850.

Figure 20C:
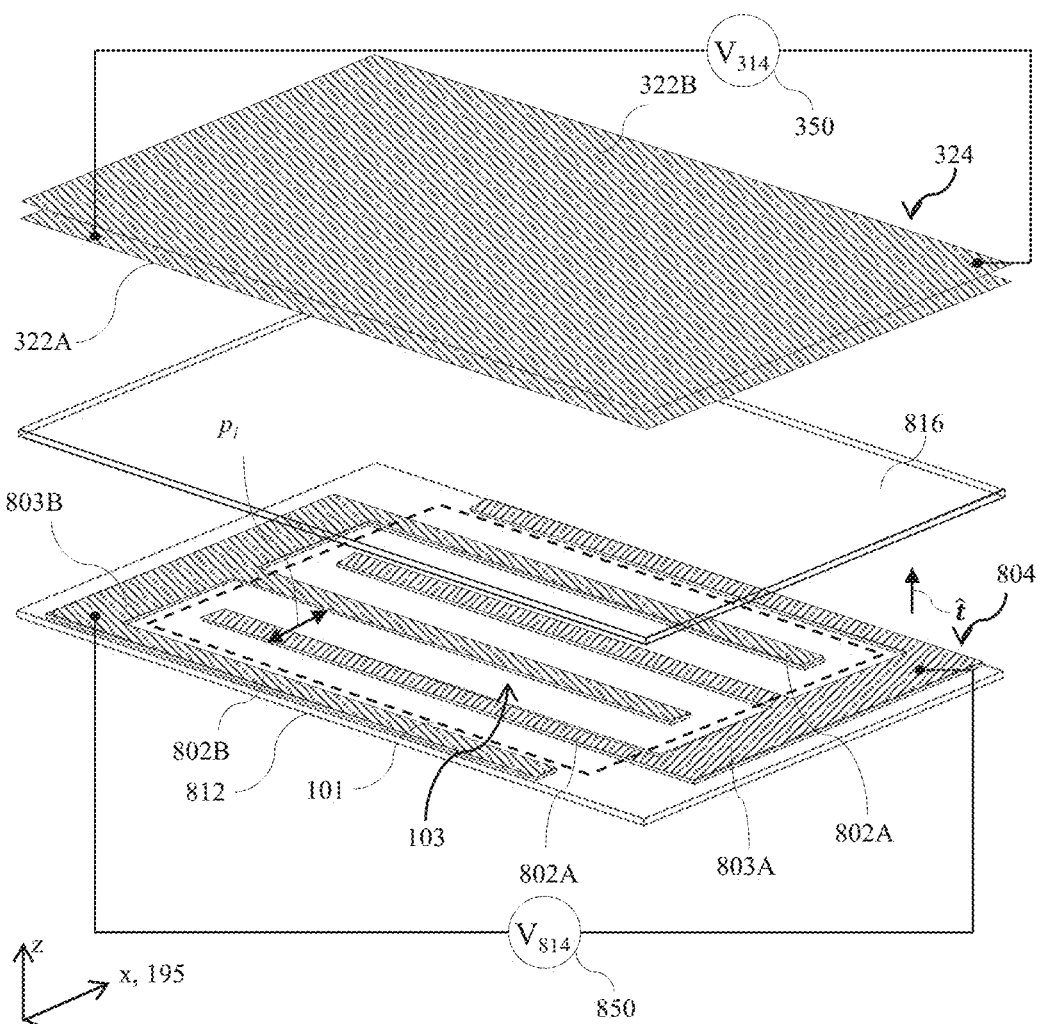
FIG. 20C is a schematic diagram illustrating in perspective side views the electrode arrangement of the SDLCE and electrode arrangement of the SNDLCR of FIGS. 20A-B.

FIG. 20C is a schematic diagram illustrating in perspective side view the electrode arrangement 804 of the SDLCE 801 and electrode arrangement 324 of the SNDLCR 301 of FIGS. 20A-B. Features of the embodiment of FIG. 20C not discussed in further detail may be assumed to correspond to the features with equivalent reference numerals as discussed above, including any potential variations in the features.

FIG. 20C illustrates that the electrode arrangement 804 may comprise interdigitated patterned electrodes 802A, 802B with respective bus bars 803A, 803B outside the area 103. Substrate 816 does not comprise an electrode. Advantageously the SDLCE 801 may be provided with low cost and complexity. Further light transmission is increased.

FIG. 20C further illustrates that the electrode arrangement 324 of the SNDLCR 301 comprises uniform electrodes 322A, 322B that are arranged on opposing side of the layer 314 of liquid crystal material 315. Advantageously cost and complexity is reduced.

Figure 20D:
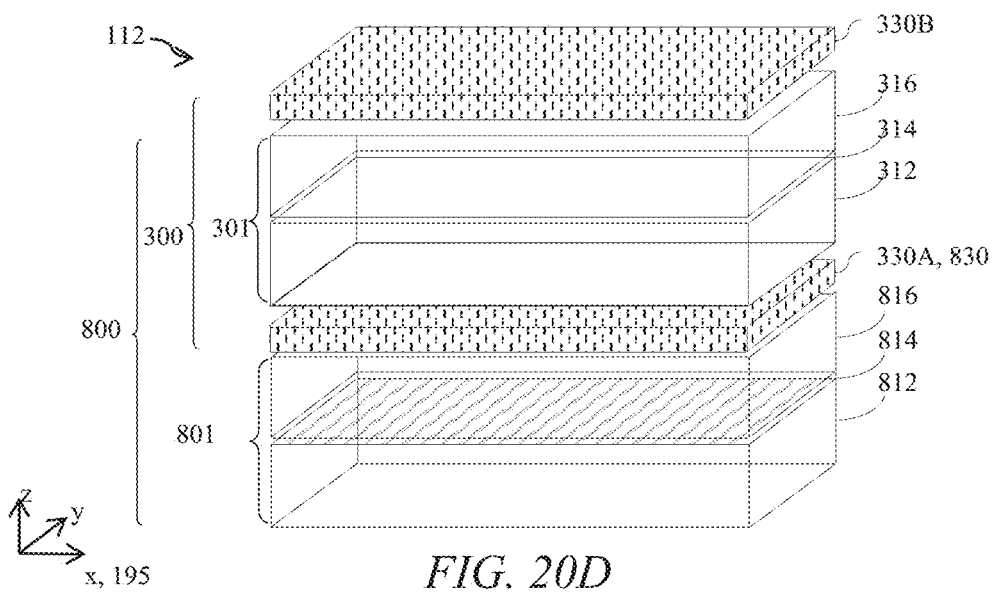
FIG. 20D is a schematic diagram illustrating in perspective side view an alternative view angle control element comprising SDVACA comprising SDLCE and switchable non-diffractive view angle control arrangement.

FIG. 20D is a schematic diagram illustrating in perspective side view an alternative view angle control element 112 comprising SDVACA 800 comprising SDLCE 801 and SNDLCRA 300. Features of the embodiment of FIG. 20D not discussed in further detail may be assumed to correspond to the features with equivalent reference numerals as discussed above, including any potential variations in the features.

Component 102 may be added during manufacture of the display device 110 or alternatively may be added to the display device 110 by a display user. Advantageously a switchable display device 110 upgrade may be achieved.

FIG. 20D further illustrates that the SNDLCR 301 may be provided between passive compensation retarders 330A, 330B so that the polarisation state output from the SDLCE 801 may be different to the polarisation state input into the SNDLCR 301. Such an arrangement may be used to adjust the transmission profile of the SDVACA 800 in narrow-angle state. The passive compensation retarders 330 may further comprise quarter waveplates arranged to improve rotational symmetry of the transmission profile, for example as described in U.S. Pat. No. 11,092,852, which is herein incorporated by reference in its entirety.

The passive compensation retarder 330A may further comprise the passive correction retarder 830. Advantageously cost and complexity may be reduced.

The operation of the arrangement of FIGS. 20A-B will now be described further.

Figure 21A:
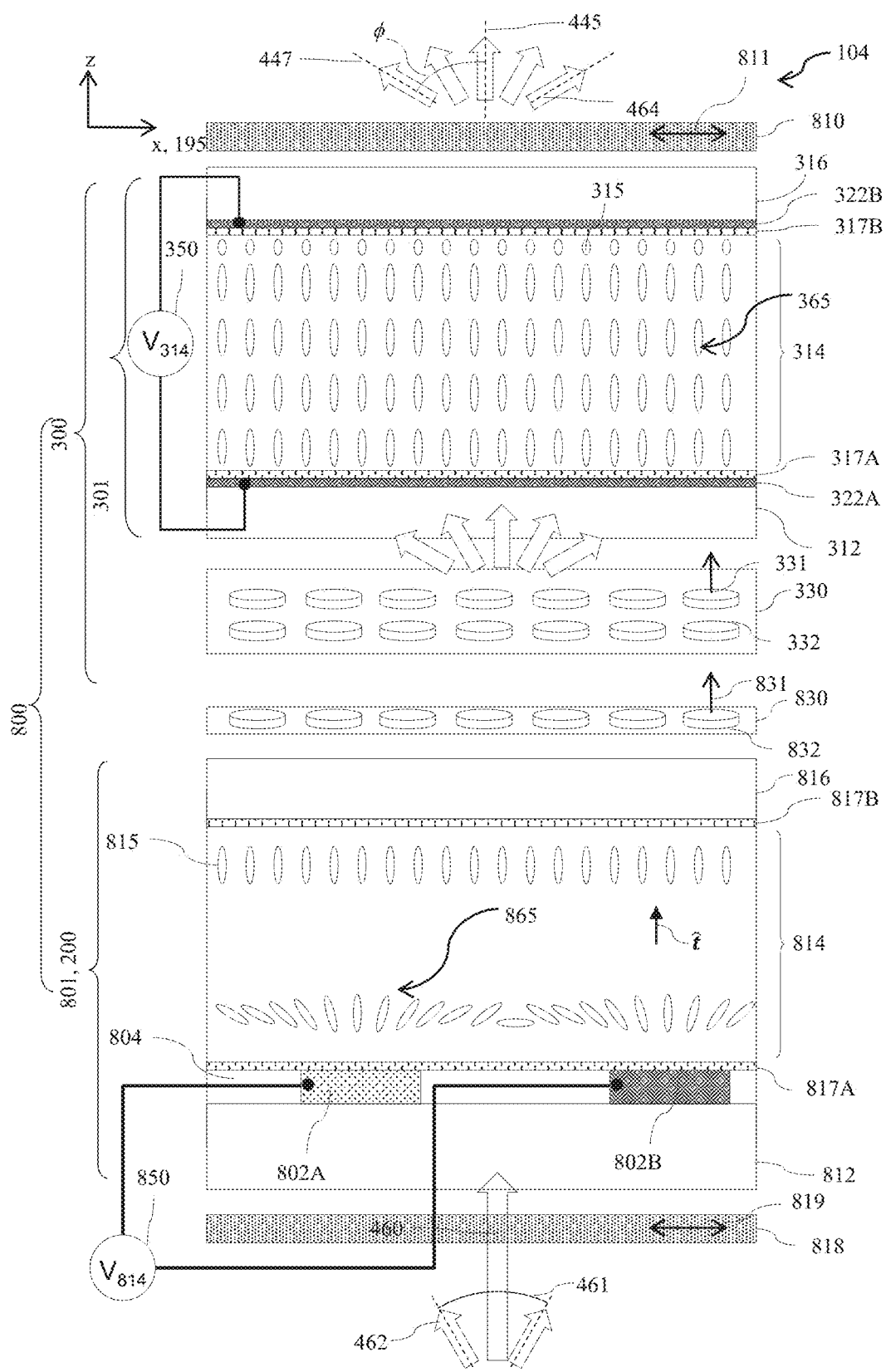
FIG. 21A is a schematic diagram illustrating in top view the structure and operation of an alternative optical stack for use in the arrangement of FIGS. 20A-B and the illustrative embodiment of TABLES 11-12 and driven for wide-angle state.
Figure 21B:
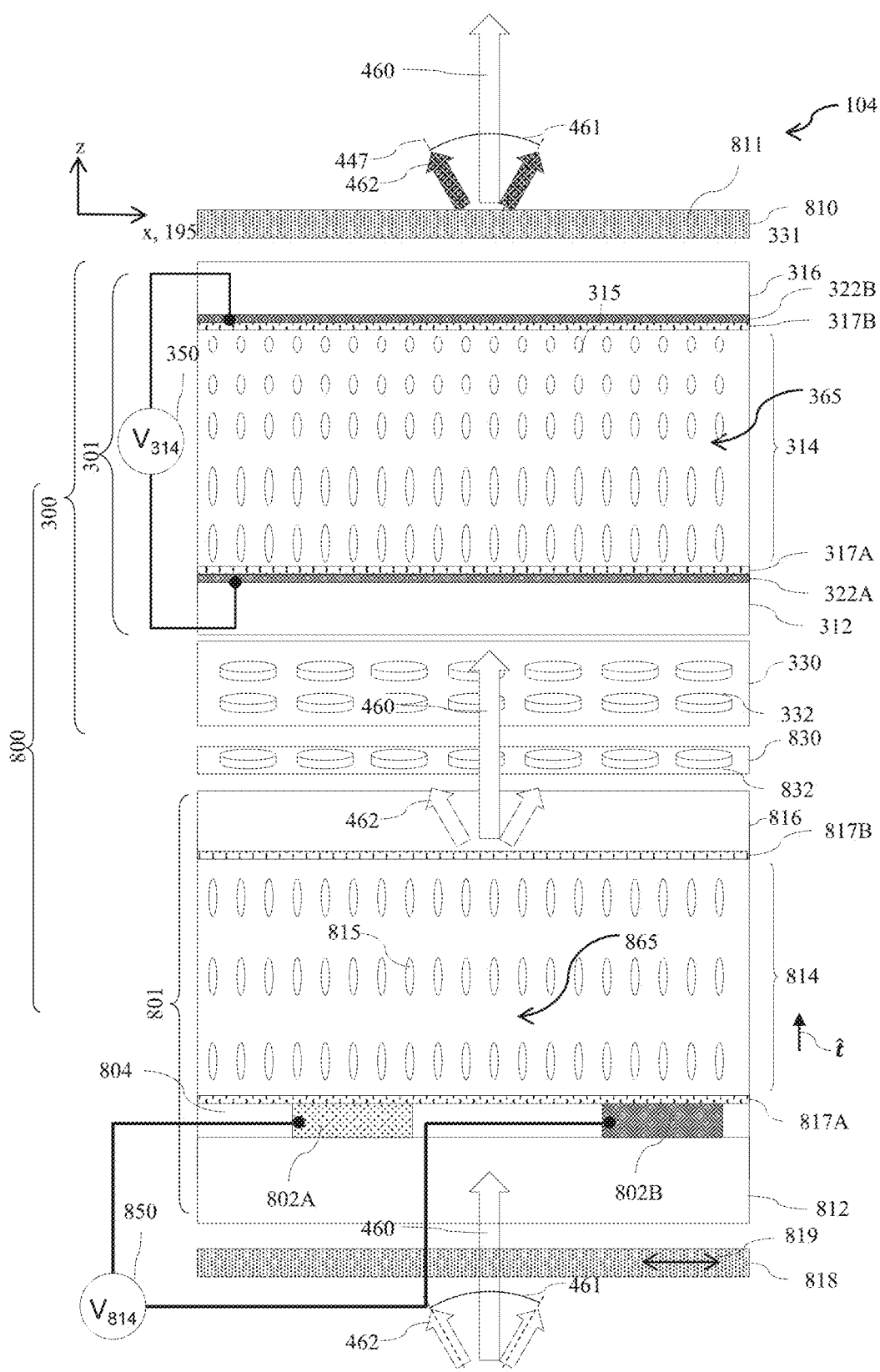
FIG. 21B is a schematic diagram illustrating in top view the structure and operation of the optical stack of FIGS. 21A-B driven for narrow-angle state.
Figure 21C:
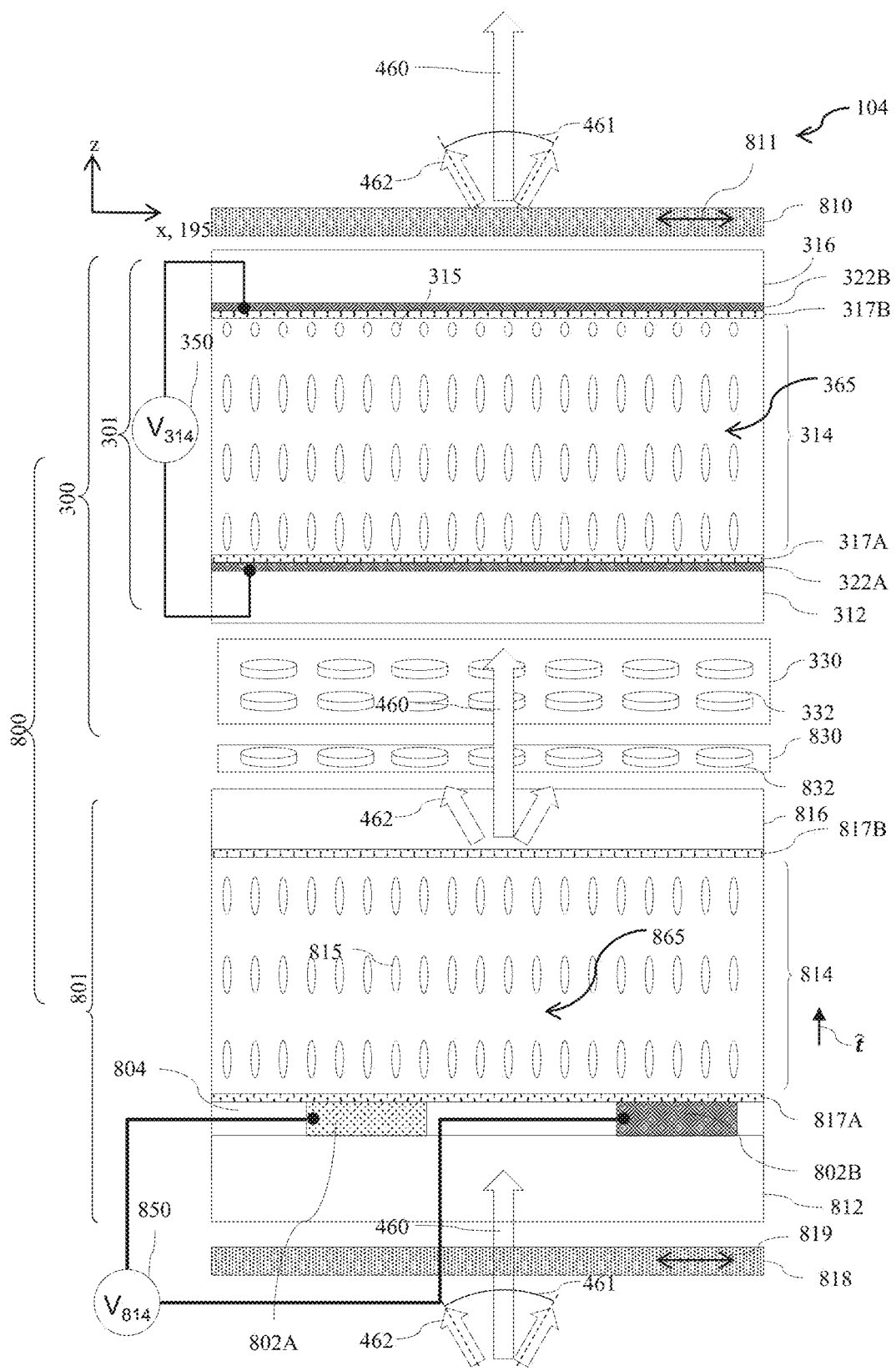
FIG. 21C is a schematic diagram illustrating in top view the optical stack of FIGS. 21A-B driven for an intermediate state.

FIG. 21A is a schematic diagram illustrating in top view the structure and operation of an alternative optical stack 104 for use in the arrangement of FIGS. 20A-B and the illustrative embodiment of TABLES 11-12 and driven for wide-angle state; FIG. 21B is a schematic diagram illustrating in top view the structure and operation of the optical stack 104 of FIGS. 21A-B driven for narrow-angle state; and FIG. 21C is a schematic diagram illustrating in top view the optical stack 104 of FIGS. 21A-B driven for an intermediate state. Features of the embodiments of FIGS. 21A-C not discussed in further detail may be assumed to correspond to the features with equivalent reference numerals as discussed above, including any potential variations in the features.

TABLE 11

| Item | | Property | Illustrative embodiment |
|---|---|---|---|
| Additional polariser 818 | | Electric vector transmission direction, 811 | 0° |
| SDLCE 801 | Electrode 802A, 802B | Pitch, $p_i$ | 10 µm |
| | | Width, w | 3 µm |
| | Surface alignment layer 827A | Type | Homeotropic |
| | | In-plane alignment direction 827Ap angle $\theta_A$ | 90° |
| | | Pretilt angle | 88° |
| | Surface alignment layer 827B | Type | Homeotropic |
| | | In-plane alignment direction 827Bp angle $\theta_B$ | 270° |
| | | Pretilt angle | 88° |
| | LC layer 814 | Retardance | 550 nm |
| | Passive retarder 830 | Type | Negative C-plate |
| | | Retardance | −550 nm |
| SNDLCR 301 | Passive retarder 330 | Type | Negative C-plate |
| | | Retardance | −880 nm |
| | Surface alignment layer 317A | Type | Homeotropic |
| | | In-plane alignment direction 827Ap angle $\theta_A$ | 90° |
| | | Pretilt angle | 88° |
| | Surface alignment layer 317B | Type | Homogeneous |
| | | In-plane alignment direction 827Bp angle $\theta_B$ | 270° |
| | | Pretilt angle | 2° |
| | LC layer 314 | Retardance | 1000 nm |
| Display polariser 810 | | Electric vector transmission direction, 819 | 0° |

TABLE 12

| Item | Wide-angle state | Narrow-angle state | Intermediate state |
|---|---|---|---|
| FIG. | 21A | 21B | 21C |
| $V_{814}$ | +20 V | 0 V | 0 V |
| $V_{314}$ | +5 V | +1.4 V | 0 V |

Drive waveforms for the embodiment of TABLE 11-16 will now be described.

Figure 22A:
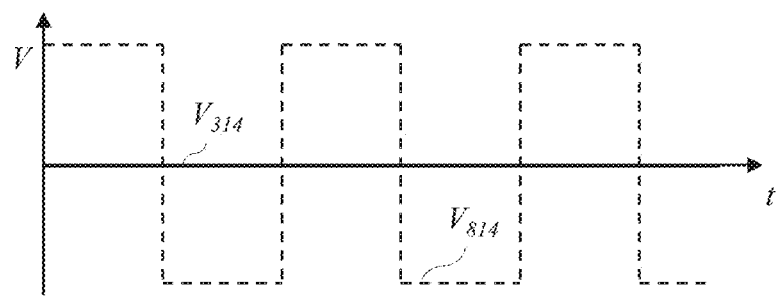
FIG. 22A is a schematic graph illustrating drive waveforms of the SDVACA of the optical stack of FIGS. 20A-B for wide-angle state.
Figure 22B:
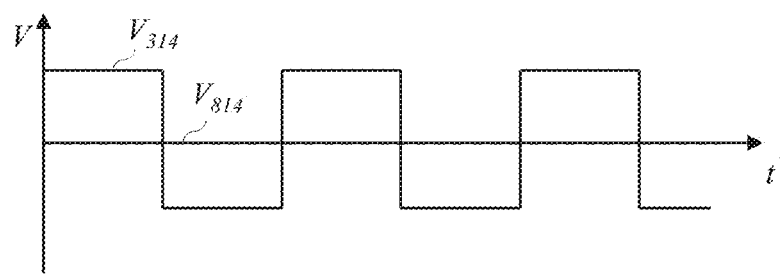
FIG. 22B is a schematic graph illustrating alternative drive waveforms of the SDVACA of FIGS. 20A-B for narrow-angle state.
Figure 22C:
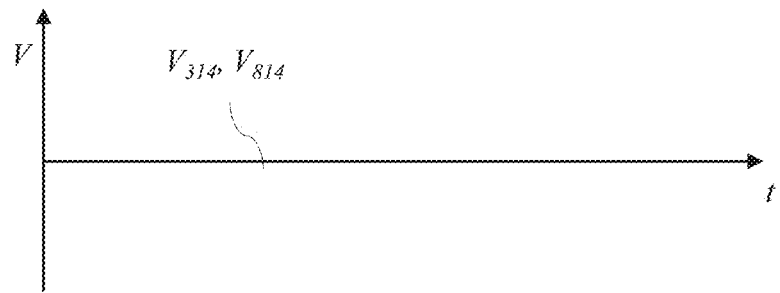
FIG. 22C is a schematic graph illustrating drive waveforms of the SDVACA of FIGS. 20A-B for intermediate state.

FIG. 22A is a schematic graph illustrating drive waveforms of the SDVACA 800 of the optical stack 104 of FIGS. 20A-B for wide-angle state; FIG. 22B is a schematic graph illustrating alternative drive waveforms of the SDVACA 800 of FIGS. 20A-B for narrow-angle state; and FIG. 22C is a schematic graph illustrating drive waveforms of the SDVACA 800 of FIGS. 20A-B for intermediate state. Features of the embodiments of FIGS. 22A-C not discussed in further detail may be assumed to correspond to the features with equivalent reference numerals as discussed above, including any potential variations in the features.

Control system 500 is arranged to control which of the waveforms of FIGS. 22A-C are provided to voltage drivers 350, 850 to provide wide-angle state, narrow-angle state or intermediate states of operation respectively. The alternating profiles provide DC balancing, achieving increased device lifetime. Non-square voltage profiles may be provided to achieve desirable addressing levels for the layers 814, 314 of liquid crystal material 815, 315 for SDLCE 801 and SNDL-CRA 300 respectively.

The operation of an illustrative display device 110 of FIGS. 21A-C and TABLES 11-12 comprising the electrode arrangement 804 of FIG. 20C will now be further described.

Figure 23A:
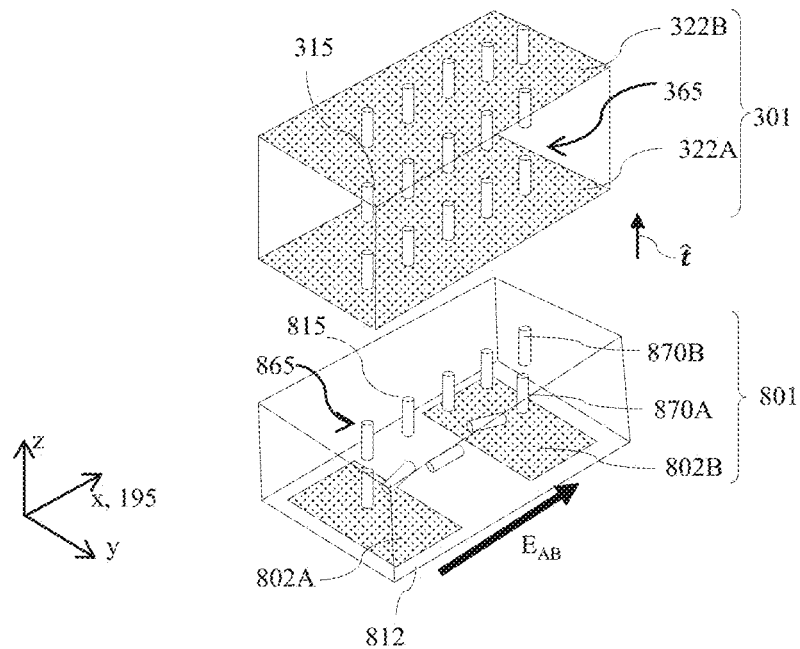
FIG. 23A is a schematic diagram illustrating in perspective front view the transmissive electrode arrangement of FIG. 21A and structure of liquid crystal material orientations for the SDLCE and structure of liquid crystal material orientations for SNDLCR of FIG. 21A in wide-angle state.
Figure 23B:
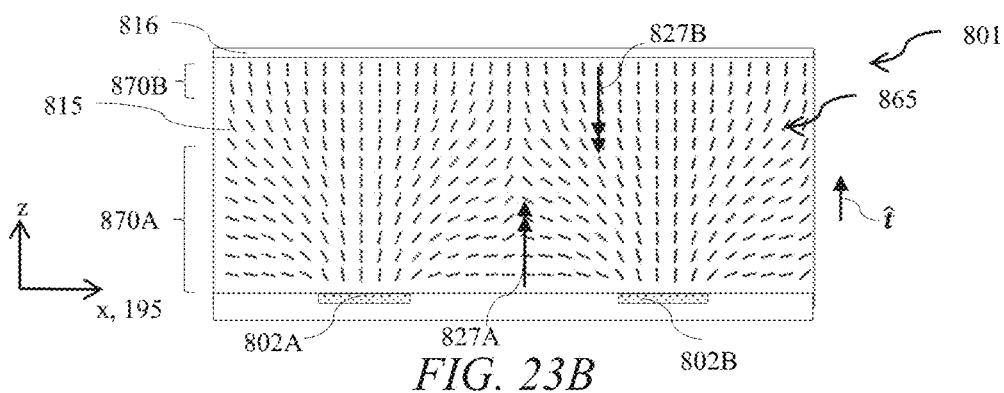
FIG. 23B is a schematic diagram illustrating in top view a structure of liquid crystal material orientations for the SDLCE of FIG. 21A and TABLES 11-12.
Figure 23C:
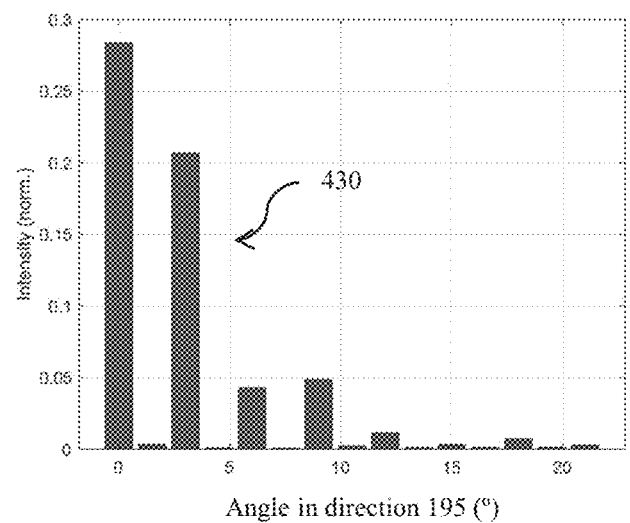
FIG. 23C is a schematic graph illustrating a profile of diffracted luminance into diffractive orders for the embodiment of FIG. 23B.
Figure 23D:
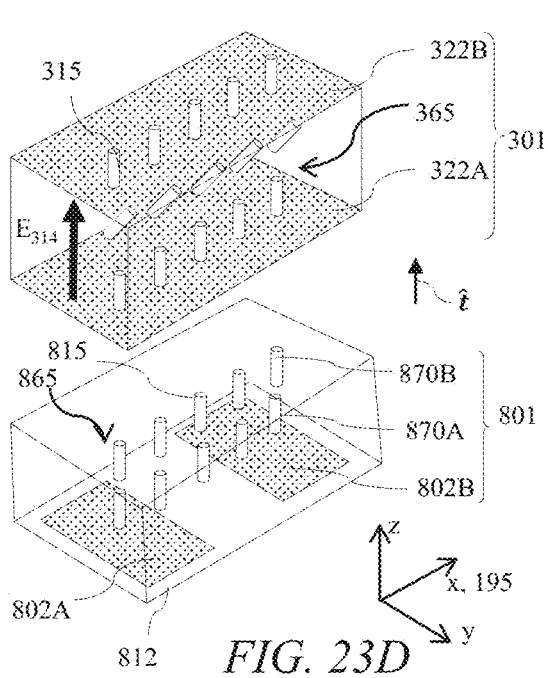
FIG. 23D is a schematic diagram illustrating in perspective front view the structure of liquid crystal material orientations for the SDLCE and SNDLCR of FIG. 21B operating in narrow-angle state.
Figure 23E:
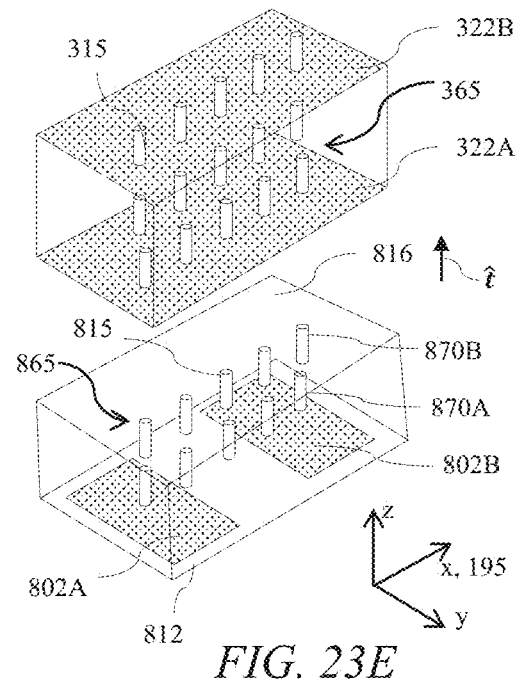
FIG. 23E is a schematic diagram illustrating in perspective front view the structure of liquid crystal material orientations for the SDLCE and structure of liquid crystal material orientations for the SNDLCR of FIG. 21C operating in intermediate state.
Figure 23F:
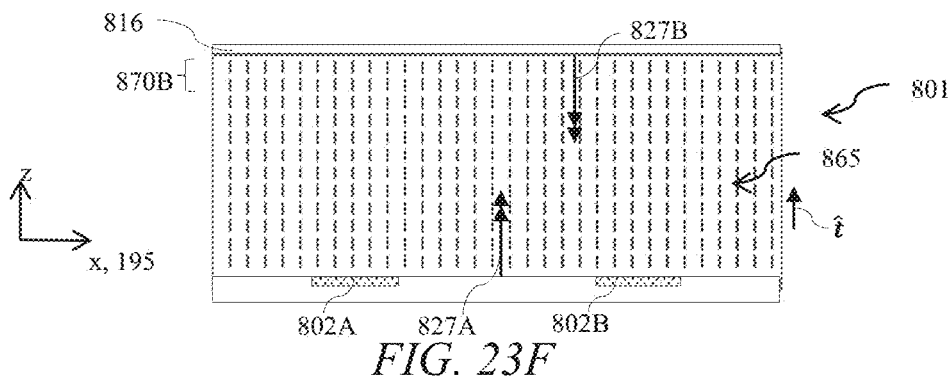
FIG. 23F is a schematic diagram illustrating in top view structure of liquid crystal material orientations of the SDLCE of FIGS. 21B-C.

FIG. 23A is a schematic diagram illustrating in perspective front view the transmissive electrode arrangement 804 of FIG. 21A and structure 865 of liquid crystal material 815 orientations for the SDLCE 801 and structure 365 of liquid crystal material 315 orientations for SNDLCR 301 of FIG. 21A operating in wide-angle state; FIG. 23B is a schematic diagram illustrating in top view a structure 865 of liquid crystal material 815 orientations for the SDLCE 801 of FIG. 21A and TABLES 11-12; FIG. 23C is a schematic graph illustrating a profile 430 of diffracted luminance into diffractive orders for the embodiment of FIG. 23B; FIG. 23D is a schematic diagram illustrating in perspective front view the structure 865 of liquid crystal material 815 orientations for the SDLCE 801 and SNDLCR 301 of FIG. 21B operating in narrow-angle state; FIG. 23E is a schematic diagram illustrating in perspective front view the structure 865 of liquid crystal material 815 orientations for the SDLCE 801 and structure 365 of liquid crystal material 315 orientations for SNDLCR 301 of FIG. 21C operating in intermediate state; and FIG. 23F is a schematic diagram illustrating in top view structure 865 of liquid crystal material 815 orientations of the SDLCE 801 of FIGS. 21B-C. Features of the embodiments of FIGS. 23A-F not discussed in further detail may be assumed to correspond to the features with equivalent reference numerals as discussed above, including any potential variations in the features.

The control system 500 is arranged: in a narrow-angle state of the display device 110: to supply voltages to the transmissive electrode arrangement 324 that are selected to drive the layer 314 of liquid crystal material 315 of the SNDLCR 301 into the narrow-angle state thereof, and to switch the SLDA 200 into the non-dispersive state; and in a wide-angle state of the display device 110: to supply voltages to the transmissive electrode arrangement 324 that are selected to drive the layer 314 of liquid crystal material 315 of the SNDLCR 301 into the wide-angle state thereof, and to switch the SLDA 200 into the dispersive state.

In the embodiment of FIG. 21A and FIG. 23A, the control system 500 is arranged in a wide-angle state to supply voltages by voltage driver 350 to the transmissive electrode arrangement 324 comprising electrodes 322A, 322B that are selected to drive the layer 314 of liquid crystal material 315 to cause the SDVACA 800 to introduce no net relative phase shift $\eta_{800}(\phi_{445})$ to orthogonal polarisation components 997 (445), 999(445) of light passed by the additional polariser 818 along the viewing axis 445; and cause the SDVACA 800 to introduce no net relative phase shift $\eta_{800}(\phi_{447})$ to orthogonal polarisation components of light passed by the additional polariser 818 along the inclined axis 447 inclined to the viewing axis 445. The operation of the SDVACA 800 in wide-angle state is similar to that illustrated in FIG. 6E hereinabove. In operation, some residual polarisation mixing as described hereinabove may be present in the SLDCE 801, however such polarisation mixing will in general be small. High transmission along the inclined axis 447 is achieved.

Control system 500 is further arranged to supply voltages to voltage driver 850 to switch the SLDA 200 that is the SDLCE 801 into the dispersive state. As illustrated in FIG. 21A, the SDLCE 801 in the dispersive state provides dispersion of light in direction 195 across an area 103 of the layer 814 of liquid crystal material 815. The SNDLCRA 300 is arranged to desirably provide no reduction of luminance with viewing angle $\phi$. Luminance along the inclined axis 447 is increased and image visibility along the inclined axis 447 for wide-angle state advantageously improved.

By way of comparison with FIG. 21A, in the illustrative embodiments of FIG. 21B and FIG. 23D, the control system 500 is arranged in a narrow-angle state to supply voltages by driver 350 to the transmissive electrode arrangement 324 that are selected to drive the layer 314 of liquid crystal material 315 to the narrow-angle state. That is the layer 314 of liquid crystal material 315 is arranged such that the SDVACA 800 introduces no net relative phase shift $\eta_{800}$ ($\phi_{445}$) to orthogonal polarisation components 997(445), 999 (445) of light passed by the additional polariser 818 along a viewing axis 445 and to cause the SDVACA 800 to introduce a net relative phase shift $\eta_{800}(\phi_{447})$ to orthogonal polarisation components 997(447), 999(447) of light passed by the additional polariser 818 along the inclined axis 447 inclined to the viewing axis 445. The control system 500 is further arranged in the narrow-angle state of FIG. 21A to switch the SDLCE 801 into the non-dispersive state. Low luminance may be achieved along inclined axis 447, advantageously achieving increased security factor, S for privacy mode operation.

The operation of the SDLCE 801 in the narrow-angle state will now be considered.

The SDLCR 901 of FIG. 1A has a primary purpose that is to reduce the transmitted luminance in the inclined axis 447 compared to the viewing axis 445 and to not diffract light when operated in the narrow-angle state; and to diffract light from the viewing axis 445 towards the inclined axis 447 when operated in the wide-angle state for example as illustrated in FIG. 40A. In the narrow-angle state the SDLCR 901 liquid crystal structure 965 behaves as an O-plate to provide such behaviour.

By comparison, the SDLCE 801 of FIG. 20A has a primary purpose that is to maintain the transmitted luminance in the inclined axis 447 compared to the viewing axis 445 when operated in the narrow-angle state; and to diffract light when operated in the wide-angle state. The electrode arrangement 804 and the layer 814 of liquid crystal material 815 is different to the electrode arrangement 904 and layer 914 of liquid crystal material 915 described hereinabove. In the narrow-angle state the SDLCE 801 liquid crystal structure 865 has a vertical orientation arising from the homeotropic surface alignment layers 827A, 827B that provides a positive C-plate structure 865. The positive C-plate behaviour provides undesirable transmission profile when the SDLCE 801 is arranged between additional polariser 818 and display polariser 810. The passive correction retarder 830 may be arranged to correct for said positive C-plate arrangement in the narrow-angle state to desirably provide a uniform linear polarisation state for input into the SNDLCRA 300 with a wide field-of-view. The SDLCE 801 and passive correction retarder 830 together provide substantially no net relative phase shift $\eta_{801}(\phi_{447})$ to orthogonal polarisation components 997(447), 999(447) of light passed to the SNDLCRA 300 along the inclined axis 447 in comparison to the net relative phase shift $\eta_{300}(\phi_{447})$ to orthogonal polarisation components 997(447), 999(447) of light passed by the SNDLCRA 300. The narrow-angle state performance of the SNDLCRA 300 may be improved and the transmission in the inclined axis 447 may be reduced.

The alternative embodiment of FIG. 21A-B comprises a layer 814 of liquid crystal material 815 that has a retardance sufficient for providing the SDLCE 801 for high diffraction efficiency in the wide-angle state. Such diffractive structure 865 of the SDLCE 801 may desirably have a retardance that is close to a half wave retardance. The diffractive structure 865 extends through a layer 870A of FIG. 23B that is typically half of the separation of the thickness of the layer 814. The retardance of the layer 814 of liquid crystal material 815 is preferably between 200 nm and 600 nm and more preferably between 450 nm and 550 nm. The passive correction retarder 830 may be a negative C-plate or crossed positive A-plates each passive correction retarder having substantially the same retardance value as the layer 814.

Further, in comparison to the SDLCR 901 hereinabove, the SDLCE 801 of FIG. 23B does not comprise the reference electrode 902R. Such an arrangement does not provide in-plane tilt of the material 815 through the thickness direction of the layer 814 of liquid crystal material 815 and as such the structure 865 in comparison to the structure 965 hereinabove does not provide a uniform O-plate structure for narrow-angle mode operation. As such the desirable transmission profiles such as in FIG. 8B are not provided by the SDLCE 801. The luminance profile in narrow-angle state may be improved, for example to modify the size of the polar region in narrow-angle state for which the security factor S is equal to or greater than 1.0.

Further, the light dispersion characteristics of the SDLCE may be improved, for example to increase the lateral direction 195 cone angle for the wide-angle luminance profile similar to that of FIG. 8G. Wide-angle visibility of the display device 100 may be increased.

By way of comparison with FIG. 21B, in the alternative embodiment of FIG. 21C and FIG. 23E the SNDLCRA 300 is switched by the control system to provide increased transmission luminance with angle $\phi$ in comparison to the narrow-angle state. As for FIG. 21B, and the SLDA 200 that is the SDLCE 801 is switched by the control system into the non-dispersive state. An intermediate state may advantageously achieve an intermediate state of operation.

Alternative illustrative embodiments of SDLCE 801 for use in SDVACA 800 will now be described.

Figure 23G:
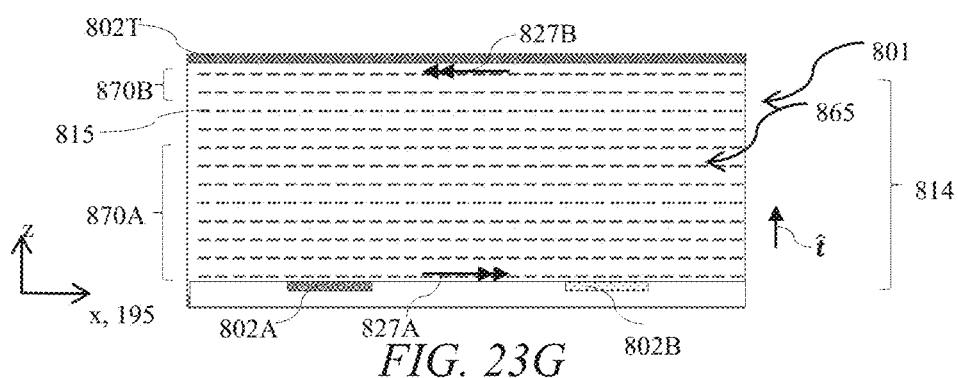
FIG. 23G is a schematic diagram illustrating in top view the structure of liquid crystal material orientations of a SDLCR comprising homogeneous surface alignment layers wherein the in-plane alignment directions are parallel and antiparallel to the lateral direction and arranged in narrow-angle state for the embodiment of TABLES 13-14.
Figure 23H:
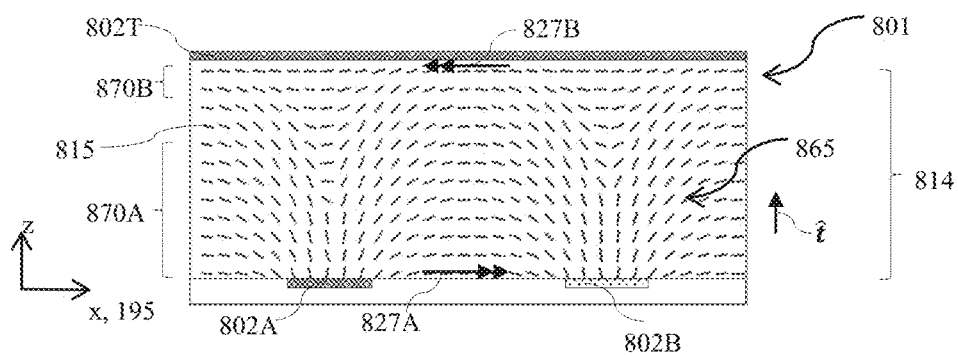
FIG. 23H is a schematic diagram illustrating a top view of the arrangement of FIG. 23G driven for wide-angle state.
Figure 23I:
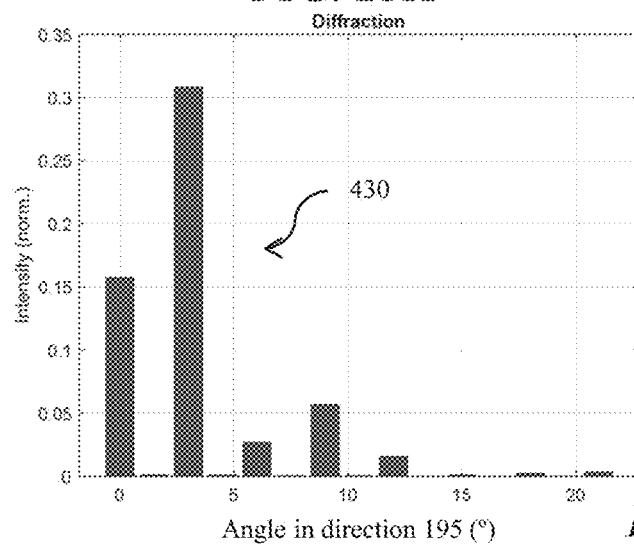
FIG. 23I is a schematic graph illustrating a profile of diffracted luminance into diffractive orders for the embodiment of FIG. 23H and TABLES 13-14.

FIG. 23G is a schematic diagram illustrating in top view the structure 865 of liquid crystal material 815 orientations of a SDLCE 801 comprising homogeneous surface alignment layers 817A, 817B wherein the in-plane alignment directions 827Ap, 827Bp are parallel and antiparallel to the lateral direction 195 and arranged in narrow-angle state for the embodiment of TABLES 13-14; FIG. 23H is a schematic diagram illustrating a top view of the arrangement of FIG. 23G driven for wide-angle state; and FIG. 23I is a schematic graph illustrating a profile 430 of diffracted luminance into diffractive orders for the embodiment of FIG. 23H and TABLES 13-14. Features of the embodiments of FIGS. 23G-I not discussed in further detail may be assumed to correspond to the features with equivalent reference numerals as discussed above, including any potential variations in the features.

TABLE 13

| Item | | Property | Illustrative embodiment |
|---|---|---|---|
| SDLCE 801 | Electrode 802A, 802B | Pitch, p | 10 μm |
| | | Width, w | 3 μm |
| | Surface alignment layer 817A | Type | Homogeneous |
| | | In-plane alignment direction 827Ap angle $\theta_A$ | 0° |
| | | Pretilt angle | 2° |
| | Surface alignment layer 817B | Type | Homogeneous |
| | | In-plane alignment direction 827Bp angle $\theta_B$ | 180° |
| | | Pretilt angle | 2° |
| | LC layer 814 | Retardance | 570 nm |

TABLE 14

| Item | Wide-angle state | Narrow-angle and intermediate states |
|---|---|---|
| $V_{AT}$ | −10 V | 0 V |
| $V_{BT}$ | +10 V | 0 V |

By way of comparison with the embodiments of FIG. 23B and FIG. 23F, the embodiments of FIG. 23H and FIG. 23G respectively provide an alternative structure 865 comprising homogeneous alignment layers 817A, 817B with alignment directions 827A, 827B that are parallel or antiparallel to the lateral direction 195.

The homogeneous alignment layers 817A, 817B may reduce the visibility of liquid crystal layer 315 misalignment arising from applied pressure may advantageously be reduced in comparison to arrangements providing at least one homeotropic alignment layer 817A, 817B of FIG. 23B and FIG. 23F.

A top electrode 802T is provided on the opposite side of the layer 814 of liquid crystal material 815 to the interdigitated patterned electrodes 802A, 802B. The top electrode 802T is different to the reference electrode 902R of FIG. 4C for example. Top electrode 802T provides driven structure 865 of FIG. 23H to provide diffractive output of FIG. 23H. In the narrow-angle state, the in-plane alignment structure 865 provides an A-plate structure of the layer 814 of liquid crystal material 815. Such A-plate is aligned with the electric vector transmission direction 819 of the additional polariser 818 and so does not change the polarisation state onto the SNDLCRA 300. Passive correction retarder 830 may be omitted, advantageously reducing thickness, complexity and cost.

Figure 23J:
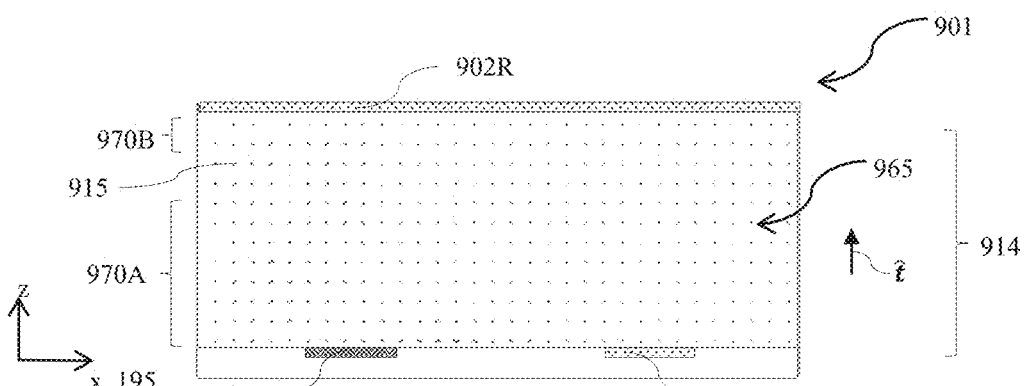
FIG. 23J is a schematic diagram illustrating in top view the structure of liquid crystal material orientations of a SDLCE comprising homogeneous surface alignment layers wherein the in-plane alignment directions are orthogonal to the lateral direction and arranged in narrow-angle state for the embodiment of TABLES 15-16.
Figure 23K:
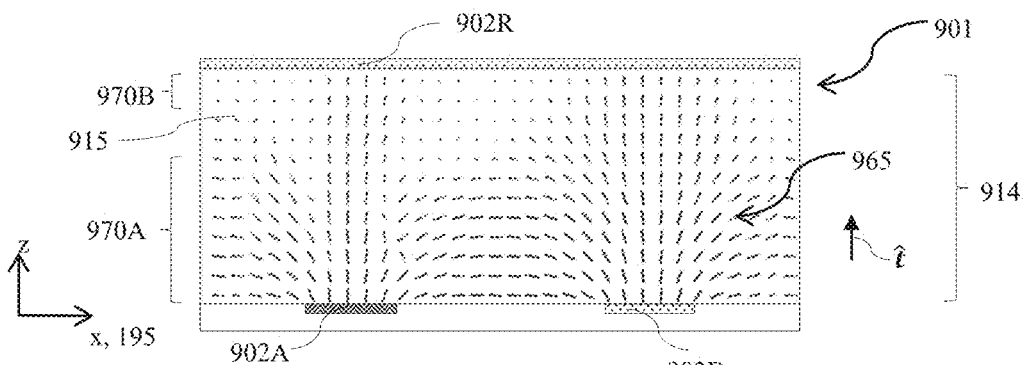
FIG. 23K is a schematic diagram illustrating a top view of the arrangement of FIG. 23J driven for wide-angle state.
Figure 23L:
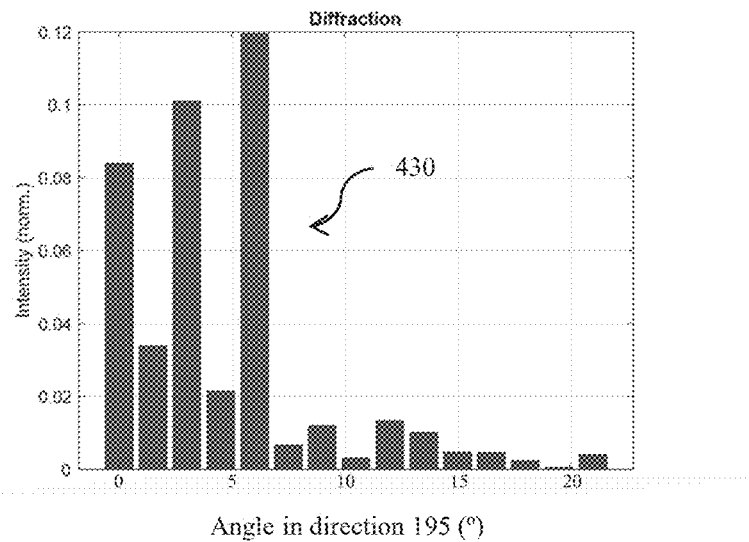
FIG. 23L is a schematic graph illustrating a profile of diffracted luminance into diffractive orders for the embodiment of FIG. 23K and TABLES 15-16.

FIG. 23J is a schematic diagram illustrating in top view the structure 865 of liquid crystal material 815 orientations of a SDLCE 801 comprising homogeneous surface alignment layers wherein the in-plane alignment directions 827Ap, 827Bp are orthogonal to the lateral direction 195 and arranged in narrow-angle state for the embodiment of TABLES 15-16; FIG. 23K is a schematic diagram illustrating a top view of the arrangement of FIG. 23J driven for wide-angle state; and FIG. 23L is a schematic graph illustrating a profile 430 of diffracted luminance into diffractive orders for the embodiment of FIG. 23K and TABLES 15-16. Features of the embodiments of FIGS. 23J-L not discussed in further detail may be assumed to correspond to the features with equivalent reference numerals as discussed above, including any potential variations in the features.

TABLE 15

| Item | | Property | Illustrative embodiment |
|---|---|---|---|
| SDLCE 801 | Electrode 802A, 802B | Pitch, p | 10 μm |
| | | Width, w | 3 μm |
| | Surface alignment layer 817A | Type | Homogeneous |
| | | In-plane alignment direction 827Ap angle $\theta_A$ | 90° |
| | | Pretilt angle | 2° |
| | Surface alignment layer 817B | Type | Homogeneous |
| | | In-plane alignment direction 827Bp angle $\theta_B$ | 270° |
| | | Pretilt angle | 2° |
| | LC layer 814 | Retardance | 570 nm |

TABLE 16

| Item | Wide-angle state | Narrow-angle and intermediate states |
|---|---|---|
| $V_{AR}$ | −10 V | 0 V |
| $V_{BR}$ | +10 V | 0 V |

The embodiment of FIG. 23L may achieve a different profile of diffraction in comparison to the embodiment of FIG. 23I. Desirable wide-angle state light dispersion properties may be achieved.

An alternative electrode arrangement 804 will now be described.

Figure 24:
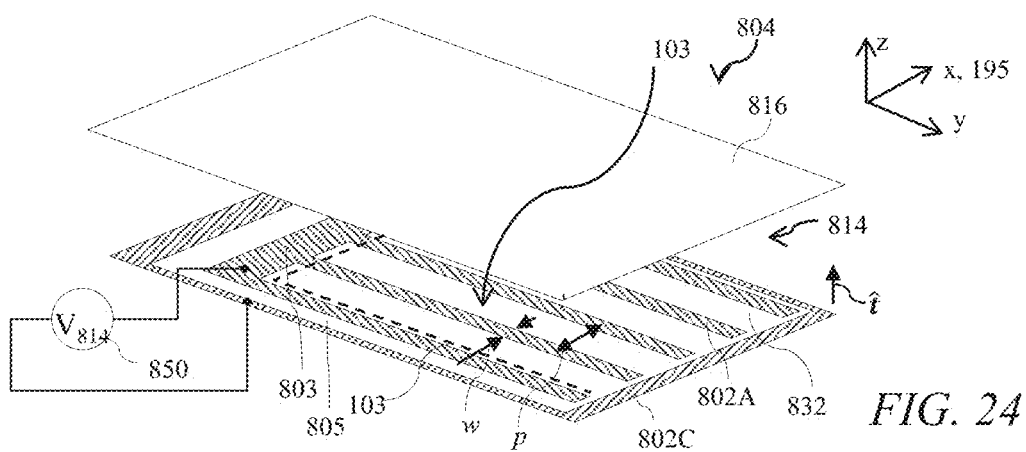
FIG. 24 is a schematic diagram illustrating in perspective side view alternative electrode arrangement comprising interdigitated electrodes arranged on a single substrate and further control and reference electrodes.

FIG. 24 is a schematic diagram illustrating in perspective side view alternative electrode arrangement 804 comprising interdigitated electrodes arranged on a single substrate and further control and reference electrodes. Features of the embodiment of FIG. 24 not discussed in further detail may be assumed to correspond to the features with equivalent reference numerals as discussed above, including any potential variations in the features.

By way of comparison with FIG. 20C, the alternative electrode arrangement of FIG. 24 comprises a uniform control electrode 802C in place of the interlaced electrode 802B. Dielectric layer 905 is arranged between the layer of the separated electrodes 802A and the control electrode 802C. The voltage V814 is provided across the dielectric layer 805. Advantageously complexity of fabrication of the electrode arrangement 804 of FIG. 20C may be reduced.

Alternative optical stacks comprising SDVACA 800 will now be described.

Increased light dispersion may be achieved and advantageously image visibility in wide-angle state may be increased.

Figure 25A:
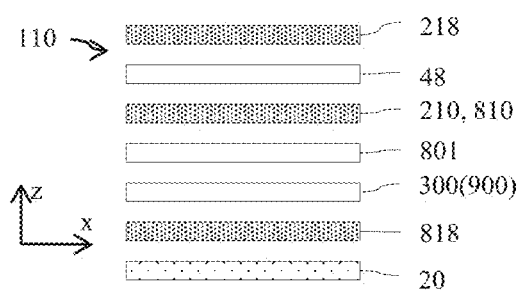
FIG. 25A, FIG. 25B, FIG. 25C, FIG. 25D, FIG. 25E, FIG. 25F, FIG. 25G, FIG. 25H, FIG. 25I, FIG. 25J, FIG. 25K, FIG. 25L, FIG. 25M, and FIG. 25N are schematic diagrams illustrating non-exhaustive side views of alternative optical stacks for a switchable display device wherein the SDLCE and the switchable luminance liquid crystal switchable non-diffractive view angle control arrangement is arranged between a display polariser and additional polariser.
Figure 25B:
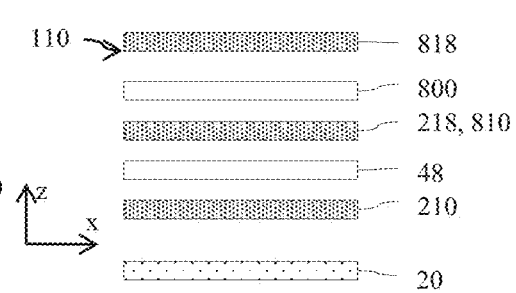
Figure 25C:
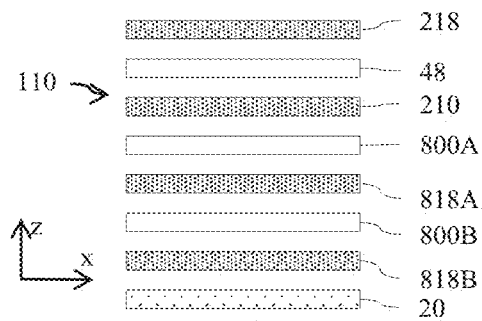
Figure 25D:
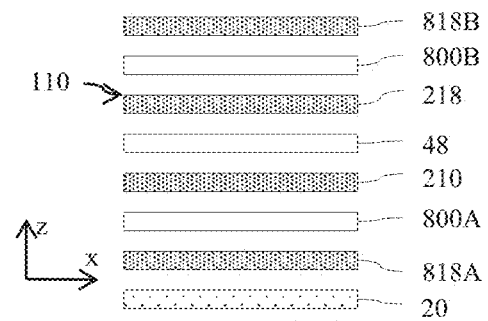
Figure 25E:
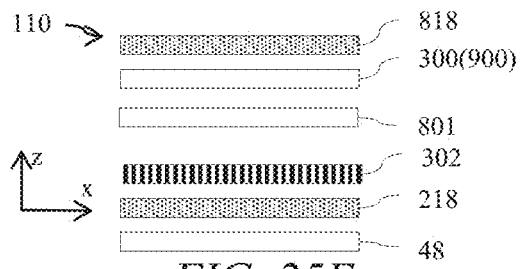
Figure 25F:
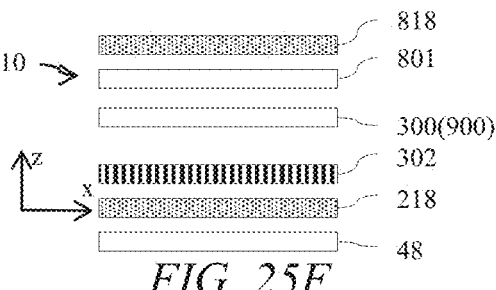
Figure 25G:
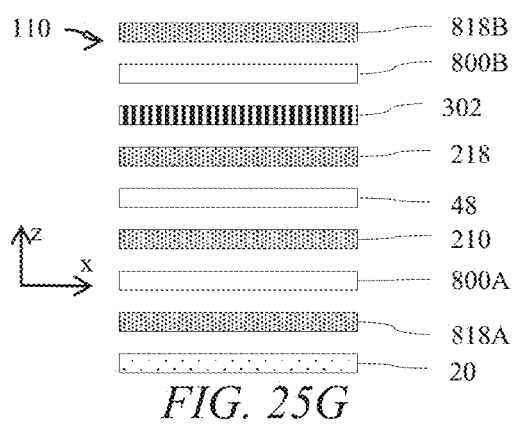
Figure 25H:
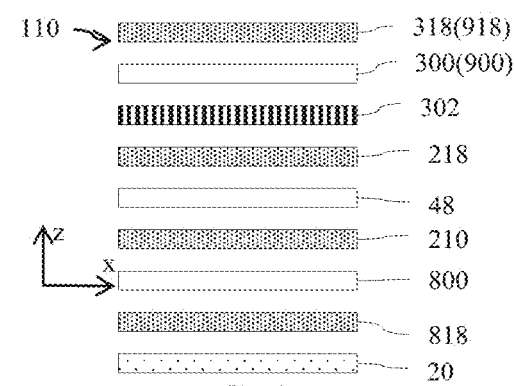
Figure 25I:
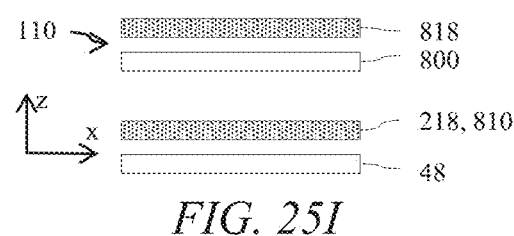
Figure 25J:
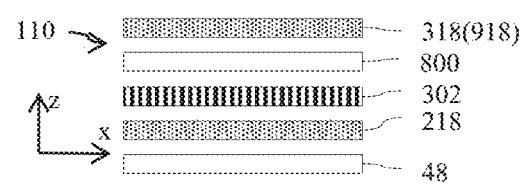
Figure 25K:
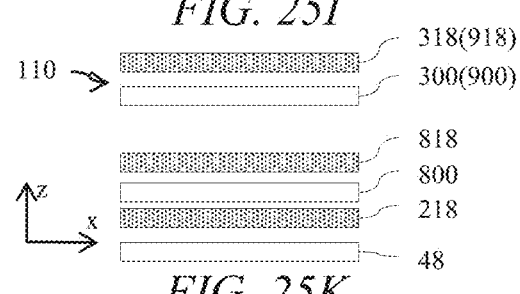
Figure 25L:
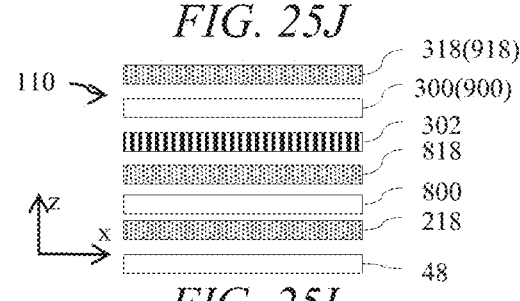
Figure 25M:
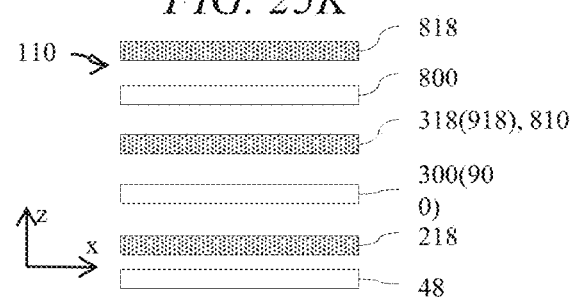
Figure 25N:
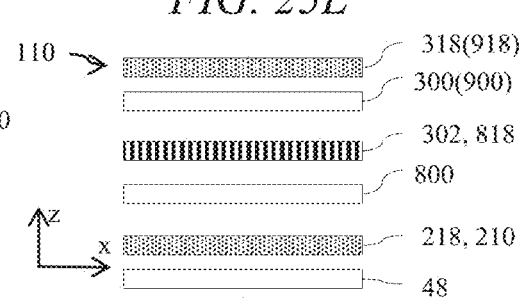

FIGS. 25A-N are schematic diagrams illustrating non-exhaustive side views of alternative optical stacks 104 for a switchable display device 110 wherein the SDLCE 801 and the switchable luminance liquid crystal SNDLCRA 300 is arranged between a display polariser 810 and additional polariser 818. Features of the embodiments of FIGS. 25A-N not discussed in further detail may be assumed to correspond to the features with equivalent reference numerals as discussed above, including any potential variations in the features.

In the alternative embodiment of FIG. 25A, the SDLCE is arranged between the SNDLCRA 300 and the display polariser 810. In the alternative embodiment of FIG. 25B, the SDVACA 800 is arranged between the output polariser 218 that is the display polariser 810 and the additional polariser 818.

The alternative embodiments of FIGS. 25C-D comprise SDVACA 800A and further SDVACA 800B, additional polariser 818A and further additional polariser 818B.

The alternative embodiments of FIGS. 25E-F comprise reflective polariser 302. Advantageously increased security factor S achieved at inclined angle 447 in narrow-angle state.

The alternative embodiment of FIG. 25G comprises a reflective polariser 302 and SDVACAs 800A, 800B. Advantageously increased diffusion may be achieved in wide-angle state and increased security factor S achieved at inclined angle 447 in narrow-angle state.

The alternative embodiment of FIG. 25H comprises a reflective polariser 302, a SDVACA 800 and a SNDLCRA 300 and alternative additional polariser 318. Advantageously increased diffusion may be achieved in wide-angle state and increased security factor S achieved at inclined angle 447 in narrow-angle state. Further blurring of the pixels 220 in the wide-angle state is reduced.

The SDVACA 800 comprising SDLCE 801 and SNDLCRA 300 may be arranged on the input side of the SLM 48 wherein the display polariser 310 may be the input polariser 210. Advantageously image contrast for light from the SLM 48 may be increased.

SDVACA 800 comprising SDLCE 801 and SNDLCRA 300 may be arranged on the output side of the SLM 48, wherein the display polariser 310 may be the output polariser 218. Complexity of assembly of the display device 110 may advantageously be reduced.

The alternative embodiments of FIGS. 25I-N illustrate emissive SLM 48 comprising at least one SDVACA 800. Advantageously display thickness may be reduced.

Alternative embodiments (not illustrated) may provide further refinements in wide-angle state visibility, image blur, thickness, cost and complexity to achieve desirable display device 110 characteristics.

The embodiments of FIGS. 25A-N comprising SNDLCRA 300 may alternatively be provided by SDVACRA 900, for example as illustrated in FIG. 18C.

Further alternative switchable display devices 120 will now be described.

Figure 26A:
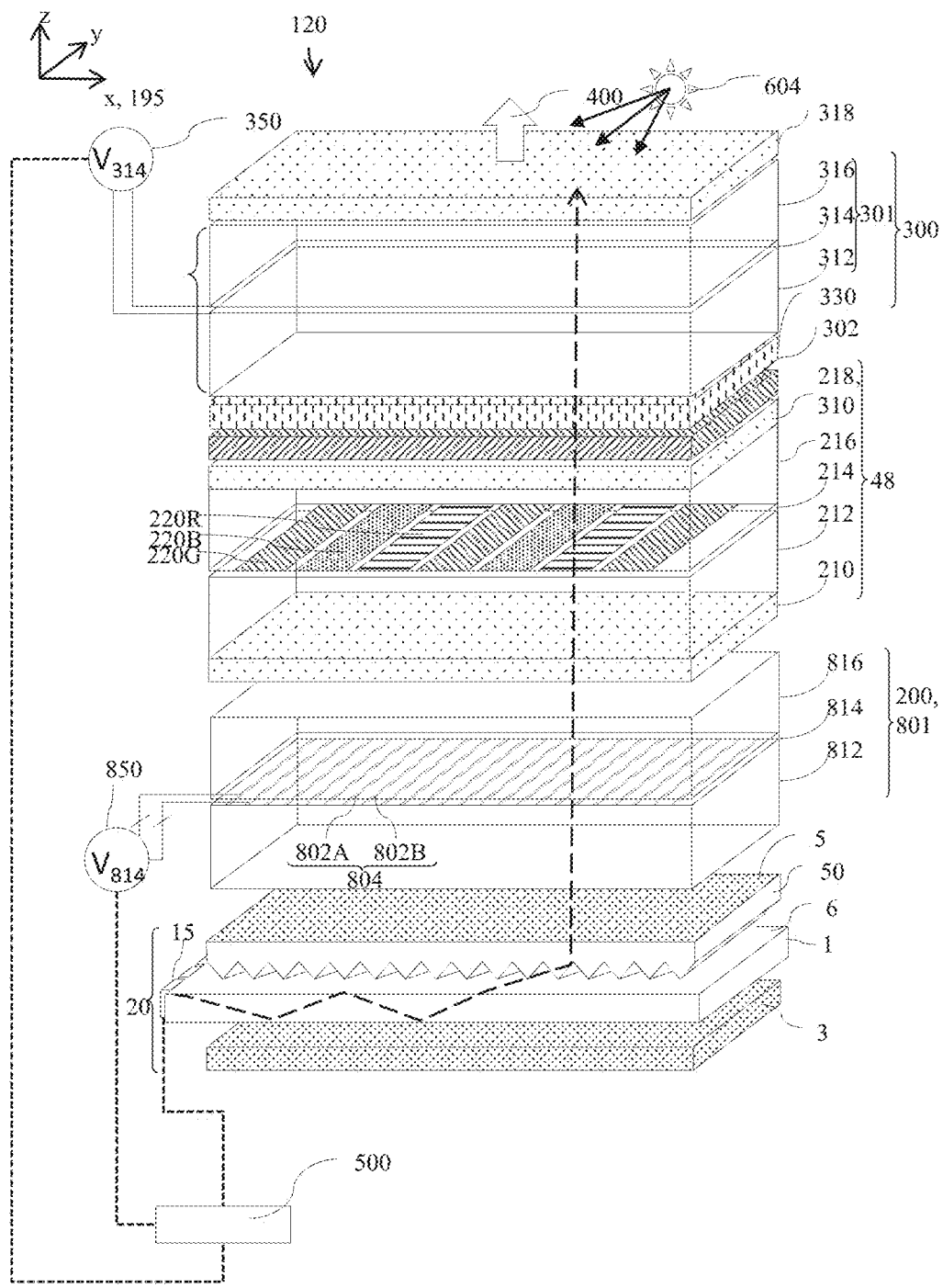
Figure 26B:
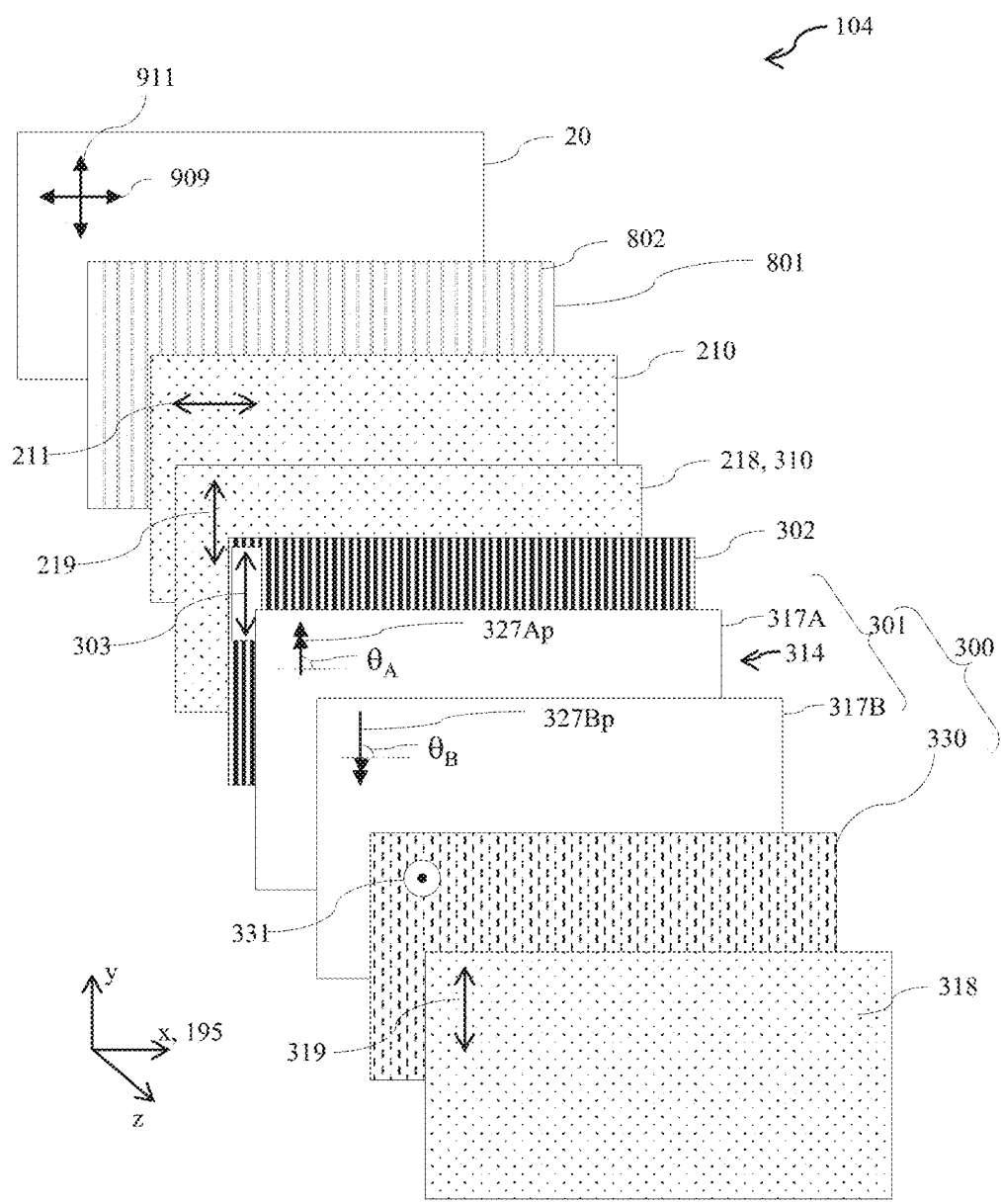

FIG. 26A is a schematic diagram illustrating in perspective side view a switchable display device 120 comprising a backlight 20; a SLDA 200 comprising SDLCE 801; a transmissive SLM 48 with input and output display polarisers 210, 218; a reflective polariser 302; a SNDLCRA 300 and an additional polariser 318; and FIG. 26B is a schematic diagram illustrating in perspective front view alignment orientations for an optical stack 104 for use in the embodiment of FIG. 26A. Features of the embodiment of FIGS. 26A-B not discussed in further detail may be assumed to correspond to the features with equivalent reference numerals as discussed above, including any potential variations in the features.

In the alternative switchable display device 120 of FIGS. 26A-B, the display polariser 310 is an output display polariser 218 arranged on the output side of the SLM 48. The display device 120 further comprises a reflective polariser 302, the reflective polariser 302 being a linear polariser arranged between the output display polariser 218, 310 and at least one first SNDLCRA 300, the reflective polariser 302 being a linear polariser. Alternatively the reflective polariser 302 may be omitted. The SNDLCRA 300 is arranged between the display polariser 218, 310 and additional polariser 318.

SLDA 200 is not arranged between the display polariser 910 and additional polariser 918 being arranged between the backlight 20 and the input polariser 210 of the SLM 48. In the embodiment of FIGS. 26A-B, the SLDA 200 comprises SDLCE 801. The SNDLCR 301 comprises two surface alignment layers 317A, 317B disposed adjacent to the layer 314 of liquid crystal material 315 and on opposite sides thereof, the surface alignment layers 317A, 317B each being arranged to provide alignment of the adjacent liquid crystal material 315. The at least one SNDLCRA 300 further includes at least one passive compensation retarder 330.

Figure 27A:
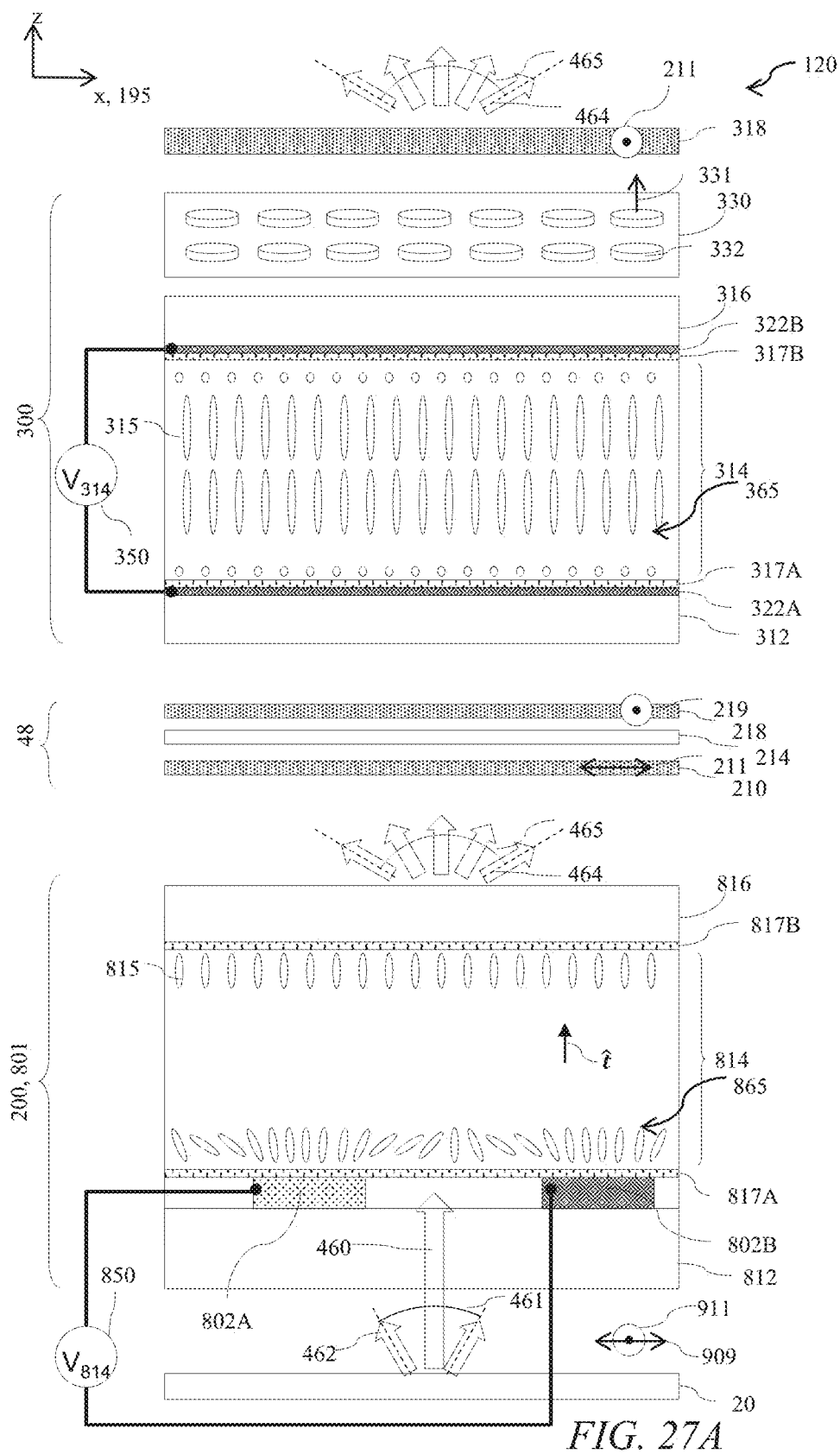
Figure 27B:
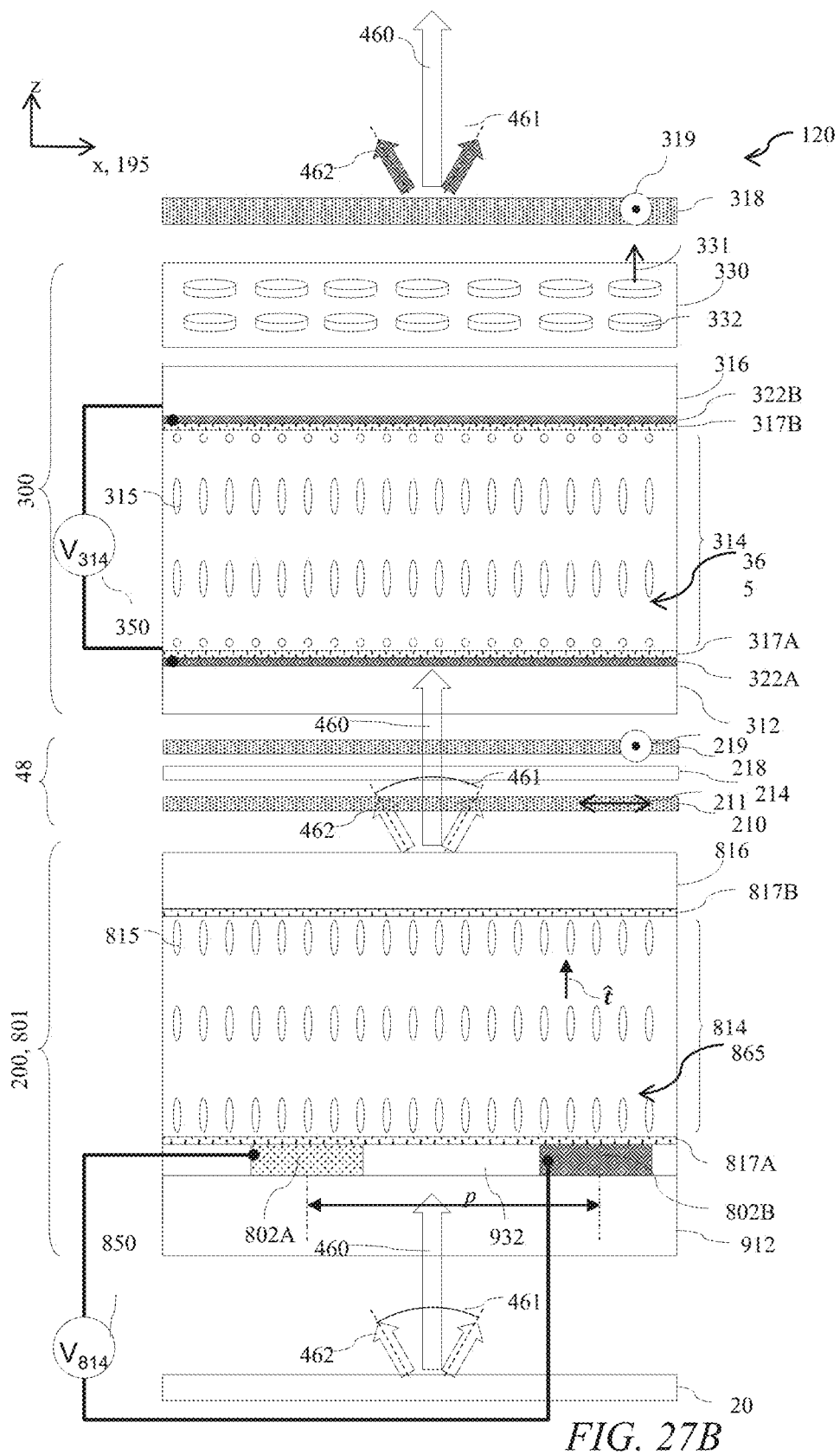
Figure 27C:
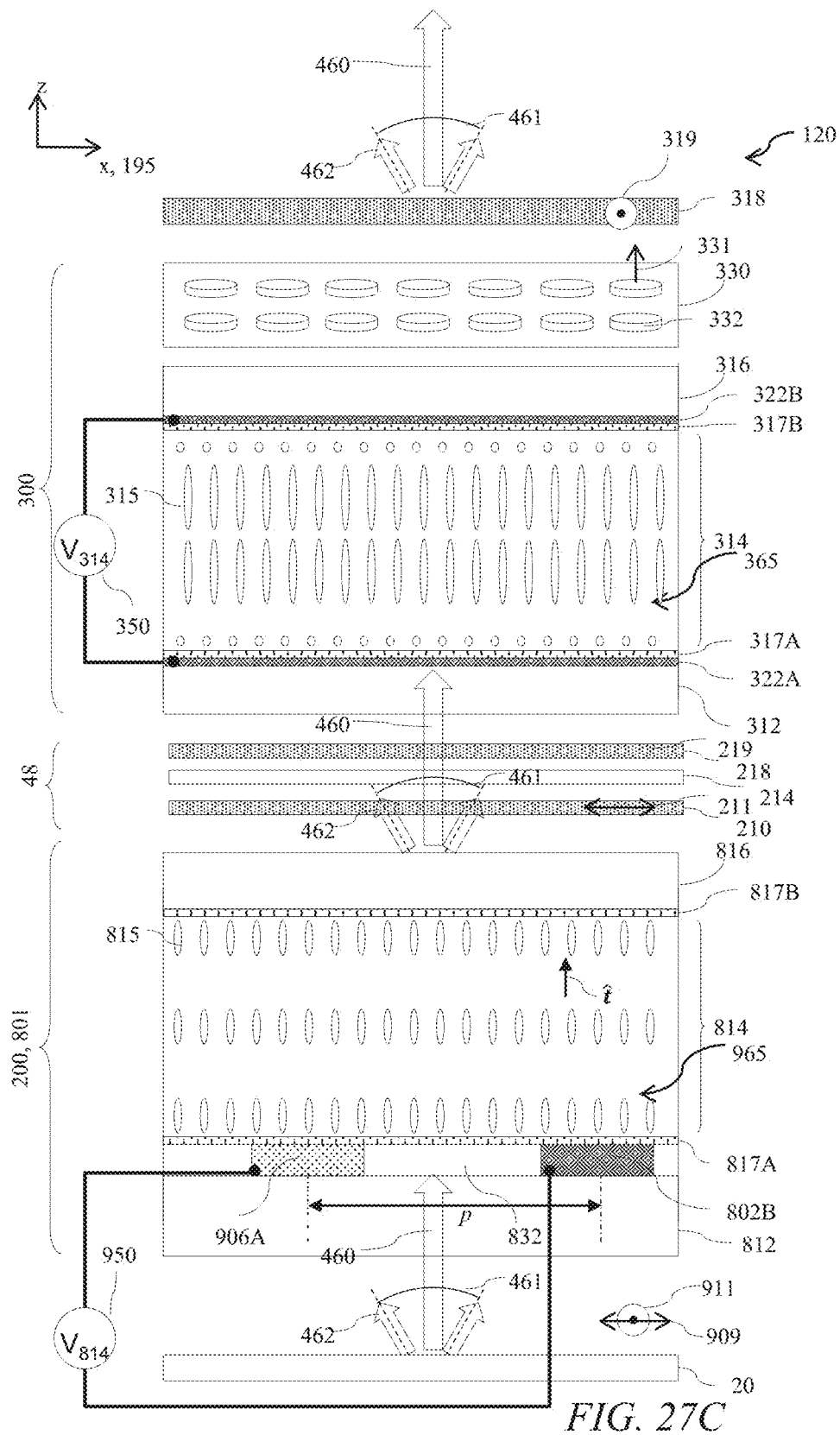

In the alternative embodiment of FIGS. 27A-C the SLDA 200 is arranged on the same side of the SLM 48 as the input display polariser 210 and is further arranged outside the additional polariser 318. The SLDA 200 comprises a SDLCE 801 that comprises transparent substrates 812, 816, a liquid crystal layer 814 comprising liquid crystal material 815 with structure 865, electrode arrangement 804 comprising interdigitated spatially separated electrodes 806A, 806B with gaps 832 and a driver 850. Surface alignment layers 817A, 817B are arranged to provide homeotropic alignment directions 827A, 827B at respective surfaces of the liquid crystal material 815. The SLDA 200 operates in unpolarised light. Polarisation mixing due to residual retardance in the SDLCE 801 does not provide light loss at the input polariser 210 and off-axis efficiency is improved. Further thickness may be reduced.

The operation of the display device 120 of FIGS. 26A-B will now be described further.

FIG. 27A is a schematic diagram illustrating in top view the structure and operation of the optical stack 104 of FIGS. 26A-B and the electrode arrangement 804 FIG. 21C (but omitting the electrode arrangement 324) for wide-angle state; FIG. 27B is a schematic diagram illustrating in top view the structure and operation of the optical stack 104 of FIGS. 26A-B for narrow-angle state; and FIG. 27C is a schematic diagram illustrating in top view the structure and operation of the optical stack 104 of FIGS. 26A-B for an intermediate state. Features of the embodiments of FIGS. 27A-C not discussed in further detail may be assumed to correspond to the features with equivalent reference numerals as discussed above, including any potential variations in the features.

TABLES 17-18 provide an illustrative embodiment for the arrangement of FIGS. 27A-B. The retardance of the SDLCE 801 may be increased to achieve increased light dispersion from the SDLCE without losses associated with undesirably polarisation mixing. Display efficiency is advantageously improved.

TABLE 17

| Item | | Property | Illustrative embodiment |
|---|---|---|---|
| SDLCE 801 | Electrode 802A, 802B | Pitch, p | 10 μm |
| | | Width, w | 3 μm |
| | Surface alignment layer 817A | Type | Homeotropic |
| | | In-plane alignment direction 827Ap angle $\theta_A$ | 90° |
| | | Pretilt angle | 90° |
| | Surface alignment layer 817B | Type | Homeotropic |
| | | In-plane alignment direction 827Bp angle $\theta_B$ | 270° |
| | | Pretilt angle | 90° |
| | LC layer 814 | Retardance | 500 nm |
| Display polariser 310 | | Electric vector transmission direction, 311 | 0° |
| SNDLCRA 300 | Surface alignment layer 317A | Type | Homogeneous |
| | | In-plane alignment direction 327Ap angle $\theta_A$ | 90° |
| | | Pretilt angle | 2° |
| | Surface alignment layer 317B | Type | Homogeneous |
| | | In-plane alignment direction 327Bp angle $\theta_B$ | 270° |
| | | Pretilt angle | 2° |
| | LC layer 314 | Retardance | 750 nm |
| | Passive retarder 330 | Type | Negative C-plate |
| | | Retardance | −440 nm |
| Additional polariser 318 | | Electric vector transmission direction, 319 | 0° |

TABLE 18

| Item | Wide-angle state | Narrow-angle state | Intermediate state |
|---|---|---|---|
| FIGS. | 27A | 27B | 27C |
| V814 | 20 V | 0 V | 0 V |
| V314 | 5 V | 2.3 V | 5 V |

In comparison to the embodiments of FIGS. 21A-C, in the alternative embodiments of FIGS. 27A-C at least one polariser is arranged between the SLDA 200 and the SNDLCRA 300. In the embodiment of FIGS. 27A-C, the at least one polariser comprises the input polariser 210 and the output polariser 218. In alternative embodiments, the at least one polariser may comprise an additional polariser 318.

The SLDA 200 operates on the polarisation components 909 provided by the backlight 20. Further, some light of polarisation state 911 may be transmitted by the SDLCE through the input polariser 210 due to polarisation mixing in the SDLCE 801 as described hereinabove. Losses arising from polarisation mixing in the SDLCE 801 may be reduced and efficiency increased.

The operation of the SNDLCRA 300 arranged between a display polariser 310 and additional polariser 318 and the reflective polariser 302 is similar to that described hereinabove. In comparison to the embodiments of FIGS. 21A-C, the embodiments of FIGS. 27A-C illustrate that the transmission properties of the SNDLCRA 300 are not modified by the structure 865 of liquid crystal material 815 orientations of the SDLCE 801. The polarisation state 219 incident onto the SNDLCRA 300 may have improved ellipticity and increased uniformity in comparison to the embodiments of FIGS. 27A-C. Advantageously in narrow-angle state, transmission may be reduced along the inclined axis 447 and the size of the polar region for desirable security factor. S>1 is increased. Improved image visibility may be achieved in the wide-angle state and improved security factor S achieved in the narrow-angle state for the inclined axis 447.

It may be desirable to further increase security factor S in narrow-angle state.

FIGS. 28A-H are schematic diagrams illustrating non-exhaustive side views of alternative switchable display devices 120. Features of the embodiments of FIGS. 28A-H not discussed in further detail may be assumed to correspond to the features with equivalent reference numerals as discussed above, including any potential variations in the features.

The embodiments of FIGS. 28A-H illustrate that arrangements of SDLCE 801 and SNDLCRA 300 may be provided to achieve improved security factor in narrow-angle state and/or improved luminance in inclined axis 447 in wide-angle state.

In the alternative embodiments of FIG. 28A, FIG. 28C, FIG. 28E and FIG. 28G the reflective polariser 302 is omitted. Advantageously cost and thickness is reduced.

In the alternative embodiments of FIGS. 28C-F. SNDLCRA 300A, additional polariser 318A, further SNDLCRA 300B and further additional polariser 318B are provided. Advantageously image security may be achieved in narrow-angle state. The angle φ at which desirable image security factor S is achieved may be reduced.

Figures 28A, 28B:
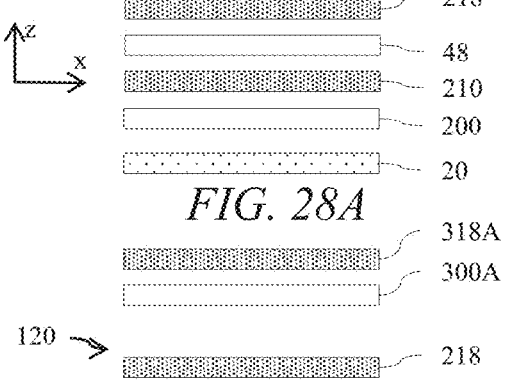
Figures 28C, 28D:
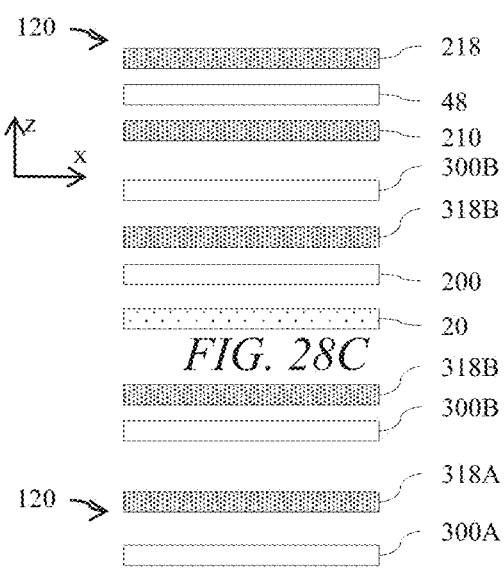
Figures 28E, 28F:
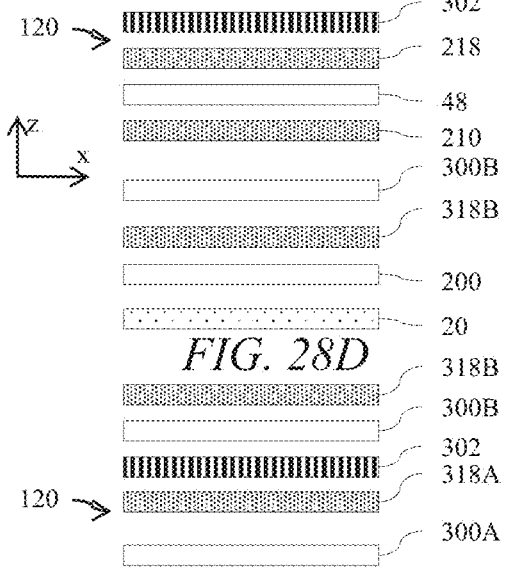
Figures 28G, 28H:
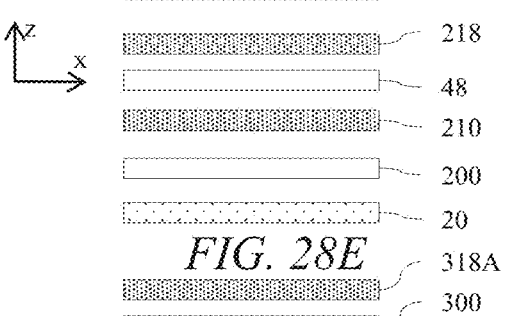

In the alternative embodiments of FIGS. 28G-H, SNDLCRA 300, additional polariser 318, SDVACRA 900 and further additional polariser 918 are provided. Advantageously image security may be achieved in narrow-angle state. The angle φ at which desirable image security factor S is achieved may be reduced. Further image visibility may be improved in the wide-angle state.

An alternative SLDA 200 will now be described.

FIG. 29A is a schematic diagram illustrating in perspective side view a switchable display device 130 comprising a backlight 20; a SLDA 200 comprising a switchable surface relief birefringent arrangement (SSRBA) 600 that comprises a surface relief birefringent light dispersion element (SR-BLDE) 601 and a polarisation control element (PCE) 610; a transmissive SLM 48 with input and output polarisers 210, 218; a reflective polariser 302; a SNDLCRA 300 and an additional polariser 318; FIG. 29B is a schematic diagram illustrating in perspective front view alignment orientations for an optical stack 104 for use in the embodiment of FIG. 29A; FIG. 29C is a schematic diagram illustrating in top view operation of the SSRBA 600 of FIGS. 29A-B in wide-angle state; FIG. 29D is a schematic diagram illustrating in top view operation of the SSRBA 600 of FIGS. 29A-B in narrow-angle state; and FIG. 29E is a schematic diagram illustrating in perspective front view a SRBLDE 601. Features of the embodiments of FIGS. 29A-E not discussed in further detail may be assumed to correspond to the features with equivalent reference numerals as discussed above, including any potential variations in the features.

As with FIGS. 26A-B, the SNDLCRA 300 of FIGS. 29A-B is arranged to receive light from the display polariser 218 and switch between wide-angle and narrow-angle states as described hereinabove. Further, the embodiments of FIGS. 28A-H may be provided with the alternative SDLA 200 of the present embodiments.

By way of comparison to FIGS. 26A-B, in the alternative embodiment of FIGS. 29A-B, the SLDA 200 comprises a SSRBA 600 comprising a SRBLDE 601 and a PCE 610.

The SRBLDE 601 comprises a birefringent layer 602 of birefringent material 603 having an ordinary refractive index no and an extraordinary refractive index ne; and an isotropic layer 604 of isotropic material 605 having an interface 608 with the birefringent layer 614, wherein the isotropic material 603 has a refractive index ni that is equal to the ordinary refractive index no or the extraordinary refractive index ne of the birefringent material, and the interface surface 608 has a surface relief that is dispersive. In practice, some small index difference between the refractive index ni and no or index ni and ne may be present, for example the difference between ni and no or ni and ne may be less than 30% and preferably less than 15% of the difference between no and ne.

In other words the SRBLDE 601 comprises a structured interface 608 between an isotropic material 605 and a birefringent material 603. The birefringent material 603 may be aligned with an alignment layer 607 that may be provided on the interface 608 such that the material 603 has respective components of alignment in the plane of the layer 607$p$ which may be provided by at least surface alignment layers 607. The isotropic material 605, may comprise for example a solid transparent polymeric material such as a UV cured material, and the birefringent material 603 may for example comprise a cured liquid crystal material such as a reactive mesogen.

The PCE 610 comprises transparent substrates 612, 616; a layer 614 of liquid crystal material 615 and surface alignment layers 617A, 617B on opposing sides of the layer 614 of liquid crystal material 615; and a transmissive electrode arrangement 624 comprising uniform electrodes 622A, 622B on opposing sides of the layer 614 of liquid crystal material 615 and arranged to drive the layer 614 of liquid crystal material 615. The control system 500 is arranged to control voltage driver 650 that provides a first voltage in the wide-angle state of FIG. 29C and a second different voltage in the narrow-angle state of FIG. 29D.

In the illustrative embodiment of FIG. 29B, the PCE 610 may comprise surface alignment layers 617A, 617B that are homogeneous surface alignment layers. Advantageously visibility of the flow of the liquid crystal material 615 under applied pressure may be reduced. Alternatively the PCE 610 may comprise surface alignment layers 617A, 617B that are homeotropic surface alignment layers. Advantageously power consumption in wide-angle state may be reduced, wherein a 0V applied voltage may be provided.

Alignment layers 617A, 617B have orthogonal alignment directions 617Ap, 617Bp so that the layer 614 of liquid crystal material 615 is a twisted nematic structure arranged to rotate an input polarisation state 609 to output polarisation state 611 in a first mode of operation and to pass the polarisation state 611 in a second mode of operation. Advantageously the chromaticity of the output polarisation state 611 may be reduced. Desirably the PCE 610 provides a rotated polarisation state for a wide field of view. FIGS. 29A-B illustrate that a further optional passive compensation retarder 630 may be provided to increase the field of view of the PCE 610. Advantageously light dispersion in the inclined axis 447 may be increased in wide-angle state.

The operation of the SSRBA 600 of FIGS. 29A-B will now be described.

As illustrated in FIGS. 29C-D, the PCE 610 is arranged to selectively control the polarisation of light passing through the SLDA 200 (that is the SSRBA 600) between a first polarisation state 611 that experiences the ordinary refractive index no in the birefringent layer and a second polarisation state 609 that experiences the extraordinary refractive index ne in the birefringent layer 614. The surface relief is dispersive by refraction and in the embodiment of FIGS. 29A-D the surface relief is a random profile. Alternatively the surface relief may comprise at least one of a lens profile, a prism profile, a random profile or an engineered profile.

In the wide-angle state, as illustrated in FIG. 29C, input light 460, 462 with the polarisation state 609 incident onto the interface 608 is dispersed because of the index step between the isotropic material 603 and the birefringent material 603. Such light is then incident onto the PCE 610. The layer 614 of liquid crystal material 615 is arranged to provide a rotation of the polarisation state of the incident polarisation component 609 such that polarisation state 611 is output and transmitted by the input display polariser 210 in the wide-angle state.

As illustrated in FIG. 29D for the narrow-angle state, light with polarisation state 611 undergoes substantially no dispersion at the interface 608 because of the matched refractive indices for the isotropic material 603 and the birefringent material 605. Such light is then incident onto the PCE 610. The layer 614 of liquid crystal material 615 is arranged to provide no rotation of the polarisation state of the incident polarisation component 611 such that the same polarisation state 611 is output and transmitted by the display polariser 910 in the wide-angle state.

The profile of the interface 608 may have a profile that is dispersive by refraction and may comprise at least one of a lens profile, a prism profile, a random profile or other engineered profile; and may further comprise discontinuous gradient as well as other engineered profiles to achieve desirable scattered light distributions. In general, the interface 608 may be provided with small pitch features (for example less than 20 micrometres, and preferably less than 10 micrometres) with sharp (high gradient) changes in comparison to refractive features. Disclinations of liquid crystal material 615 at such features may provide improved scatter and advantageously achieve higher image visibility in the inclined axis 447 in wide-angle state. In narrow-angle state, the incident polarisation state 611 is substantially index-matched at the interface and the disclination may be substantially not modifying the incident wavefront 470.

FIG. 29E illustrates a SRBLDE 601 that is a refractive element that provides dispersion of light by refraction in the dispersion state.

A diffractive SRBLDE 601 will now be described.

FIG. 30A is a schematic diagram illustrating in perspective front view a diffractive profile SRBLDE 601; and FIG. 30B is a schematic graph illustrating a profile 430 of diffracted luminance into diffractive orders for the embodiment of FIG. 30A in wide-angle state. Features of the embodiment of FIGS. 30A-B not discussed in further detail may be assumed to correspond to the features with equivalent reference numerals as discussed above, including any potential variations in the features.

In comparison to FIG. 29E, in the alternative embodiment of FIG. 30B, the surface relief 608 is dispersive by diffraction, comprising interface 608 comprising periodic features with period q. FIG. 30B illustrates a diffraction profile for the light of the polarisation state 609 of FIG. 29C, $\alpha$ 10 micron pitch q and a grating phase depth $\vartheta$ of $\pi$ for a wavelength of 550 nm and period, q of 10 μm. Advantageously higher light diffusion angles can be provided than achievable by refractive surfaces alone. The angle $\sigma$ at which desirable image visibility may be observed in the inclined axis 447 may advantageously be increased.

A passenger infotainment display will now be described.

FIG. 31A is a schematic diagram illustrating in top view a passenger infotainment display device 100 for use in a vehicle 650; and FIG. 31B is a schematic diagram illustrating in top view operation of the passenger infotainment display device 100 of FIG. 31A. Features of the embodiment of FIGS. 31A-B not discussed in further detail may be assumed to correspond to the features with equivalent reference numerals as discussed above, including any potential variations in the features.

Vehicles may include the automotive vehicle 650 of FIG. 31A or trains, boats, and airplanes for example. In the alternative embodiment of FIG. 31A, display device 100 is arranged in a passenger information display (PID) location (on the right-hand side of the vehicle for Left-Hand Drive), with light rays 445, 447 output to the user 45 and user 47 respectively. In right-hand drive vehicles, the directions of light deflection referred to hereinbelow are typically reflected about a vertical axis, that is the lateral direction is reversed.

The present embodiments refer to display device 100 as described hereinbefore. Alternatively the display devices 110, 120, 130 described hereinabove may be provided.

In narrow-angle state the display device 100 is arranged for viewing by the front passenger 45 near to an on-axis 199 location, and to inhibit viewing by the driver 47. Light rays along inclined axis 447 may represent the direction for minimum luminance from the display device 100. Light rays along viewing axis 445 may be arranged at a non-zero angle to the normal 199 direction. Advantageously the angular separation of the passenger 45 from the driver 47 may be increased to achieve increased security factor S for the driver 47. Further, the passenger 45 may be located at a desirable seating position that may be at a different angle to the optical axis 199.

It is desirable that the passenger 45 may view information such as entertainment without the image causing distraction to the driver 47, that is the narrow-angle state refers to a low driver distraction mode. The narrow-angle state is in comparison with a mode in which the passenger display turns off when the vehicle is in motion to prevent driver distraction. More specifically to minimise the visibility to the driver 47 of distracting images at both the nominal driver position along axis 447 and when the driver leans across towards the display while driving, it is desirable to maximise the security factor S at angles $\alpha$ from the optical axis 199 of greater than 30° and preferably greater than 25° in the direction from the optical axis 199 towards the driver 47. Further it is desirable to achieve a high security factor. S for polar angles at least at angles $\beta$ from the optical axis 199 to minimise visibility of reflected light from surfaces within the vehicle 650.

Further in a low stray light function of the narrow-angle state, it may be desirable to provide an image to the passenger 45 in narrow-angle light cone 461 with desirable luminance while reducing the luminance to reflecting and scattering surfaces within the vehicle. Advantageously the brightness of internal surfaces of the vehicle 650 may be reduced during night-time operation, reducing driver distraction. Further, increased area displays may be provided while maintaining desirably low levels of stray illumination within the vehicle 650 cabin.

In the wide-angle state, the display device 100 is arranged for viewing by driver 47 in an off-axis inclined axis 447. Such use may be for occasions when viewing the display content is safe such as when the vehicle is stationary, or the content is appropriate such as map or instrument data.

As illustrated in FIG. 31B, an asymmetric diffraction profile 430 of FIG. 15D for example may be arranged to achieve light cone 465 that is preferentially inclined towards the driver 47 in wide-angle state. Advantageously image visibility to the driver may be increased in comparison to embodiments comprising symmetric diffraction profiles 430.

It may be desirable to improve the uniformity of light output from the display device 100 as seen by viewers 45, 47 close to the display device, for example when the display device 100 subtends an angle of more than 10° to the eye of a viewer 45, 47.

FIG. 32A is a schematic diagram illustrating in top view an alternative transmissive electrode arrangement 904 wherein the electrode pitch p varies across the display device 100; FIG. 32B is a schematic diagram illustrating in top view the operation of a display device 100 comprising the alternative transmissive electrode arrangement 904 of FIG. 32A; and FIG. 32C is a schematic diagram illustrating in top view the operation of a display device 100 comprising the alternative transmissive electrode arrangement 904 of FIG. 32A further comprising a pupillated backlight 20 and/or pupillated switchable luminance liquid crystal SNDLCRA 300. Features of the embodiments of FIGS. 32A-C not discussed in further detail may be assumed to correspond to the features with equivalent reference numerals as discussed above, including any potential variations in the features.

FIGS. 32A-C illustrate examples of pupillated output from the display device 100. In the present disclosure, pupillation refers to the optical output of the display providing at least one common point such as on-axis point 425 and off-axis point 427 from which in respective narrow-angle and wide-angle states, rays from each at least part of the display device 100 are directed with substantially similar transmission, or luminance. A viewer at a pupil such as point 425 may see a substantially uniform luminance or transmission from across the at least part of the display device 100. Pupillation of various components in the display 100 may advantageously achieve increased luminance uniformity and increased uniformity of security factor.

The embodiment of FIG. 32A illustrates a SDLCR 901 comprising electrode arrangement 904 similar to that of FIG. 15C for example. Electrodes 902AAC and 902BAC central to the display area 103 have an offset $\delta c$ that is zero, to provide a symmetric diffracted output profile 430C. Electrodes 902AAR and 902BAR to the right side of the display area 103 in the direction 195 have a non-zero negative offset 8R, to provide an asymmetric diffracted output profile 430R that is directed towards the display centre. Electrodes 902AAL and 902BAL to the left side of the display area 103 in the direction 195 have a non-zero positive offset $\delta_L$, to provide an asymmetric diffracted output profile 430R that is directed towards the display centre. In operation, planar light waves 470 are pupillated to provide a pupillated output.

In the alternative embodiment of FIG. 32B, the common point 425 from which the diffraction profiles 430 converge with greatest uniformity is provided behind the nominal viewing location of the viewer 45. Advantageously display uniformity may be improved, and residual intensity variations in the direction 195 for lateral movement of the viewer 45 may be provided with desirable appearance. Further, the uniformity seen by the viewer 47 the wide-angle light cones 465R, 465C, 465L is improved in wide-angle state.

In the alternative embodiment of FIG. 32C, in comparison to the embodiment of FIG. 32B the light cones 461L, 461C, 461R from the display device 100 are further pupillated. Pupillation of backlights is described for example in U.S. Pat. No. 11,340,482, which is herein incorporated by reference in its entirety. The wide-angle light cones 465L, 465C, 465R may further be pupillated to one side, for example for use in the passenger infotainment display device 100 of FIGS. 31A-B. Advantageously wide-angle image uniformity and narrow-angle image uniformity may be further increased.

A curved display device 100 will now be described.

FIG. 32D is a schematic diagram illustrating in top view operation of a curved switchable display device 100. Features of the embodiment of FIG. 32D not discussed in further detail may be assumed to correspond to the features with equivalent reference numerals as discussed above, including any potential variations in the features.

By way of comparison with the embodiment of FIG. 32A, the display device may be curved, for example with a curvature in the plane of the normal 199 and the direction 195. Viewing directions 445C, 445L, 445R and inclined directions 447C, 447L, 447R for centre, left and right sides of the area 103 of the display device 100 respectively. Such curvature provides increased pupillation, so that advantageously the viewers 45, 47 may be provided with higher uniformity images and the viewer 47 in a non-viewing inclined axis 447 may be provided with a larger size of polar region for which desirable image security, S is achieved.

Segmented display devices 100 will now be described.

FIG. 32E is a schematic diagram illustrating in perspective front view an alternative electrode arrangement 904 for a segmented switchable display device 100. Features of the embodiment of FIG. 32E not discussed in further detail may be assumed to correspond to the features with equivalent reference numerals as discussed above, including any potential variations in the features.

By way of comparison with FIG. 1E, in the alternative embodiment of FIG. 32 the control electrode 902C is segmented with non-conducting gap 952C such that the area 103A is driven independently of the area 103B. Further the electrode bus bars 903A, 903B are provided with a gap 953 in alignment with the gap 952C so that the regions 103A, 103B may be driven independently between wide-angle, narrow-angle and intermediate states. Electrode 902R may be uniform across the area of the display device 100 or alternatively may further be segmented in alignment with the gaps 952C.

FIG. 32F is a schematic diagram illustrating in front view a segmented switchable display device 100 comprising the electrode arrangement 904 of FIG. 32E. Features of the embodiment of FIG. 32F not discussed in further detail may be assumed to correspond to the features with equivalent reference numerals as discussed above, including any potential variations in the features.

The alternative embodiment of FIG. 32F illustrates a display device 100 that is provided for a passenger infotainment display. Passenger 45 near the viewing axis 445 of the area 103A of the display device 100 may see a first image from the area 103A and second image from the area 103B, while the driver 47 along the inclined axis 447 to the area 103A may see a different image in the area 103A for example.

FIG. 32G is a schematic diagram illustrating in perspective front view the appearance to an observer 47 along an inclined axis 447 of a segmented switchable display device 100 arranged to provide a uniform wide-angle state; and FIG. 32H is a schematic diagram illustrating in perspective front view the appearance to an observer 47 along an inclined axis 447 of a segmented switchable display device 100 arranged to provide an area 103A in a narrow-angle state and an area 103B in a wide-angle state. Features of the embodiments of FIGS. 32G-H not discussed in further detail may be assumed to correspond to the features with equivalent reference numerals as discussed above, including any potential variations in the features.

As illustrated in FIG. 32G, in the wide-angle state of the area 103A, the driver 47 sees the image from both the regions 103A, 103B. Further the driver sees the image from area 103B.

By comparison as illustrated in FIG. 32H, in the narrow-angle state of the area 103A, the driver receives light with high security factor from the area 103A and thus has low driver distraction. The image in the area 103A remains visible.

Provision of a mark 321 in narrow-angle state will now be described.

FIG. 32I is a schematic diagram illustrating in perspective front view the appearance to an observer 47 along an inclined axis 447 of a segmented switchable display device 100 arranged to provide visibility of a mark 321 provided in the electrode arrangement 904 of the switchable display device 100. Features of the embodiment of FIG. 32I not discussed in further detail may be assumed to correspond to the features with equivalent reference numerals as discussed above, including any potential variations in the features.

In the alternative embodiment of FIG. 32I, the SDLCR 901 and SNDLCR 301 may be provided with electrode arrangement 904 comprising a mark 321 as described in U.S. Pat. No. 11,892,717, which is herein incorporated by reference in its entirety.

At least one electrode 902C, 902R or 322A, 322B may be patterned in areas separated by gaps to provide plural addressable regions of the layer 914 or 314 of liquid crystal material 915 or 315, at least one of the plural regions being in a shape of a mark 321 for display to an observer 45; and the control system 500 is arranged to control the SLM and to apply voltages across the first and second transmissive electrodes 902C, 902R or 322A, 322B for driving the layer 914 or 314 of liquid crystal material 915 or 315 wherein the control system 500 is arranged to be operable in plural modes of operation, including: a wide-angle operational display mode, in which the control system 500 controls the SLM 48 to display an operational image and applies voltages across the first and second transmissive electrodes 902C, 902R or 322A, 322B that drive the layer 914 or 314 of liquid crystal material 915 or 315 into the same state in different regions such that the operational image is visible at a wide angle and a narrow angle, and the mark 321 is not visible at the narrow angle or the wide angle; at least one narrow-angle operational display mode, in which the control system 500 controls the SLM to display an operational image and applies voltages across the first and second transmissive electrodes 902C, 902R or 322A, 322B that drive the layer 914 or 314 of liquid crystal material 915 or 315 into states in different regions such that the operational image is visible at the narrow-angle but not at the wide angle, and the mark 321 is not visible at the narrow-angle; and at least one mark display mode in which the control system 500 applies voltages across the first and second transmissive electrodes 902C, 902R or 322A, 322B that drive the layer 914 or 314 of liquid crystal material 915 or 315 into different states in different regions such that the mark 321 is visible.

Thus for the off-axis observer 47 of FIG. 32I, the mark 321 may be visible when the SLM 48 is not arranged in an operational mode. Such mark 321 is visible in reflected light with different reflectance in the mark 321 to the background to the mark. Alternatively the mark 321 may be arranged to be visible with different security factors S in the mark and background to the mark and the SLM 48 may be operational. The observer 47 may be made aware that the area 103A is providing information to the observer 45.

Alternative arrangements of backlights 20 will now be described. The backlight 20 arrangements of the display devices 100 described elsewhere herein may be provided by other backlight 20 types disclosed herein, including but not limited to waveguides 1 with light turning film components 50, brightness enhancement film 41 or films 41A, 41B, switchable backlights, mini-LED backlights, out-of-plane polarisers 522 and light control films 530 as described further hereinbelow.

FIG. 33A is a schematic diagram illustrating in perspective side view an alternative backlight 20 comprising addressable first and second arrays of light sources 15A, 15B. Features of the embodiment of FIG. 33A not discussed in further detail may be assumed to correspond to the features with equivalent reference numerals as discussed above, including any potential variations in the features.

The alternative embodiment of FIG. 33A provides first and second light cones 455A, 455B in dependence on the array 15A, 15B that is illuminated respectively. In wide-angle state, light source 15B may provide light cone 455B and optionally light source 15A may provide some light in light cone 445A. In narrow-angle state only light source 15A is illuminated and light primarily directed into light cone 445A.

In the present embodiments, the SDVACRA 900 may be arranged to provide further increase in the size of the cone 455B in wide-angle state. Advantageously the visibility of the display device 100 in wide-angle state may be further increased.

An alternative switchable backlight 20 will now be described.

FIG. 33B is a schematic diagram illustrating in perspective side view an alternative backlight 20 comprising first and second waveguides 1A, 1B and respective aligned first and second arrays of light sources 15A, 15B; FIG. 33C is a schematic diagram illustrating in top view operation of the backlight 20 of FIG. 33B; FIG. 33D is a schematic diagram illustrating in perspective rear view a light turning component 50; and FIG. 33E is a schematic diagram illustrating in top view a light turning component 50. Features of the embodiments of FIGS. 33B-E not discussed in further detail may be assumed to correspond to the features with equivalent reference numerals as discussed above, including any potential variations in the features.

By way of comparison with FIG. 33A, the alternative embodiment of FIGS. 34A-D comprises a further waveguide 1A arranged to receive light from a waveguide 1B with respective aligned light sources 15A, 15B. The backlight 20 comprises: at least one first light source 15A arranged to provide input light; at least one second light source 15B arranged to provide input light in an opposite direction from the at least one first light source 15A; a waveguide arrangement 11 comprising at least one waveguide 1, the waveguide arrangement 11 being arranged to receive the input light from the at least one first light source and the at least one second light source and to cause light from the at least one first light source and the at least one second light source to exit from the waveguide arrangement 11 by breaking total internal reflection; and an optical turning film component 50 comprising: an input surface 56 arranged to receive the light exiting from a waveguide 1 through a light guiding surface 8 of the waveguide 1 by breaking total internal reflection, the input surface 56 extending across the plane; and an output surface 58 facing the input surface 56, wherein the input surface 56 comprises an array of prismatic elements 51. The prismatic elements 51 may be elongate.

The waveguide arrangement 11 comprises: a first waveguide 1A extending across a plane and comprising first and second opposed light guiding surfaces arranged to guide light along the waveguide, the second light guiding surface being arranged to guide light by total internal reflection; and a first input end 2A arranged between the first and second light guiding surfaces 6A, 8A and extending in a lateral direction between the first and second light guiding surfaces 6A, 8A; wherein the at least one first light source 15A is arranged to input light 445 into the first waveguide 1A through the first input end, and the first waveguide 1A is arranged to cause light from the at least one first light source 15A to exit from the first waveguide 1A through one of the first and second light guiding surfaces 6A, 8A by breaking total internal reflection; a second waveguide 1B extending across the plane arranged in series with the first waveguide 1A and comprising first and second opposed light guiding surfaces 6B, 8B arranged to guide light along the waveguide 1B, the second light guiding surface 8B being arranged to guide light by total internal reflection, and a second input end 2B arranged between the first and second light guiding surfaces 6B, 8B and extending in a lateral direction between the first and second light guiding surfaces 6B. 8B; wherein the at least one second light source 15B is arranged to input light 447 into the second waveguide 1B through the second input end 2B, and the second waveguide 1B is arranged to cause light from the at least one second light source 15B to exit from the second waveguide 1B through one of the first and second light guiding surfaces 6B. 8B by breaking total internal reflection, and wherein the first and second waveguides 1A, 1B are oriented so that at least one first light source 15A and at least one second light source 15B input light 445, 447 into the first and second waveguides 1A, 1B in opposite directions.

The optical turning film component 50 comprises: an input surface 56 arranged to receive the light 444A, 444B exiting from the waveguide arrangement 11 through a light guiding surface of the at least one waveguide 1A, 1B of the waveguide arrangement by breaking total internal reflection, the input surface 56 extending across the plane; and an output surface 58 facing the input surface, wherein the input surface 56 comprises an array of prismatic elements 52. The prismatic elements each comprise a pair of elongate facets 52 defining a ridge 54 therebetween. Angles $\phi_A$, $\phi_B$ of prism surfaces 53A, 53B are provided to direct the nominal light output from waveguides 1A, 1B to directions 445, 447 by refraction and reflection at surfaces 53A, 53B. Advantageously desirable illumination directions such as illustrated in FIGS. 4A-F may be achieved by selection of angles $\phi_A$, $\phi_B$.

The backlight 20 of FIG. 33C may provide two different luminance profiles, for example for use in the passenger infotainment display device 100 of FIGS. 31A-B. In operation, the light 444A from the first light source 15A exits the backlight 20 with a first angular distribution 445 towards the passenger 45 and the light from the second light source 15B exits the backlight 20 with a second angular distribution 457 towards the driver. The first angular distribution 455 may be symmetrical about an axis 199 of symmetry of the backlight 20 and the second angular distribution 457 is asymmetrical about the same axis 199 of symmetry of the backlight 20. In a left-hand drive vehicle, the asymmetrical distribution 457 may be to the left of the axis 199 of symmetry of the backlight 20 and in a right-hand drive vehicle the asymmetrical distribution 457 may be to right of the axis 199 of symmetry of the backlight 20.

Waveguides 1A, 1B comprise surface relief features that are arranged to leak some of the guiding light either towards the rear reflector 3 or towards the light turning component 50. Each waveguide 1A. 1B comprises a surface relief 30 arranged on the first side 6A, 6B that may comprise prism surfaces 32, 33. Further the second sides 8A, 8B may further comprise surface relief 31 that may comprise elongate features or prism features as illustrated in FIG. 15D hereinbelow. In operation the surface reliefs 30, 31 provide leakage of light 445, 447 from the waveguide 1A, 1B for light guiding along the waveguide 1A, 1B.

FIG. 34A is a schematic diagram illustrating in perspective side view an alternative backlight 20 comprising an array of light sources 15a-n that may be mini-LEDs and an array of light deflecting wells 40a-n. Features of the embodiment of FIG. 34A not discussed in further detail may be assumed to correspond to the features with equivalent reference numerals as discussed above, including any potential variations in the features.

Backlight 20 is described in U.S. Patent Publ. No 2022-0404540, which is herein incorporated by reference in its entirety. The backlight 20 is arranged to illuminate a predetermined area of a transmissive SLM 48. Backlight 20 and SLM 48 are controlled by means of controller 500.

The size and profile of the light output cone 455 is determined by the structure and operation of the backlight 20 and other optical layers in the optical stack 5. The backlight 20 is arranged to provide α distribution of luminous intensity within a relatively small cone angle 402 in comparison with conventional backlights using brightness enhancement films such as BEF™ from 3M corporation described hereinbelow.

Backlight 20 comprises a support substrate 17, reflective layer 3, an array of light emitting elements 15 and an optical waveguide 1 comprising light input wells 30 and light deflecting wells 40. The light emitting elements 15 are aligned to the light input wells 30. The light deflecting wells 40 are arranged in an array between the light input wells 30.

The waveguide 1 comprises rear and front light guiding surfaces 6, 8 and may be comprise a light transmitting material such as PMMA, PC, COP or other known transmissive material. The light input wells may comprise air between the rear light guiding surface 6 and the end 34. The waveguide 1 comprises an array of catadioptric elements wherein light is refracted at the light input well and is reflected by total internal reflection and/or reflection at coated reflective surfaces.

The backlight 20 further comprises a reflective layer 3 behind the rear light guiding surface 6 that is arranged to reflect light extracted from the waveguide 1 through the rear light guiding surface 6 back through the waveguide 1 for output forwardly.

The backlight 20 further comprises a light turning optical arrangement that is a light turning optical component 50 arranged to direct light output rays 415G from the waveguide 1 into desirable light output cone 402. Light turning optical component 50 may comprise a film. Advantageously low thickness may be achieved.

Control system 500 is arranged to control the light emitting elements 15 and the pixels 220R, 220G, 220B of the SLM 48. High resolution image data may be provided to the SLM 48 and lower resolution image data may be provided to the light emitting elements 15 by the control system. The display device 100 may advantageously be provided with high dynamic range, high luminance and high efficiency as will be described further hereinbelow.

FIG. 34B is a schematic diagram illustrating in perspective side view an alternative backlight 20 arrangement comprising an array of light sources 15 provided on the edge of a waveguide 1, crossed brightness enhancement films 41A, 41B, light control component 5 comprising a diffuser; and a passive light control element 520 comprising an out-of-plane polariser 522 and an additional polariser 918 of the display device 100. Features of the embodiment of FIG. 34B not discussed in further detail may be assumed to correspond to the features with equivalent reference numerals as discussed above, including any potential variations in the features.

By way of comparison with FIG. 1A, the alternative backlight 20 of FIG. 34B provides an output luminance distribution that has a wider luminance profile than that typically provided by waveguides and light turning components 50. As will be described in FIG. 35C hereinbelow, the profile of the alternative backlight 20 may be narrowed by the out-of-plane polariser 522 arranged outside a polariser that may be an additional polariser 918 or alternatively a display input polariser 210.

Alternatively or additionally a light control element 520 comprising a micro-louvre component 770 may be provided between the backlight 20 and the polariser 918. Advantageously security factor S may be improved in a narrow-angle state while the light dispersion provided by the present embodiments may achieve desirable wide-angle state performance.

In alternative embodiments, the light sources 15 may be arranged as a two dimensional mini-LED array arranged to direct light into one of the guide surfaces of the waveguide 1 to achieve full area local dimming. Advantageously a high dynamic range display device 100 may be provided.

It may be desirable to provide high security factors in viewing directions 447 that are close to the normal direction. The operation of the out-of-plane polariser 522 will also be further described.

FIG. 35A is a schematic diagram illustrating in perspective side view a switchable display device 100 comprising a backlight 20; a passive light control element 520 comprising an out-of-plane polariser 522 and the additional polariser 918 that is an in-plane polariser; a SDVACRA 900; and α transmissive SLM 48; and FIG. 35B is a schematic diagram illustrating in perspective front view alignment orientations for an optical stack 104 for use in the embodiment of FIG. 35A. Features of the embodiment of FIGS. 35A-B not discussed in further detail may be assumed to correspond to the features with equivalent reference numerals as discussed above, including any potential variations in the features.

By way of comparison with FIG. 1A, the alternative embodiment of FIG. 35A illustrates that an out-of-plane polariser 522 is provided between the backlight 20 and in-plane polariser that is the additional polariser 918. As will be described further hereinbelow, the out-of-plane polariser 522 comprises dichroic material 703 arranged in a layer 714 between input side 706 and output side 708. The layer 714 may be arranged on a support substrate (not shown) to achieve controlled direction of absorption axis 722 direction ke and achieve controlled viewing axis 445 for maximum transmission.

The out-of-plane polariser 522 may be planar such as illustrated in FIG. 34B so that the direction ke may be uniform across the area of the display device 100. Advantageously thickness may be reduced.

In an alternative embodiment as illustrated in FIG. 35A, the layer 714 of the out-of-plane polariser 522 may be curved. In operation the light cone 455A is output towards the out-of-plane polariser 522 from the backlight 20. The backlight 20 may provide output light cones 455AR, 455AC, 455AL that are directed towards a common location that may be on the output side of the display device 100. Such backlights 20 are described for example in U.S. Pat. No. 11,340,482, which is herein incorporated by reference in its entirety. The curvature of the layer 714 provides light cones 455BR, 455BC, 455BL that are output from the additional polariser 918 that is an in-plane polariser that are further directed towards a further common location that may be on the output side of the display device 100 wherein the further common location may be the same as the common location. The common location may be referred to as a viewing window and may be in a viewing window plane. In an illustrative embodiment the common window plane may have a distance of 1000 mm for a nominal observer 45 viewing distance of 500 mm. In operation, the observer 45 may advantageously receive an image with improved uniformity across the area of the display device 100.

The operation of the out-of-plane polariser 522 will now be further described.

FIG. 35C is a schematic diagram illustrating in perspective side view the operation of an out-of-plane polariser 522 and an additional polariser 918 for light from the backlight 20. Features of the embodiment of FIG. 35C not discussed in further detail may be assumed to correspond to the features with equivalent reference numerals as discussed above, including any potential variations in the features.

FIG. 35C illustrates light rays 762 propagation with linear polarisation state 742 from backlight 20 that is incident on a molecule 703 of the out-of-plane polariser 522.

Light ray 762a from location 760a along the normal 199 propagates along the absorption axis $k_e$ direction 720 of the molecule 703, and parallel to the transmission axis $k_{oa}$, 722a, so that substantially no absorption takes place and the light ray 762a is transmitted with high luminous flux through the out-of-plane polariser 522.

In-plane polariser 918 with dichroic material 903 and absorption axis $j_e$ direction 922 has electric vector transmission direction 919 arranged to transmit linear polarisation state 742.

Light ray 762c from location 760c is incident on the molecule 703 with polarisation state 742 aligned orthogonally to the absorption axis $k_e$ direction 720 so that substantially no absorption takes place by the molecules 703 of the out-of-plane polariser 522 and the light ray 763c is transmitted by the in-plane polariser 918 with high luminous flux.

By comparison with light rays 762a. 762c, for light ray 762b from location 760b the polarisation state 742 has a component along the ray 762b that is aligned with the absorption axis $k_e$ direction 722 of the molecule 703. Such alignment provides some absorption at the molecule 703 so that the output ray 763b from the out-of-plane polariser 522 has reduced luminous flux. The amount of absorption is determined by the thickness, d, refractive indices ne, no and absorption coefficients $\alpha_e(\phi,\theta)$ $\alpha_o(\phi,\theta)$ of the out-of-plane polariser 522 for polar angle ($\phi$, $\theta$), at the angle of incidence of the ray 762b for the polarisation state 740.

Considering the orthogonal polarisation state 740, in the first mode, light rays 762a, 762b, 762c from the backlight 20 are absorbed by the in-plane polariser 918 from the locations 760a, 760b, 760c across the backlight 20 and so are not illustrated.

An illustrative embodiment of passive light control element 520 comprising an out-of-plane polariser 522 will now be described.

FIG. 36A is a schematic graph illustrating the polar variation of transmission for an illustrative out-of-plane polariser 522 and in-plane polariser 918; FIG. 36B is a schematic graph illustrating the polar variation of luminance for an illustrative arrangement backlight 20 profile of FIG. 8A and the out-of-plane polariser 522 transmission profile of FIG. 36A; FIG. 36C is a schematic graph illustrating the polar variation of transmission for an illustrative SDVACRA 900 of TABLE 19; and FIG. 36D is a schematic graph illustrating the polar variation of security factor for an illustrative switchable display device 100 of FIG. 35A comprising the backlight profile of FIG. 8A, the out-of-plane polariser profile of FIG. 36A; and the SDVACRA 900 profile of FIG. 36C. Features of the embodiments of FIGS. 36A-D not discussed in further detail may be assumed to correspond to the features with equivalent reference numerals as discussed above, including any potential variations in the features.

The illustrative embodiment of FIG. 36A illustrates that reduced luminance may be achieved across the lateral direction, advantageously achieving reduced luminance profile of FIG. 36B for the backlight 20 and passive light control element 520 of FIG. 35A.

FIG. 36C illustrates the transmission profile for the arrangement of SDVACRA 900 of FIG. 35A in narrow-angle state of operation. The components 927Ap, 927Bp of alignment in the plane of the retarder layer 914 are rotated by angles $\theta_A$, $\theta_B$ (as illustrated in FIG. 1C) by angles that are different to 90° so that the direction of peak luminance is moved laterally from the normal direction 199. Switchable liquid crystal retarders comprising such rotation angles $\theta_A$, $\theta_B$ are further described in U.S. Pat. No. 11,099,448, which is herein incorporated by reference in its entirety.

TABLE 19

| Layer | Alignment Type (Surface alignment layer 917 component 927p direction) | LC layer 914 retardance | Additional passive retarder 930 type (Additional passive retarder 930 retardance) |
|---|---|---|---|
| 917A | Homogeneous ($\theta_A = 85°$) | 1000 nm | |
| 917B | Homeotropic ($\theta_B = 265°$) | | |

TABLE 19-continued

| Layer | Alignment Type (Surface alignment layer 917 component 927p direction) | LC layer 914 retardance | Additional passive retarder 930 type (Additional passive retarder 930 retardance) |
|---|---|---|---|
| 930 | | | Negative C-plate (−880 nm) |

FIG. 36D illustrates that the security factor of S>1 may be achieved for a driver 47 that is off axis with angles from the normal 199 of less than 30° for example. Such an arrangement may achieve performance that is suitable for the passenger infotainment display device 100 of FIG. 31A for example. Further transmission reduction using SNDLCRA 300 may be omitted and the display device 100 may comprise a single switch layer 914 or liquid crystal material 915 may provide desirable security factor, S for the driver 47 at an angle α of 30° or more. Cost and complexity may be advantageously reduced. In the share mode of operation, the display device 100 may be switched by diffusing light from the out-of-plane polariser 522 and additional polariser 918 to the driver 47 with high image visibility.

The arrangement of FIG. 35A may be provided with variations of SDLCR 901 as described elsewhere herein and is not limited to the embodiment of FIG. 2A for example. The out-of-plane polariser 522 may further be provided in display devices 100 comprising other types of backlight 20 including but not limited to the mini-LED backlight of FIG. 34A.

Backlights 20 may be provided with other types of passive light control element 520 as will now be described.

FIG. 37A is a schematic diagram illustrating in perspective side view the operation of a backlight comprising a light turning component 50, and a micro-louvre component 770. Features of the embodiment of FIG. 37A not discussed in further detail may be assumed to correspond to the features with equivalent reference numerals as discussed above, including any potential variations in the features.

The alternative backlight 20 of FIG. 37A is further provided with a light control component 770 that is provided to be arranged between the backlight 20 and the SLM 48. The light control component 770 comprises an input surface 776, an output surface 778 facing the input surface 776, an array of light transmissive regions 774 extending between the input surface 776 and the output surface 778, and absorptive regions 772 between the transmissive regions and extending between the input surface and the output surface.

Light control component 770 may further comprise a support substrate 710. Advantageously the flatness of the light control film may be increased to achieve increased uniformity. The light control component 770 may be curved to increase image luminance uniformity to the user 45 as described further hereinabove.

FIG. 37B is a schematic diagram illustrating in perspective side view the operation of a backlight comprising a light turning component 50, a light control component 770, an out-of-plane polariser 522 and an in-plane polariser 318. Features of the embodiment of FIG. 37B not discussed in further detail may be assumed to correspond to the features with equivalent reference numerals as discussed above, including any potential variations in the features.

By way of comparison with FIG. 37A, a further out-of-plane polariser 522 is provided between the light control element 770 and the additional polariser 918. Advantageously the size of the light cone 455C is reduced in comparison to the light cones 455A, 455B in the lateral direction at least and security factor, S for driver 447 at small angles α such as illustrated in FIG. 31A.

It may be desirable to provide a backlight 20 comprising brightness enhancement films 41A, 41B.

FIG. 38A is a schematic diagram illustrating in perspective side view an alternative backlight 20 comprising a light scattering waveguide 1, a rear reflector 3, crossed prismatic films 40A, 40B and a light control element 530 comprising louvres 532 of thickness tl with pitch pl and louvre 532 width al arranged between light transmissive regions 532 of width sl; and arranged on substrate 534; and FIG. 38B is a schematic diagram illustrating in top view operation of the backlight 20 of FIG. 38A. Features of the embodiments of FIGS. 38A-B not discussed in further detail may be assumed to correspond to the features with equivalent reference numerals as discussed above, including any potential variations in the features.

The backlight apparatus 20 of FIGS. 38A-B comprises a rear reflector 3; and an illumination apparatus comprising waveguide 1 and light sources 15. Light rays 412 from the source 15 are input through input side 2 and guide within the surfaces 6, δ of the waveguide 1. Light is output by means of extraction features 12 and is incident onto rear reflector 3 which may reflect light either by scattering or specular reflection back through the waveguide 1.

In alternative embodiments (not shown), the light sources 15 and waveguide 1 may be alternatively provided by a two-dimensional array of mini-LEDs arrayed across the area of the SLM 48 and optionally various scattering layers including wavelength conversion layers provided.

Output light is directed towards crossed brightness enhancement films 41A, 41B that are arranged to receive light exiting from the first surface 6 of waveguide 1. In the present embodiments, 'crossed' refers to an angle of substantially 90° between the optical axes of the two retarders in the plane of the retarders.

Brightness enhancement films 41A, 41B each comprise a prismatic layer with prismatic surfaces 42A, 42B arranged between the optical waveguide 1 and the SLM 48 to receive output light from the optical waveguide 1 or array of mini-LEDs. Light rays 412 from the waveguide 1 or array of mini-LEDs are directed through the SLM 48.

The prismatic surfaces 42A, 42B are elongate and the orientation of the elongate prismatic surfaces of the turning film and further turning film are crossed. Light that is in directions near to the optical axis 199 are reflected back towards the reflector 3, whereas light rays 410 that are closer to grazing the surface 6 are output in the normal direction.

Optionally reflective polariser 208 may be provided between the input display polariser 210 and backlight 20 to provide recirculated light and increase display efficiency. Advantageously efficiency may be increased.

The light recirculating components 3, 41A, 41B, 208 of backlight 20 achieve a mixing of output light from the waveguide. Such recirculation is tolerant to manufacturing defects and backlights 20 may advantageously be provided with larger size, lower cost and higher luminance uniformity than the collimated backlights illustrated elsewhere herein. However, the backlights of FIGS. 38A-B provide increased luminance at higher polar angles that may degrade security factor in narrow-angle state as will be described below.

It would be desirable to provide high uniformity backlights with low manufacturing cost while achieving high security factor in narrow-angle state, and achieving desirable luminance in the public mode of operation.

The light control component 530 is arranged between the backlight 20 and the SLM 48. Light control component 530 is arranged between the reflective polariser 208 of the backlight 20 and the display input polariser 210.

The arrangements of FIGS. 38A-B in combination with switchable liquid crystal retarders are described further in U.S. Pat. No. 11,099,447, which is herein incorporated by reference in its entirety.

Advantageously the embodiments of FIGS. 38A-B used for the backlight 20 of the present embodiments may provide reduce cost of manufacture. Improved wide-angle state visibility may be achieved and high security factor for viewers 47 in narrow-angle state.

The out-of-plane polariser 602 of FIG. 37B may further be provided with the arrangements of FIGS. 38A-B to further reduce the size of the output light cone 455.

The principles of operation of the liquid crystal layers 314, 914 and passive compensation retarders 330, 930 arranged between display polarisers 310, 910 and additional polarisers 318, 918 will now be further described.

FIG. 39A is a schematic diagram illustrating in top view propagation of output light along axes 445, 447 from a SLM 48 through an SNDLCRA 300 in a narrow-angle state. Features of the embodiment of FIG. 39A not discussed in further detail may be assumed to correspond to the features with equivalent reference numerals as discussed above, including any potential variations in the features.

In the embodiments of FIGS. 39A-B and FIGS. 40A-B as referred to hereinabove wherein the SNDLCRA 300 is alternatively provided by a SDVACRA 900, then additional polariser 318, SNDLCR 301 comprising layer 314 of liquid crystal material 315, and passive compensation retarder 330 may be alternatively provided by additional polariser 918, SDLCR 901 comprising layer 914 of liquid crystal material 915, and passive compensation retarder 930 respectively.

The principles of polarisation component phase shift $\eta(\phi_{447})$ is described further hereinabove with respect to FIG. 5D.

Linear polarisation component 360 from the output polariser 218 is transmitted by reflective polariser 302 and incident on SNDLCRA 300.

Considering the viewing axis 445, when the layer 314 of liquid crystal material 315 is driven to operate in the narrow-angle state, the SNDLCRA 300 provides no overall transformation of polarisation component 360 to output light rays 400 passing therethrough along the axis 445, but provides an overall transformation of polarisation component 360 to light rays 402 passing therethrough for the inclined axis 447. On-axis 445 light has a polarisation component 362 that is unmodified from component 360 and is transmitted through the additional polariser 318.

Considering the inclined axis 447 off-axis light has a polarisation component 364 that is transformed by the SNDLCRA 300. At a minimum transmission, the polarisation component 361 is transformed to a linear polarisation component 364 and absorbed by additional polariser 318. More generally, the polarisation component 361 is transformed to an elliptical polarisation component, that is partially absorbed by additional polariser 318.

The profile of light transmission such as that illustrated in FIG. 8B modifies the polar distribution of luminance output of the underlying SLM 48. In the case that the SLM 48 comprises a directional backlight 20, then off-axis luminance may be further be reduced as described above.

When the display polariser 310 is the input polariser 210, the principles of operation of the SNDLCRA 300 are the same as when the display polariser 310 is the output polariser 218 for transmitted light.

The operation of the reflective polariser 302 for light from ambient light source 604 will now be described for the display operating in narrow-angle state.

FIG. 39B is a schematic diagram illustrating in top view propagation of ambient illumination light through the SNDLCRA 300 in a narrow-angle state. Features of the embodiment of FIG. 39B not discussed in further detail may be assumed to correspond to the features with equivalent reference numerals as discussed above, including any potential variations in the features.

Ambient light source 604 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

For rays along axis 410, in both wide-angle and narrow-angle states of operation, the polarisation component 372 remains unmodified by the SNDLCRA 300 and so transmitted polarisation component 382 is parallel to the transmission axis of the reflective polariser 302 and the output polariser 218, so ambient light is directed through the SLM 48 and lost.

By comparison, for ray 412 along inclined axis 447, light is directed through the SNDLCRA 300 such that polarisation component 374 incident on the reflective polariser 302 may be reflected. Such polarisation component is re-converted into component 376 after passing through SNDLCRA 300 and is transmitted through the additional polariser 318.

Thus when the layer 314 of liquid crystal material is in the narrow-angle state, the reflective polariser 302 provides reflected light rays 412 along the inclined axis 447 for ambient light passing through the additional polariser 318 and then the SNDLCRA 300; wherein the reflected light 412 passes back through the SNDLCRA 300 and is then transmitted by the additional polariser 318.

The illustrative polar distribution of light reflection illustrated in FIG. 16C thus illustrates that high reflectivity can be provided at typical inclined axis 447 locations by means of the narrow-angle state of the SNDLCRA 300. Thus, in the narrow-angle state, the reflectivity for off-axis viewing positions is increased as illustrated in FIG. 16C, and the luminance for off-axis light from the SLM is reduced as illustrated in FIG. 8B. Image security factor S is advantageously increased.

Operation in the wide-angle state will now be further described.

FIG. 40A is a schematic diagram illustrating in top view propagation of output light from a SLM through the SNDLCRA 300 in wide-angle state. Features of the embodiment of FIG. 40A not discussed in further detail may be assumed to correspond to the features with equivalent reference numerals as discussed above, including any potential variations in the features.

When the SNDLCR 301 is in the wide-angle state, the SNDLCRA 300 provide substantially no overall transformation of polarisation component 360 to output light passing therethrough along either of the axes 445, 447. The profile of light transmission such as that illustrated in FIG. 8F provides substantially no modification of the polar distribution of luminance output of the underlying SLM 48.

As described hereinabove, polarisation mixing in diffractive wide-angle states may provide some change in the polarisation state 364, providing loss although desirably polarisation component 362 is substantially the same as polarisation component 360 and polarisation component 364 is substantially the same as polarisation component 360. Thus the angular transmission profile of FIG. 40B is substantially uniformly transmitting across a wide polar region. Advantageously a display may be switched to a wide field of view.

FIG. 40B is a schematic diagram illustrating in top view propagation of ambient illumination light through the SNDLCRA 300 in a wide-angle state. Features of the embodiment of FIG. 40B not discussed in further detail may be assumed to correspond to the features with equivalent reference numerals as discussed above, including any potential variations in the features.

When the SNDLCR 301 is in the wide-angle state, the SNDLCRA 300 provides substantially no overall transformation of polarisation component 372 to ambient light rays 412 passing through the additional polariser 318 along the axes 445, 447.

In operation in the wide-angle state, input light ray 412 has polarisation state 372 after transmission through the additional polariser 318. For both axes 445, 447 no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 26A.

Advantageously in a wide-angle state, high luminance and low reflectivity is provided across a wide field of view. Such a display can be conveniently viewed with high contrast by multiple viewers.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
   a spatial light modulator (SLM) arranged to output spatially modulated light;
   a display polariser arranged on a side of the SLM, the display polariser being a linear polariser, and wherein the display polariser is an output display polariser arranged on the output side of the SLM;
   an additional polariser arranged on the same side of the SLM as the display polariser outside the display polariser, the additional polariser being a linear polariser; and
   a switchable diffractive view angle control retarder arrangement arranged between the additional polariser and the display polariser, the switchable diffractive view angle control retarder arrangement comprising a switchable diffractive liquid crystal retarder comprising a layer of liquid crystal material and a transmissive electrode arrangement arranged to drive the layer of liquid crystal material,
   wherein the transmissive electrode arrangement is patterned to be capable of driving the layer of liquid crystal material selectively into:
      a narrow-angle state in which the layer of liquid crystal material has a structure of orientations which: causes the layer of liquid crystal material to introduce net phase shifts to light having a predetermined polarisation state that are uniform across an area of the layer of liquid crystal material and thereby cause the layer of liquid crystal material to provide no diffractive effect to the light having the predetermined polarisation state; and causes the switchable diffractive view angle control retarder arrangement to introduce net relative phase shifts to orthogonal polarisation components of the light having the predetermined polarisation state that differ along a viewing axis and an inclined axis that is inclined to the viewing axis; and
      a wide-angle state in which the layer of liquid crystal material has a structure of orientations which causes the layer of liquid crystal material to introduce net phase shifts to the light having the predetermined polarisation state that vary spatially across the area of the layer of liquid crystal material and thereby cause the layer of liquid crystal material to provide a diffractive effect to the light having the predetermined polarisation state.

2. A display device according to claim 1, wherein the display device further comprises a reflective polariser arranged between the output display polariser and the switchable diffractive view angle control retarder arrangement, the reflective polariser being a linear polariser.

3. A display device comprising:
   a spatial light modulator (SLM) arranged to output spatially modulated light;
   a display polariser arranged on a side of the SLM, the display polariser being a linear polariser;
   an additional polariser arranged on the same side of the SLM as the display polariser outside the display polariser, the additional polariser being a linear polariser;
   a switchable non-diffractive liquid crystal retarder arrangement arranged between the additional polariser and the display polariser, the switchable non-diffractive liquid crystal retarder arrangement comprising a switchable non-diffractive liquid crystal retarder comprising a layer of liquid crystal material and a transmissive electrode arrangement arranged to drive the layer of liquid crystal material selectively into:
  a narrow-angle state in which the layer of liquid crystal material causes the switchable non-diffractive liquid crystal retarder arrangement to introduce net relative phase shifts to orthogonal polarisation components of light having a predetermined polarisation state that vary along a viewing axis and an inclined axis that is inclined to the viewing axis; and
  a wide-angle state in which the layer of liquid crystal material causes the switchable non-diffractive liquid crystal retarder arrangement to introduce net relative phase shifts to the orthogonal polarisation components of the light having the predetermined polarisation state that are the same along the viewing axis and the inclined axis; and
a switchable light dispersion arrangement arranged in series with the SLM, the display polariser, the additional polariser and the switchable non-diffractive liquid crystal retarder arrangement, wherein the switchable light dispersion arrangement is switchable between a non-dispersive state not providing dispersion of light and a dispersive state providing dispersion of light.

4. A display device according to claim 3, wherein the switchable light dispersion arrangement provides dispersion of light in the dispersive state in one direction across the area of the layer of liquid crystal material.

5. A display device according to claim 3, further comprising a control system arranged to supply voltages to the transmissive electrode arrangement for driving the layer of liquid crystal material and arranged to control the switchable light dispersion arrangement.

6. A display device according to claim 5, wherein the control system is arranged:
  in the narrow-angle state of the display device:
    to supply voltages to the transmissive electrode arrangement that are selected to drive the layer of liquid crystal material of the switchable non-diffractive liquid crystal retarder into the narrow-angle state thereof, and
    to switch the switchable light dispersion arrangement into the non-dispersive state; and
  in the wide-angle state of the display device:
    to supply voltages to the transmissive electrode arrangement that are selected to drive the layer of liquid crystal material of the switchable non-diffractive liquid crystal retarder into the wide-angle state thereof, and
    to switch the switchable light dispersion arrangement into the dispersive state.

7. A display device according to claim 3, wherein the switchable light dispersion arrangement is a diffractive element that provides dispersion of light by diffraction in the dispersion state.

8. A display device according to claim 7, wherein the layer of liquid crystal material is a first layer of liquid crystal material, the transmissive electrode arrangement is a first transmissive electrode arrangement, and the switchable light dispersion arrangement comprises a switchable diffractive liquid crystal element that comprises:
  a second layer of liquid crystal material; and
  a second transmissive electrode arrangement arranged to drive the second layer of liquid crystal material,
  wherein the second transmissive electrode arrangement is patterned to be capable of driving the second layer of liquid crystal material selectively into:
    a non-diffractive state corresponding to the non-dispersive state of the switchable light dispersion arrangement in which the second layer of liquid crystal material has a structure of orientations which causes the second layer of liquid crystal material to introduce net phase shifts to the light having the predetermined polarisation state that are uniform across the area of the second layer of liquid crystal material and thereby cause the second layer of liquid crystal material to provide no dispersion of the light having the predetermined polarisation state; and
    a diffractive state corresponding to the dispersive state of the switchable light dispersion arrangement in which the second layer of liquid crystal material has a structure of orientations which causes the second layer of liquid crystal material to introduce net phase shifts to the light having the predetermined polarisation state that vary spatially across the area of the second layer of liquid crystal material and thereby cause the second layer of liquid crystal material to provide the dispersion of light by a diffractive effect to the light having the predetermined polarisation state.

9. A display device according to claim 3, wherein the switchable light dispersion arrangement is a refractive element that provides dispersion of light by refraction in the dispersion state.

10. A display device according to claim 3, wherein the switchable light dispersion arrangement comprises:
  a birefringent layer of birefringent material having an ordinary refractive index and an extraordinary refractive index;
  an isotropic layer of isotropic material having an interface with the birefringent layer, wherein the isotropic material has a refractive index that is equal to the ordinary refractive index or the extraordinary refractive index of the birefringent material, and the interface surface has a surface relief that is dispersive; and
  a polarisation control element arranged to selectively control the polarisation of light passing through the switchable light dispersion arrangement between a first polarisation state that experiences the ordinary refractive index in the birefringent layer and a second polarisation state that experiences the extraordinary refractive index in the birefringent layer.

11. A display device according to claim 10, wherein the surface relief is dispersive by refraction.

12. A display device according to claim 11, wherein the surface relief is a lens profile, a prism profile, a random profile, or an engineered profile.

13. A display device according to claim 10, wherein the surface relief is dispersive by diffraction.

14. A display device according to claim 3, wherein the switchable light dispersion arrangement is arranged between the display polariser and the additional polariser.

15. A display device according to claim 14, wherein;
  the display device further comprises a backlight arranged to output light,
  the SLM is a transmissive SLM arranged to receive the output light from the backlight, and
  the display polariser is an input display polariser arranged on the input side of the SLM.

16. A display device according to claim 3, wherein the switchable light dispersion arrangement is arranged on the same side of the SLM as the display polariser, outside the additional polariser.

17. A display device according to claim 16, wherein:
the display device further comprises a backlight arranged to output light,
the SLM is a transmissive SLM arranged to receive the output light from the backlight,
the display polariser is an input display polariser arranged on the input side of the SLM, and
the switchable light dispersion arrangement, the additional polariser and the switchable non-diffractive liquid crystal retarder arrangement are arranged between the backlight and the SLM.

18. A display device according to claim 3, wherein;
the display device further comprises a backlight arranged to output light, and
the SLM is a transmissive SLM arranged to receive the output light from the backlight.

19. A display device according to claim 18, wherein;
the display polariser is an output display polariser arranged on the output side of the SLM, and
the switchable light dispersion arrangement is arranged between the backlight and the SLM.

20. A display device according to claim 19, wherein the display device further comprises a reflective polariser arranged between the output display polariser and the switchable non-diffractive liquid crystal retarder arrangement, the reflective polariser being a linear polariser.

21. A display device according to claim 17, wherein the backlight provides a luminance at polar angles to the normal to the SLM greater than 45 degrees that is at most 30% of the luminance along the normal to the SLM, preferably at most 20% of the luminance along the normal to the SLM, and most preferably at most 10% of the luminance along the normal to the SLM.

22. A display device according to claim 3, wherein the switchable non-diffractive liquid crystal retarder comprises two surface alignment layers disposed adjacent to the layer of liquid crystal material and on opposite sides thereof.

23. A display device according to claim 3, wherein the switchable non-diffractive liquid crystal retarder arrangement further includes at least one passive compensation retarder.

\* \* \* \* \*